US010693969B2

(12) United States Patent
Cho et al.

(10) Patent No.: US 10,693,969 B2
(45) Date of Patent: Jun. 23, 2020

(54) ELECTRONIC DEVICE USING LOGICAL CHANNELS FOR COMMUNICATION

(71) Applicant: Samsung Electronics Co., Ltd., Suwon-si, Gyeonggi-do (KR)

(72) Inventors: Ki-Soo Cho, Seoul (KR); Aravind Iyer, Bangalore (IN); Mahesh Anjanappa, Bangalore (IN); Ranjeet Kumar Patro, Bangalore (IN); Prasad Tirumala Sree Hari Vara Vadlapudi, Bangalore (IN); Suck-Ho Seo, Suwon-si (KR); In-Hyuk Choi, Seoul (KR); Il-Sung Hong, Seoul (KR); Abhijit C Pathak, Bangalore (IN); Amit Prabhudesai, Bangalore (IN); Ashok Subash, Bangalore (IN); Ravindra Balkrishna Shet, Bangalore (IN); Dong-Hyoun Son, Suwon-si (KR); Byeong-Ho Shim, Suwon-si (KR); Ji-Ryang Chung, Suwon-si (KR); Kangli Hao, Suwon-si (KR); Madhavan Vasudevan, Bangalore (IN); Mahesh Malagouda Patil, Bangalore (IN); M. S. S. K. Sharma, Bangalore (IN); Ranjitsinh Udaysinh Wable, Bangalore (IN); Shekhar Anantha Ambekar, Bangalore (IN);

(Continued)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/230,918

(22) Filed: Dec. 21, 2018

(65) Prior Publication Data

US 2019/0132401 A1  May 2, 2019

Related U.S. Application Data

(63) Continuation of application No. 14/281,206, filed on May 19, 2014, now abandoned.

(Continued)

(51) Int. Cl.
*H04L 29/08* (2006.01)
*H04W 76/14* (2018.01)
(Continued)

(52) U.S. Cl.
CPC ............ *H04L 67/141* (2013.01); *G06F 9/541* (2013.01); *H04L 65/1066* (2013.01);
(Continued)

(58) Field of Classification Search
CPC ............... H04L 67/141; H04L 65/1066; H04L 65/1069; H04L 65/80; H04L 69/14;
(Continued)

(56) References Cited

U.S. PATENT DOCUMENTS 7,266,614 B1 9/2007 Winkles et al.
7,489,700 B2 2/2009 Oogushi
(Continued)

FOREIGN PATENT DOCUMENTS

CN 101027889 A 8/2007
CN 101102593 A 1/2008
(Continued)

OTHER PUBLICATIONS

Wikipedia, Comparison of wireless data standards, Sep. 21, 2019, https://en.wikipedia.org/wiki/Comparison_of_wireless_data_standards (Year: 2019).*

(Continued)

*Primary Examiner* — James E Springer
(74) *Attorney, Agent, or Firm* — Jefferson IP Law, LLP

(57) ABSTRACT

An apparatus and method for providing one or more protocols for one or more electronic devices are provided. The method includes establishing, by an electronic device configured to provide a framework interface by executing instructions stored in a memory, one or more physical channels with an external electronic device, using one or (Continued)

more communication modules, executing, by the electronic device, two or more application programs to interface with the framework interface, and communicating, via the framework interface, data from the two or more application programs through the one or more physical channels to the external electronic device, using at least one logical channel or session for a respective one of the two or more application programs.

16 Claims, 107 Drawing Sheets

(72) Inventors: Subba Reddy Venkata Kota, Bangalore (IN); Raghavendra Vaddarahalli Ramegowda, Bangalore (IN); Varunjith Therath Kainoth, Bangalore (IN); Vishwanath Balekudige Gopalakrishna, Bangalore (IN);Nam-Kun Kim, Suwon-si (KR); Young-Ju Kim, Suwon-si (KR); Jeong-Mi Kim, Suwon-si (KR); Chang-Sik Kim, Anyang-si (KR); Hyeong-Geun Kim, Suwon-si (KR); Shashanka Dasari, Bangalore (IN); Gyu-Seok Shim, Suwon-si (KR); Won-Geun Shim, Suwon-si (KR); Anil Agiwal, Bangalore (IN); Jin-Hyuk Lee, Suwon-si (KR); Sang-Hyun Han, Suwon-si (KR); In-Hyup Hwang, Suwon-si (KR); Ji-Young Hwang, Seoul (KR)

Related U.S. Application Data

(60) Provisional application No. 61/825,702, filed on May 21, 2013, provisional application No. 61/870,428, filed on Aug. 27, 2013.

(51) Int. Cl.
    *H04W 4/80*     (2018.01)
    *H04W 4/12*     (2009.01)
    *H04L 29/06*    (2006.01)
    *G06F 9/54*     (2006.01)
    *H04W 88/06*    (2009.01)

(52) U.S. Cl.
    CPC .......... *H04L 65/1069* (2013.01); *H04L 65/80* (2013.01); *H04L 69/14* (2013.01); *H04W 4/12* (2013.01); *H04W 4/80* (2018.02); *H04W 76/14* (2018.02); *H04L 69/18* (2013.01); *H04L 69/321* (2013.01); *H04W 88/06* (2013.01)

(58) Field of Classification Search
    CPC ...... H04L 69/18; H04L 69/321; H04W 76/14; H04W 4/80; H04W 4/12; H04W 88/06; G06F 9/541

USPC ........................................................ 709/227
See application file for complete search history.

(56) References Cited

U.S. PATENT DOCUMENTS

| | | | |
|---|---|---|---|
| 7,526,588 B1 | 4/2009 | Schubert et al. | |
| 7,529,870 B1 | 5/2009 | Schubert et al. | |
| 7,966,405 B2 | 6/2011 | Sundaresan et al. | |
| 8,402,145 B2 | 3/2013 | Holden et al. | |
| 2003/0081592 A1 | 5/2003 | Krishnarajah et al. | |
| 2004/0076181 A1 | 4/2004 | Pantelias et al. | |
| 2005/0286516 A1 | 12/2005 | Sundaresan et al. | |
| 2006/0028998 A1 | 2/2006 | Lioy et al. | |
| 2006/0149765 A1 | 7/2006 | Knoerle et al. | |
| 2006/0209821 A1 | 9/2006 | Jung et al. | |
| 2007/0195765 A1 | 8/2007 | Heissenbuttel et al. | |
| 2007/0211690 A1 | 9/2007 | Van Megen et al. | |
| 2008/0019275 A1 | 1/2008 | Mudireddy et al. | |
| 2008/0069065 A1 | 3/2008 | Wu et al. | |
| 2008/0165711 A1 | 7/2008 | Wyld | |
| 2008/0298274 A1 | 12/2008 | Takashige et al. | |
| 2009/0064202 A1 | 3/2009 | Lee et al. | |
| 2010/0085975 A1 | 4/2010 | Wang et al. | |
| 2010/0153969 A1* | 6/2010 | Dyba | H04L 69/14 |
| | | | 719/315 |
| 2011/0286380 A1 | 11/2011 | Zhu | |
| 2011/0314467 A1 | 12/2011 | Pearson | |
| 2012/0005369 A1 | 1/2012 | Capone et al. | |
| 2012/0047521 A1 | 2/2012 | Huang et al. | |
| 2012/0077483 A1 | 3/2012 | Abraham et al. | |
| 2012/0143939 A1 | 6/2012 | Kang et al. | |
| 2012/0147849 A1 | 6/2012 | Trung et al. | |
| 2013/0013912 A1 | 1/2013 | Rung et al. | |
| 2013/0055347 A1 | 2/2013 | Chawla et al. | |
| 2013/0114482 A1 | 5/2013 | Oh et al. | |
| 2013/0223337 A1 | 8/2013 | Choo | |
| 2013/0322335 A1 | 12/2013 | Smith | |
| 2014/0022969 A1 | 1/2014 | Ryshakov et al. | |
| 2014/0024410 A1 | 1/2014 | He et al. | |
| 2014/0222903 A1 | 8/2014 | Wyld | |
| 2014/0293959 A1 | 10/2014 | Singh et al. | |
| 2014/0342719 A1 | 11/2014 | Lindholm | |
| 2015/0350068 A1 | 12/2015 | Tung et al. | |

FOREIGN PATENT DOCUMENTS

| | | |
|---|---|---|
| CN | 101491038 A | 7/2009 |
| CN | 101553046 A | 10/2009 |

OTHER PUBLICATIONS

Apple, CFNetwork Programming Guide, Jun. 11, 2012 https://developer.apple.com/library/content/documentation/Networking/Conceptual/CFNetwork/Concepts/Concepts.html#//appleref/doc/uid/TP30001132-CH4-SW10.

China State Intellectual Property Office; Chinese Office Action dated Nov. 15, 2018; Application No. 201480041345.X; pp. 1-20.

* cited by examiner

| Bits:0-2 | 3 | 4-13 | 14-15 | 16-31 | Variable |
|---|---|---|---|---|---|
| Version | Frame Type | Session ID | Fragmentation | Sequence Number | Payload |

FIG.59

| Bits:0-2 | 3 | 4-13 | 14-15 | Variable |
|---|---|---|---|---|
| Version | Frame Type | Session ID | Fragmentation | Payload |

FIG.60

Frame Format

· Data Frame Control Frame Format
  - Data Frame: Application Data
  - Control Frame: Data Transport · Generic Frame Format 0. Frame Foramt

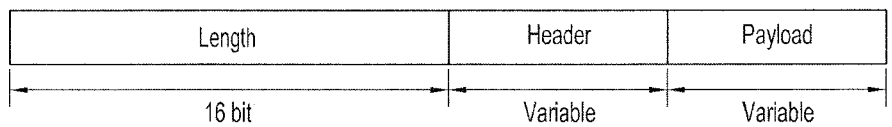

· Frame Header Format
  - T: Frame type(0: Data, 1:Control). F:Fragmentation(0x0:None 0x1:First, 0x2:Mid, 0x3:Last)

1.Frame Header Format

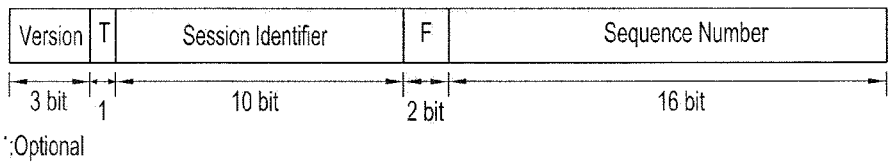

*:Optional

2.Frame Payload Foramt

· Frame Payload Format
  - Control Information
    - Immediate ACK(0x00)/Block ACK(0x01)
      :Sequence Number
    - Smart ACK(0x02)
      :Hole

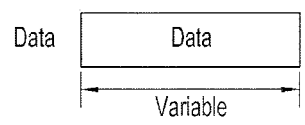

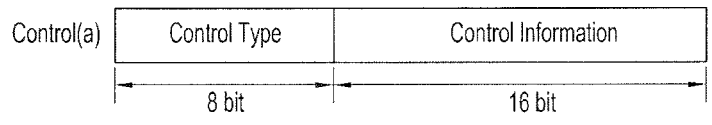

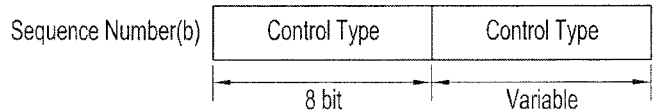

FIG.64

Frame Format
· Overall
3.Overall Frame Format
  A. Data(w/o Fragmentation)
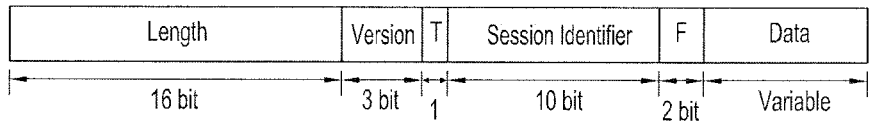
  B. Data(w/Fragmentation)
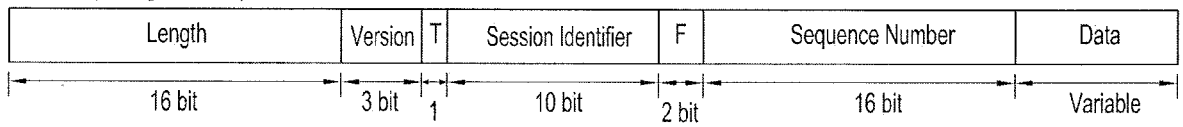
  C. Control(w/Immediate ACK & Block ACK)
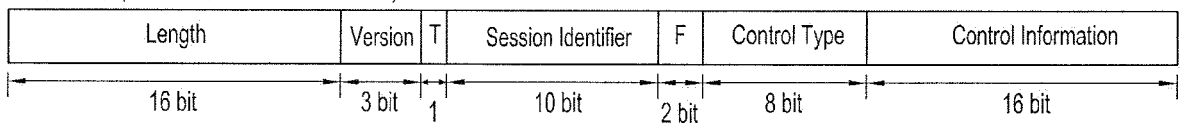
  D. Control(w/Smart ACK)
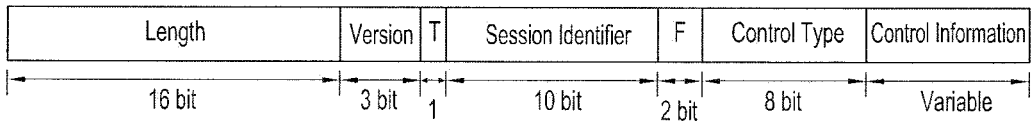
- T: Frame Type
| Value | Description |
|---|---|
| 0 | Data Frame |
| 1 | Control Frame |
- F: Fragmentation
| Value | Description |
|---|---|
| 0b00 | No fragmentation |
| 0b01 | Fragmentation - First frame |
| 0b10 | Fragmentation - Middle frames |
| 0b11 | Fragmentation - Last frame |
FIG.65

Frame Format - Data Frame
· Create Service Connection Response
  - Full Format
    A. Frame Format
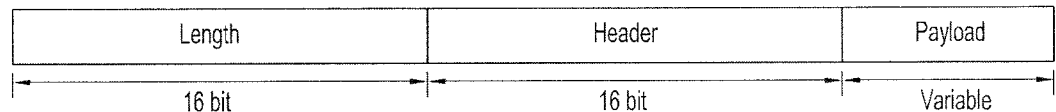
  - Header Format
    B. Header Format
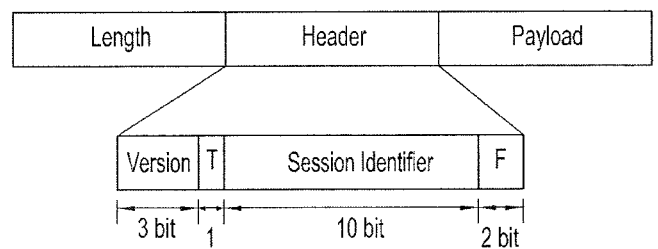
  Payload Format
    C. Payload Format
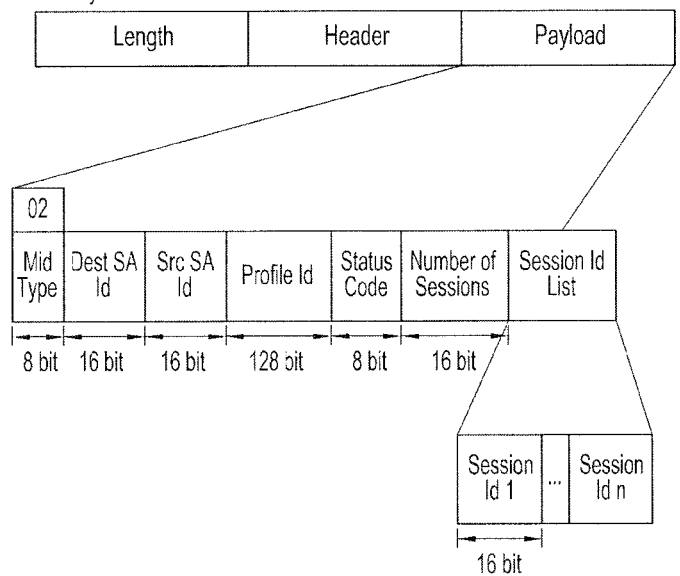
FIG.67

Frame Format - Data Frame

Terminate Service Connection Request

- Full Format

A. Frame Format

| Length | Header | Payload |
  |--------|--------|---------|
  | 16 bit | 16 bit | Variable |

- Header Format

B. Header Format

| Length | Header | Payload |
  |--------|--------|---------|

| Version | T | Session Identifier | F |
  |---------|---|--------------------|----|
  | 3 bit | 1 | 10 bit | 2 bit |

Payload Format

C. Payload Format

| Length | Header | Payload |
  |--------|--------|---------|

| 03 | | | |
  |----|----|----|----|
  | Mid Type | Dest SA Id | Src SA Id | Profile Id |
  | 8 bit | 16 bit | 16 bit | 128 bit |

FIG.68

Frame Format - Data Frame
· Terminate Service Connection Response
 - Full Format
  A. Frame Format
| Length | Header | Payload |
|---|---|---|
| 16 bit | 16 bit | Variable |
 - Header Format
  B. Header Format
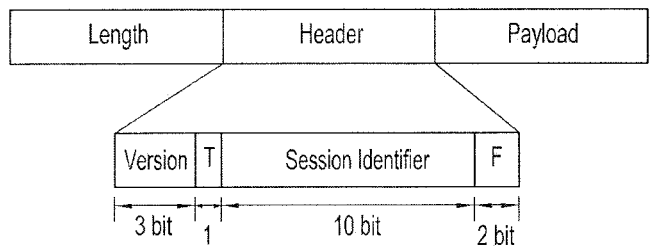
 - Payload Format
  C. Payload Format
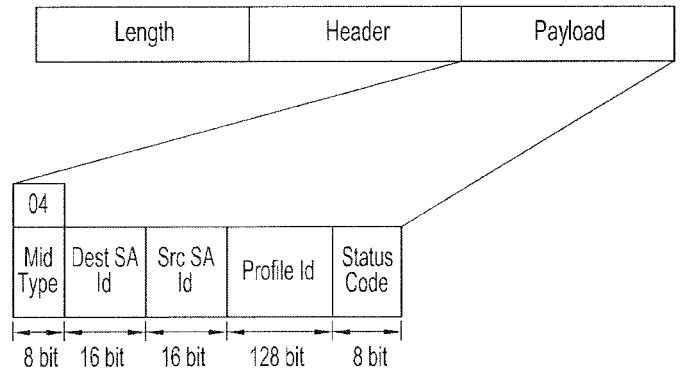
FIG.69

Frame Format - Data Frame
· Send Data
  - Full Format
    A. Frame Format
    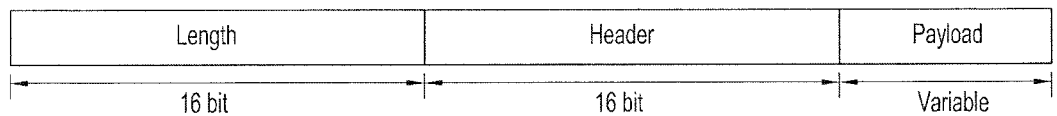
    - Header Format
    B. Header Format
    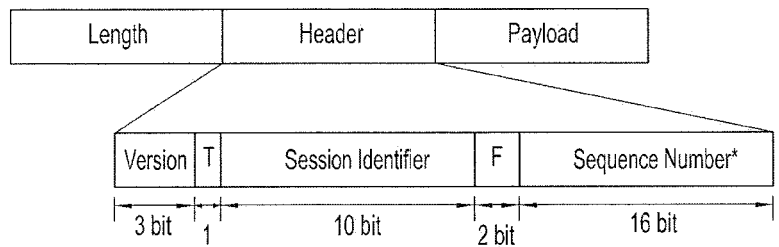
    - Payload Format
    C. Payload Format
    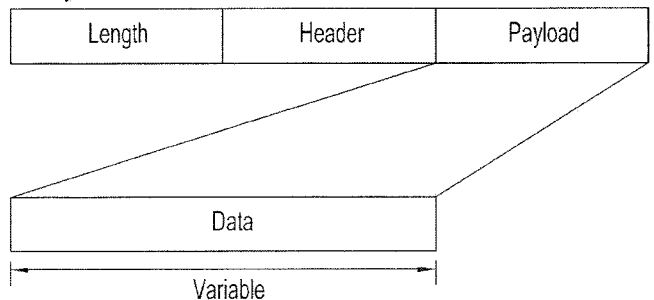
FIG.70

Frame Format - Data Frame

· Message Type

| Value | Type | Description |
|---|---|---|
| 0x00 | · | Reserved |
| 0x01 | Session Message | Create Session Request |
| 0x02 | Session Message | Create Session Response |
| 0x03 | Session Message | Terminate Session Request |
| 0x04 | Session Message | Terminate Session Response |
| 0x05 ~0xFF | · | Reserved |

· Fragmentation

| Value | Description |
|---|---|
| 0b00 | No fragmentation |
| 0b01 | Fragmentation - First frame |
| 0b10 | Fragmentation - Middle frame |
| 0b11 | Fragmentation - Last frame |

· Sequence Number
   - Depends on fragmentation field.
   - Specify the order of data sequence
   - Incremented by one, modulo $2^{16}$

FIG.71

Frame Format - Control Frame
· Immediate Acknowledge
 - Full Format
  A. Frame Format
| Length | Header | Control Type | Control Information |
|---|---|---|---|
| 16 bit | 16 bit | 8 bit | 16 bit |
 - Header Format
  B. Header Format
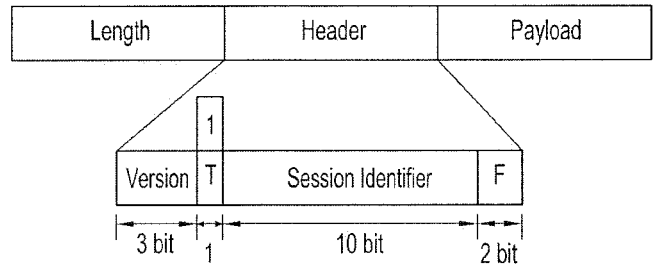
 - Payload Format
  C. Payload Format
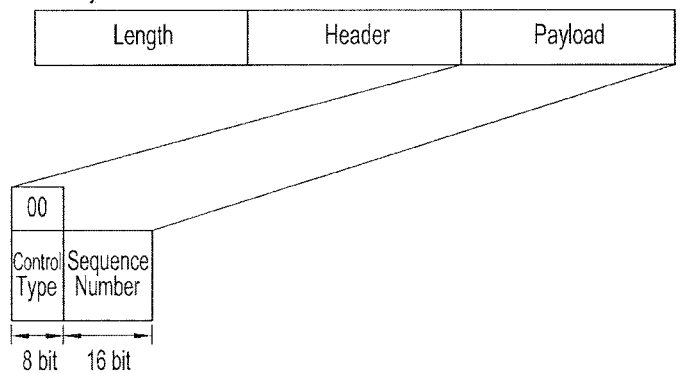
FIG.72

Frame Format - Control Frame
· Block Acknowledge
- Full Format
A. Frame Format
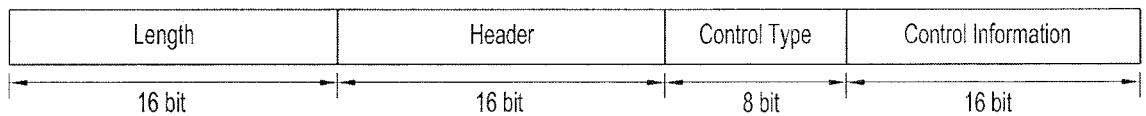
- Header Format
B. Header Format
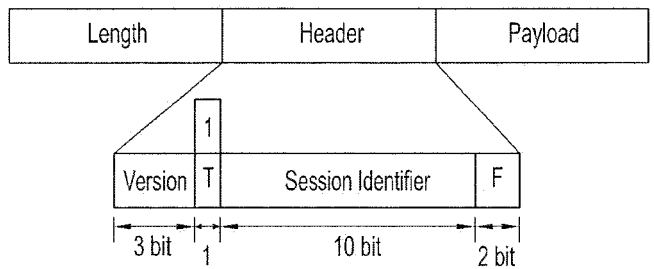
- Payload Format
C. Payload Format
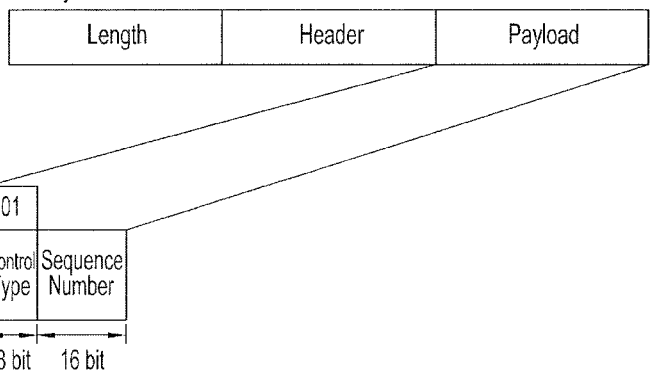
FIG.73

Frame Format - Control Frame
· Selective Negative Acknowledge
- Full Format
A. Frame Format
| Length | Header | Control Type | Control Information |
|---|---|---|---|
| 16 bit | 16 bit | 8 bit | Variable |
- Header Format
B. Header Format
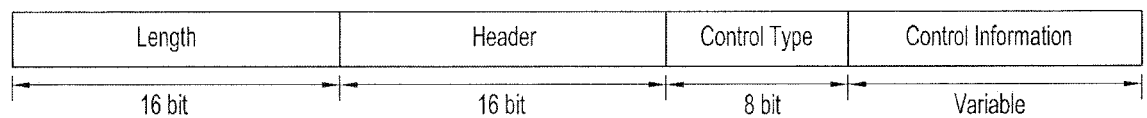
- Payload Format
C. Payload Format
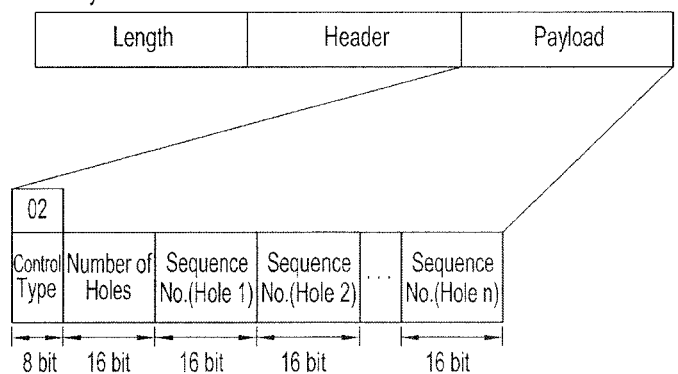
FIG.74

Frame Format - Control Frame

· Control Type

| Value | Description |
|---|---|
| 0x00 | Immediate Acknowledgement Mechanism |
| 0x01 | Block Acknowledgement Mechanism |
| 0x02 | Selective Not Acknowledged Mechanism |
| 0x03 ~0xFF | Reserved |

· Fragmentation

| Value | Description |
|---|---|
| 0b00 | No fragmentation |
| 0b01 | Fragmentation - First frame |
| 0b10 | Fragmentation - Middle frames |
| 0b11 | Fragmentation - Last frame |

FIG.75

ELECTRONIC DEVICE USING LOGICAL CHANNELS FOR COMMUNICATION

CROSS-REFERENCE TO RELATED APPLICATION(S)

This application is a continuation application of prior application Ser. No. 14/281,206, filed on May 19, 2014, and was based on and claimed priority under 35 U.S.C. § 119(e) of a U.S. Provisional application filed on May 21, 2013 in the U.S. Patent and Trademark Office and assigned Ser. No. 61/825,702, and a U.S. Provisional application filed on Aug. 27, 2013 in the U.S. Patent and Trademark Office and assigned Ser. No. 61/870,428, the entire disclosure of each of which is hereby incorporated by reference.

This application is also related to a U.S. patent application Ser. No. 14/281,355, filed on May 19, 2014, and titled "ELECTRONIC DEVICE USING FRAMEWORK INTERFACE FOR COMMUNICATION", the entire disclosure of which is hereby incorporated herein by reference.

TECHNICAL FIELD

The present disclosure generally relates to one or more electronic devices, and more particularly to one or more electronic devices using one or more protocols.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more.

With the plurality of features now provided, a mobile terminal has effectively become a necessity of daily life. Accordingly, there are efforts to develop an apparatus and method for providing improved functionalities for a mobile terminal.

SUMMARY

Aspects of the present disclosure are to address at least the above-mentioned problems and/or disadvantages and to provide at least the advantages described below. Accordingly, an aspect of the present disclosure is to provide an apparatus and method for using one or more protocols for one or more electronic devices.

In accordance with an aspect of the present disclosure, a method for using one or more protocols for one or more electronic devices is provided. The method includes executing, by at least one processor of the electronic device, an application program to interface with a framework interface, routing, by the framework interface, data between the application program and one or more communication modules, wherein each of the one or more communication modules is configured to operate according to a selected one or more communication protocols, wherein the framework interface is configured to select at least one of the one or more communication modules for at least part of the data, and communicating, by the one or more communication modules, the data with one or more external electronic devices.

In accordance with another aspect of the present disclosure, an electronic device for using one or more protocols is provided. The electronic device includes one or more communication modules, wherein each of the one or more communication modules is configured to communicate with one or more external electronic devices based on one or more communication protocols, and at least one processor configured to execute an application program to interface with a framework interface, route data between the application program and the one or more communication modules, wherein the framework interface is configured to select at least one of the one or more communication modules for at least part of the data, and control the one or more communication modules to communicate the data with the one or more external electronic devices based on a selected one or more communication protocols.

In accordance with another aspect of the present disclosure, an electronic device for using one or more protocols is provided. The electronic device includes one or more communication modules configured to communicate with one or more external electronic devices, based on one or more communication protocols, and at least one processor configured to provide a framework interface configured to interface with an application program to be downloaded from outside the electronic device, wherein the framework interface is configured to route data to/from the one or more communication modules, and control the one or more communication modules to communicate the data with the one or more external electronic devices, based on a selected one or more communication protocols.

In accordance with another aspect of the present disclosure, a method for using one or more protocols for one or more electronic devices is provided. The method includes establishing, by an electronic device, one or more physical channels with an external electronic device, using one or more communication protocols, and communicating, by the electronic device, data with the external electronic device via one or more logical channels or sessions, using the one or more physical channels, wherein the one or more logical channels or sessions are independent of the one or more communication protocols.

In accordance with another aspect of the present disclosure, an electronic device for using one or more protocols is provided. The electronic device includes one or more communication modules configured to establish one or more physical channels with an external device, using one or more communication protocols, and at least one processor configured to control the one or more communication modules to establish the one or more physical channels with the external electronic device, and control the one or more communication modules to communicate data with the external device via one or more logical channels or sessions, using the one or more physical channels, wherein the one or more logical channels or sessions are independent of the one or more communication protocols.

In accordance with another aspect of the present disclosure, a method for using one or more protocols for one or more electronic devices is provided. The method includes establishing, by an electronic device configured to provide a framework interface, one or more physical communication channels with an external electronic device, executing, by the electronic device, an application program to interface with the framework interface, receiving, by the framework interface, information on at least one of one or more logical channels or sessions, using the one or more physical communication channels, changing, by the framework interface, at least one of the one or more logical channels or sessions, based at least in part on the received information, and communicating data from the application program using the changed at least one of the one or more logical channels or sessions over the one or more physical communication channels.

In accordance with another aspect of the present disclosure, an electronic device for using one or more protocols is provided. The electronic device includes one or more communication modules configured to establish one or more physical communication channels with an external device, and at least one processor configured to operatively communicate with the external electronic device on one or more logical channels or sessions, using the one or more physical communication channels, execute an application program to interface with a framework interface, wherein the framework interface is configured to receive information on at least one of the one or more logical channels or sessions, using the one or more physical channels, change at least one of the one or more logical channels or sessions based at least in part on the received information, and operatively communicate data from the application program using the changed at least one of the one or more logical channels or sessions over the one or more physical communication channels.

In accordance with another aspect of the present disclosure, a method for using one or more protocols for one or more electronic devices is provided. The method includes receiving, by the framework interface, an indication of requirements for data transmission, for an application program of an electronic device, establishing, by the framework interface, one or more physical communication channels between the electronic device and an external electronic device, configuring, by the framework interface, one or more logical channels over which data from the application program is to be communicated between the electronic device and the external electronic device according to the indication of requirements for data transmission, and communicating data, by the framework interface, from the application program over the one or more configured logical channels using the one or more physical communication channels.

In accordance with another aspect of the present disclosure, an electronic device for using one or more protocols is provided. The electronic device includes one or more communication modules configured to establish one or more physical communication channels with an external device, and at least one processor configured to operatively communicate with the external electronic device, on one or more logical channels, using the one or more physical communication channels, and execute an application program to interface with a framework interface, wherein the framework interface is configured to receive an indication of requirements for data transmission for the application program, establish one or more physical communication channels between the electronic device and an external electronic device, configure one or more logical channels over which data from the application program is to be communicated between the electronic device and the external electronic devices according to the indication of requirements for data transmission, and operatively communicate data from the application program over the one or more configured logical channels using the one or more physical communication channels.

In accordance with another aspect of the present disclosure, a method for using one or more protocols for one or more electronic devices is provided. The method includes establishing, by an electronic device configured to provide a framework interface by executing instructions stored in a memory, one or more physical channels with an external electronic device, using one or more communication modules, executing, by the electronic device, two or more application programs to interface with the framework interface, and communicating, via the framework interface, data from the two or more application programs through the one or more physical channels to the external electronic device, using at least one logical channel or session for a respective one of the two or more application programs, wherein communicating the data comprises providing, by the framework interface, a data packet including a payload, to the communication module, and wherein the payload includes first data from one of the two or more application programs, and second data from another of the two or more application programs.

In accordance with another aspect of the present disclosure, an electronic device for using one or more protocols is provided. The electronic device includes one or more communication modules configured to establish one or more physical channels with an external electronic device, and at least one processor configured to control the one or more communication modules to establish the one or more physical channels with the external electronic device, execute two or more application programs to interface with a framework interface provided by the electronic device, and control the framework interface to communicate data from the two or more application programs through the one or more physical channels to the external electronic device, using at least one logical channel or session for a respective one of the two or more application programs, wherein the framework interface provides a data packet including a payload, to the one or more communication modules, and wherein the payload includes first data from one of the two or more application programs, and second data from another one of the two or more application programs.

In accordance with another aspect of the present disclosure, a method for using one or more protocols for one or more electronic devices is provided. The method includes establishing, by the electronic device, one or more communication channels with an external electronic device, and requesting, by the electronic device, the external electronic device to communicate one or more profile identifiers (IDs) to the electronic device, using at least one of the one or more communication channels, wherein each of the one or more profile IDs is associated with one or more service capabilities supported by a respective one of one or more application programs supported by the external electronic device.

In accordance with another aspect of the present disclosure, an electronic device for using one or more protocols is provided. The electronic device includes one or more communication modules configured to establish one or more communication channels, and at least one processor configured to operatively communicate with an external electronic device, using at least one of the one or more communication channels, and send the external electronic device a request for the external electronic device to provide one or more profile identifiers (IDs) to the electronic device, using the at least one of the one or more communication channels, wherein each of the one or more profile IDs is associated with one or more service capabilities supported by a respective one of one or more application programs supported by the external electronic device.

In accordance with another aspect of the present disclosure, a method for using one or more protocols for one or more electronic devices is provided. The method includes establishing, by the electronic device configured to run one or more application programs, one or more communication channels with an external electronic device, and receiving, by the electronic device, a request from the external electronic device to provide one or more profile identifiers (IDs) to the external electronic device, using at least one of the one or more communication channels, wherein each of the profile IDs is associated with one or more service capabilities supported by a respective one of the one or more application programs.

In accordance with another aspect of the present disclosure, an electronic device for using one or more protocols is provided. The electronic device includes one or more communication modules configured to establish one or more communication channels, a memory configured to store one or more application programs, and at least one processor configured to operatively communicate with an external electronic device, using at least one of the one or more communication channels, and operatively receive, from the external electronic device, a request to provide one or more profile identifiers (IDs) to the external electronic device, using the at least one of the one or more communication channels, wherein each of the profile IDs is associated with one or more service capabilities supported by a respective one of the application programs.

In accordance with another aspect of the present disclosure, a method for using one or more protocols for one or more electronic devices is provided. The method includes executing, by the electronic device configured to provide a framework interface by executing instructions stored in a memory, one or more application programs, and registering, by at least one of the one or more application programs, a service capability thereof with the framework interface.

In accordance with another aspect of the present disclosure, an electronic device for using one or more protocols is provided. The electronic device includes a memory configured to store one or more application programs, and a framework interface, and at least one processor configured to execute at least one of the one or more application programs, wherein at least one of the one or more application programs, a service capability thereof with the framework interface.

In accordance with another aspect of the present disclosure, a method for using one or more protocols for one or more electronic devices is provided. The method includes establishing, by the electronic device, one or more communication channels with an external electronic device, communicating, by the electronic device, to the external electronic device, an inquiry on a capability of the external electronic device, and communicating, by the electronic device, to the external electronic device, an indication of a type of the inquiry.

In accordance with another aspect of the present disclosure, an electronic device for using one or more protocols is provided. The electronic device includes one or more communication modules configured to establish one or more communication channels with an external electronic device, and at least one processor configured to operatively communicate with the external electronic device, using the one or more communication channels, operatively communicate, to the external electronic device, an inquiry on a capability of the external electronic device, and operatively communicate, to the external electronic device, an indication of a type of the inquiry.

In accordance with another aspect of the present disclosure, a method for using one or more protocols for one or more electronic devices is provided. The method includes establishing, by the electronic device, one or more communication channels with an external electronic device, and communicating, by the electronic device, to the external electronic device, information associated with one or more of services, function, or capabilities of the electronic device.

In accordance with another aspect of the present disclosure, an electronic device for using one or more protocols is provided. The electronic device includes one or more communication modules configured to establish one or more communication channels with an external electronic device, and at least one processor configured to communicate with the external electronic device using the one or more communication channels, and operatively communicate, to the external electronic device, information associated with one or more of services, function, or capabilities of the electronic device.

In accordance with another aspect of the present disclosure, a method for using one or more protocols for one or more electronic devices is provided. The method includes establishing, by the electronic device, one or more communication channels with an external electronic device, communicating, by the electronic device, to the external electronic device, an inquiry on a capability of the external electronic device, and communicating, by the electronic device, to the external electronic device, an indication as to whether the inquiry is a query according to which the external electronic device is required to report on a current capability of the external electronic device, or a query according to which the external electronic device is required to report on a current capability of the external electronic device and to report on a change to the current capability of the external electronic device.

In accordance with another aspect of the present disclosure, an electronic device for using one or more protocols is provided. The electronic device includes one or more communication modules configured to establish one or more communication channels with an external electronic device, and at least one processor configured to communicate with the external electronic device using the one or more communication channels, and communicate, to the external electronic device, an indication as to whether the inquiry is a query according to which the external electronic device is required to report on a current capability of the external electronic device, or a query according to which the external electronic device is required to report on a current capability of the external electronic device and to report on a change to the current capability of the external electronic device.

In accordance with another aspect of the present disclosure, a method for using one or more protocols for one or more electronic devices is provided. The method includes establishing, by the electronic device, one or more communication channels with an external electronic device, and communicating, by the electronic device, to the external electronic device, in response to receiving a request from the external electronic device, capability information that is configured to identify one or more application programs residing on the electronic device.

In accordance with another aspect of the present disclosure, an electronic device for using one or more protocols is provided. The electronic device includes one or more communication modules configured to establish one or more communication channels with an external electronic device, and at least one processor configured to operatively communicate with the external electronic device, using the one or more communication channels, and operatively communicate, in response to receiving a request from the external electronic device, capability information that is configured to identify one or more application programs residing on the electronic device.

In accordance with another aspect of the present disclosure, a method for using one or more protocols for one or more electronic devices is provided. The method includes establishing, by the electronic device, one or more communication channels with a first external electronic device and a second external electronic device, communicating, by the electronic device, to the first external electronic device, a request for information on a change of capability of the first external electronic device, and communicating, by the electronic device, to the second external electronic device, a request for information on a change of capability of the second external electronic device.

In accordance with another aspect of the present disclosure, an electronic device for using one or more protocols is provided. The electronic device includes one or more communication modules configured to establish one or more communication channels with an external electronic device, and at least one processor configured to operatively communicate, to the first external electronic device, a request for information on a change of capability of the first external electronic device, and operatively communicate, to the second external electronic device, a request for information on a change of capability of the second external electronic device.

In accordance with another aspect of the present disclosure, a method for using one or more protocols for one or more electronic devices is provided. The method includes executing, by an electronic device configured to provide a framework interface by executing instructions stored in a memory, one or more application programs, receiving, by the framework interface, a service capability inquiry from at least one of the one or more application programs, wherein the service capability inquiry includes a service capability query filter, and communicating, by the framework interface, one or more service capability records matching the service capability inquiry, to the at least one of the one or more application programs, if one or more service capability records match the service capability inquiry.

In accordance with another aspect of the present disclosure, an electronic device for using one or more protocols is provided. The electronic device includes a memory configured to store one or more application programs, and a framework interface, and at least one processor configured to execute the one or more application programs to interface with the framework interface, wherein the one or more application programs are configured to communicate, to the framework interface, a service capability including a service capability query filter, and receive, from the framework interface, one or more service capability records matching the capability inquiry, and wherein the framework interface is configured to receive, from at least one of the one or more application programs, the service capability including the service capability query filter, and communicate, to the at least one of the one or more programs, the one or more service capability records matching the service capability inquiry, if one or more service capability records match the service capability inquiry.

In accordance with another aspect of the present disclosure, a method for using one or more protocols for one or more electronic devices is provided. The method includes executing, by an electronic device including an operating system stored in a memory, one or more application programs on a framework interface that is configured to interface with the operating system, establishing, by the electronic device, one or more communication channels with an external electronic device, communicating, by the electronic device, data from the one or more application programs with the external electronic device using the one or more communication channels, and determining, by the framework interface of the electronic device, whether at least one of the one or more application programs stops running, at least partly in response to a function of the operating system.

In accordance with another aspect of the present disclosure, an electronic device for using one or more protocols is provided. The electronic device includes one or more communication modules configured to establish one or more communication channels with an external electronic device, a memory configured to store an operating system, and at least one processor configured to communicate data with the external electronic device using the one or more communication modules, and execute one or more application programs on a framework interface that is configured to interface with the operating system, wherein the framework interface is configured to determine whether the one or more application programs stops running, at least partly in response to a function of the operating system.

In accordance with another aspect of the present disclosure, a method for using one or more protocols for one or more electronic devices is provided. The method includes executing, by an electronic device configured to provide an operating system and a framework interface by executing instructions stored in a memory, one or more application programs on the framework interface, wherein the framework interface is configured to interface with the operating system, establishing, by electronic device, one or more communication channels with an external electronic device, communicating, by the electronic device, data from the one or more application programs with an external electronic device using the one or more communication channels, and monitoring, by the framework interface, at least one of a status of the one or more communication channels or a status of a process of the operating system.

In accordance with another aspect of the present disclosure, an electronic device for using one or more protocols is provided. The electronic device includes one or more communication modules configured to establish one or more communication channels with an external electronic device, a memory configured to store an operating system and a framework interface, and at least one processor configured to communicate data with the external electronic device using at least one of the one or more communication modules, and execute one or more application programs on the framework interface, wherein the framework interface is configured to interface with an operating system, and wherein the framework interface is configured to monitor at least one of a status of the one or more communication channels or a status of a process of the operating system.

In accordance with another aspect of the present disclosure, a method for using one or more protocols for one or more electronic devices is provided. The method includes executing, by an electronic device configured to provide a framework interface by executing instructions stored in a memory, one or more application programs on the framework interface, establishing, by one or more communication modules of the electronic device, one or more communication channels with an external electronic device, communicating, by the one or more communication modules of the electronic device, data with the external electronic device via at least one of the one or more communication channels, and selecting, by the framework interface, a subset of all features available in the framework interface for communicating the data according to at least one of feature capability of the electronic device or feature capability of the external electronic device.

In accordance with another aspect of the present disclosure, an electronic device for using one or more protocols is provided. The electronic device includes one or more communication modules configured to establish one or more communication channels with an external electronic device, a memory configured to store a framework interface, and at least one processor configured to communicate data with the external electronic device, using at least one of the one or more communication channels, and execute one or more application programs on a framework interface, wherein the framework interface is configured to select a subset of all features available in the framework interface for communicating the data according to at least one of feature capability of the electronic device or feature capability of the external electronic device.

In accordance with another aspect of the present disclosure, a system of one or more electronic devices for using one or more protocols is provided. The system includes a first electronic device and a second electronic device, wherein the first electronic device and the second electronic device communicate with each other to determine a common minimum set of features, wherein each of the first electronic device and the second electronic device respectively comprises, one or more communication modules configured to establish one or more communication channels with a respective one of the first electronic device or the second electronic device, a memory configured to store a framework interface, and at least one processor configured to communicate with the respective one of the first electronic device or the second electronic device using the one or more communication channels, and execute one or more application programs on a framework interface, and wherein the framework interface is configured to select a subset of all features available in the framework interface for communicating the data according to feature capability of the first electronic device or feature capability of the second electronic device.

In accordance with another aspect of the present disclosure, a method for using one or more protocols for one or more electronic devices is provided. The method includes establishing, by an electronic device configured to provide a framework interface by executing instructions stored in a memory, one or more communication channels with the external electronic device, based on one or more communication protocols, and executing, by the electronic device, one or more application programs to interface with the framework interface, wherein the framework interface is configured to communicate information on a version of the framework interface with the external electronic device during discovery of the external electronic device.

In accordance with another aspect of the present disclosure, a method for using one or more protocols for one or more electronic devices is provided. The method includes establishing, by an electronic device configured to provide a framework interface by executing instructions stored in a memory, one or more communication channels with an external electronic device, based on one or more communication protocols, and executing, by the electronic device, one or more application programs to interface with the framework interface, wherein the framework interface is configured to transmit a message for determining compatibility to the external electronic device, and wherein the message includes information relating to a version.

In accordance with another aspect of the present disclosure, a method for using one or more protocols for one or more electronic devices is provided. The method includes establishing, by an electronic device configured to provide a framework interface by executing instructions stored in a memory, one or more communication channels with an external electronic device, based on one or more communication protocols, and executing, by the electronic device, one or more application programs to interface with the framework interface, wherein the framework interface is configured to provide a header according to a frame format to at least one message transmitted to the external electronic device, and, wherein the header includes a version that indicates the frame format which the framework interface uses to determine frame format compatibility.

In accordance with another aspect of the present disclosure, an electronic device for using one or more protocols is provided. The electronic device includes one or more communication modules configured to establish one or more communication channels with an external electronic device based on one or more communication protocols, a memory configured to store a framework interface, and at least one processor configured to control the one or more communication modules to establish the one or more communication channels with the external electronic device, and execute one or more application programs that interface with the framework interface, wherein the framework interface is configured to communicate information on a version of the framework interface with the external electronic device during discovery of the external electronic device.

In accordance with another aspect of the present disclosure, an electronic device for using one or more protocols is provided. The electronic device includes one or more communication modules configured to establish one or more communication channels with an external electronic device based on one or more communication protocols, a memory configured to store a framework interface, and at least one processor configured to control the one or more communication modules to establish the one or more communication channels with the external electronic device, and execute one or more application programs that interface with the framework interface, wherein the framework interface is configured to provide a header according to a frame format to at least one message transmitted to the external electronic device, and wherein the header includes a version that indicates the frame format which the framework interface uses to determine frame format compatibility.

In accordance with another aspect of the present disclosure, an electronic device for using one or more protocols is provided. The electronic device includes one or more communication modules configured to establish one or more communication channels with an external electronic device, based on one or more communication protocols, a memory configured to store a framework interface, and at least one processor configured to control the one or more communication modules to establish the one or more communication channels with the external electronic device, and execute one or more application programs that interface with a framework interface, wherein the framework interface is configured to transmit a message for determining compatibility to the external electronic device, and wherein the message includes information relating to a version.

In accordance with another aspect of the present disclosure, an electronic device for using one or more protocols is provided. The electronic device includes one or more communication modules configured to establish one or more communication channels with an external electronic device based on one or more communication protocols, a memory configured to store a framework interface, and at least one processor configured to control the one or more communication modules to establish the one or more communication channels with the external electronic device, and execute one or more application programs that interface with a framework interface, wherein the framework interface is configured to provide a header according to a frame format to at least one message transmitted to the external electronic device, and wherein the header includes a version that indicates the frame format which the framework interface uses to determine frame format compatibility.

In accordance with another aspect of the present disclosure, a method for using one or more protocols for one or more electronic devices is provided. The method includes executing, by at least one processor of the electronic device, a framework interface and an application program that interfaces with the framework interface, routing, by the framework interface, data between the application program and one or more communication modules that communicate with an external electronic device based on one or more communication protocols, and communicating, by the one or more communication modules, the data with the external electronic device, wherein the framework interface comprises a session layer configured to receive information from the application program and to manage one or more logical channels or sessions used for communicating the data with the external electronic device, based at least partly on the information from the application program.

In accordance with another aspect of the present disclosure, a method for using one or more protocols for one or more electronic devices is provided. The method includes executing, by at least one processor of the electronic device, a framework interface and an application program that interfaces with the framework interface, routing, by the at least one processor, data through the framework interface between the application program and one or more communication modules that operate based on one or more communication protocols, and communicating, by the one or more communication modules, the data with an external electronic device, wherein the framework interface comprises a session layer, and a transport layer configured to receive, via the session layer, information from the application program relating to Quality of Service (QoS) of one or more logical channels or sessions used for communicating data with the external device, and adapt a respective one of the one or more logical channels or sessions according to the information received from the application program relating to QoS.

In accordance with another aspect of the present disclosure, a method for using one or more protocols for one or more electronic devices is provided. The method includes executing, by at least one processor of the electronic device, a framework interface and an application program that interfaces with the framework interface, routing, by the at least one processor, data through the framework interface between the application program and one or more communication modules that communicate based on one or more communication protocols, and communicating, by the one or more communication modules, the data with an external electronic device, wherein the framework interface comprises a transport layer, and a connection layer configured to receive data from the transport layer, add, to a data unit received from the transport layer, a field for confirming that the data is communicated to the external electronic device according to a preset minimum data integrity, and add, to a data unit received from the transport layer, a length field that is indicative of a number of bytes constituting the data unit.

In accordance with another aspect of the present disclosure, a method for using one or more protocols for one or more electronic devices is provided. The method includes executing, by at least one processor of the electronic device, an application program providing one or more services, and communicating, by one or more communication modules configured to communicate with an external electronic device based on one or more communication protocols, data between the application program and the external electronic device, wherein the application program includes one or more service agents, and wherein each of the one or more service agents is assigned to handle data for one of the one or more services provided by the application program.

In accordance with another aspect of the present disclosure, an electronic device for using one or more protocols is provided. The electronic device includes one or more communication modules configured to communicate data with an external electronic device based on one or more communication protocols, a memory configured to store a framework interface, and at least one processor configured to execute a framework interface and an application program that interfaces with the framework interface, wherein the framework interface routes the data between the application program and the one or more communication modules, and wherein the framework interface comprises a session layer configured to receive information from the application program and to manage one or more logical channels or sessions used for communicating the data with the external electronic device, based at least partly on the information from the application program.

In accordance with another aspect of the present disclosure, an electronic device for using one or more protocols is provided. The electronic device includes one or more communication modules configured to communicate data with an external electronic device based on one or more communication protocols, a memory configured to store a framework interface, and at least one processor configured to execute a framework interface and an application program that interfaces with the framework interface, and route the data through the framework interface between the application program and the one or more communication modules, wherein the framework interface comprises a session layer, and a transport layer configured to receive, via a session layer, information from the application program relating to Quality of Service (QoS) of one or more logical channels or sessions used for communicating data with the external device, and change a respective one of the one or more logical channels or sessions according to the information received from the application program relating to QoS.

In accordance with another aspect of the present disclosure, an electronic device for using one or more protocols is provided. The electronic device includes one or more communication modules configured to communicate data with an external electronic device based on one or more communication protocols, a memory configured to store a framework interface, and at least one processor configured to execute a framework interface and an application program that interfaces with the framework interface, route the data through the framework interface between the application program and the one or more communication modules, wherein the framework interface comprises a transport layer, and a connection layer configured to receive data from a transport layer, add, to a data unit received from the transport layer, a field for confirming that the data is communicated to the external electronic device according to a preset minimum data integrity, and add, to a data unit received from the transport layer, a length field that is indicative of a number of bytes constituting the data unit.

In accordance with another aspect of the present disclosure, an electronic device for using one or more protocols is provided. The electronic device includes one or more communication modules configured to communicate data with an external electronic device based on one or more communication protocols, a memory configured to store a framework interface, and at least one processor configured to execute an application program providing one or more services, wherein the application program includes one or more service agents, and wherein each of the one or more service agents is assigned to handle data for one of the one or more services provided by the application program.

In accordance with another aspect of the present disclosure, a method for using one or more protocols for one or more electronic devices is provided. The method includes executing, by an electronic device configured to provide a framework interface by executing instructions stored in a memory, one or more application programs, establishing, by the electronic device, one or more communication channels with an external electronic device, and routing, by the electronic device, data from the one or more application programs via the framework interface to the external electronic device, wherein the one or more application programs support one or more services, wherein the one or more services comprise one or more service objectives, and wherein the one or more application programs provide the one or more services objectives by communicating one or more application messages with the external electronic device.

In accordance with another aspect of the present disclosure, an electronic device for using one or more protocols is provided. The electronic device includes one or more communication modules configured to establish one or more communication channels with an external electronic device, a memory configured to store a framework interface, and at least one processor configured to execute one or more application programs, wherein the framework interface is configured to route data from the one or more application programs to the external electronic device, wherein the one or more services comprise one or more service objectives, and wherein the one or more application programs provides the one or more services objectives by communicating one or more application messages with the external electronic device.

In accordance with another aspect of the present disclosure, an electronic device for using one or more protocols is provided. The electronic device includes a portable electronic housing, one or more communication modules housed in the housing, the communication modules being configured to communicate with an external electronic device, based on one or more communication protocols, wherein the communication modules include one or more of a Universal Serial Bus (USB) module, a Universal Asynchronous Receiver/Transmitter (UART) module, a ZigBee module, an Ultra-WideBand (UWB) module, Radio Frequency IDentification (RFID) module, infrared module, a Bluetooth module, a Bluetooth Low Energy (BLE) module, a WiFi module, a Near Field Communication (NFC) module, or a cellular communication module, a touch screen display housed at last partly in the housing, a battery housed in the housing, a memory housed in the housing, the memory storing an operating system and a media player software program, an application processor housed in the housing, the application processor being configured to run the operating system, wherein the memory further stores instructions that, when executed, cause the application processor to provide a framework interface configured to interface between the operating system and the media player software program, route media data between the media player software program and one or more of the one or more communication modules, and select at least one of the communication modules for communicating at least part of the media data with the external electronic device, independently of the media player software program.

In accordance with another aspect of the present disclosure, an electronic device for using one or more protocols is provided. The electronic device includes a portable electronic housing, one or more communication modules housed in the housing, the communication modules being configured to communicate with an external electronic device, based on one or more communication protocols, wherein the communication modules include one or more of a Universal Serial Bus (USB) module, a Universal Asynchronous Receiver/Transmitter (UART) module, a ZigBee module, an Ultra-WideBand (UWB) module, Radio Frequency IDentification (RFID) module, infrared module, a Bluetooth module, a Bluetooth Low Energy (BLE) module, a WiFi module, a Near Field Communication (NFC) module, or a cellular communication module, a touch screen display housed at last partly in the housing, a battery housed in the housing, a memory housed in the housing, the memory storing an operating system and a dialer software program, and an application processor housed in the housing, the application processor being configured to run the operating system, wherein the memory further stores instructions that, when executed, cause the application processor to provide a framework interface configured to interface between the operating system and the dialer software program, route notification data between the dialer software program and one or more of the one or more communication modules, and select at least one of the communication modules for communicating at least part of the notification data with the external electronic device, independently of the dialer software program.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which:

FIG. 59 illustrates a structure of a first data frame format supported by a transport layer according to an embodiment of the present disclosure;

FIG. 60 illustrates a structure of a second data frame format supported by a transport layer according to an embodiment of the present disclosure;

FIG. 64 illustrates an overview of a generic frame structure for a transport frame according to an embodiment of the present disclosure;

FIG. 65 illustrates an overall frame structure for a transport frame according to an embodiment of the present disclosure;

FIG. 67 illustrates a transport layer data frame structure for a create service connection response according to an embodiment of the present disclosure;

FIG. 68 illustrates a transport layer data frame structure for a terminate service connection request according to an embodiment of the present disclosure;

FIG. 69 illustrates a transport layer data frame structure for a terminate service connection response according to an embodiment of the present disclosure;

FIG. 70 illustrates a transport layer data frame structure for sending data according to an embodiment of the present disclosure;

FIG. 71 illustrates parameters for message type, fragmentation, and sequence number fields of the transport layer data frame structures of FIGS. 66 to 70 according to an embodiment of the present disclosure;

FIG. 72 illustrates a transport layer control frame structure for immediate acknowledgment according to an embodiment of the present disclosure;

FIG. 73 illustrates a transport layer control frame structure for block acknowledgment according to an embodiment of the present disclosure;

FIG. 74 illustrates a transport layer control frame structure for selective negative acknowledgment according to an embodiment of the present disclosure;

FIG. 75 illustrates parameters for message type, fragmentation, and sequence number fields of the transport layer control frame structures of FIGS. 72 to 74 according to an embodiment of the present disclosure;

Throughout the drawings, it should be noted that like reference numbers are used to depict the same or similar elements, features, and structures.

BRIEF DESCRIPTION OF TERMS

Figure 1:
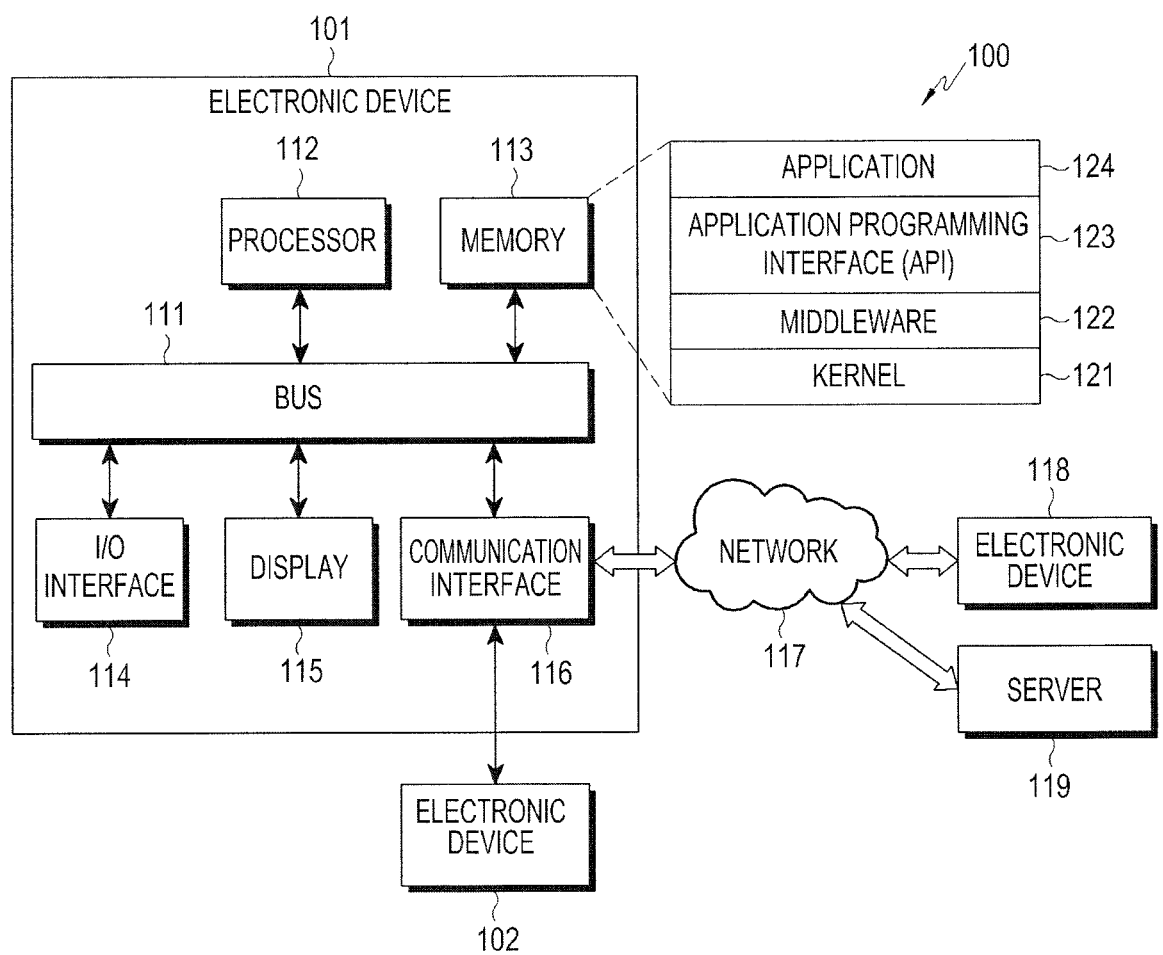
FIG. 1 illustrates a network environment including an electronic device according to an embodiment of the present disclosure.

Terms as used in the present disclosure are used to describe the various embodiments of the present disclosure, and are not intended to limit the present disclosure. Singular terms are intended to include plural forms, unless the context makes it clear that plural forms are not intended. Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic. In addition, any definition of a term provided herein should not be construed to be limiting the meanings of that or other terms, and the term can be interpreted differently, depending on the context and/or usage.

Accessory Service Profile (ASP): A defined method for providing an Accessory Service that specifies a definition of a service provider (i.e., a logical entity that provides the service), a definition of a service consumer (i.e., a logical entity that consumes the service), and a definition of an application protocol specifying formats for transaction and data which are exchanged as packets between the service provider and service consumer.

Accessory Service Profile ID (ASP ID): An Accessory Service Profile is uniquely identified by this identifier. In order to avoid conflicts, this ID can be assigned & managed by an authority. However un-assigned ID's can also be used at the risk of conflicts in case of duplicate identifiers. When a Service Agent registers with session layer, it may specify the ASP ID. When a Service Agent initiates a Service-Connection, it may specify the ASP ID.

Application Layer Entity (ALE): The application layer may include Application Layer Entities (ALEs). An ALE encapsulates an application logic that utilizes one or more Accessory Services to fulfill some purpose of the User.

Application Layer Entity (ALE) Registration Database: A repository that may include identity and capability info of ALE's that have registered with an underlying Capability Discovery Layer.

Application Layer Entity Identifier (ALE-ID): An Application Layer Entity Identifier (ALE-ID) identifies an ALE uniquely on a given device and binds the Service Agents used by the ALE.

Application Packet Data Unit (APDU): Application PDU's make up an Application Protocol message exchanged between a SP and a SC.

Device Identifier (ID): A peer electronic device is uniquely identified by the Device ID. The terms "Device ID" and "Peer Device ID" are used interchangeably. The Device ID can be assigned by the Discovery Management Entity (DME). The Device ID can be used by ALEs to refer to a specific peer electronic device when issuing a primitive to the network protocol Device Management Application: This entity identifies the application layer which helps the users to find out the accessory devices, pair with them, authenticate whether they are certified devices and vice versa.

Entity: An entity embodies the actor that performs specific roles and responsibilities at a specific layer. For example, an entity performing roles at an N Layer is referred to as an N Layer Entity (NLE). The entity that provides data services at an N Layer is referred to as the N Layer Data Entity (NLDE). The entity that provides management services at an N Layer is referred to as the N Layer Management Entity (NLME).

In-order Delivery: If an (N+1) Layer requests in-order delivery from an N Layer, then an (N+1) PDU transmitted by a remote (N+1) LDE may be provided to the local (N+1) LDE, only after all prior (N+1) PDUs transmitted by the same remote (N+1) LDE have been provided to the local (N+1) LDE.

Layer: A layer represents a collection of roles and responsibilities at a specific level of abstraction. Often, the term N Layer is used to refer to a layer, and its upper and lower layers are respectively referred to as, e.g., N+1 Layer and N−1 Layer.

Local Persistent Query State: Local Persistent Query State may include a filter list (list of {Peer-Device ID, ASP ID} pairs) which is union of the filters in the CD-ServiceList.request requests (that requested for Persistent Query Behavior) received so far. Each entry in this list has an associated list of ALE-ID's of ALE's that included the particular {Peer-Device ID, or ASP ID} pair in their CD-ServiceList.request request.

Peer Electronic Device: A remote smart device or accessory to which, when connected over a particular connectivity interface, in general is referred to as a peer electronic device or peer device. In this document, the term "peer (electronic) device" can be interchangeably used, without limitation, with "external (electronic) device," "accessory (electronic) device," or "appcessory (electronic) device," depending on the context. With respect to a given first (electronic) device, other (electronic) devices can be referred to as "peer (electronic) devices," "(electronic) devices," or "external (electronic) devices." Herein, the terms "external" and "peer" can be used interchangeably and the term "electronic" may be omitted. When describing a procedure or a concept referring to two or more electronic devices, there may not be a "local device" and a "peer device, but only "peer devices." In this case, the terms "external" and "peer" may not be interchangeable.

If the same remote smart device or accessory is connected over multiple connectivity interfaces, it is viewed as a number of different and distinct peer-devices, as many as the number of interfaces.

Peer Electronic Device ALE Database: A repository that may include identity and capability info of ALE's on peer electronic devices learned by capability exchange procedures.

Primitive: A primitive is a unit interaction step to realize a Service Access Point (SAP). The following primitives are used in this specification: request, ready, confirm, indication and response. A primitive may also be referred to as a message in the present disclosure.

Priority: Priority is the basis on which the local NLDE prioritizes transmissions of multiple (N+1) PDUs to the peer NLDE. At any time, (N+1) PDUs of "High" priority are transmitted first. If there are no (N+1) PDUs of "High" priority, then (N+1) PDUs of "Medium" priority are transmitted. If there are no (N+1) PDUs of "High" or "Medium" priority, then (N+1) PDUs of "Low" priority are transmitted.

Quality of Service (QoS) Attribute: A QoS Attribute is a specific characteristic of an (N+1) PDU which identifies how it should be treated by the peer NLDEs.

Quality of Service (QoS): The term Quality of Service refers to how an N+1 Layer Protocol Data Unit ((N+1) PDU) from a local (N+1) LDE is treated by NLE, in order to be delivered to a peer (N+1) LDE.

Remote Persistent Query State: Remote Persistent Query State includes a filter list which is union of all {Peer Electronic Device ID, ASP-ID} tuples gathered from the Capability Query messages received so far, that indicated Persistent Query Behavior.

Restricted Service Data Unit (SDU): If an N Layer provides a restricted NSDU service, then the N Layer does not follow any procedures to mask the NSDU size limitation arising due to limitations of (N−1) layers and below. The maximum NSDU or (N+1) PDU size is indicated by the N Layer to the (N+1) Layer. The (N+1) PDU should be strictly within the NSDU size limit imposed by the N Layer.

Accessory Network Protocol: The Accessory Network Protocol provides uniform data services on top of diverse connectivity technologies. The suite of Accessory Application Protocols is expected to make use of the services of the Network Protocol.

Services: The roles and responsibilities performed by NLEs are made available to N+1 Layer Entities by means of N Layer Services. Specifically, the data service offered by NLDE enables (N+1) LEs to transmit data to peer (N+1) LEs. Also, the management services offered by NLME enables (N+1) LEs to setup and/or configure the data services.

Service Access Point (SAP): The unit of an N Layer service is specified as a Service Access Point. A collection of Service Access Points is abbreviated as SAP. At N Layer, NLDE provides data service specified as the NLDE-SAP, and NLME provides a collection of management services specified as the NLME-SAP.

Service Agent: A Service Agent is an entity that realizes or implements an Accessory Service Profile.

Service Agent ID: A Service Agent ID identifies a Service Agent uniquely across Service Agents realizing or implementing the same Accessory Service Profile on a given device.

Service Connection: A Service Connection is a context between an SC and an SP over which the SP provides a service to the SC. It is composed of a set of channels that carry the messages pertaining to the application protocol defined in the associated ASP.

Service Consumer: A logical entity that consumes a service. The Service Consumer may be generically referred to as a Service Agent.

Service Provider: A logical entity that provides a service. The Service Provider may be generically referred to as a Service Agent.

Unordered Delivery: If an (N+1) Layer requests unordered delivery from N Layer, then an (N+1) PDU transmitted by a remote (N+1) LDE may be provided to the local (N+1) LDE, even if prior (N+1) PDUs transmitted by the same remote (N+1) LDE have not been provided to the local (N+1) LDE.

Unrestricted SDU: If an N Layer provides an unrestricted NSDU service, then the local and peer N layers follow fragmentation and reassembly procedures to provide a uniform NSDU size abstracting away the limitations of (N−1) layers and below. The maximum NSDU or (N+1) PDU size is indicated by the N Layer to the (N+1) Layer. The (N+1) PDU should be strictly within the NSDU size limit imposed by the N Layer.

BRIEF DESCRIPTION OF ABBREVIATIONS

ACK: Acknowledgment
ALE: Application Layer Entity
AME: Authentication Management Entity
AOAP: Android Open Accessory Protocol
APDU: Application Protocol Data Unit
AS: Accessory Service
ASP: Accessory Service Profile
ASP Id: Accessory Service Profile identifier
BLE: Bluetooth Low Energy
BR/EDR: (Bluetooth) Basic Rate/Enhanced Data Rate
BT: Bluetooth
BT_ADDR: Bluetooth Device Address
CL: Connection Layer
CLDE: Connection Layer Data Entity
CLDE-SAP: Connection Layer Data Entity Service Access Point
CPDU: Connection layer Protocol Data Unit
CSDU: Connection layer Service Data Unit
DME: Discovery Management Entity
ID: Identifier IP: Internet Protocol
L2CAP: Logical Link Layer Control and Adaptation Protocol
LE: (Bluetooth) Low Energy
MAC: Medium Access Control
MTU: Maximum Transmission Unit
NAK: Negative Acknowledgment
NLE: N Layer Entity
NLDE: N Layer Data Entity
NLME: N Layer Management Entity
PDU: Protocol Data Unit
QoS: Quality of Service
RFCOMM: (Bluetooth) Radio Frequency Communications
SAP: Service Access Point
SC: Service Consumer
SDU: Service Data Unit
SL: Session Layer
SLDE: Session Layer Data Entity
SLDE-SAP: Session Layer Data Entity Service Access Point
SLME: Session Layer Management Entity
SLME-SAP: Session Layer Management Entity Service Access Point
SP: Service Provider
SPDU: Session Protocol Data Unit
SSDU: Session Service Data Unit
TCP: Transmission Control Protocol
TL: Transport Layer
TLDE: Transport Layer Data Entity
TLDE-SAP: Transport Layer Data Entity Service Access Point
TLME: Transport Layer Management Entity
TLME-SAP: Transport Layer Management Entity Service Access Point
TPDU: Transport Protocol Data Unit
TSDU: Transport Service Data Unit
UART: Universal Asynchronous Receiver Transmitter
UDP: User Datagram Protocol
USB: Universal Serial Bus

DETAILED DESCRIPTION

Detailed descriptions of the various aspects of the present disclosure will be discussed below with reference to the attached drawings. The descriptions are set forth as examples only, and shall not limit the scope of the present disclosure. With respect to the description of the drawings, like features are referenced with like numerals.

Table of Contents
A. Introductory Statements
B. Overview of Electronic Device
C. Introductory Concepts
D. Accessory Protocol
E. Application Protocol
F. Service Discovery/Capability Exchange
G. Device Discovery
H. Network Protocol
I. Various Embodiments

A. INTRODUCTORY STATEMENTS

As used in the present disclosure, terms such as "includes" or "may include" refer to the presence of the corresponding function, operation or feature, and do not limit the presence of additional functions, operations or features. Also, terms such as "includes" or "has" refers to the presence of characteristics, numbers, steps, operations, components or combinations thereof, and is not intended to exclude one or more additional characteristics, numbers, steps, operations, components or combinations thereof.

As used in the present disclosure, without limitation, the phrase "configured to" may be interchangeably used with other terms, such as "suitable for," "having the capacity to," "designed to," "adapted to," "made to," or "capable of," depending on the circumstances. In certain examples, the term "configured to" may not necessarily mean "specifically designed to" in a hardware sense. Rather, in a certain context, the term "configured to" may mean "capable of" with assistance of other components. For example, the phrase "a processor configured to perform A, B, and C" can mean a generic-purpose processor (for example, a CPU or an application processor) that can perform A, B, and C by executing one or more software programs stored in a memory device.

As used in the present disclosure, the term "or" is used to include any and all combination of terms listed. For examples, "A or B" includes only A, only B, or both A and B. As used in the present disclosure, terms such as "first" or "second" may be used to describe various features, but do not limit such features. For example, the terms do not limit the order and/or the importance of their associated features. Such terms may be used to differentiate one feature from another. For example, a first user equipment (alternatively, "UE") and a second user equipment are both user equipment, but are different user equipments. For example, without departing from the scope of the present disclosure, a first component may be called a second component, and likewise, a second component may be called a first component.

As used in the present disclosure, the phrase "at least one of A or B" or "at least one of A and B" can mean (1) A, (2) B, or (3) A and B, not necessarily requiring at least one A and at least one B.

If a component is said to be "connected with" or "connected to" another component, the component may be directly connected with, or connected to, the other component, or another component may exist in between. On the other hand, if a component is said to be "directly connected with" or "directly connected to" another component, it should be understood that no components exist in between.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

B. OVERVIEW OF ELECTRONIC DEVICE

An electronic device according to the present disclosure may include communication functionality. For example, an electronic device according to the present disclosure may be a smart phone, a tablet Personal Computer (PC), a mobile phone, a video phone, an e-book reader, a desktop PC, a laptop PC, a netbook PC, a Personal Digital Assistant (PDA), Portable Multimedia Player (PMP), an MP3 player, a mobile medical device, a camera, or a wearable device (e.g., Head-Mounted Device (HMD), electronic clothes, electronic braces, an electronic necklace, an electronic accessory, an electronic tattoo, a smart watch, a smart glass, a smart glove, or a smart patch).

According to various embodiments, an electronic device may be a smart home appliance with communication functionality. A smart home appliance may be, for example, a television, Digital Video Disk (DVD) player, audio, refrigerator, air conditioner, vacuum cleaner, oven, microwave oven, washer, dryer, air purifier, set-top box, TV box (e.g., HomeSync™, Apple TV™, or Google TV™), gaming console, electronic dictionary, electronic key, camcorder, or electronic picture frame.

According to various embodiments, an electronic device may be a medical device (e.g., a Magnetic Resonance Angiography (MRA) device, a Magnetic Resonance Imaging (MRI) device, a Computed Tomography (CT) device, an imaging device, or a ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope or compass), an avionic electronic device, security device, or industrial or consumer robot.

According to various embodiments, an electronic device may be furniture, part of a building/structure, an electronic board, an electronic signature receiving device, a projector, or various measuring devices (e.g., water, electricity, gas or electro-magnetic wave measuring devices), that include communication functionality.

An electronic device according to the present disclosure may be any combination of the foregoing devices. In addition, it will be apparent to one having ordinary skill in the art that an electronic device according to the present disclosure is not limited to the foregoing devices.

FIG. 1 illustrates a network environment including an electronic device according to an embodiment of the present disclosure.

Referring to FIG. 1, an electronic device 101 may include a bus 111, a processor 112, a memory 113, an Input/Output (I/O) interface 114, a display 115, and a communication interface 116.

The bus 111 may be circuitry that connect the foregoing components and allow communication (e.g., send control messages) between the foregoing components.

The processor 112 may, for example, receive instructions from other components (e.g., the memory 113, the I/O interface 114, the display 115, or the communication interface 116), interpret the received instructions and execute computation or data processing according to the interpreted instructions.

The memory 113 may, for example, store instructions or data that are received from, or generated by, other components (e.g., the memory 113, the I/O interface 114, the display 115, or the communication interface 116). For example, the memory 113 may include programming modules such as a kernel 121, a middleware 122, an Application Programming Interface (API) 123 or an application 124. Each of the foregoing programming modules may include a combination of at least two of software, firmware or hardware.

The kernel 121 may control or manage system resources (e.g., the bus 111, the processor 112 or the memory 113) that may be used in executing operations or functions implemented in other programming modules such as, for example, the middleware 122, the API 123 or the application 124. Also, the kernel 121 may provide an interface for allowing the middleware 122, the API 123 or the application 124 to access individual components of the electronic device 101.

The middleware 122 may be a medium through which the kernel 121 may communicate with the API 123 or the application 124 to send and receive data. Also, the middleware 122 may control (e.g., scheduling or load balancing) work requests by one or more applications 124 by, for example, assigning priorities for using system resources (the bus 111, the processor 112 or the memory 113) of the electronic device 101 to the one or more applications 124.

The API 123 is an interface that may control functions that the application 124 may provide at the kernel 121 or the middleware 122. For example, the API 123 may include at least an interface or function (e.g., command) for file control, window control, video processing or character control.

According to various embodiments, the application 124 may include, for example, an SMS/MMS application, an email application, a calendar application, an alarm application, a health care application (e.g., exercise amount or blood sugar level measuring application) or an environmental information application (e.g., an application that may provide atmospheric pressure, humidity or temperature information). In addition to or alternatively, the application 124 may be an application that is associated with information exchange between the electronic device 101 and a peer electronic device (e.g., the electronic device 118). The application that is associated with the information exchange may include, for example, a notification relay application that may provide the peer electronic device with certain type of information, or a device management application that may manage the peer electronic device.

For example, the notification relay application may include a functionality that provides notification generated by other applications at the electronic device 101 (e.g., SMS/MMS application, email application, health care application or environmental information application) to a peer electronic device (e.g., the electronic device 118). In addition to or alternatively, the notification relay application may provide, for example, receive notification from a peer electronic device (e.g., the electronic device 118) and provide the notification to a user. The device management application may manage, for example, enabling or disabling of functions associated with at least a portion of a peer electronic device (the peer electronic device itself, or one or more components of the peer electronic device) in communication with the electronic device 101, controlling of brightness (or resolution) of a display of the peer electronic device, or application operated at, or service (e.g., voice call service or messaging service) provided by, the peer electronic device.

According to various embodiments, the application 124 may include, for example, one or more applications that are determined according to a property (e.g., type of electronic device) of the peer electronic device (e.g., the electronic device 118). For example, if the peer electronic device is an mp3 player, the application 124 may include one or more applications related to music playback. In another example, if the peer electronic device is a mobile medical device, the application 124 may be health care-related applications. According to an embodiment, the application 124 may include at least one of an application that is preloaded at the electronic device 101 or an application that is received from a peer electronic device (e.g., the electronic device 118 or the server 119).

The I/O interface 114, for example, may receive an instruction or data from a user and send, via the bus 111, the instruction or data to the processor 112, the memory 113, or the communication interface 116. For example, the I/O interface 114 may provide data associated with user input received via a touch screen to the processor 112. Also, the I/O interface 114 may, for example, output instructions or data received via the bus 111 from the processor 112, the memory 113, or the communication interface 116, via an I/O device (e.g., a speaker or a display). For example, the I/O interface 114 may output voice data processed using the processor 112, via a speaker.

The display 115 may display various types of information (e.g., multimedia or text data) to the user.

The communication interface 116 may provide communication between the electronic device 101 and one or more peer electronic devices (e.g., the electronic device 118 or the server 119). For example, the communication interface 116 may communicate with the peer electronic device by establishing a connection with the network 117 using wireless or wired communication. The wireless communication may be at least one of, for example, Wi-Fi, Bluetooth, Near Field Communication (NFC), Global Positioning System (GPS), or cellular communication (e.g., LTE, LTE-A, CDMA, WDCMA, UMTS, WiBro or GSM). The wired communication may be at least one of, for example, Universal Serial Bus (USB), High Definition Multimedia Interface (HDMI), recommended standard 232 (RS-232) or Plain Old Telephone Service (POTS).

According to various embodiments, the network 117 may be a telecommunications network. The telecommunications network may include at least one of, for example, a computer network, the Internet, the Internet of Things or a telephone network. According to an embodiment, a protocol (e.g., transport layer protocol, data link layer protocol or physical layer protocol) for communicating between the electronic device 101 and a peer electronic device may be supported by, for example, at least one of the application 124, the application programming interface 123, the middleware 122, the kernel 121 or the communication interface 116.

Figure 2:
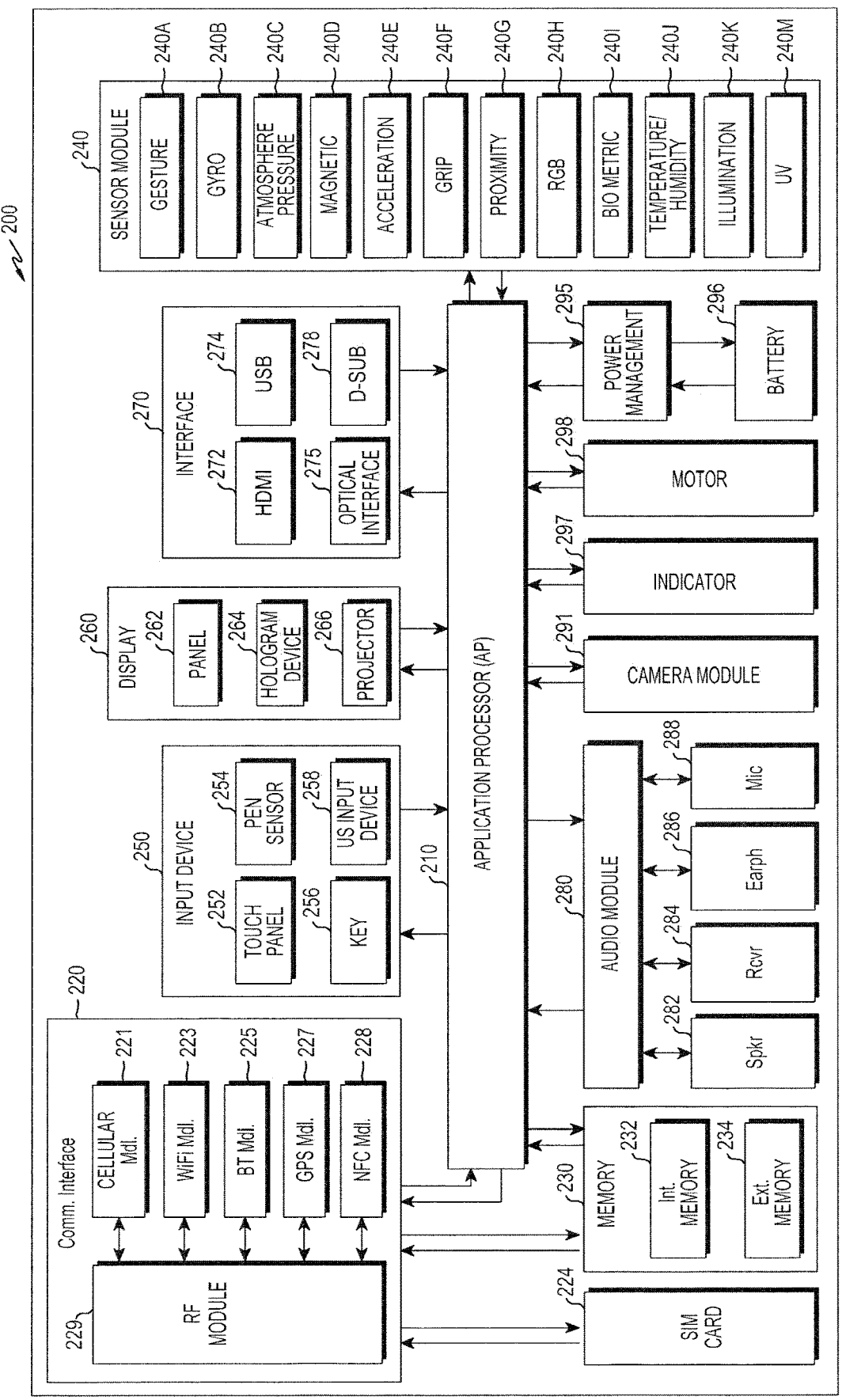
FIG. 2 illustrates a block diagram of an electronic device according to an embodiment of the present disclosure.

FIG. 2 illustrates a block diagram of an electronic device according to an embodiment of the present disclosure.

Referring to FIG. 2, an electronic device 200 may be, for example, a part or all of the electronic device 101. Referring to FIG. 2, the electronic device 200 may include one or more Application Processors (AP) 210, a communication module 220, a Subscriber Identification Module (SIM) card 224, a memory 230, a sensor module 240, an input module 250, a display module 260, an interface 270, an audio module 280, a camera module 291, a power management module 295, a battery 296, an indicator 297 or a motor 298.

The AP 210 may control one or more hardware or software components that are connected to the AP 210, or perform processing or computation of data (including multimedia data). The AP 210 may be implemented, for example, as a System-on-Chip (SoC). The AP 210 may further include a Graphics Processing Unit (GPU; not shown).

The communication module 220 (e.g., the communication interface 116) may transmit and receive data in communications between the electronic device 200 and other electronic devices (e.g., the electronic device 118 or the server 119). The communication module 220 may include, for example, one or more of a cellular module 221, a Wi-Fi module 222, a Bluetooth module 225, a GPS module 227, a Near-Field Communication (NFC) module 228, or a Radio Frequency (RF) module 229.

The cellular module 221 may provide services such as, for example, voice call, video call, Short Messaging Service (SMS) or internet, via a communication network (e.g., LTE, LTE-A, CDMA, WCDMA, UMTS, WiBro or GSM). The cellular module 221 may, for example, also differentiate and authorize electronic devices within a communication network, using a subscriber identification module (SIM) card (e.g., the SIM card 224). According to an embodiment, the cellular module 221 may perform at least a part of the functionalities of the AP 210. For example, the cellular module 221 may perform at least a part of multimedia control functionality.

According to an embodiment, the cellular module 221 may include a Communication Processor (CP). The cellular module 221 may, for example, be implemented as SoC. Although FIG. 2 shows components such as the cellular module 221 (e.g., CP), the memory 230 or the power management module 295 as components that are separate from the AP 210, according to the present disclosure, the AP 210 may include, or be integrated with, one or more of the foregoing components (e.g., the cellular module 221).

According to an embodiment, the AP 210 or the cellular module 221 (e.g., a CP) may process instructions or data received from at least one of a non-volatile memory or other components by loading in a volatile memory. Also, the AP 210 or the cellular module 221 may store at the non-volatile memory at least one of data that is received from at least one of other components or data that is generated by at least one of the other components.

Each of the Wi-Fi module 222, the Bluetooth module 225, the GPS module 227 or the NFC module 228 may, for example, include one or more processors that may process data received or transmitted by the respective modules. Although FIG. 2 shows the cellular module 221, the Wi-Fi module 223, the Bluetooth module 225, the GPS module 227 and the NFC module 228 as separate blocks, according to an embodiment, any combination (e.g., two or more) of the cellular module 221, the Wi-Fi module 223, the Bluetooth module 225, the GPS module 227 or the NFC module 228 may be included in an Integrated Chip (IC) or an IC package. For example, at least some of the processors corresponding to the respective cellular module 221, the Wi-Fi module 223, the Bluetooth module 225, the GPS module 227 or the NFC module 228 may be implemented as a single SoC. For example, a CP corresponding to the cellular module 221 and a Wi-Fi processor corresponding to the Wi-Fi module 223 may be implemented as a single SoC.

The RF module 229 may, for example, transmit and receive RF signals. Although not shown, the RF module 229 may include a transceiver, a Power Amp Module (PAM), a frequency filter or a Low Noise Amplifier (LNA). Also, the RF module 229 may include one or more components for transmitting and receiving Electro-Magnetic (EM) waves in free space such as, for example, conductors or conductive wires. Although FIG. 2 shows that the cellular module 221, the Wi-Fi module 223, the Bluetooth module 225, the GPS module 227 and the NFC module 228 are sharing one RF module 229, according to an embodiment, at least one of the cellular module 221, the Wi-Fi module 223, the Bluetooth module 225, the GPS module 227 or the NFC module 228 may transmit and receive RF signals via a separate RF module.

The SIM card 224 may be a card implementing a SIM, and may be configured to be inserted into a slot disposed at a specified location of the electronic device. The SIM card 224 may include a unique identifier (e.g., Integrated Circuit Card Identifier (ICCID)) or subscriber information (e.g., International Mobile Subscriber Identity (IMSI)).

The memory 230 may include an internal memory 232 or a peer memory 224. The internal memory 232 may be, for example, at least one of volatile memory (e.g., Dynamic RAM (DRAM), Static RAM (SRAM) or Synchronous Dynamic RAM (SDRAM)) or non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, NAND flash memory or NOR flash memory).

According to an embodiment, the internal memory 232 may be a Solid State Drive (SSD). The external memory 234 may be, for example, a flash drive (e.g., a Compact Flash (CF) drive, a Secure Digital (SD), a micro Secure Digital (micro-SD), a mini Secure Digital (mini-SD), an extreme Digital (xD) or a Memory Stick). The external memory 234 may be operatively coupled to the electronic device 200 via various interfaces. According to an embodiment, the electronic device 200 may include recording devices (or recording media) such as, for example, Hard Disk Drives (HDD).

The sensor module 240 may measure physical/environmental properties or detect operational states associated with the electronic device 200, and convert the measured or detected information into signals such as, for example, electric signals or electromagnetic signals. The sensor module 240 may include at least one of, for example, a gesture sensor 240A, a gyro sensor 240B, an atmospheric pressure sensor 240C, a magnetic sensor 240D, an accelerometer 240E, a grip sensor 240F, a proximity sensor 240G, an RGB sensor 240H, a biometric sensor 240I, a temperature/humidity sensor 240J, a luminosity sensor 240K or an Ultra Violet (UV) sensor 240M. The sensor module 240 may detect the operation state of the electronic device or measure physical properties and convert the detected or measured information into electrical signals. Additionally or alternatively, the sensor module 240 may also include, for example, electrical-nose sensor (not shown), electromyography (EMG) sensor (not shown), electroencephalogram (EEG) sensor (not shown), infrared (IR) sensor (not shown), eye-scanning sensor (e.g., iris sensor; not shown) or fingerprint sensor. Sensor module 240 may also include control circuitry for controlling one or more sensors included therein.

The input module 250 may include a touch panel 252, a (digital) pen sensor 254, a key 256 or an ultrasonic input device 258. The touch panel 252 may detect touch input using, for example, capacitive, resistive, infrared or ultrasonic methods. The touch panel 252 may also include a touch panel controller (not shown). A capacitive-type touch panel may, for example, detect proximity inputs (e.g. hovering input) in addition to, or alternative to, physical touch inputs. The touch panel 252 may also include a tactile layer. Haptic feedback may be provided to the user using the tactile layer.

The (digital) pen sensor 254 may be implemented, for example, using methods identical to or similar to receiving a touch input from a user, or using a separate detection sheet (e.g., a digitizer). The key 256 may be, for example, a keypad or a touch key. The ultrasonic input device 258 may be a device configured to identify data by detecting, using a microphone (e.g., the microphone 288), ultrasonic signals generated by a device capable of generating the ultrasonic signal. The ultrasonic input device 258 may detect data wirelessly. According to an embodiment, the electronic device 200 may receive user input from an external device (e.g., a network, computer or server) connected to electronic device 200 using the communication module 220.

The display module 260 (e.g., the display 115) may include a panel 262, a hologram device 264 or a projector 266. The panel 262 may be, for example, a Liquid-Crystal Display (LCD) or an Active-Matrix Organic Light-Emitting Diode (AM-OLED) display. The panel 262 may be configured to be, for example, flexible, transparent or wearable. The panel 262 and the touch panel 252 may be implemented as a single module. The hologram device 264 may utilize the interference of light waves to provide a three-dimensional image in empty space. The projector 266 may provide image by projecting light on a surface (e.g., a wall or a screen). The surface may, for example, be positioned internal or external to the electronic device 200. According to an embodiment, the display module 260 may also include a control circuitry for controlling the panel 262, the hologram device 264 or the projector 266.

The interface 270 may include, for example, one or more interfaces for a High-Definition Multimedia Interface (HDMI) 272, a Universal Serial Bus (USB) 274, a projector 276 or a D-subminiature (D-sub) 278. Additionally or alternatively, the interface 270 may include, for example, one or more interfaces for Secure Digital (SD)/MultiMedia Card (MMC) (not shown) or Infrared Data Association (IrDA) (not shown).

The audio codec 280 may encode/decode a voice into an electrical signal, and vice versa. The audio codec 280 may, for example, encode/decode voice information that is input into, or output from, the speaker 282, the receiver 284, the earphone 286 or the microphone 288.

The camera module 291 may capture still images or video. According to an embodiment, the camera module 291 may include one or more image sensors (e.g., front sensor module or rear sensor module; not shown), an Image Signal Processor (ISP, not shown), or a flash Light-Emitting Diode (flash LED, not shown).

The power management module 295 may manage electrical power of the electronic device 200. Although not shown, the power management module 295 may include, for example, a Power Management Integrated Circuit (PMIC), a charger Integrated Circuit (charger IC) or a battery fuel gauge.

The PMIC, for example, may be disposed in an integrated circuit or an SoC semiconductor. The charging method for the electronic device 200 may include wired or wireless charging. The charger IC may charge a battery, or prevent excessive voltage or excessive current from a charger from entering the electronic device 200. According to an embodiment, the charger IC may include at least one of a wired charger IC or a wireless charger IC. The wireless charger IC may be, for example, a magnetic resonance type, a magnetic induction type or an electromagnetic wave type, and may include circuits such as, for example, a coil loop, a resonance circuit or a rectifier.

The battery gauge may measure, for example, charge level, voltage while charging, or temperature of the battery 296. The battery 296 may supply power to, for example, the electronic device 200. The battery 296 may be, for example, a rechargeable battery.

The indicator 297 may indicate one or more states (e.g., boot status, message status or charge status) of the electronic device 200 or a portion thereof (e.g., the AP 210). The motor 298 may convert electrical signal into mechanical vibration. The MCU 299 may control the sensor module 240.

Although not shown, the electronic device 200 may include one or more devices for supporting mobile television (mobile TV, e.g., a Graphics Processing Unit (GPU)). The devices for supporting mobile TV support processing of media data compliant with, for example, Digital Multimedia Broadcasting (DMB), Digital Video Broadcasting (DVB) or media flow.

Figure 3:
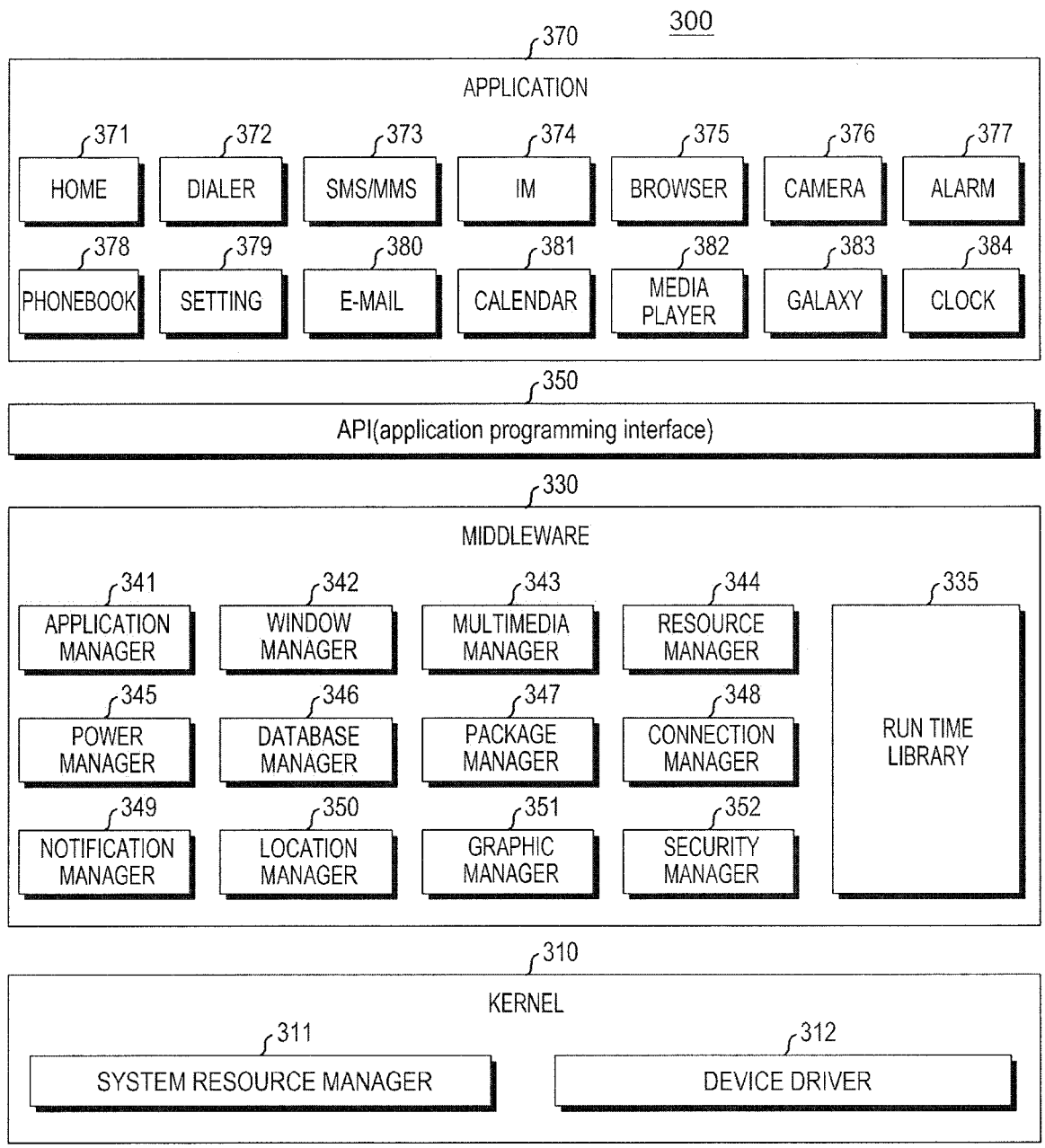
FIG. 3 illustrates a block diagram of a programming module according to an embodiment of the present disclosure.

FIG. 3 illustrates a block diagram of a programming module according to an embodiment of the present disclosure.

Referring to FIG. 3, a programming module 300 may be included (for example, stored) in the electronic device 100 (for example, in the memory 113) illustrated in FIG. 1. At least a part of the programming module 300 may be implemented in software, firmware, hardware, or in a combination of them. The programming module 300 may be implemented in hardware (for example, the electronic device 200) and may include an Operating System (OS) that controls resources related to an electronic device (for example, the electronic device 100) or various applications executed on the OS (for example, applications 370). For example, the OS may be Android, iOS, Windows, Symbian, Tizen, Bada, or the like. Referring to FIG. 3, the programming module 300 may include a kernel 310, middleware 330, an Application Programming Interface (API) 360, or the applications 370.

The kernel 310 (for example, the kernel 121) may include a system resource manager 311 or a device driver 312. The system resource manager 311 may include, for example, a process manager (not shown), a memory manager (not shown), or a file system manager (not shown). The system resource manager 311 may control, allocate, or deallocate system resources. The device driver 312 may include, for example, a display driver (not shown), a camera driver (not shown), a Bluetooth driver (not shown), a shared memory driver (not shown), a USB driver (not shown), a keypad driver (not shown), a Wi-Fi driver (not shown), or an audio driver (not shown). In an embodiment of the present disclosure, the device driver 312 may include an Inter-Process Communication (IPC) driver (not shown).

The middleware 330 may include a plurality of modules that have already been implemented to provide functions commonly used for the applications 370. The middleware 330 may provide functions through the API 360 so that the applications 370 may efficiently use limited system resources available within the electronic device. For example, as illustrated in FIG. 3, the middleware 330 (for example, the middleware 122) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a complier uses to add a new function in a programming language during execution of an application 370. In an embodiment of the present disclosure, the runtime library 335 may perform input/output, memory management, a function related to arithmetic function, or the like.

The application manager 341 may manage, for example, the life cycle of at least one of the applications 370. The window manager 342 may manage GUI resources used for a screen. The multimedia manager 343 may determine formats used to play back various media files and may encode or decode a media file using a CODEC suitable for the format of the media file. The resource manager 344 may manage resources including source code, a memory, or storage space of at least one of the applications 370.

The power manager 345 may manage a battery or a power source by operating in conjunction with a Basic Input/Output System (BIOS) and may provide power information used for an operation. The database manager 346 may manage a database for at least one of the applications 370 so that the database may be generated, searched, or modified. The package manager 347 may manage installation or update of an application distributed as a package file.

The connectivity manager 348 may manage, for example, wireless connectivity of Wi-Fi, Bluetooth, or the like. The notification manager 349 may indicate or notify an event such as message arrival, a schedule, a proximity alarm, or the like in a manner that does not bother a user. The location manager 350 may mange position information about the electronic device. The graphic manager 351 may manage graphical effects to be provided to the user or related user interfaces. The security manager 352 may provide an overall security function used for system security, user authentication, and the like. In an embodiment of the present disclosure, if the electronic device (for example, the electronic device 100) has a telephony function, the middleware 330 may further include a telephony manager (not shown) to manage a voice or video call function of the electronic device.

A new middleware module may be created and used by combining various functions of the above-described component modules in the middleware 330. The middleware 330 may provide a customized module for each OS type in order to provide differentiated functions. In addition, the middleware 330 may dynamically delete a part of the existing components or add a new component. Accordingly, a part of the components may be omitted, another component may be added, or a component may be replaced with a component with a different name but a similar function in the embodiment of the present disclosure.

The API 360 (for example, the API 123) is a set of API programming functions, which may be configured differently according to an OS. For example, in the case of Android or iOS, one API set may be provided per platform, whereas in the case of Tizen, two or more API sets may be provided per platform.

The applications 370 (for example, the applications 124) may include, for example, a preloaded application or a third party application.

At least a part of the programming module 300 may be implemented as commands stored in a computer-readable storage medium. When a command is executed by one or more processors (for example, the processor 210), the one or more processors may execute a function corresponding to the command. The computer-readable storage medium may be, for example, the memory 230. At least a part of the programming module 300 may be implemented (for example, executed) by the processor 210. At least a part of the programming module 300 may include, for example, a module, a program, a routine, a set of instructions, and/or a process to execute one or more functions.

The names of components of a programming module according to the present disclosure (for example, the programming module 300) may vary according to the type of an OS. The programming module of the present disclosure may include at least one of the afore-described components, may not include a part of the components, or may include an additional component. Operations of the programming module or other components according to the present disclosure may be performed sequentially, in parallel, repeatedly, or heuristically. Further, a part of the operations may be omitted or a new operation may be added.

Components of hardware described above according to the present disclosure may each include one or more components, and each component's name may vary according to the type of an electronic device. The hardware according to the present disclosure may include at least one of the above-described components, and some may be omitted or may include additional components. Also, some of the components of the hardware according to the present disclosure may be combined into a single entity and perform functions identical or similar to those of the respective components before their combination.

The term "module" as used herein may include its ordinary meaning including, but not limited to, for example, a unit of one, or a combination of two or more, hardware, software or firmware. The term "module" may be used interchangeably with terms such as, for example, unit, logic, logical block, component or circuit. A module may be the smallest unit for performing one or more functions, or a portion thereof. A module may be implemented mechanically, or electronically. For example, a module according to the present disclosure may include at least one of a known, or to-be-developed, Application-Specific Integrated Circuit (ASIC) chip, Field-Programmable Gate Array (FPGA) or programmable logic device that perform certain operations.

A module according to the present disclosure may include one or more of the above-described components, may omit a portion thereof, or may include additional components. Operations that are performed by a module, a programming module or other components according to the present disclosure may be processed in a serial, parallel, repetitive or heuristic manner, and some operations may be omitted or additional operations may be added.

C. INTRODUCTORY CONCEPTS

To assist with an understanding of the present disclosure a concept of a layered framework architecture is introduced.

Figure 4:
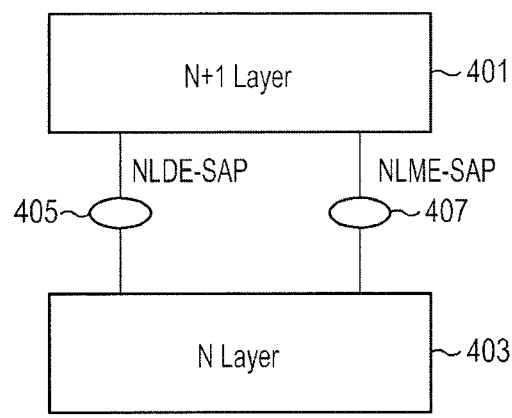
FIG. 4 illustrates a block diagram of a layered framework architecture according to an embodiment of the present disclosure.

FIG. 4 illustrates a block diagram of a layered framework architecture according to an embodiment of the present disclosure.

Referring to FIG. 4, the framework interface has a layered architecture including multiple layers with each layer providing services to its upper layer by utilizing the services of its lower layer.

A layer represents a collection of roles and responsibilities at a specific level of abstraction. The term N Layer 403 is used to refer to a layer, and its upper layer and lower layer are respectively referred to as N+1 Layer 401 and N−1 Layer.

An entity embodies the actor that performs specific roles and responsibilities at a specific layer. Specifically, an entity performing roles at N Layer 403 is referred to as an N Layer Entity (NLE). The specific entity that provides data services at N Layer 403 is referred to as the N Layer Data Entity (NLDE). The specific entity that provides management services at N Layer 403 is referred to as the N Layer Management Entity (NLME).

The roles and responsibilities performed by NLEs are made available to N+1 Layer Entities by means of N Layer Services. Specifically, the data service offered by NLDE enables (N+1)LEs to transmit data to peer (N+1)LEs. Also, the management services offered by NLME enables (N+1) LEs to setup and/or configure the data services.

The unit of an N Layer service is specified as a Service Access Point (SAP). At N Layer 403, NLDE provides data service specified as an NLDE-SAP 405, and NLME provides a collection of management services specified as an NLME-SAP 407.

A Protocol Data Unit (PDU) is a unit of message exchange between peer N layer entities. Specifically, an N layer PDU is called an NPDU.

A Service Data Unit (SDU) is a unit of data exchange between an N+1 layer and an N layer. Specifically, an SDU submitted by N+1 layer 401 to N Layer 403 for delivery to a peer N+1 layer, is referred to as an NSDU. The transmitting N Layer 403 may append its headers to an NSDU to construct an NPDU. The receiving N Layer may strip its headers from an NPDU to construct an NSDU.

A primitive is a unit interaction step to realize a SAP. The following primitives are used in this disclosure: request, ready, confirm, indication and response.

Here, a NLDE-SAP primitive can be one of the following generic types.

Request: The request primitive is issued by N+1 layer 401 to N Layer 403 to request a data service from N-Layer 403. N+1 Layer 401 may wait for a confirmation before initiating a fresh request.

Ready: The ready primitive is issued by N layer 403 to N+1 Layer 401 to notify that it is ready to accept further data from N+1 layer 401.

Confirm: The confirm primitive is used by N layer 403 to convey the delivery status of the previously requested data from N+1 layer 401.

Indication: The indication primitive is used by N Layer 403 to indicate/deliver data received for N+1 layer 401.

Here, a NLME-SAP primitive can be one of the following generic types.

Request: The request primitive is issued by N+1 layer 401 to N Layer 403 to request a management service from N Layer 403.

Confirm: The confirm primitive is used by N layer 403 to convey the result of a previous management service request from N+1 layer 401.

Indication: The indication primitive is used by N Layer 403 to indicate to N+1 layer 401 of N Layer events concerning the N+1 layer 401.

Response: The response primitive is issued by N+1 layer 401 to N layer 403 to notify completion of a procedure previously invoked by an indication primitive.

In order to allow multiple instances of the same primitive to be issued by one layer to another layer, the concept of Transaction Identifier (ID) is used. The default method for the use of Transaction IDs for various primitives is specified below.

When the N+1 layer 401 issues a Request primitive from the NLDE-SAP 405, the N+1 layer 401 is responsible for generating the Transaction ID.

In the Ready primitive and the Confirm primitive that the N layer 403 issues to N+1 layer 401 in response to the above Request primitive, the Transaction ID included in the Request primitive is echoed.

When the N layer 403 issues an Indication primitive from the NLDE-SAP 405, the N layer 403 is responsible for generating the Transaction ID.

When the N+1 layer 401 issues a Request primitive from the NLME-SAP 407, the N+1 layer 401 is responsible for generating the Transaction ID.

In the Confirm primitive that the N layer 403 issues to N+1 layer 401 in response to the above Request primitive, the Transaction ID included in the Request primitive is echoed.

When the N layer 403 issues an Indication primitive from the NLME-SAP 407, the N layer 403 is responsible for generating the Transaction ID.

In the Response primitive that the N+1 layer 401 issues to N layer 403 in response to the above Indication primitive, the Transaction ID included in the Indication primitive is echoed.

The disclosure is not limited to the above default method for the use of Transaction IDs. Other specific primitives may be utilized, such as those put forth throughout the present disclosure.

The term Quality of Service (QoS) refers to how an N+1 Layer Protocol Data Unit ((N+1)PDU) from a local (N+1) LDE is treated by the NLE, in order to be delivered to a peer (N+1)LDE. A QoS Attribute is a specific characteristic of an (N+1)PDU which identifies how it should be treated by the peer NLDEs. The following QoS attributes may be employed.

Here, a NLDE-SAP primitive can be one of the following generic types.

Datagram Service: The N Layer is said to provide a datagram service to the (N+1) Layer 401 if each (N+1)PDU transmitted by the local (N+1) Layer 401 is delivered to the peer (N+1) Layer as is, in the form of a single distinct data unit. Without being segmented into multiple data units, and without being concatenated with other (N+1)PDUs.

In-Order Delivery: If (N+1) Layer 401 requests in-order delivery of (N+1)PDUs from N Layer: Then an (N+1)PDU transmitted by the local (N+1)LDE may be delivered to the peer (N+1)LDE, only after all prior (N+1)PDUs transmitted by the local (N+1)LDE have been delivered to the peer (N+1)LDE. The local and peer NLDEs may follow retransmission and recovery mechanisms or rely on the capabilities of (N−1) layers and below for (N+1)PDU delivery. If the local NLDE and the peer NLDE are unable to deliver an (N+1)PDU to the peer (N+1)LDE, then they should terminate the connection and notify their respective (N+1)LDEs of connection failure.

Unordered Delivery: If the (N+1) Layer 401 requests unordered delivery of (N+1)PDUs from N Layer: Then an (N+1)PDU transmitted by the local (N+1)LDE may be delivered to the peer (N+1)LDE, even if prior (N+1)PDUs transmitted by the local (N+1)LDE have not been delivered to the peer (N+1)LDE. (N+1)PDUs are transmitted by the local NLDE to the peer NLDE in the same sequence as received from the local (N+1)LDE. The local and peer NLDEs do not follow any retransmission and recovery mechanisms, but simply rely on the capabilities of (N−1) layers and below for (N+1)PDU delivery. If the local NLDE and the peer NLDE are unable to deliver an (N+1)PDU to the peer (N+1)LDE, then they should drop that (N+1)PDU and attempt to deliver the next (N+1)PDU in the sequence.

Restricted SDU: If N Layer 403 provides a restricted NSDU service: Then the N Layer 403 does not follow any procedures to mask the NSDU size limitation arising due to limitations of (N−1) layers and below. According to the limitations of (N−1) layers and below, the N Layer 403 indicates the maximum NSDU or (N+1)PDU size to the (N+1) Layer. The (N+1)PDU should be strictly within the NSDU size limit.

Unrestricted SDU: If N Layer 403 provides an unrestricted NSDU service: Then the local and peer N layers follow fragmentation and reassembly procedures to provide a uniform NSDU size masking the limitations of (N−1) layers and below. For practical reasons, the N Layer 403 imposes a reasonable maximum NSDU or (N+1)PDU size independent of the limitations of (N−1) layers and below, and indicates this to the (N+1) Layer. The (N+1)PDU should be strictly within the NSDU size limit.

Priority: Priority is the basis on which the local NLDE prioritizes transmissions of multiple (N+1)PDUs to the peer NLDE: At any time, (N+1)PDUs of "High" priority are transmitted first. From all non-empty (N+1)PDU queues, the NLDE picks the queue for which Priority is set to "High Priority". If there are multiple such queues, the NLDE should break the tie using an implementation-specific technique. If there are no (N+1)PDUs of "High" priority, then (N+1)PDUs of "Medium" priority are transmitted by the NLDE by picking the queue for which Priority is set to "Medium Priority". Again, if there are multiple such queues, the NLDE should break the tie using an implementation-specific technique. If there are no (N+1)PDUs of "High" or "Medium" priority, then (N+1)PDUs of "Low" priority are transmitted by the NLDE picking the queue for which Priority is set to "Low Priority". Again, if there are multiple such queues, the NLDE should break the tie using an implementation-specific technique. If multiple queues with the same priority have PDUs to be transmitted, then the tie should be broken using an implementation-specific technique which is dictated by the platform capability and policies of that electronic device.

Data Rate: Data Rate is the basis on which the local NLDE tunes its retransmission and recovery mechanisms which it may be using to provide In-Order Delivery of (N+1)PDUs: If the (N+1)LDE specifies the Data Rate as "Low", the local and peer NLDEs acknowledge each (N+1) PDU individually. If the (N+1)LDE specifies the Data Rate as "High", the local and peer NLDEs may not acknowledge each (N+1)PDU individually but may rather use acknowledgments selectively. The Data Rate parameter is used to tune the retransmission and recovery mechanism to provide in-order delivery. With a "Low" setting of Data Rate, it is expected that (N+1)PDUs may be transmitted relatively sporadically. Therefore, the peer NLDEs should acknowledge each (N+1)PDU individually. With a "High" setting of Data Rate, it is expected that (N+1)PDUs may be transmitted relatively frequently. Therefore, the peer NLDEs could use window-based acknowledgment mechanisms to selectively acknowledge (N+1)PDUs.

Scope of QoS Settings: The (N+1) Layer 401 can apply the aforementioned QoS parameters and settings at the granularity of a logical flow of (N+1)PDUs between peer (N+1) Layer entities. After individual layer functionalities are introduced, the notion of a logical flow may be precisely specified, to which QoS parameters and settings can be applied.

D. ACCESSORY PROTOCOL

Figure 5:
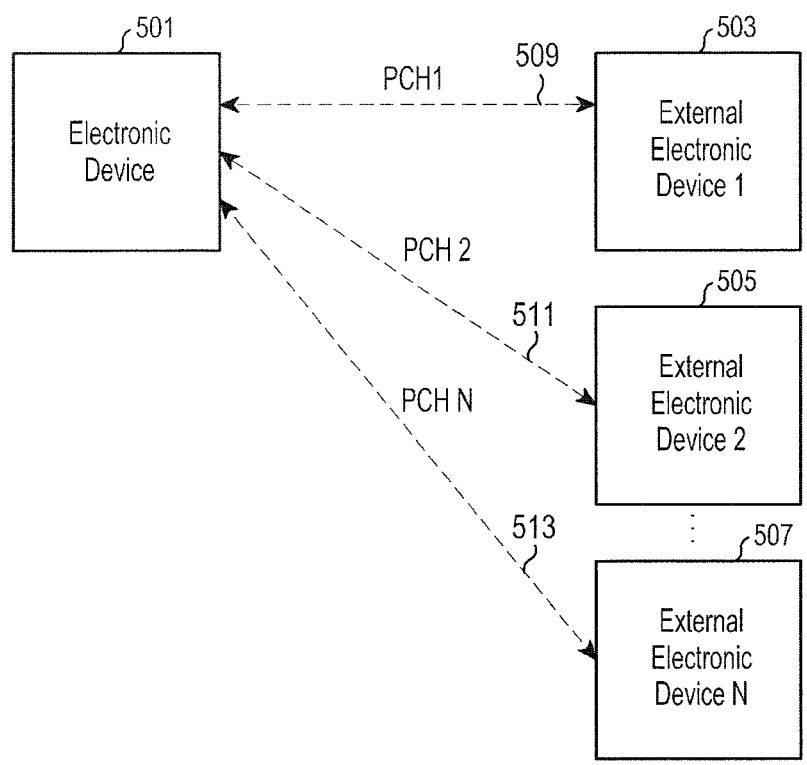
FIG. 5 illustrates a system of electronic devices communicating according to an embodiment of the present disclosure.

FIG. 5 illustrates a system of electronic devices communicating with one another according to an embodiment of the present disclosure.

Referring to FIG. 5, a system of electronic devices may communicate therebetween. The system may include an electronic device 501, a first external electronic device 503, a second external electronic device 505, an N-th external electronic device 507, and/or the like.

According to various embodiments of the present disclosure, the electronic device 501, the first external electronic device 503, the second external electronic device 505, and the N-th external electronic device 507 may communicate using a common protocol (e.g., common between at least each set of electronic devices communicating). As an example, the common protocol may enable the electronic device 501 and the first external electronic device 503 to provide a service to a user. For example, the common protocol may enable the electronic device 501 and the first external electronic device 503 to communicate information regarding an accessory service. The electronic device 501 may provide services to the first external electronic device 503 and/or consume services provided by the first external electronic device 503. Conversely, the first external electronic device 503 may provide services to the electronic device 501 and/or consumer services provided by the electronic device 501.

According to various embodiments of the present disclosure, the electronic device 501 may communicate with the first external electronic device 1 503 over a first physical channel 509. Similarly, the electronic device 501 may communicate with the second external electronic device 505 over a second physical channel 511. The electronic device 501 may communicate with the N-th external electronic device 507 over an N-th physical channel 513.

According to various embodiments of the present disclosure, the common protocol may enable the electronic device 501 to establish the corresponding physical channel between each of the first external electronic device 503, the second external electronic device 505, and the N-th external electronic device 507.

According to various embodiments of the present disclosure, the common protocol may allow application programs to be developed independently or agnostic of the connectivity technology with which the corresponding physical channel is established between the electronic device 501 and the corresponding peer electronic device.

Figure 6:
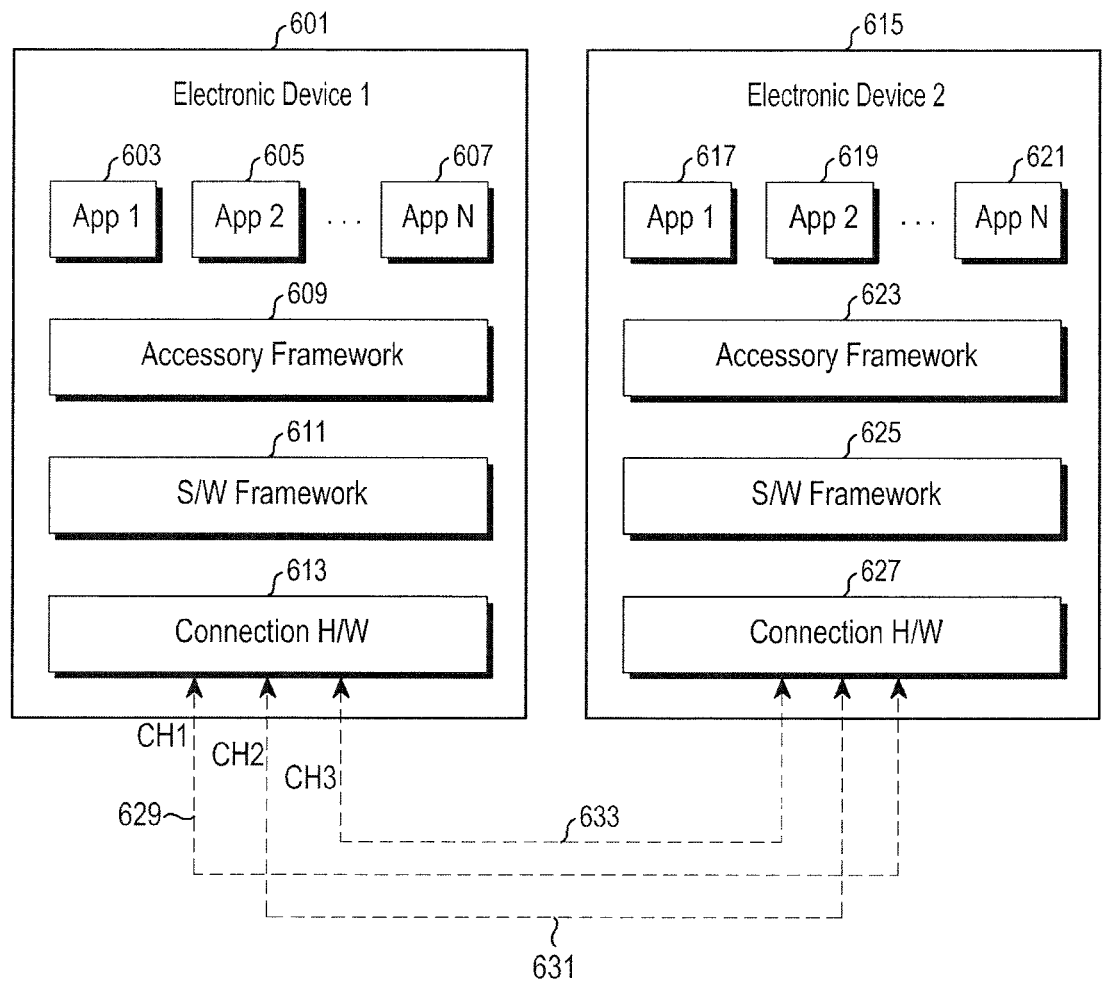
FIG. 6 illustrates communication between electronic devices according to an embodiment of the present disclosure.

FIG. 6 illustrates communication between electronic devices according to an embodiment of the present disclosure.

Referring to FIG. 6, a first electronic device 601 may communicate with a second electronic device 615.

The first electronic device 601 may include a first application 603 (e.g., an application program installed on the first electronic device 601, a service agent, and/or the like), a second application 605, and an N-th application 607. According to various embodiments of the present disclosure, the first electronic device 601 may include an accessory framework 609, a software framework 611, connection hardware 613, and/or the like.

The second electronic device 615 may include a first application 617, a second application 619, and an N-th application 621. According to various embodiments of the present disclosure, the second electronic device 615 may include an accessory framework 623, a software framework 625, connection hardware 627, and/or the like.

According to various embodiments of the present disclosure, the connection hardware 613 of the first electronic device 601 and the connection hardware 627 of the second electronic device 615 may establish a channel therebetween to enable communication between the first electronic device 601 and the second electronic device 615. For example, the connection hardware 613 and the connection hardware 627 may establish, for example, a first channel 629, a second channel 631, and a third channel 633. The channels between the connection hardware 613 and the connection hardware 627 may be physical wireless and/or wired channels.

According to various embodiments of the present disclosure, an application (e.g., the first application 603, the second application 605, and the N-th application 607) on the first electronic device 601 may communicate with (1) a respective one of applications (e.g., the first application 617, the second application 619, the N-th application 621) or (2) one or more of the applications 666 on the second electronic device 615 over the channels formed between the connection hardware 613 and the connection hardware 627.

The accessory framework 609 may enable an application on the first electronic device 601 to establish and communicate over a connection (e.g., a channel) between the first electronic device 601 and the second electronic device 615. For example, the accessory framework 609 may negotiate with the software framework 613 to communicate with the peer electronic device.

Figure 7:
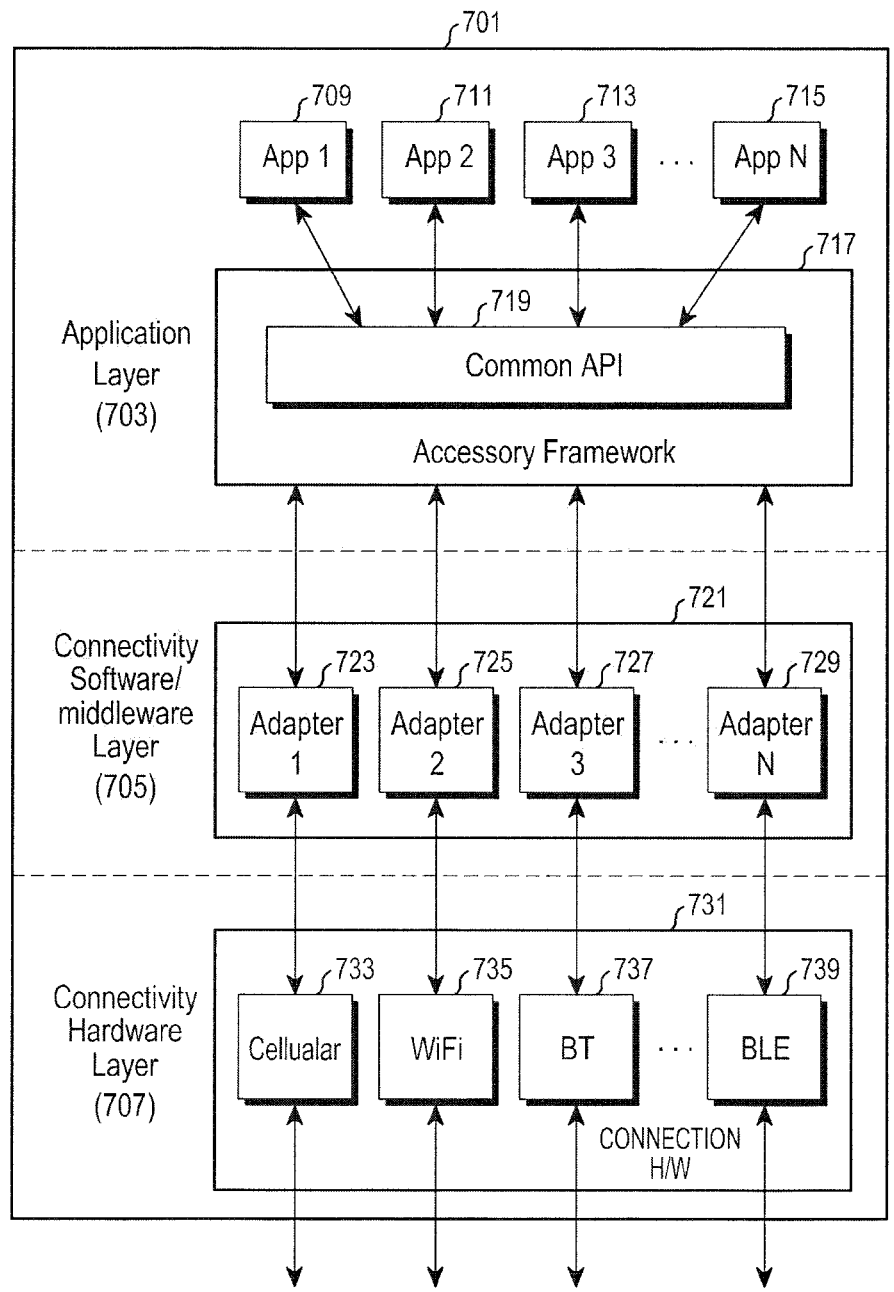
FIG. 7 illustrates a configuration of an electronic device according to an embodiment of the present disclosure.

FIG. 7 illustrates a configuration of an electronic device according to an embodiment of the present disclosure.

Referring to FIG. 7, an electronic device 701 may include an application layer 703, a connectivity software/middleware layer 705, and a connectivity hardware layer 707.

All or part of at least one of the application layer 703 and the connectivity software/middleware layer 705, etc. may be part of an operation system (OS) or can be a separate software module downloaded and installed onto the OS. Additionally or alternatively, all or part of at least one of the application layer 703 and the connectivity software/middleware layer 705, etc. may be implemented in hardware (e.g., ASIC) or in a configurable processor (e.g., FPGA).

According to various embodiments of the present disclosure, the application layer 703 may include one or more applications. For example, the application layer 703 may include a first application 709, a second application 711, a third application 713, and an N-th application 715. The one or more applications may provide a user with an accessory service. For example, the one or more applications may enable the user to send/receive communications, and/or to consume data received.

According to various embodiments of the present disclosure, the application layer 703 may interface with an accessory framework 717. The accessory framework may support communication and/or interaction between one or more applications (e.g., the first application 709, the second application 711, the third application 713, and the N-th application 715) and other modules and/or layers within the electronic device 701. The accessory framework 717 may include a common application programming interface 719 with which the one or more applications may communicate in order to carry out their respective services (e.g., accessory services).

According to various embodiments of the present disclosure, the one or more applications may communicate with a network layer in order to communicate with a peer electronic device (not shown). For example, the one or more applications may communicate with a network layer using the accessory framework 717. The one or more applications may communicate with the connectivity software/middleware layer 705 and/or the connectivity hardware layer 707.

The connectivity software/middleware layer 705 may include one or more communication adapters 721. For example, the one or more communication adapters 721 may include a first adapter 725, a second adapter 725, a third adapter 727, and an N-th adapter 729. The one or more communication adapters 721 may be respectively associated with at least one connectivity technology. According to various embodiments of the present disclosure, the connectivity software/middleware layer 705 may facilitate communication between the application layer 703 and the connectivity hardware layer 707. The one or more communication adapters 721 may support communication between the application layer 703 and connection hardware 731 used by the electronic device 701 to communicate with a peer electronic device.

The connectivity hardware layer 707 may serve as an interface for communication between the electronic device 701 and a peer electronic device. For example, the connectivity hardware layer 707 may communicate information from the application layer 703 to a peer electronic device. The connectivity hardware layer 707 may include the connection hardware 731. The connection hardware 731 may correspond to various hardware elements for communication technologies supported by the electronic device 701. For example, the connection hardware 731 may include a cellular unit 733 for communication over cellular technology, a WiFi unit 735 for communication over WiFi technology, a Bluetooth unit 737 for communication over Bluetooth, a Bluetooth low energy (BLE) unit 739 for communication over Bluetooth low energy technology, and/or the like.

According to various embodiments of the present disclosure, the one or more communication adapters 721 in the software network framework 721 may communicate and/or interface with a hardware element of the connection hardware 731 to perform communication with a peer electronic device using a desired communication technology.

Figure 8:
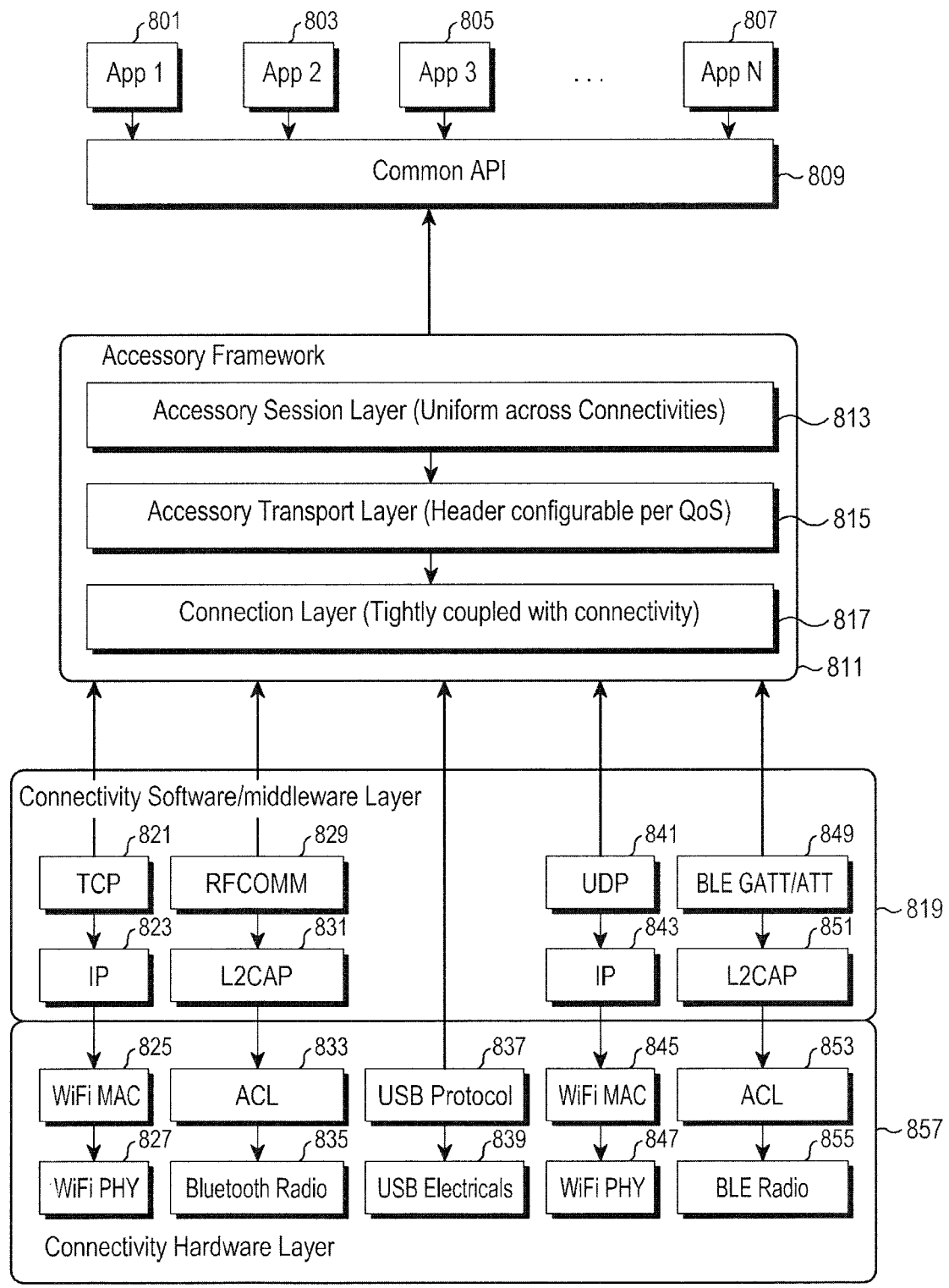
FIG. 8 illustrates a configuration of an electronic device according to an embodiment of the present disclosure.

FIG. 8 illustrates a configuration of an electronic device according to an embodiment of the present disclosure.

Referring to FIG. 8, the electronic device includes a plurality of application programs 801, 803, 805, and 807, an application programming interface 809, an accessory framework 811, a connectivity software/middleware layer 819, and a connectivity hardware layer 857 that includes diverse connectivity technologies. The separation of connectivity software/middleware layer 819 and a connectivity hardware layer 857 is not fixed to that shown in FIG. 8 and may be different depending on the embodiment.

Each of the plurality of application programs 801, 803, 805, and 807 implements its own accessory service profile. The accessory service profiles may be uniform across connectivity technologies. The accessory framework 811 includes a session layer 813, a transport layer 815, and a connection layer 817. The connectivity software/middleware layer 819 and connectivity hardware layer 857 are configured to support communication through, for example, TCP/IP, Bluetooth, USB, UDP/IP, and BLE. TCP/IP may be supported by including TCP 821 and IP 823 in the connectivity software/middleware layer 819, and WiFi MAC 825 and WiFi PHY 827 in the connectivity hardware layer 857. Further, the diverse connectivity technologies 8 may include Universal Asynchronous Receiver/Transmitter (UART), a ZigBee, an Ultra-WideBand (UWB), Radio Frequency Identification (RFID), infrared, Near Field Communication (NFC), and cellular communication. Bluetooth may be supported by including RFCOMM 829 and L2CAP 831 in the connectivity software/middleware layer 819, and ACL 833, and Bluetooth Radio 835 in the connectivity hardware layer 857. USB may be supported by including USB protocol 837 in the connectivity software/middleware layer 819, and USB Electricals 839 in the connectivity hardware layer 857. UDP/IP may be supported by including UDP 841 and IP 843 in the connectivity software/middleware layer 819, and WiFi MAC 845 and WiFi PHY 847 in the connectivity hardware layer 857. BLE may be supported by including BLE GATT/ATT 849 and L2CAP 851 in the connectivity software/middleware layer 819, and ACL 853, and BLE Radio 855 in the connectivity hardware layer 857. TCP/IP, Bluetooth, and USB 88 may employ an in-order byte stream. UDP/IP and BLE 8 may communicate with the accessory framework 811 using an unordered datagram. The accessory framework 811 communicates with the application programming interface 809 using a datagram with per session QoS.

Figure 9:
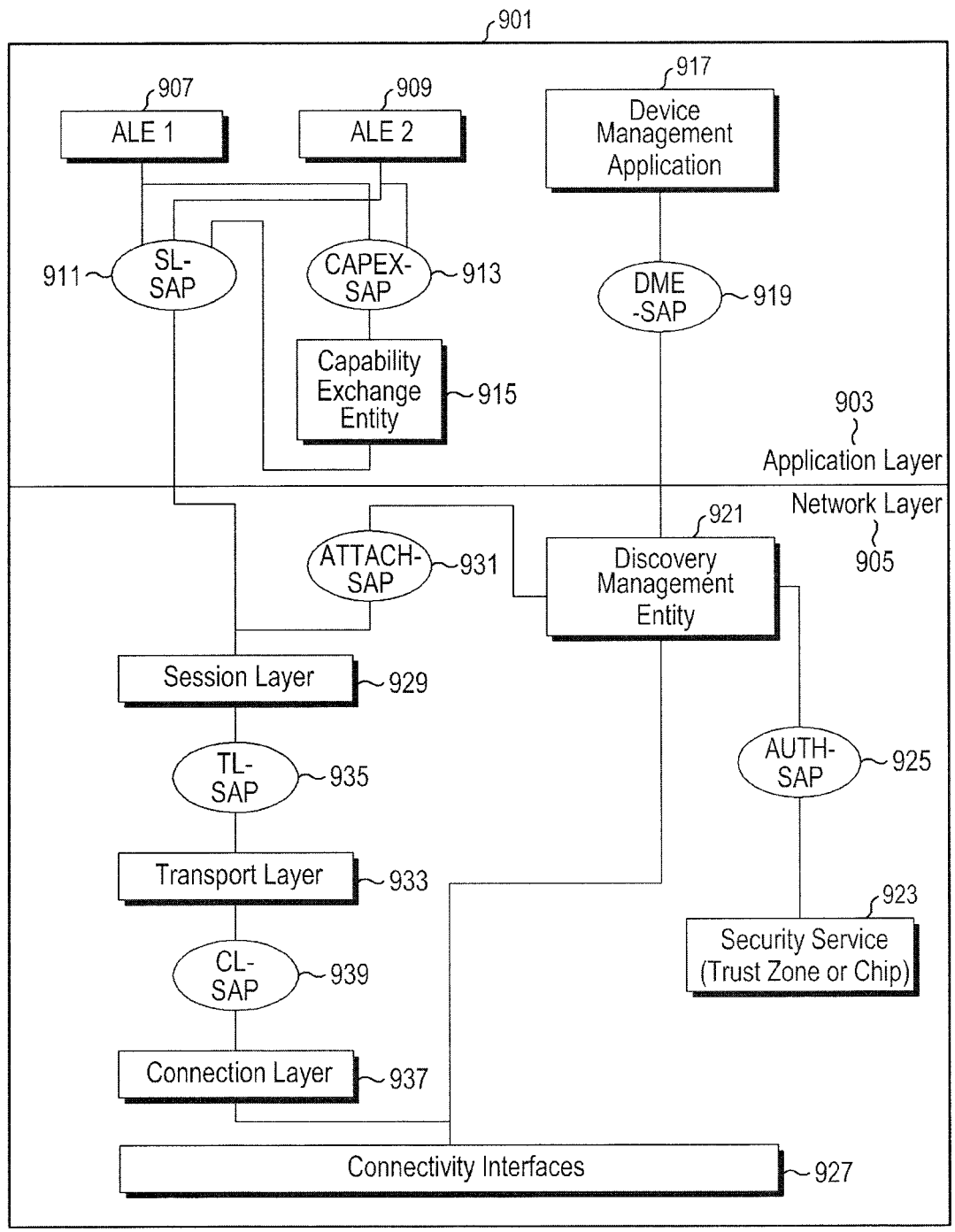
FIG. 9 illustrates an overall architecture of an accessory protocol according to an embodiment of the present disclosure.

FIG. 9 illustrates an overall architecture of the accessory protocol according to an embodiment of the present disclosure.

Referring to FIG. 9, the Accessory Protocol stack may include multiple protocols with each protocol being realized by multiple layers and functional blocks. The Accessory Network Protocol may include a session layer 929, a Transport layer 933 and a connection layer 937 which operate on top of Connectivity Interfaces 927.

The payload of the Network Protocol carries the messages pertaining to the Service Discovery Protocol and the suite of Application Protocols. The Accessory Service Discovery Protocol operates on top of the Accessory Network Protocol and is realized by means of a peer Capability Exchange Entity 915.

The Accessory Service Discovery Protocol enables Application Layer (AL) entities (e.g., a first ALE 907 and a second ALE 909) to discover AL entities on a peer electronic device. The suite of Accessory Application Protocols can operate on top of the Accessory Network Protocol and the Accessory Service Discovery Protocol, and are realized by means of the peer application layer entities (e.g., the first ALE 907 and the second ALE 909).

The Accessory Device Discovery Protocol operates in parallel to the Accessory Network Protocol, the Service Discovery Protocol, and the Application Protocol, and is responsible for enabling Accessory Protocol-capable devices to discover and authenticate one another. The Accessory Device Discovery Protocol is realized by means of a Device Management Application 917, a Discover Management Entity 921, and a Security Service 923 (e.g., Trust Zone or Chip).

As shown in FIG. 9, the overall architecture 901 of the Accessory Protocol can include an application layer 903 and a network layer 905. The application layer 903 includes a first ALE 907, a second ALE 909, an SL-SAP 911, a CAPEX-SAP 913, the Capability Exchange Entity 915, the Device Management Application 917, and a DME-SAP 919. While the first ALE 907 and the second ALE 909 are described herein, the Accessory Protocol may be utilized with one or more than two AL Entities. The first ALE 907 and the second ALE 909 are coupled to the CAPEX-SAP 913. The CAPEX-SAP 913 is also coupled to the Capability Exchange Entity 915. The first ALE 907, the second ALE 909, and the Capability Exchange Entity 915 are all coupled to the SL-SAP 911. Also, in the application layer 903, the Device Management Application 917 is coupled to the DME-SAP 919.

The network layer 905 includes an ATTACH-SAP 931, the Discover Management Entity 921, an AUTH-SAP 925, the Security Service 923 (e.g., Trust Zone or Chip), the session layer 929, a TL-SAP 935, the Transport layer 933, a CL-SAP 939, connection layer 937, and the Connectivity Interfaces 927. The Discover Management Entity 921 is coupled to the DME-SAP 919 of the network layer 905. Also, the Discover Management Entity 921 is coupled to the AUTH-SAP 925 which is coupled to the Security Service 923 (e.g., Trust Zone or Chip). In addition, the Discover Management Entity 921 is coupled to the ATTACH-SAP 931 and the Connectivity Interfaces 927. The session layer 929 is attached to the SL-SAP 911 of the application layer 903, the ATTACH-SAP 931, and the TL-SAP 935. The TL-SAP 935 is also coupled to the transport layer 933. The transport layer 933 is also coupled to the CL-SAP 939. The CL-SAP 939 is coupled to the connection layer 937. The connection layer 937 is also coupled to the Connectivity Interfaces 927.

Figure 10:
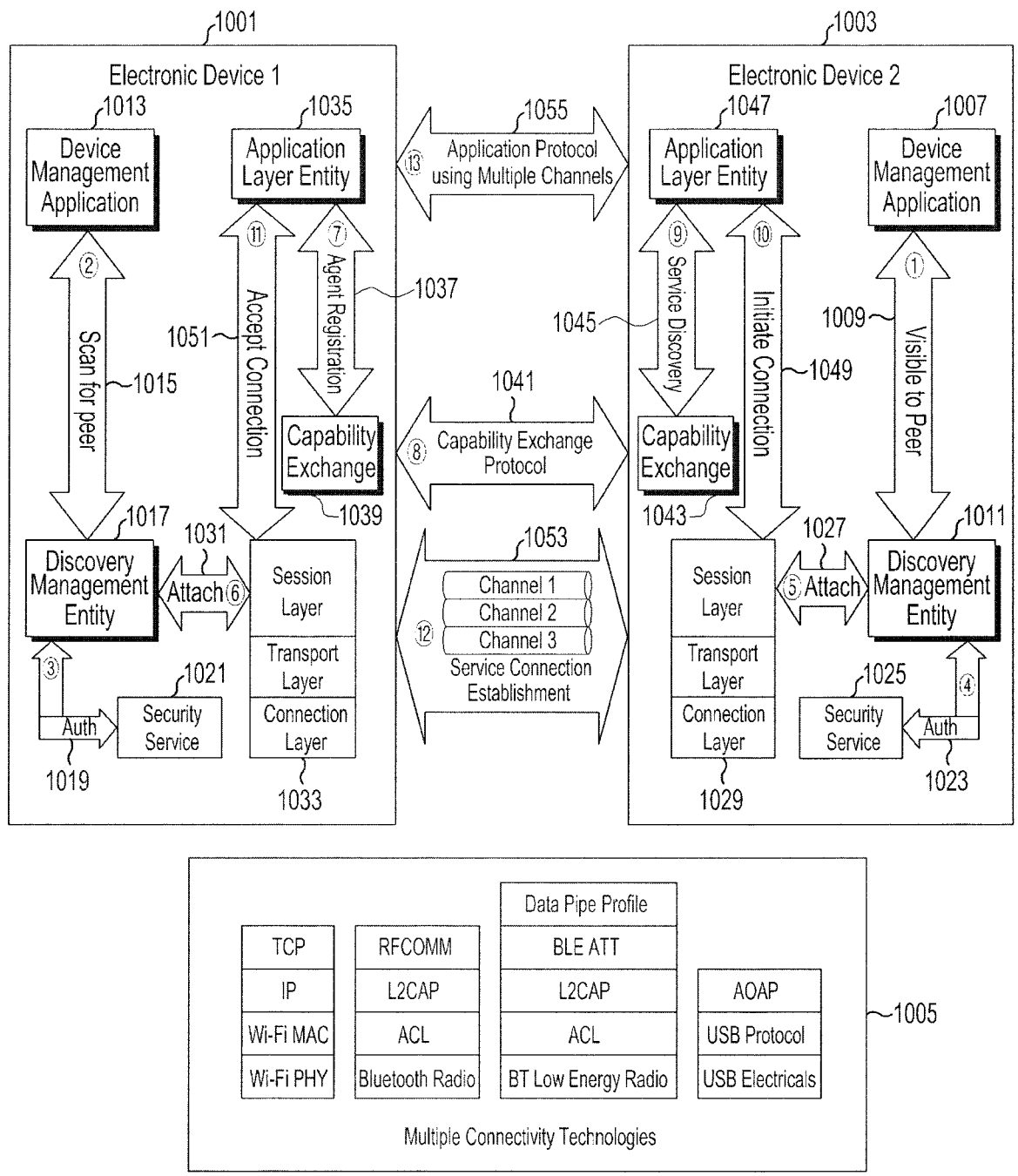
FIG. 10 illustrates an overall sequence of operations for carrying out an accessory protocol according to an embodiment of the present disclosure.

FIG. 10 illustrates an overall sequence of operations for carrying out an accessory protocol according to an embodiment of the present disclosure.

In operation 1009, by means of user interaction or by means of a programmatic trigger, a second electronic device 1003 makes itself visible to a first electronic device 1001 via a communication between a device management application 1007 and a discovery management entity 1011. In operation 1015, by means of a user interaction or by means of a programmatic trigger, the first electronic device 1001 attempts to scan for a visible second electronic device 1003 via a communication between a device management application 1013 and a discovery management entity 1017. In operation 1019, the first electronic device 1001 authenticates the cryptographic credentials of the second electronic device 1003 via a communication between the discovery management entity 1017 and security service 1021. Similarly, in operation 1023, the second electronic device 1003 authenticates the cryptographic credentials of the first electronic device 1001 via a communication between the discovery management entity 1011 and a security service 1025.

In operation 1027, upon successfully concluding the authentication process, the discovery management entity 1011 on the second electronic device 1003 notifies the session layer 1029 on the second electronic device 1003. Similarly, upon successfully concluding the authentication process, the discovery management entity 1017 on the electronic device notifies a session layer 1033 on the second electronic device 1003. In operations 1051 and 1037, an application layer entity 1035 on the first electronic device 1001 registers itself to the session layer 1033 and a capability exchange entity 1039. In operation 1041, by means of a service discovery protocol, the service capability of the application layer entity 1035 on the first electronic device 1001 is made available on the second electronic device 1003. In operation 1045, an application layer entity 1047 on the second electronic device 1003 discovers the service capability of the application layer entity 1035 on the first electronic device 1001.

In operation 1049, the application layer entity 1047 on the second electronic device 1003 initiates a Service Connection to the application layer entity 1047 on the second electronic device 1003. In operation 1051, the application layer entity 1035 on the first electronic device 1001 accepts the Service Connection request. In operation 1053, the session layers 1033 and 1029 set up the Service Connection and configure the channels for application protocol data exchange. In operation 1055, the application layer entities 1035 and 1047 exchange APDUs with each other using multiple channels as per their mutually agreed application protocol. Herein, it is noted that the communication in operations 1041, 1053, and 1055 occurs over at least one of a plurality of connectivity technologies 1005.

Figure 11:
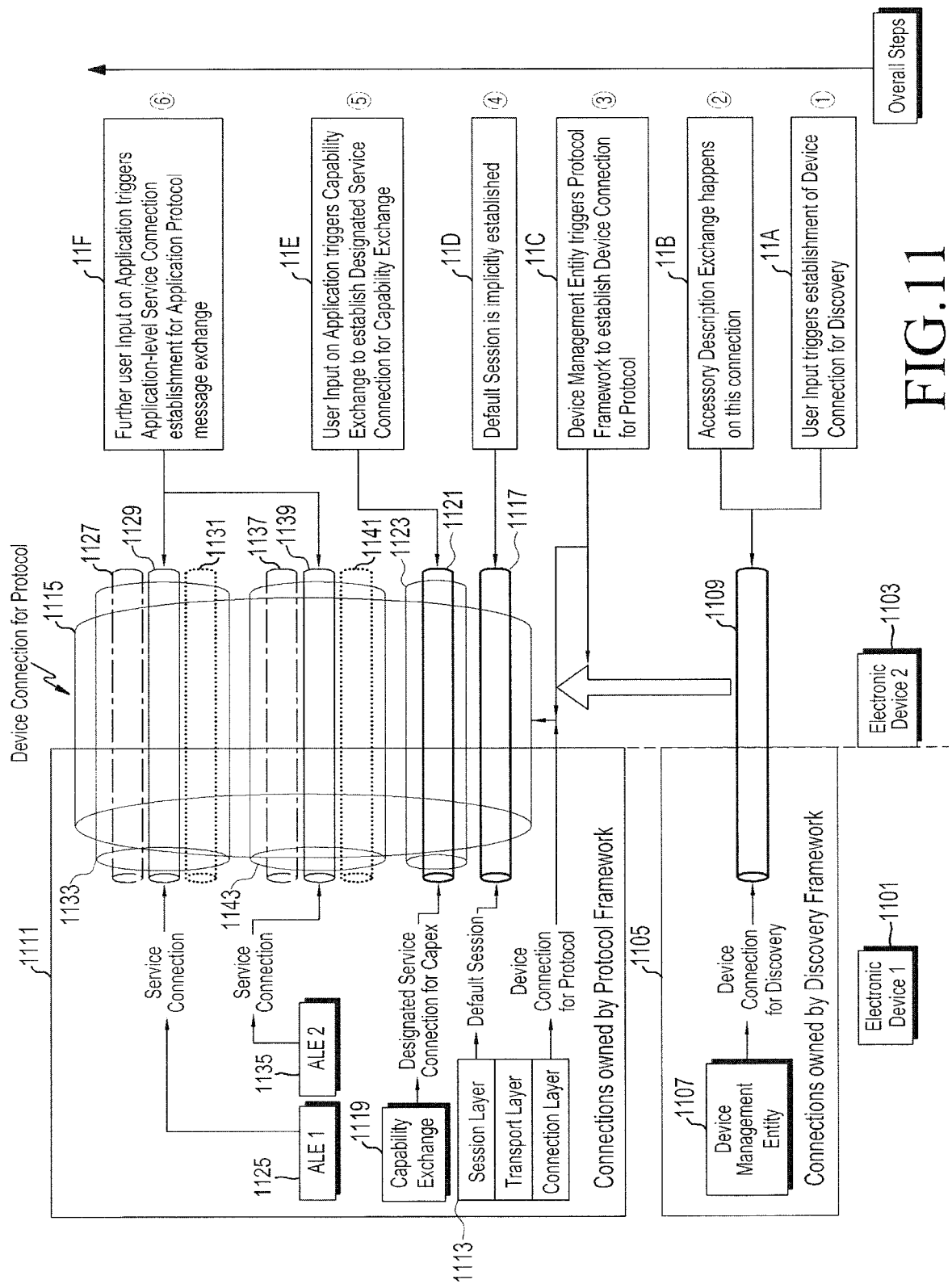
FIG. 11 illustrates an overall sequence of operations for carrying out an accessory protocol according to an embodiment of the present disclosure.

FIG. 11 illustrates an overall sequence of operations for carrying out an accessory protocol according to an embodiment of the present disclosure.

Referring to FIG. 11, a sequence of operations is shown for carrying out an accessory protocol between a first electronic device 1101 and a second electronic device 1103. In operation 11A, a user input triggers establishment of device discovery. Here, a device management entity 1107 in a discovery framework 1105 uses a device connection 1109 between the first electronic device 1101 and the second electronic device 1103 for the discovery procedure. In operation 11B, an accessory description exchange happens on the device connection 1109.

In operation 11C, the device management entity 1107 triggers a protocol framework 1111 to establish a device connection 1115 with the network layer of the protocol. In operation 11D, a default session 1117 is implicitly established. In operation 11E, user input on an application triggers a capability exchange 1119 to establish a designated service connection 1123 for a capability exchange 1121. In operation 11F, further user input on the application triggers an application level service connection establishment for an application protocol message exchange. More specifically, a service connection 1133 is established with logical channels 1127, 1129, and 1131 for a first ALE 1125. Similarly, a service connection 1143 is established with logical channels 1137, 1139, and 1141 for a second ALE 1135.

Figure 12:
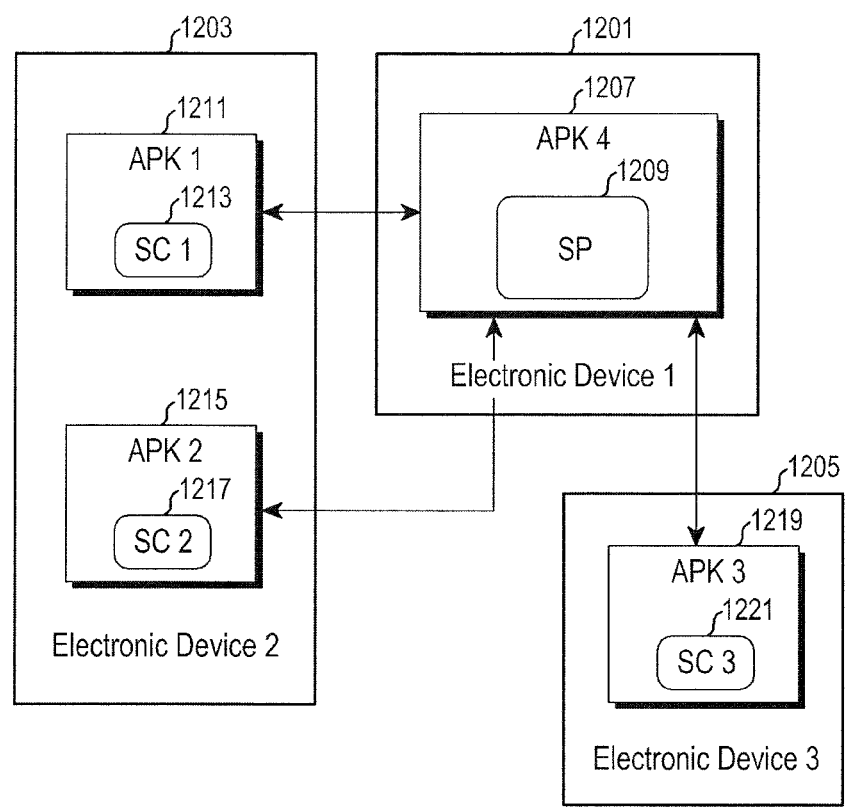
FIG. 12 illustrates communication between electronic devices according to an embodiment of the present disclosure.

FIG. 12 illustrates communication between electronic devices according to an embodiment of the present disclosure.

Referring to FIG. 12, a first electronic device 1201 may communicate with a second electronic device 1203 and a third electronic device 1205. According to various embodiments, a fourth application layer entity 1207 (e.g., an application program on the electronic device) may communicate with the second electronic device 1203 and the third electronic device 1205.

As illustrated in FIG. 12, the first electronic device 1201 may communicate with multiple electronic devices. In particular, a service agent on the first electronic device 1201 may communicate with multiple service agents across the various electronic devices. The service agent on the first electronic device 1201 may concurrently communicate with the multiple service agents across the various electronic devices.

According to various embodiments of the present disclosure, a service agent may be a service provider and/or a service consumer. A service agent may be both a service provider and a service consumer in relation to another service agent or in relation to a group of service agents. A service provider may provide services to a counterpart service agent. A service consumer may consume services from a counterpart service agent.

The first electronic device 1201 includes the fourth application layer entity 1207. As illustrated in FIG. 12, the fourth application layer entity 1207 may include a service provider 1209 (e.g., a service agent).

The second electronic device 1203 may include a first application layer entity 1211 and a second application layer entity 1215. The first application layer entity 1211 may include a first service consumer 1213 (e.g., a service agent). The second application layer entity 1215 may include a second service consumer 1217 (e.g., a service agent).

The third electronic device 1205 may include a third application layer entity 1219. The third application layer entity 1219 may include a third service consumer 1221 (e.g., a service agent).

According to various embodiments of the present disclosure, a single service agent may contemporaneously communicate with multiple service agents. For example, the service provider 1209 may communicate with the first service consumer 1213, the second service consumer 1217, and the third service consumer 1221.

According to various embodiments of the present disclosure, a service agent may contemporaneously communicate with at least one service agent as a service provider and communicate with at least one service agent as a service consumer. For example, the service agent corresponding to the service provider 1209 may contemporaneously communicate with the first service consumer 1213, the second service consumer 1217, and the third service consumer 1221, while contemporaneously communicating with a service provider (not shown) in the role of service consumer. In other words, a given service agent may contemporaneously serve in the role of a service provider and a service consumer (e.g., depending on the desired accessory services).

Figure 13:
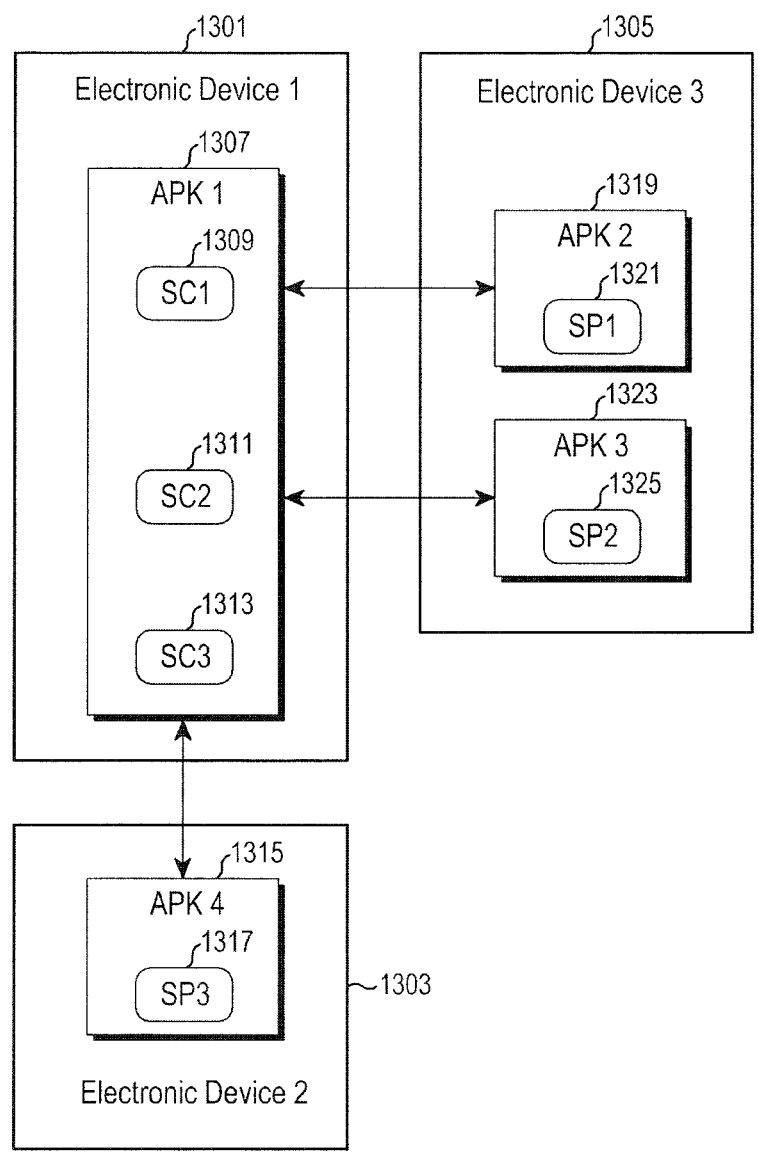
FIG. 13 illustrates communication between electronic devices according to an embodiment of the present disclosure.

FIG. 13 illustrates communication between electronic devices according to an embodiment of the present disclosure.

Referring to FIG. 13, a first electronic device 1301 may communicate with a second electronic device 1303 and a third electronic device 1305. According to various embodiments, a first application layer entity 1307 (e.g., an application program on the electronic device) may communicate with the second electronic device 1303 and the third electronic device 1305.

The second electronic device 1303 may include a fourth application layer entity 1315. The fourth application layer entity 1315 may include a third service provider 1317.

The first electronic device 1301 includes the first application layer entity 1307. As illustrated in FIG. 13, the first application layer entity 1307 may include a first service consumer 1309, a second service consumer 1311, and a third service consumer 1313.

The third electronic device 1305 may include a second application layer entity 1319 and a third application layer entity 1323. The second application layer entity 1319 may include a first service provider 1321. The third application layer entity 1323 may include a second service provider 1325.

The second electronic device 1303 may include a fourth application layer entity 1315. The fourth application layer entity 1315 may include a third service provider 1317.

According to various embodiments of the present disclosure, an application layer entity may include one or more service agents. For example, the application layer entity may include one or more service consumers. As illustrated in FIG. 13, the first application layer entity 1307 includes a plurality of service consumers (e.g., the first service consumer 1309, the second service consumer 1311, and the third service consumer 1313).

According to various embodiments of the present disclosure, an electronic device may consume services from a plurality of other electronic devices. For example, the electronic device may consume services from a plurality of other electronic devices such that a subset of the services consumed by the electronic device are provided by one electronic device, and another subset of services consumed by the electronic device are provided by another electronic device.

As illustrated in FIG. 13, the plurality of service consumers (e.g., the first service consumer 1309, the second service consumer 1311, and the third service consumer 1313) may consume services provided by the third electronic device 1305 (e.g., services provided by the first service provider 1321 and/or the second service provider 1325) and may consume services provided by the second electronic device 1303 (e.g., services provided by the third service provider 1317).

According to various embodiments of the present disclosure, an application layer entity (e.g., an application program installed on an electronic device) may receive and/or consumer services provided by one or more other electronic devices in order to perform an accessory service (e.g., in order to perform a service desired by a user). According to various embodiments of the present disclosure, an application layer entity may communicate with one or more other electronic devices for data to be used in performing an accessory service (e.g., data used in performing the service desired by the user).

E. APPLICATION PROTOCOL

As discussed above, an electronic device may be connected with a peer electronic device. The electronic device and peer electronic device may communicate to provide one or more users of at least one of the electronic device or the peer electronic device with a desired service (e.g., the accessory service). As an example, the desired service may be provided by running (e.g., executing) at least one application that is installed on at least one of the electronic device or the peer electronic device.

According to various embodiments of the present disclosure, the application protocol may be used to enable the accessory service. For example, the electronic device and the peer electronic device may communicate according to an application protocol in order to provide the user with the desired service. According to various embodiments of the present disclosure, the application protocol may be an agreed specification between applications installed on different electronic devices (e.g., the electronic device and the peer electronic device). The application protocol may define data exchanges (e.g., including data formats, scheme, sequence of message exchanges, and/or the like) that are independent of various connectivity technologies. For example, the application may define a data exchange using an application protocol so that the applications may perform the data exchange across a plurality of connectivity technologies (e.g., to allow for a connectivity abstraction). The application protocol may be used such that an application may only define the data exchange once and the application protocol may perform the data exchange between the electronic device and the peer electronic device regardless of the connectivity technology by which the electronic device and the peer electronic device are connected.

Various embodiments of the present disclosure described below relate to the application layer and the relationship between the application layer and the application protocol.

Figure 14:
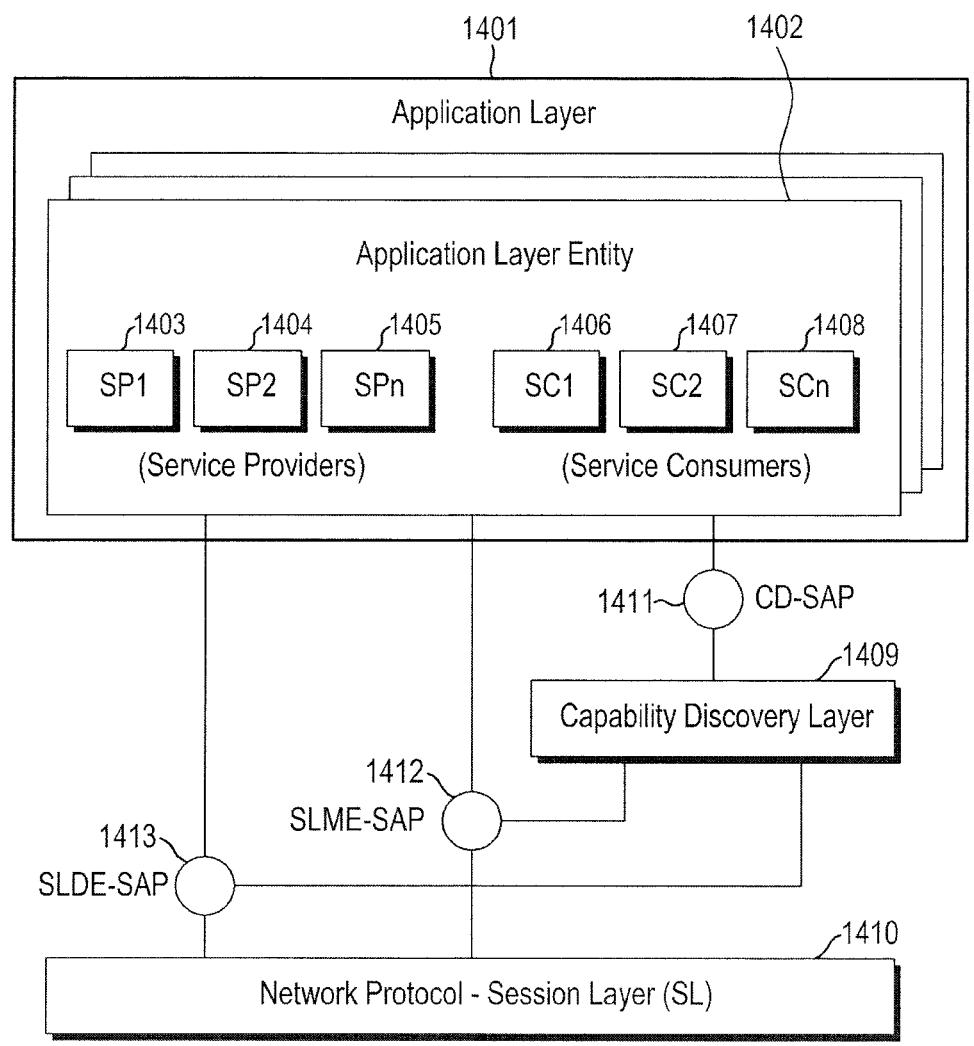
FIG. 14 illustrates a configuration of an application layer in relation to a network layer according to an embodiment of the present disclosure.

FIG. 14 illustrates a configuration of an application layer in relation to a network layer according to an embodiment of the present disclosure.

Referring to FIG. 14, an application layer 1401 may operate logically on top of a network protocol (e.g., a session layer) 1410. For example, the application layer 1401 may leverage the network protocol 1410 for communication between the electronic device and the peer electronic device. In particular, the application layer 1401 may communicate data between the electronic device and the peer electronic device (e.g., to provide an accessory service) using the network protocol 1410.

According to various embodiments of the present disclosure, data may be communicated between the application layer 1401 and the network protocol 1410 or session layer using a session layer data entity service access point 1413. According to various embodiments of the present disclosure, data may be communicated between the application layer 1401 and the network protocol 1410 or session layer using a session layer management entity service access point 1412.

According to various embodiments of the present disclosure, data may be communicated between a capability discovery layer 1409 and the network protocol 1410 or session layer using the session layer data entity service access point 1413. According to various embodiments of the present disclosure, data may be communicated between the capability discovery layer 1409 and the network protocol 1410 or session layer using a session layer management entity service access point 1412.

According to various embodiments of the present disclosure, data may be communicated between the application layer 1401 and the capability discovery layer 1409 using a capability discovery service access point 1411.

As illustrated in FIG. 14, the application layer 1401 may include at least one application layer entity 1402. The application layer 1401 may include application logic that uses at least one accessory service to provide a service to a user of at least one of the electronic device or the peer electronic device. The application layer entity 1402 may include logic that is used to fulfill a purpose/desire of a user. The application layer entity 1402 may include at least one accessory service to fulfill the purpose/desire of the user. The accessory service may include a set of instructions and/or data for performing a service for the user. The application layer entity 1402 may leverage the specific service performed by the various applicable application services to perform an overarching service for the user.

The application layer entity 1402 may include at least one service provider (e.g., SP1 1403, SP2 1404, SPn 1405, and/or the like) and/or at least one service consumer (e.g., SC1 1406, SC2 1407, SCn 1408, and/or the like).

The at least one service provider (e.g., SP1 1403, SP2 1404, SPn 1405, and/or the like) may be a logical entity that provides an accessory service to at least one service consumer using a certain protocol (e.g., that includes the application protocol and the network protocol). According to various embodiments of the present disclosure, the at least one service provider may provide the accessory service to the at least one service consumer by responding to service requests received from the at least one service consumer. According to various embodiments of the present disclosure, the at least one service provider may provide an accessory service without receiving a service request from at least one consumer device. The at least one service provider may provide an accessory service or data related thereto according to a defined protocol (e.g., a defined transaction and data).

The at least one service consumer (e.g., SC1 1406, SC2 1407, SCn 1408, and/or the like) may be a logical entity that consumes an accessory service. For example, the at least one service consumer may be a logical entity that consumes an accessory service provided by at least one service provider. The at least one consumer may request an accessory service or data related thereto from at least one service provider.

According to various embodiments, at least one service provider of an electronic device may provide an accessory service or data related thereto to at least one service consumer on another electronic device (e.g., a peer electronic device) peered with the electronic device that includes the at least one service provider.

The application protocol may define a set of messages that are exchanged between the at least one service provider and the at least one service consumer to perform/provide an accessory service. The at least one service provider and the at least one service consumer may be configured to generate and interpret the messages exchanged between the at least one service provider and the at least one service consumer. The at least one service provider and the at least one service consumer may be configured to perform actions according to a received message exchanged between the at least one service provider and the at least one service consumer.

The application layer entity 1402 may provide data related thereto to another electronic device (e.g., the peer electronic device). For example, the application layer entity 1402 may advertise at least one of an identity thereof, a capability thereof (e.g., the list of services that the application layer entity 1402 may provide) and/or the like. According to various embodiments of the present disclosure, the application layer entity 1402 may advertise the identity thereof, the capability thereof, and/or the like using a capability discovery layer 1409. According to various embodiments of the present disclosure, the application layer entity 1402 may advertise the identity thereof, the capability thereof, and/or the like independent of the capability discovery layer 1409. For example, as illustrated in FIG. 9, the application layer entity 907 and 909 may communicate data to the network layer 905 without having to send the data through the capability exchange entity 915.

As discussed above, the application layer 1401 may communicate data between the electronic device and the peer electronic device (e.g., to provide an accessory service) using the network protocol 1410. The network protocol 1410 may configure a session layer that enables the at least one service provider (e.g., SP1 1403, SP2 1404, SPn 1405, and/or the like) and/or at least one service consumer (e.g., SC1 1406, SC2 1407, SCn 1408, and/or the like) to exchange messages. For example, the session layer may enable the at least one service provider and/or at least one service consumer to setup a conduit for message exchange. The network protocol 1410 may allow the at least one service provider and/or at least one service consumer to define a number of channels, a Quality of Service (QoS), and/or the like for message exchange therebetween.

Figure 15:
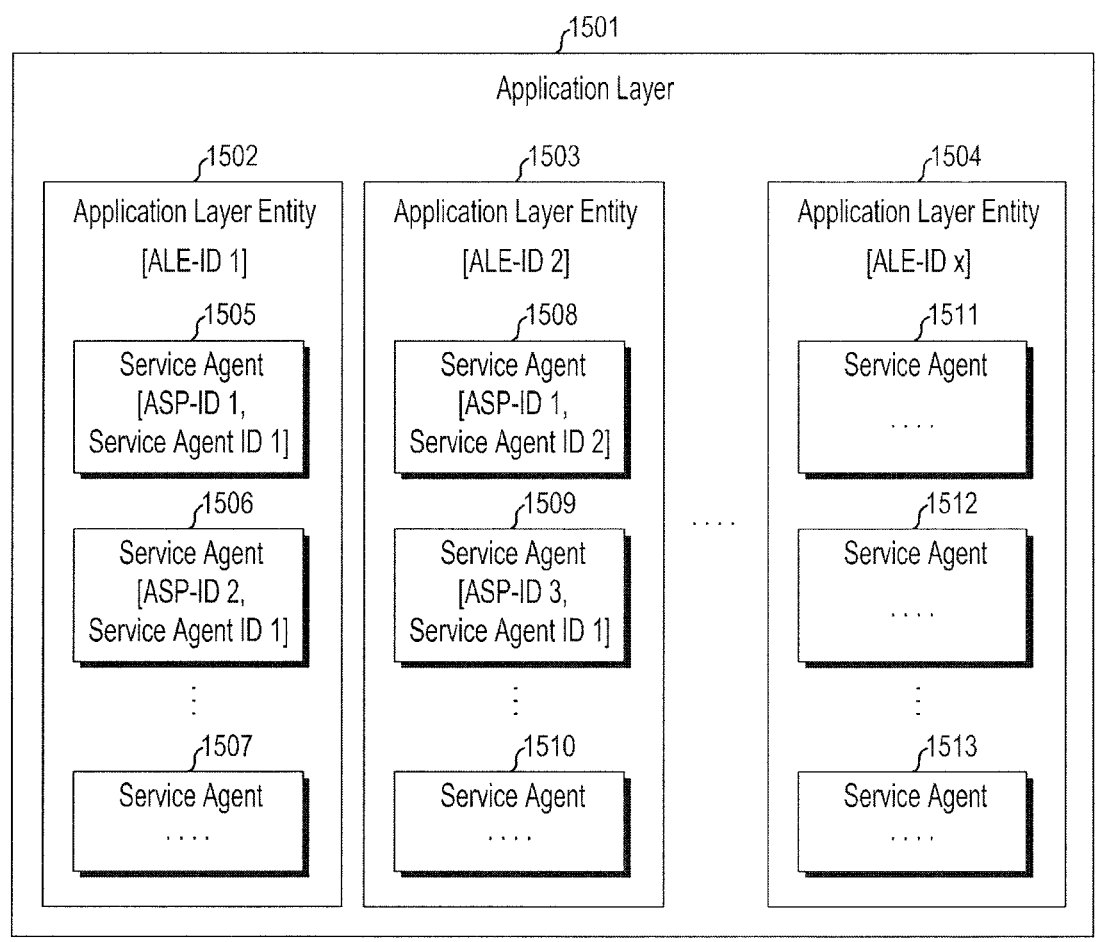
FIG. 15 illustrates a configuration of an application layer according to an embodiment of the present disclosure.

FIG. 15 illustrates a configuration of an application layer according to an embodiment of the present disclosure.

As discussed above, an application layer may include at least one application layer. Referring to FIG. 15, an application layer 1501 may include an application layer entity 1502, an application layer entity 1503, and an application layer entity 1504. Each application layer entity may include at least one service agent. For example, as illustrated in FIG. 15, the application layer entity 1502 may include a service agent 1505, a service agent 1506, and a service agent 1507; the application layer entity 1503 may include a service agent 1508, a service agent 1509, and a service agent 1510; and the application layer entity 1504 may include a service agent 1511, a service agent 1512, and a service agent 1513. Accordingly, an application layer may include at least one service agent.

As discussed above in relation to FIG. 14, an application layer may include application logic with which the application layer provides a service to a user of at least one of the electronic device or the peer electronic device. According to various embodiments of the present disclosure, the application layer may use at least one service agent to fulfill a purpose/desire of the user. For example, the application layer 1501 may use at least one of the service agent 1505 through the service agent 1513 to fulfill a purpose/desire of the user.

A service agent may include logic that may manage communication between at least one service provider and at least one service consumer used in order to provide a service to the user. According to various embodiments of the present disclosure, the service agent may be at least one of a service provider and/or a service consumer. Each service agent carries out instructions/actions according to a defined role of the service agent for a specific service (e.g., according to whether the service agent is implemented as a service provider or a service consumer).

Each service agent within an application layer may include a service agent identifier. The service agent identifier may be a unique identification across service agents on a given electronic device. For example, the service agent identifier may be a unique identification across service agents on a given electronic device that implements the same accessory service profile.

Each service agent within an application layer may be associated with an accessory service profile. The accessory service profile may enable a service provider to provide an accessory service to a service consumer. For example, the accessory service profile may define a specification and/or protocol according to which communication between a service provider and an accessory may be configured. The accessory service profile may define a number of channels across which a service provider and a service consumer may communicate, a QoS for communication between a service provider and a service consumer (e.g., a QoS for each respective channel), a structure of messages communicated between a service provider and a service consumer, a channel over which a particular message may be communicated, define message semantics, message sequences (e.g., identify valid message sequences) of message exchanges between a service provider and a service consumer, which of a service provider and a service consumer may initiate a service connection therebetween, and/or the like. An accessory service profile may have an ASP ID associated therewith.

According to various embodiments of the present disclosure, a service agent may be identified by a combination of an applicable ASP ID and a service agent identifier. As illustrated in FIG. 15, the service agent 1505 may be identified by a combination of an ASP ID 1 and a service agent identifier 1; the service agent 1506 may be identified by a combination of an ASP ID 2 and a service profile identifier 1; the service agent 1508 may be identified by a combination of an ASP ID 1 and a service agent identifier 2; and the service agent 1509 may be identified by a combination of an ASP ID 3 and a service agent identifier 1.

As discussed above, the accessory service profile may enable a service provider to provide an accessory service to a service consumer. For example, the accessory service profile may define a specification and/or protocol according to which communication between a service provider and an accessory may be configured. The accessory service profile may be used as a template with which a developer may develop an accessory using previously defined characteristics associated with the application, and with the communication between the electronic device and the peer electronic device. Development of an application using a predefined accessory service profile may reduce development time and thus may encourage developers to develop applications against electronic devices that leverage the accessory service profile and associated protocols.

The application layer entity 1402 may use accessory services corresponding to a set of service agents, and manage and/or use the service agents in order to achieve a purpose (e.g., to fulfill the desired purpose/desire of a user). Each application layer entity may have a corresponding unique application layer entity identifier that uniquely identifies the application layer entity on a given electronic device. The applicable set of accessory service profiles and service agents (e.g., respectively identified using the ASP ID and the service agent identifier) may be bound to the application layer entity identifier.

According to various embodiments of the present disclosure, an application protocol may define a structure of messages communicated between an electronic device and a peer electronic device. The messages may be communicated according to a predefined format. For example, the messages may be communicated according to a binary format, a JSON format, an XML format, and/or the like. Examples of message structures defined in an accessory service profile according to the applicable application protocol are described below in reference to FIGS. 16 and 17.

Figure 16:
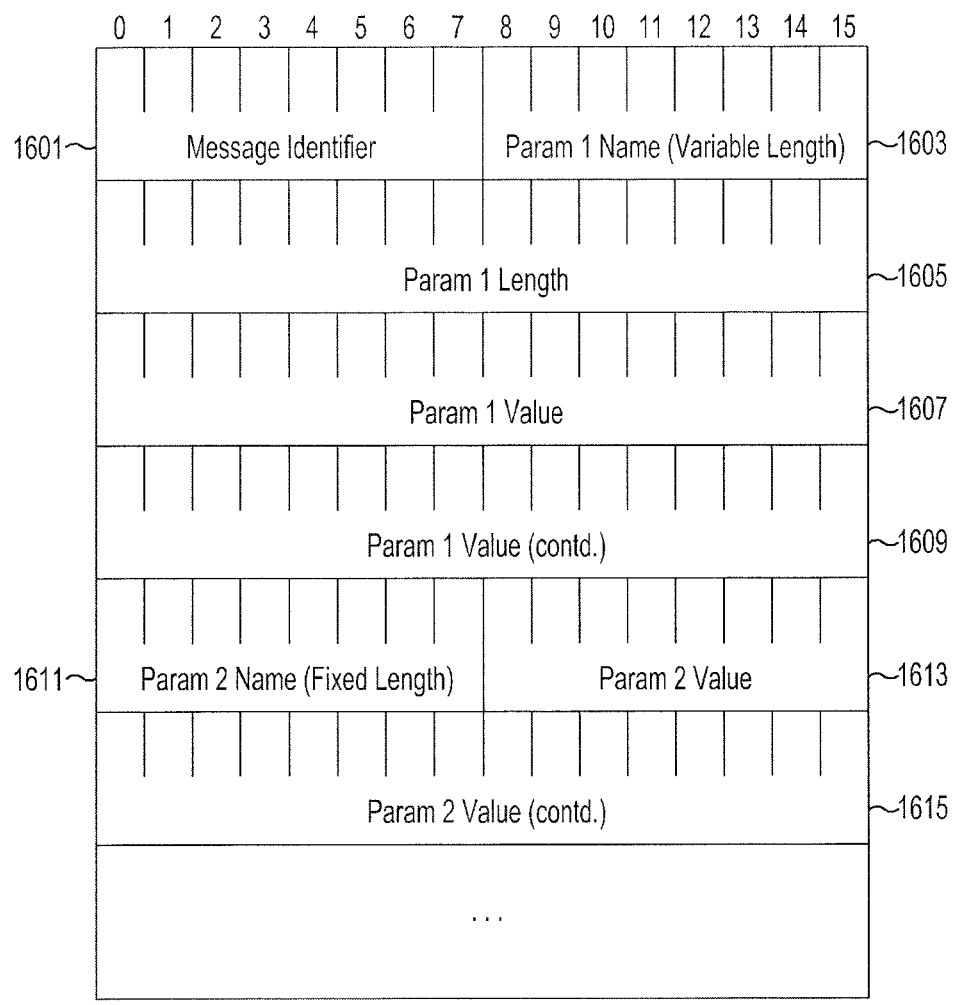
FIG. 16 illustrates a structure of a message according to an application protocol according to an embodiment of the present disclosure.

FIG. 16 illustrates a structure of a message according to an application protocol according to an embodiment of the present disclosure.

Referring to FIG. 16, a binary structure of a message for a request and/or an indication is illustrated. According to various embodiments of the present disclosure, any message for a request and/or indication communicated between an electronic device and a peer electronic device may include at least two parts: a message identifier 1601 and parameters.

The message identifier 1601 may correspond to a field having 8 bits. The message identifier 1601 may correspond to a field used to identify the specific message. The message identifier 1601 may uniquely identify a particular type of message across the corresponding accessory service profile. The message identifier 1601 may include elements identifying a feature, an intent, a type, and/or the like. The feature may correspond to an identification of a high-level function of the service. The intent may correspond to the service objective. The type may correspond to the type of the message. For example, the type may correspond to a request, a response, an indication, and/or the like. If the type corresponds to a request, then the type may indicate that a response message is expected. If the type corresponds to a response, then the type may indicate that the message is a response to a prior request message. If the type corresponds to an indication, then the type may indicate that a response message is not expected.

The parameters may include a parameter name, a parameter length, and a parameter value. For example, as illustrated in FIG. 16, the message may include parameters that include a parameter 1 name 1603, a parameter 1 length 1605, a parameter 1 value 1607, a field for additional information associated with the parameter 1 value referred to as parameter 1 value (contd.) 1609, a parameter 2 name 1611, a parameter 2 value 1613, and a field for additional information associated with the parameter 2 value referred to as parameter 2 value (contd.) 1615. The parameter 1 name 1603 may correspond to a field in which the parameter name is communicated. The parameter 1 value 1607 may correspond to a field in which the value of the corresponding parameter is communicated. The parameter 1 value (contd.) 1609 may be a field in which additional information regarding the value of the corresponding parameter is communicated.

Each parameter may have a variable length or a fixed length. For example, the parameter 1 illustrated in FIG. 16 may have a variable length. If the parameter has a variable length, then the message may include an additional parameter field (e.g., parameter 1 length 1605) in which information regarding the length of the corresponding parameter is communicated. As another example, the parameter 2 illustrated in FIG. 16 may have a fixed length. If the parameter has a fixed length, then communication of information regarding length of the corresponding parameter may be unnecessary. The parameter name field may have 8 bits.

Thus, the message may not include an additional parameter field in which information regarding the length of the corresponding parameter is communicated. According to various embodiments of the present disclosure, the parameters may be communicated in the message in any order irrespective of whether the corresponding parameter has a fixed length or a variable length.

Figure 17:
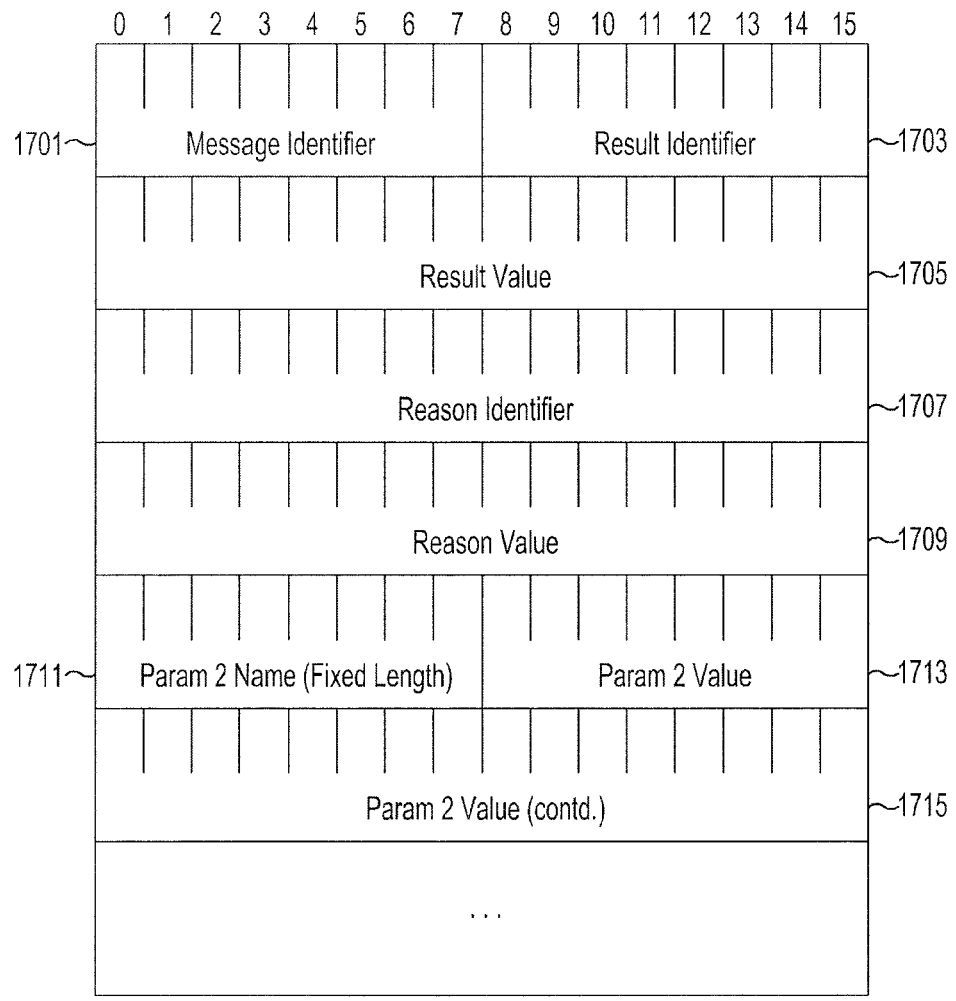
FIG. 17 illustrates a structure of a message according to an application protocol according to an embodiment of the present disclosure.

FIG. 17 illustrates a structure of a message according to an application protocol according to an embodiment of the present disclosure.

Referring to FIG. 17, a binary structure of a message for a response (e.g., a response to a message for a request and/or an indication) is provided. According to various embodiments of the present disclosure, any message for a response communicated between an electronic device and a peer electronic device may include at least two parts: a message identifier 1701 and a result. The message for a response may also include a reason. The message for a response may also include parameters.

The message identifier 1701 may correspond to a field having 8 bits. The message identifier 1701 may correspond to a field used to identify the specific message.

The results may include a result identifier 1703 and a result value 1705. The result identifier 1703 may correspond to a field having 8 bits, and the results value 1705 may correspond to a field having 16 bits.

The reason may include a reason identifier 1707 and a reason value 1709. The reason identifier may correspond to a field having 16 bits, and the reason value 1709 may correspond to a field having 16 bits.

The parameter may include a parameter 2 name 1711, and a parameter 2 value 1713. The parameter may also include a parameter 2 value (contd.) 1715. The parameter 2 name 1711 may correspond to a field in which the parameter name is communicated. The parameter 2 value 1713 may correspond to a field in which the value of the corresponding parameter is communicated. The parameter 2 value (contd.) 1715 may be a field in which additional information regarding the value of the corresponding parameter is communicated.

Figure 18:
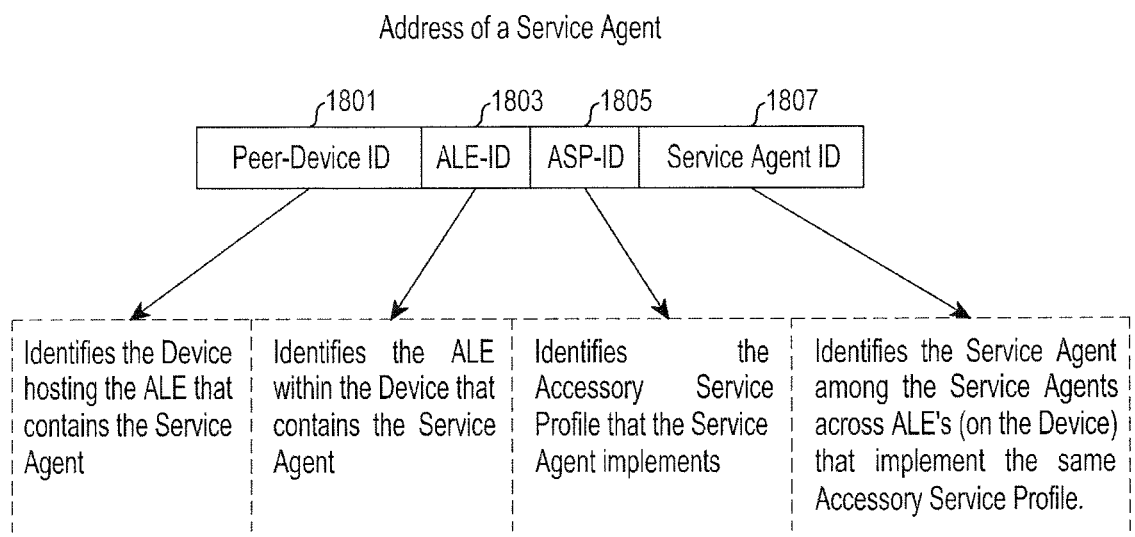
FIG. 18 illustrates an addressing of a service agent according to an embodiment of the present disclosure.

FIG. 18 illustrates an addressing of a service agent according to an embodiment of the present disclosure.

Referring to FIG. 18, an address of a service agent may be used to facilitate communication between applicable service agents on an electronic device and/or a peer electronic device. The address of the service agent may include a peer device identifier 1801, an application layer entity 1803, an ASP ID 1805, and a service agent identifier 1807.

The peer device identifier 1801 may identify the device that hosts the application layer entity that may include the service agent.

The application layer entity identifier 1803 may identify the application layer entity within the device that may include the service agent. As an example, the application layer entity identifier 1803 may be obtained by registering with a capability discovery layer (e.g., be declaring or identifying the set of service agents used by the application layer entity). The application layer entity advertises its capabilities by using the capability discovery layer to advertise to a peer electronic device the application layer entity and the associated service agents. If the application layer entity does not wish to receive service connection requests (e.g., from another application layer entity), then the application layer entity may not register with the capability discovery layer. The application layer entity may not register with the capability discovery layer if the application layer entity has or may use an alternative mechanism for advertising or publishing capabilities and/or information to another application layer entity (e.g., on a peer electronic device).

The ASP ID 1805 may identify the accessory service profile that the service agent implements.

The service agent identifier 1807 may identify the service agent among the service agents across application layer entities on the device that implement the same accessory service profile. The service agent identifier 1807 may be obtained by registering with the session layer.

According to various embodiments of the present disclosure, a service agent may establish at least one service connections with another service agent using the session layer. A service agent may use the unique addressing of the service agent for setting up a service connection.

Figure 19:
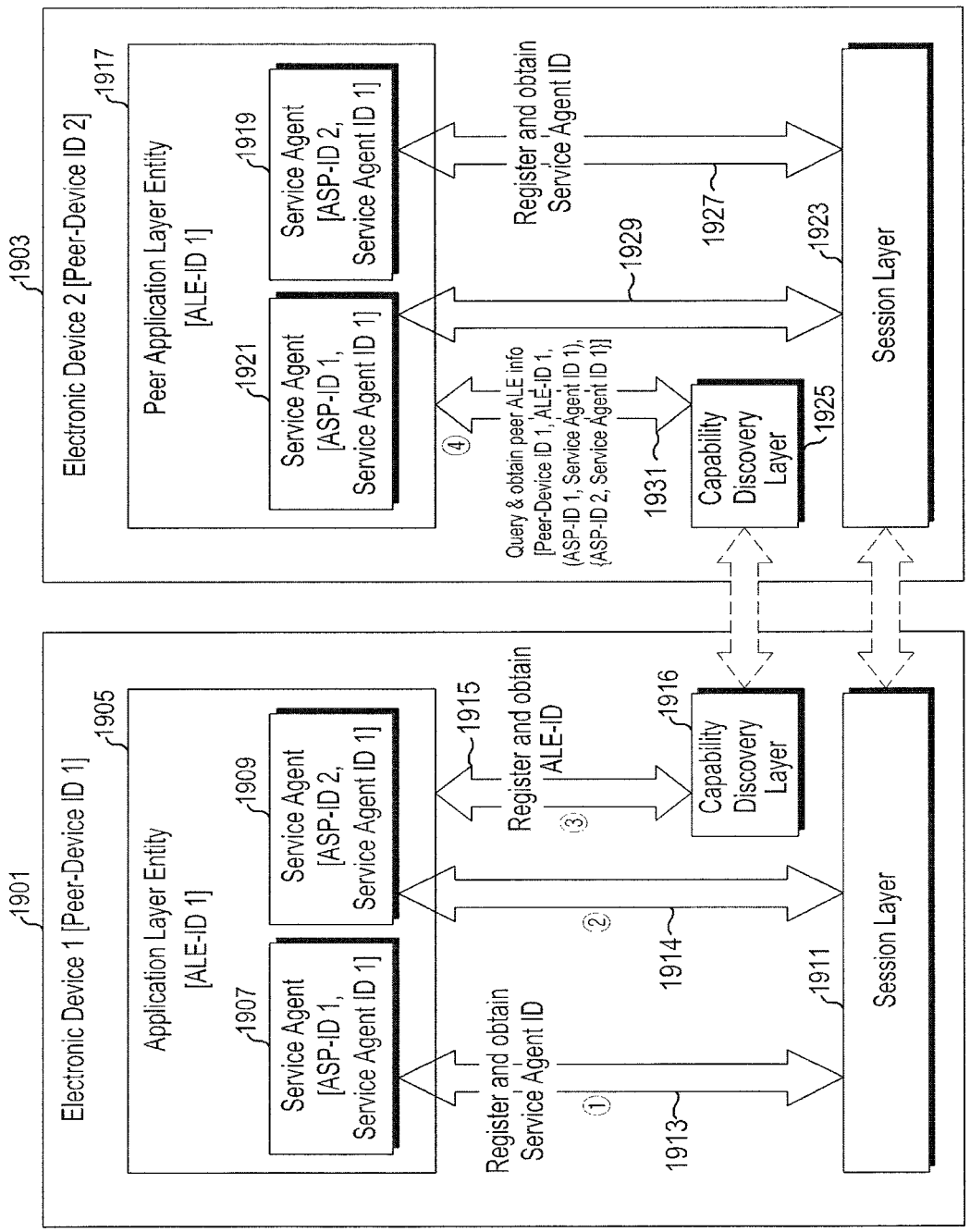
FIG. 19 illustrates configuration of a first electronic device and a second electronic device for communication therebetween according to an embodiment of the present disclosure.
Figure 20:
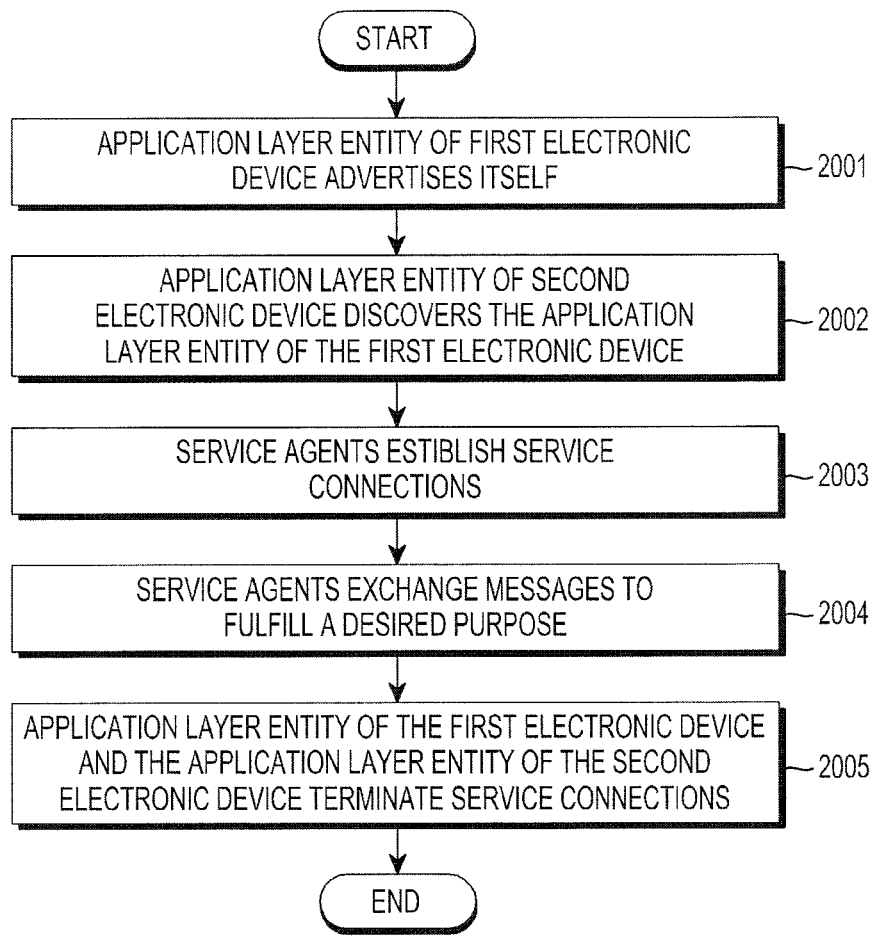
FIG. 20 illustrates a method of communication between a first electronic device and a second electronic device according to an embodiment of the present disclosure.

FIG. 19 illustrates configuration of a first electronic device and a second electronic device for communication therebetween according to an embodiment of the present disclosure. FIG. 20 illustrates a method of communication between a first electronic device and a second electronic device according to an embodiment of the present disclosure.

Referring to FIG. 19, a service discovery procedure between a first electronic device 1901 and a second electronic device 1903 is illustrated. The first electronic device 1901 has a peer device identifier 1, and the second electronic device 1903 has an peer device identifier 2.

The first electronic device 1901 may include an application layer entity 1905 having an application layer entity identifier 1. The application layer entity 1905 may include a service agent 1907 and a service agent 1909. The service agent 1907 may be identified by the combination of an ASP ID 1 and a service agent identifier 1. The service agent 1909 may be identified by the combination of an ASP ID 2 and a service agent identifier 1.

Similarly, the second electronic device 1903 may include an application layer entity 1917 having an application layer entity identifier 1. The application layer entity 1917 may include a service agent 1921 and a service agent 1919. The service agent 1921 may be identified by the combination of an ASP ID 1 and a service agent identifier 1. The service agent 1919 may be identified by the combination of the accessory service identifier 2 and the service agent identifier 1.

According to various embodiments of the present disclosure, providing and/or consumption of an accessory service by a service agent may include service discovery, service connection establishment, application protocol message exchange, and service connection termination.

Referring to FIG. 20, according to service discovery, an application layer entity of a first electronic device may advertise itself or may discover an application layer entity on a second electronic device (e.g., that corresponds to an application layer entity of interest). For example, at operation 2001, the application layer entity of the first electronic device may advertise itself. At operation 2002, the application layer entity of the second electronic device may discover the application layer entity of the first electronic device (e.g., that is advertising itself). The application layer entity of the first electronic device may obtain information about an application layer entity on the second electronic device during service discovery. The information about an application layer entity on the second electronic device may include addresses of the service agents associated with the discovered application layer entity.

As illustrated in FIG. 19, the service agent 1907 may register with a session layer 1911 of the first electronic device 1901. The registration of the service agent 1907 with the session layer 1911 is illustrated by reference numeral 1913. Similarly, the registration of the service agent 1909 with the session layer 1911 is illustrated by reference numeral 1914. The service agent 1909 may register with the capability discovery layer 1916. For example, registration for the service agent 1909 with the capability discovery layer 1916 is illustrated by reference numeral 191. If the service agent 1909 registers with the capability discovery layer 1916, then the service agent 1909 may obtain an application layer entity identifier. If the service agent 1907 registers with the session layer 1911, then the service agent 1907 may obtain a service agent identifier (e.g., in the example illustrated in FIG. 19, the service agent 1907 has obtained a service agent identifier 1). The combination of the ASP ID and the service agent identifier is a unique identifier among service agents across an application layer entity on a given electronic device. Similarly, the service agent 1909 may register with the session layer 1911. If the service agent 1909 registers with the session layer 1911, then the service agent 1909 may obtain a service agent identifier (e.g., in the example illustrated in FIG. 19, the service agent 1909 has obtained a service agent identifier 1). Registration of the service agent 1909 with the session layer 1911 is illustrated by reference numeral 1914. The service agent 1909 may register with the capability discovery layer 1916. For example, registration of the service agent 1909 with the capability discovery layer 1916 is illustrated by reference numeral 1915. If the service agent 1909 registers with the capability discovery layer 1916, then the service agent 1909 may obtain an application layer entity identifier.

The service agent 1919 may register with the session layer 1923 of the second electronic device 1903. If the service agent 1919 registers with the session layer 1923, then the service agent 1919 may obtain a service agent identifier (e.g., in the example illustrated in FIG. 19, the service agent 1919 has obtained a service agent identifier 1). Similarly, the service agent 1921 may register with the session layer 1923. If the service agent 1921 registers with the session layer 1923, then the service agent 1921 may obtain a service agent identifier (e.g., in the example illustrated in FIG. 19, the service agent 1921 has obtained a service agent identifier 1). Registration of the service agent 1921 with the session layer 1923 is illustrated by reference numeral 1929.

According to various embodiments of the present disclosure, an application layer entity may use a capability discovery layer in order to advertise capabilities of the application layer entity to another application layer entity. Similarly, an application layer entity may use a capability discovery layer to discover another application layer entity. For example, the application layer entity may use the capability discovery layer to discover (e.g., identify) another application layer entity that has a desired capability set (e.g., a desired set of service agents).

As illustrated in FIG. 19, the application layer entity 1905 may register with a capability discovery layer 1923 of the first electronic device 1901. If the application layer entity 1905 registers with the capability discovery layer 1923, then the application layer entity 1905 may obtain an application layer entity identifier. The application layer entity identifier may be associated with the set of the ASP ID and the service agent identifier (e.g., {ASP ID, service agent identifier}) of the application layer entity. The application layer entity identifier and the set of ASP IDs and service agent identifiers may form at least a part of the information (e.g., the application layer entity information) that is advertised by the capability discovery layer. For example, if the application layer entity 1905 registers with the capability discovery layer 1923, then the capability discovery layer 1923 may advertise (to the second electronic device) information including the application layer entity identifier, the service agent identifier of the service agent 197, the service agent identifier of the service agent 1909, the ASP ID associated with the service agent 1907, and the ASP ID associated with the service agent 1909.

The capability discovery layer of the first electronic device may communicate with the capability discovery layer of the second electronic device to provide information from which a capability set of the first electronic device may be identified. The capability discovery layer of the first electronic device may respond to queries from capability discovery layers of the second electronic device in order to provide information relating to the capability set of the first electronic device.

As illustrated in FIG. 19, the application layer entity 1917 may coordinate with a capability discovery layer 1925 of the second electronic device 1903 to determine whether an electronic device in proximity of or otherwise connected to the second electronic device 1903 has a desired capability set. For example, if application layer entity 1917 has a service agent that wants to act as a service consumer to consume an accessory service, then the application layer entity 1917 may coordinate with the capability discovery layer 1925 to determine whether any electronic device in proximity of or otherwise connected to the second electronic device 1903 has an applicable service agent that may act as a service provider to provide information associated with the desired accessory service.

The application layer entity 1917 may query the capability discovery layer 1925 to obtain the application layer entity identifier and the identities of the service agents of an application layer of interest on the second electronic device.

The capability discovery layer 1925 of the second electronic device 1903 may communicate with the capability discovery layer 1916 of the first electronic device 1901 to receive information relating to the capability set of the first electronic device 1901 (e.g., to receive information relating to the capability set of a specific application layer entity on the first electronic device 1901). The communication relating to the query for information relating to the capability set of the first electronic device 1901 between the application layer entity 1917 and the capability discovery layer 1925 is illustrated by reference numeral 1931. The capability discovery layer 1925 may query the capability discovery layer 1916 when the capability discovery layer 1925 is queried by the application layer entity 1917 of the second electronic device 1903, or the capability discovery layer 1925 may receive information relating to the capability set of the first electronic device 1901 at specific times (e.g., at connection between the first electronic device 1901 and the second electronic device 1903, at an update on the capability set of at least one of the first electronic device 1901 or the second electronic device 1903, at a predetermined periodic interval, and/or the like). The capability discovery layer 1925 may provide the application layer entity 1917 a response to the query of the capability set of the first electronic device 1901.

At operation 2003, a service connection is established between the first electronic device and the second electronic device. For example, at operation 2003, the service agents of the application layer entity of the first electronic device and the service agents of the application layer entity of the second electronic device establish at least one service connection therebetween. According to service connection establishment, a service agent of an application layer entity on the second electronic device may establish a service connection in order to setup a conduit for message exchange according to the application protocol.

The application layer entity 1917 of the second electronic device 1903 may determine whether the application layer entity 1905 of the first electronic device 1901 has a desired capability (e.g., uses a desired service agent) according to the response that the application layer entity 1917 received from the capability discovery layer 1925 to the query 1931. If the application layer entity 1917 determines that the application layer entity 1905 has a desired capability set (e.g., uses a desired service agent), then at least one service agent of the application layer entity 1917 may communicate with at least one service agent of the application layer entity 1905. For example, if information relating to the capability set of the first electronic device 1901 indicates a desired capability set, then a service agent 1921 may establish a service connection with the service agent 1909. The service connection may be established between the session layer 1933 of the second electronic device 1903 and the first electronic device 1901.

According to various embodiments of the present disclosure, if at least one service connection is established between a service agent of the second electronic device and a service agent of the first electronic device, then the service agent of the second electronic device and the service agent of the first electronic device may communicate information (e.g., information relating to an accessory service and/or the like). The service agent of an application layer entity on a given electronic device may use the address of a desired service agent on an application layer on an electronic device in order to establish a connection therebetween. For example, the service agent 1921 may use the address (e.g., the peer device identifier, the application layer entity identifier, the ASP ID, and the service agent identifier) of the service agent 1909 in order to initiate and setup a connection between the service agent 1921 and the service agent 1909.

At operation 2004, messages are exchanged between the first electronic device and the second electronic device in order to fulfill a desired purpose. For example, the service agents of the application layer entity of the first electronic device and the service agents of the application layer entity of the second electronic device may exchange messages in order to fulfill the desired purpose. The messages may be exchanged according to the applicable application protocol. The service agents of the application layer entity of the first electronic device and the service agents of the application layer entity of the second electronic device may exchange messages in order to respectively provide and consume an accessory service.

At operation 2005, the service connections are terminated. The application layer entity of the first electronic device and the application layer entity of the second electronic device may terminate the service connection that were established to allow the service agents to fulfill the desired purpose.

According to various embodiments of the present disclosure, if the desired purpose is fulfilled, then the service connection between a service agent of the second electronic device and a service agent of the first electronic device may be terminated.

The service connection may be terminated by identifying a service connection to be terminated. For example, the application layer entity may send a termination request to terminate a service connection with the service connection identifier identifying the service connection that the application layer entity desires to terminate.

Figure 21:
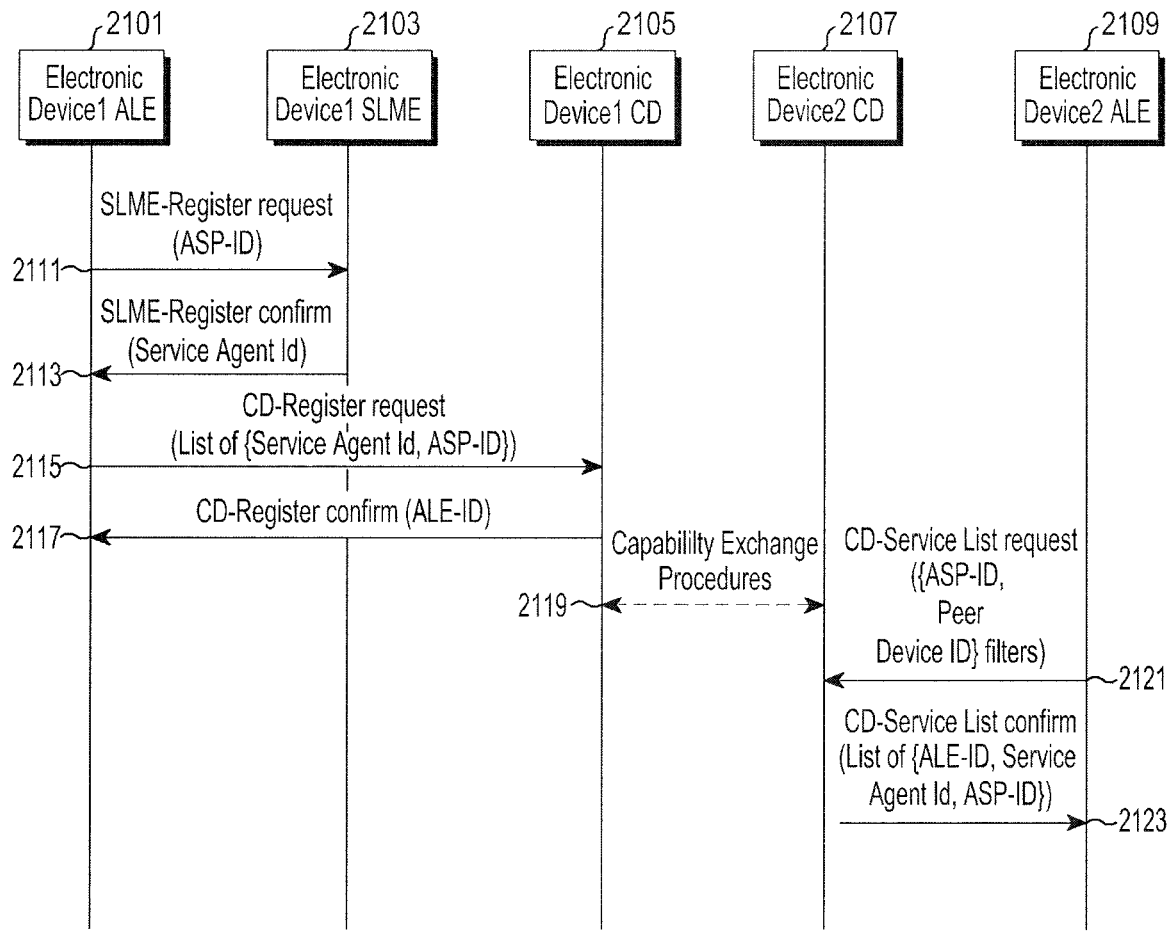
FIG. 21 illustrates a signaling diagram for a service discovery according to an embodiment of the present disclosure.

FIG. 21 illustrates a signaling diagram for a service discovery according to an embodiment of the present disclosure.

Referring to FIG. 21, an application layer entity of a first electronic device may register with a session layer of the application layer entity. For example, the application layer of the first electronic device may register with the session layer management entity of the first electronic device.

As illustrated in FIG. 21, the application layer entity 2101 may register with the session layer management entity 2103. The application layer entity 2101 may send a registration request (e.g., SLME-Register.request) 2111 to the session layer management entity 2103. The registration request 2111 may include an ASP ID associated with application layer entity 2101.

In response to the registration request 2111, the session layer management entity 2103 may send a registration confirmation (e.g., SLME-Register.confirm) 2113 to the application layer entity 2101 of the first electronic device. The registration confirmation 2113 may include a service agent identifier associated with a service agent of the application layer entity 2101 to identify the service agent.

Thereafter, the application layer entity 2101 of the first electronic device may send a registration request (e.g., CD-Register.request) 2115 to the capability discovery layer 2105 of the first electronic device. The registration request 2115 may include a list of the capabilities of the application layer entity 2101. For example, the registration request 2115 may include a list of the associated service agent identifiers and ASP IDs associated with the various service agents of the application layer entity 2101.

In response to the registration request 2115, the capability discovery layer 2105 may send a registration confirmation (e.g., CD-Register.confirm) 2117 to the application layer entity 2101. The registration confirmation may include an application layer entity identifier to identify the application layer entity 2101 being registered with the capability discovery layer 2105.

According to various embodiments of the present disclosure, a first electronic device and a second electronic device may perform a procedure for identifying capabilities of at least one of the first electronic device or the second electronic device. For example, the first electronic device and the second electronic device may perform a capability exchange. The capability exchange may provide the first electronic device with the capability set of the second electronic device (e.g., a list of services that the second electronic device may perform, a list of service agents on the second electronic device, and/or the like), and may provide the second electronic device with the capability set of the first electronic device.

As illustrated in FIG. 21, the capability discovery layer 2105 of the first electronic device may communicate with a capability discovery layer 2107 of a second electronic device to communicate capabilities of at least one of the first electronic device or the second electronic device. For example, the capability discovery layer 2105 and the capability discovery layer 2107 may perform a capability exchange procedure 2119.

If an application layer entity on the second electronic device wants to provide a service to a user (e.g., to perform an accessory service), then the application layer entity may query the capability discovery layer of the second electronic device to determine whether an application layer entity or a service agent is available to provide information for the service and/or to identify an available application layer entity or service agent to provide information for the service.

An application layer entity 2109 on the second electronic device may send a service request (e.g., CD-ServiceList.request) 2121 to the capability discovery layer 2107 of the second electronic device. The service request 2121 may correspond to a query for an identification of application layer entities and/or service agents that may be available to provide information for a desired service (e.g., an accessory service). The service request 2121 may include a filter which is used to focus the query on logical entities that may be relevant to the second electronic device, the desired service, and/or the like. The filters on the service request 2121 may correspond to a filter related to an ASP ID, peer device identifiers, and/or the like. For example, the filter may serve to focus the query on capabilities of a specific device, on availability for information sources of a particular application, and/or the like.

The capability discovery layer 2107 of the second electronic device may provide a list of capabilities to the application layer entity 2109. For example, in response to the service request 2121, the capability discovery layer 2107 may provide a service confirmation (e.g., CD-ServiceList-.confirmation) 2123. The service confirmation 2123 may include a list of associated application layer entity identifiers, service agent identifiers, and ASP IDs. The service confirmation 2123 may provide information from which the application layer entity 2109 may determine whether a desired capability may be satisfied (e.g., whether logical entity such as an application layer entity and/or a service agent is available to provide information for a desired service).

Figure 22:
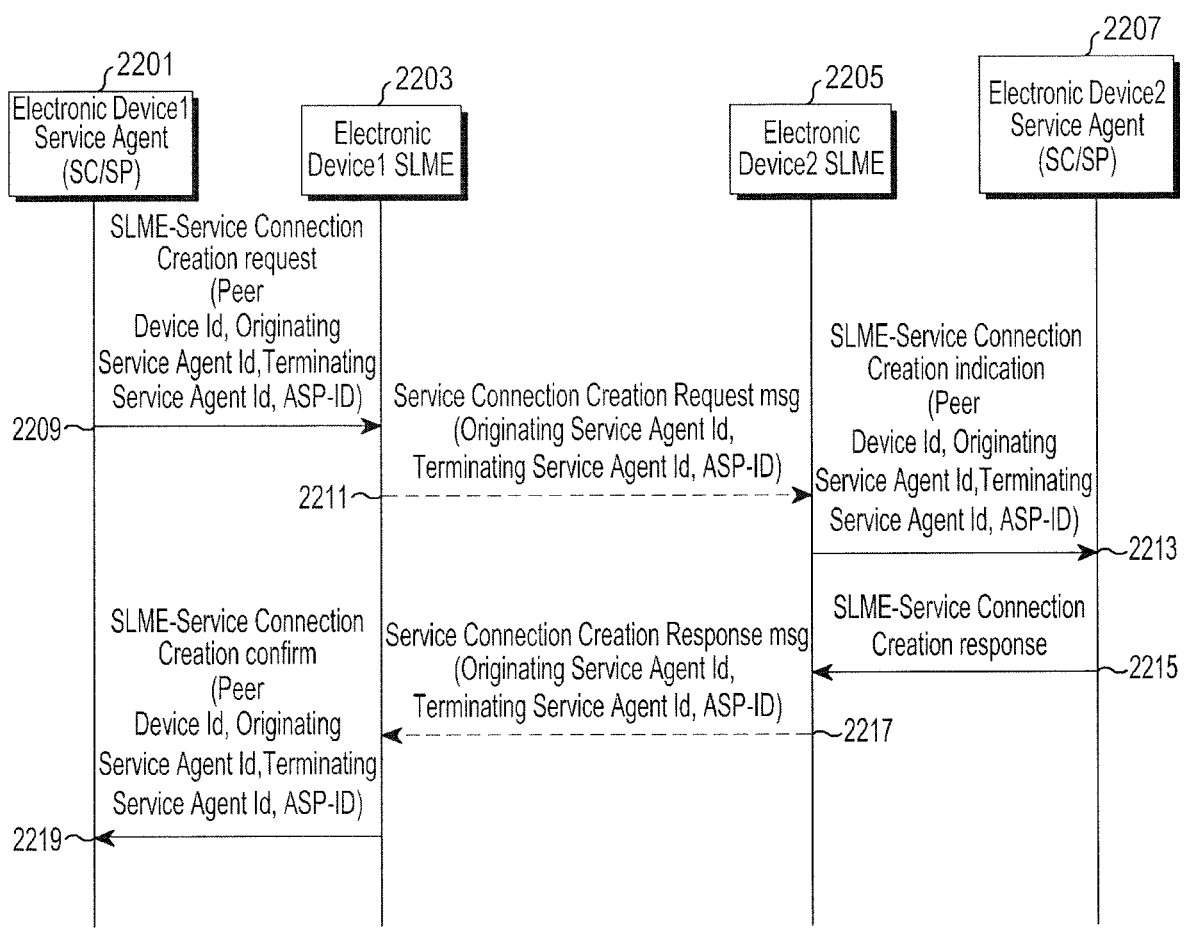
FIG. 22 illustrates a signaling diagram for establishing a service connection according to an embodiment of the present disclosure.

FIG. 22 illustrates a signaling diagram for establishing a service connection according to an embodiment of the present disclosure.

Referring to FIG. 22, a logical entity of a first electronic device may wish to communicate with a logical entity of a second electronic device to communicate information relating to a desired service (e.g., an accessory service). For example, in order to provide an accessory service to a user, a logical entity of the first electronic device may communicate with a logical entity of the second electronic device to communicate information relating to the accessory service. According to various embodiments of the present disclosure, a service agent on the first electronic device may communicate with a service agent on the second electronic device in order to communicate information relating to the desired service. According to various embodiments of the present disclosure, in order to communicate information relating to a desired service, the service agent on the first electronic device may initiate and setup (e.g., establish) at least one service connection over which information relating to the desired service is communicated.

As illustrated in FIG. 22, a service agent 2201 on the first electronic device may send a service connection creation request (e.g., SLME-ServiceConnectionCreation.request) 2209 to a session layer of the first electronic device. For example, the service agent 2201 may send the service connection creation request 2209 to a session layer management entity 2203 of the first electronic device. The service connection creation request 2209 may include a peer device identifier, a service agent identifier such as an originating service agent identifier that identifies the service agent from which the request to establish the service connection originated, a terminating service agent identifier that identifies the service agent with which a service connection is desired, an ASP ID, and/or the like. The peer device identifier may identify an electronic device with which service connection is desired.

If the session layer management entity 2203 receives a request to establish a service connection, then the session layer management entity 2203 may communicate with a session layer management entity of the second electronic device on which the desired service agent resides. As an example, the session layer management entity 2203 may communicate with the session layer management entity of the peer device identified in the service connection creation request 2209. According to various embodiments of the present disclosure, if the session layer management entity 2203 receives a service connection creation request 2209, then the session layer management entity 2203 may send a service connection creation request message (e.g., ServiceConnectionCreationRequest) 2211 to a session layer management entity 2205 of the second electronic device. The service connection creation request message 2211 may include a service agent identifier such as an originating service agent identifier that identifies the service agent from which the request to establish the service connection originated, a terminating service agent identifier that identifies the service agent with which a service connection is desired, an ASP ID, and/or the like.

If the session layer management entity 2205 of the second electronic device receives the service connection creation request message 2211, then the session layer management entity 2205 may send to a service agent 2207 on the second electronic device an indication that the service agent on the first electronic device wants to establish a service connection therewith. For example, the session layer management entity 2205 may send a service connection creation indication (e.g., SLME-ServiceConnectionCreation.indication) 2213 to the service agent 2207. The service connection creation indication 2213 may include a peer device identifier, a service agent identifier such as an originating service agent identifier that identifies the service agent from which the request to establish the service connection originated, a terminating service agent identifier that identifies the service agent with which a service connection is desired, an ASP ID, and/or the like. The peer device identifier may identify the electronic device from which the request to establish the service connection originated.

In response to receiving a service connection creation indication, a logical entity on the second electronic device, may determine whether to accept the service connection creation request. For example, in response to receiving a service connection creation indication, the service agent 2207 of the second electronic device may determine whether to accept the service connection creation request of the service agent 2201 of the first electronic device. For example, the service agent 2207 may authenticate the service agent 220, and/or the like.

The service agent 2207 may send a service connection creation response (e.g., SLME-ServiceConnectionCreation-.response) 2215 to the session layer management entity 2205 of the second electronic device. The service connection creation response may indicate whether the request for service connection creation is accepted, conditions and/or parameters for the service connection, and/or the like.

If the session layer management entity 2205 receives the service connection creation response 2215 from the service agent 2207, then the session layer management entity 2205 may send a service connection creation response message (e.g., ServiceConnectionCreationResponse) 2217 to the session layer management entity 2203 of the first electronic device. The service connection creation response message 2217 may include a service agent identifier such as an originating service agent identifier that identifies the service agent from which the request to establish the service connection originated, a terminating service agent identifier that identifies the service agent with which a service connection is desired, an ASP ID, and/or the like. The service connection creation response message 2217 may indicate whether the request for service connection creation is accepted, conditions and/or parameters for the service connection, and/or the like.

According to various embodiments of the present disclosure, the session layer management entity 2205 may start a timer upon receiving a service connection creation request message 2211. The timer may be used to determine whether the service connection creation request message has timed out. For example, the timer may be used to determine whether the service agent 2207 has responded to the service connection creation indication 2213 within a preset time. If the service agent 2207 has not responded to the service connection creation indication 2213 within the preset time, then the session layer management entity 2205 may send a service connection creation response message 2217 that indicates to the service agent 2201 (e.g., through the session layer management entity 2203) that the service agent 2207 is unavailable, that the request for a service connection has timed out, and/or the like. For example, upon expiration of the timer, then the session layer management entity 2205 may send a service connection creation response message 2217 that indicates to the service agent 2201 (e.g., through the session layer management entity 2203) that the service agent 2207 is unavailable, that the request for a service connection has timed out, and/or the like.

If the session layer management entity 2203 receives the service connection creation response message 2217, then the session layer management entity 2203 may send a service connection creation confirmation (SLME-ServiceConnectionCreation.confirm) 2219 to the service agent 2201 (e.g., to the service agent at which the request for the service connection originated). The service connection creation confirmation 2219 may include a peer device identifier, a service agent identifier such as an originating service agent identifier that identifies the service agent from which the request to establish the service connection originated, a terminating service agent identifier that identifies the service agent with which a service connection is desired, an ASP ID, and/or the like. The peer device identifier may identify the peer electronic device with which service connection is desired.

Figure 23:
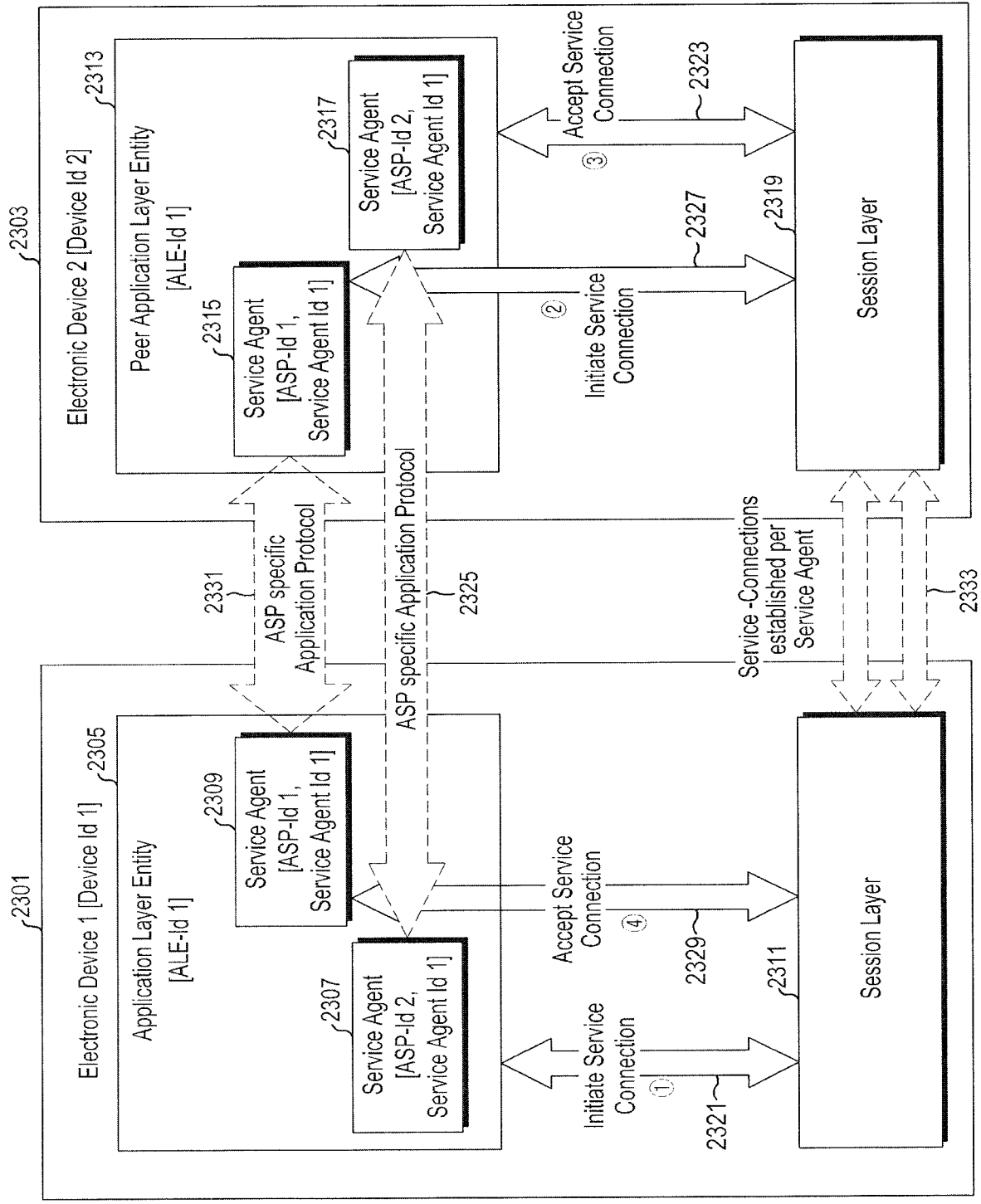
FIG. 23 illustrates a service connection and communicating using an application protocol according to an embodiment of the present disclosure.
Figure 24:
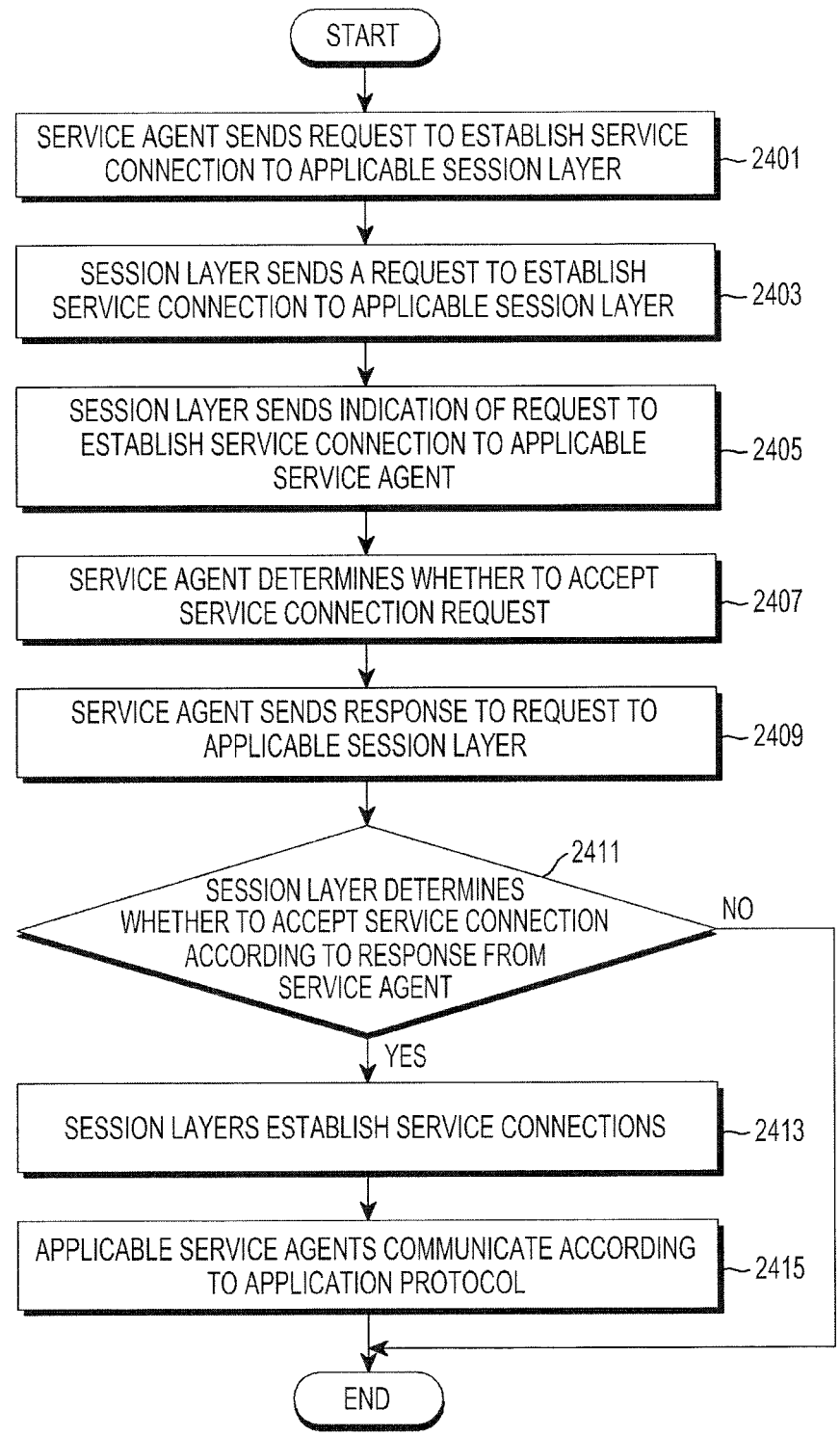
FIG. 24 illustrates a procedure for establishing a service connection according to an embodiment of the present disclosure.

FIG. 23 illustrates a service connection and communicating using an application protocol according to various embodiments of the present disclosure. FIG. 24 illustrates a procedure for establishing a service connection according to an embodiment of the present disclosure.

Referring to FIG. 23, a service connection procedure between a first electronic device 2301 and a second electronic device 2303 is illustrated. The first electronic device 2301 has a peer device identifier 1, and the second electronic device 2303 has a peer device identifier 2.

The first electronic device 2301 may include an application layer entity 2305 having an application layer entity identifier 1. The application layer entity 2305 may include a service agent 2307 and a service agent 2309. The service agent 2307 may be identified by the combination of an ASP ID 2 and a service agent identifier 1. The service agent 2309 may be identified by the combination of an ASP ID 1 and a service agent identifier 1.

Similarly, the second electronic device 2303 may include an application layer entity 2313 having an application layer entity identifier 1. The application layer entity 2313 may include a service agent 2315 and a service agent 2317. The service agent 2315 may be identified by the combination of an ASP ID 1 and a service agent identifier 1. The service agent 2317 may be identified by the combination of the accessory service identifier 2 and the service agent identifier 1.

Referring to FIG. 24, if an electronic device performs an accessory service or otherwise determines to fulfill a purpose/desire (e.g., to provide a user thereof with a service), then the electronic device may establish a service connection with a peer electronic device.

At operation 2401, a service agent of the electronic device sends a request to establish a service connection to an applicable session layer. For example, as illustrated in FIG. 23, the service agent 2307 may initiate a service connection by communicating with a session layer 2311 of the first electronic device 2301. The initiation of the service connection is identified by reference numeral 2321. The service agent 2307 may send a request to establish a service connection to the session layer 2311.

At operation 2403, the session layer sends a request to establish a service connection to an applicable session layer. For example, as illustrated in FIG. 23, the session layer 2311 of the first electronic device 2301 may send a request to establish a service connection to a session layer 2319 of the second electronic device 2303.

At operation 2405, the session layer sends an indication of a request to establish a service connection to an applicable service agent. For example, as illustrated in FIG. 23, the session layer 2319 may send an indication to the service agent 2317 of the second electronic device 2303 that the session layer 2319 received a request to establish a service connection (e.g., between the service agent 2307 and the service agent 2317).

At operation 2407, the service agent determines whether to accept the service connection request. For example, as illustrated in FIG. 23, the service agent 2317 may determine whether to accept the service connection request for establishing a service connection (e.g., between the service agent 2307 and the service agent 2317).

At operation 2409, the service agent sends a response to the service connection request to the applicable session layer. For example, as illustrated in FIG. 23, the service agent 2317 sends the response to the service connection request to the session layer 2319. The response to the service connection request provides an indication as to whether the service agent 2317 accepts the service connection (e.g., between the service agent 2307 and the service agent 2317). The response to the service connection request communicated between the service agent 2317 and the session layer 2319 is illustrated by reference numeral 2323.

At operation 2411, the session layer determines whether to accept the service connection according to the response received from the service agent. For example, as illustrated in FIG. 23, the session layer 2319 may determine whether to accept the service connection (e.g., whether to establish the service connection between the service agent 2307 and the service agent 2317) according to the response received from the service agent 2317 as to whether the service agent 2317 accepts the service connection.

If the session layer determines to accept the service connection at operation 2411, then the service connection procedure may proceed to operation 2413 at which the session layer establishes the service connection. For example, as illustrated in FIG. 23, if the session layer 2319 determines to accept the service connection request received from the session layer 2311, then the session layer 2319 may communicate with the session layer 2311 to establish the service connection between the service agent 2307 and the service agent 2317. Thereafter, the service connection procedure proceeds to operation 2415.

At operation 2415, the applicable service agents communicate according to the application protocol. For example, as illustrated by reference numeral 2325, if the service connection is established between the service agent 2307 and the service agent 2317 (e.g., using the session layer 2311 and the session layer 2319), then the service agent 2307 and the service agent 2317 may communicate. The service agent 2307 and the service agent 2317 may communicate using an accessory service profile specific application protocol.

According to various embodiments of the present disclosure, an electronic device may include a service agent that acts as a service provider and a service agent that acts as a service consumer at any given time. For example, an electronic device is not limited to only include service agents acting as service providers or service consumers at a given time. According to various embodiments of the present disclosure, a service agent may act as a service provider in relation to communication with a first peer electronic device and the service agent may act as a service consumer in relation to communication with a second peer electronic device.

According to various embodiments of the present disclosure, a service consumer may be configured to request a service provider to provide the service consumer with an accessory service or information relating thereto. The service consumer may be configured to request the service provider using a message configured to the application protocol for the applicable accessory service profile. The service consumer may be configured to receive messages (e.g., accessory service or information relating thereto) from the service provider. The service consumer may be configured to process or interpret messages received from the service provider according to the application protocol for the applicable accessory service profile.

According to various embodiments of the present disclosure, a service provider may be configured to receive a request and/or a message from a service consumer. The service provider may be configured to process and execute procedures in response to the request and/or message received from the service consumer according to the application protocol for the applicable accessory service profile. The service provider may be configured to provide the service consumer with an accessory service or information relating thereto. According to various embodiments of the present disclosure, a service provider may serve one or more service consumers.

According to various embodiments of the present disclosure, a service provider may serve multiple service consumers on the same peer electronic device.

According to various embodiments of the present disclosure, an electronic device may include multiple service providers that provide the same accessory service.

According to various embodiments of the present disclosure, the accessory service profile corresponding to an accessory service may ensure consistent behavior of a service provider and/or service consumer implemented for the accessory service. For example, the accessory service profile may be a standardized set of protocols according to which service providers and service consumers may communicate in relation to the accessory service. As a result, the accessory service profile allows the development of accessory services to be extensible to be developed with greater ease. The accessory services may be developed across a variety of electronic devices that implement accessory service profiles.

According to various embodiments of the present disclosure, network protocols that an electronic device uses to communicate with a peer electronic device may be agnostic to the applicable accessory service profiles being used between service providers and service consumers of the electronic device and the peer electronic device.

As illustrated in FIG. 23, the service agent 2315 may initiate a service connection by sending a request to establish a service connection to the session layer 2319. The session layer 2319 may then communicate with the session layer 2311 to send a request to establish a service connection to the session layer 2311. Thereafter, the session layer 2311 may send an indication of a request to establish a service connection to the service agent 2309. For example, the session layer 2311 may send an indication that the session layer 2311 received a request to establish a service connection (e.g., between the service agent 2315 and the service agent 2309). Thereafter, the service agent 2309 may determine whether to accept the service connection, and the service agent 2309 may provide to the session layer 2311 an indication of whether to accept the service connection. For example, the indication of whether to accept the service connection that is communicated between the service agent 2309 and the session layer 2311 may be illustrated by reference numeral 2329. If the service agent 2309 accepts the service connection, then the session layer 2311 may communicate with the session layer 2319 to establish the desired service connection. Thereafter, the service agent 2315 may communicate with the service agent 2309 using an accessory service protocol specific application protocol 2331. The communication between the service agent 2315 and the service agent 2309 using an accessory service protocol specific application protocol 2331 may occur over at least one service connection 2333 established between the service agent 2315 and the service agent 2309.

As illustrated in FIG. 23, an application layer entity may include a service agent that initiates a service connection, and a service agent that receives a request to establish a service connection and that accepts or authenticates a service connection. For example, the application layer entity 2305 may include the service agent 2307 that initiates a service connection with service agent 2317, and the service agent 2309 that receives a request to establish a service connection from service agent 2315.

Figure 25:
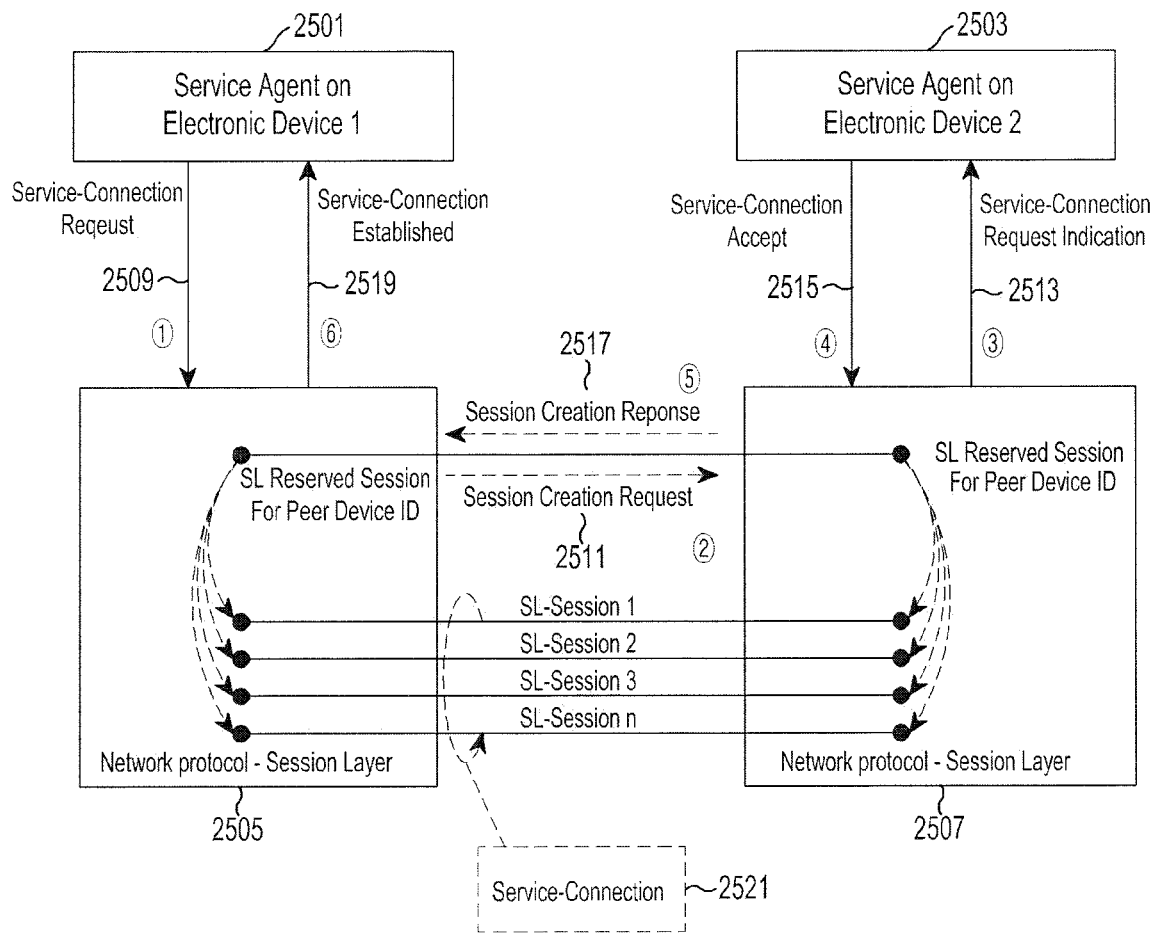
FIG. 25 illustrates a service connection according to an embodiment of the present disclosure.

FIG. 25 illustrates a service connection according to an embodiment of the present disclosure.

Referring to FIG. 25, a service connection between a service agent 2501 of a first electronic device and a service agent 2503 of a second electronic device may be established. According to various embodiments of the present disclosure, the service connection may be established using a service connection creation session between the first electronic device and the second electronic device. According to various embodiments of the present disclosure, a service connection between the service agent 2501 and the service agent 2503 may include at least one session between the first electronic device and the second electronic device. For example, a service connection may include a plurality of sessions between the first electronic device and the second electronic device.

The service agent 2501 may attempt to initiate a service connection to another service agent such as, for example, the service agent 2503. The service agent 2501 may initiate a service connection in order to perform an accessory service, to fulfill a purpose/need for a user of an electronic device, and/or the like. According to various embodiments of the present disclosure, the service agent 2501 may attempt to establish a service connection according to a corresponding application service protocol. According to various embodiments of the present disclosure, the service agent 2501 may initiate a service connection by communicating with a network protocol and/or session layer 2505 of the first electronic device. For example, the service agent 2501 may send a service connection request 2509 to the network protocol and/or session layer 2505.

According to various embodiments of the present disclosure, in response to receiving the service connection request 2509 from the service agent 2501, the network protocol and/or session layer 2505 may communicate with a network protocol and/or session layer 2507 of the second electronic device. The network protocol and/or session layer of an electronic device may have a reserved session for communication with a given peer electronic device. As an example, the network protocol and/or session layer 2505 and the network protocol and/or session layer 2507 may open a service connection creation session therebetween. The network protocol and/or session layer 2505 may send a service connection creation request 2511 to the network protocol and/or session layer 2507.

According to various embodiments of the present disclosure, a network protocol and/or session layer of an electronic device may provide an indication that the network protocol and/or session layer received a service connection request from the network protocol and/or session layer of a peer electronic device. For example, as illustrated in FIG. 3 25, the network protocol and/or session layer 2507 may send a service connection request indication 2513 to the service agent 2503 (e.g., the service agent associated with the service connection request).

According to various embodiments of the present disclosure, a service agent of an electronic device may determine whether to accept a service connection requested from a service agent of a peer electronic device. For example, the service agent may determine whether to accept a service connection request according to an authentication of the service agent requesting service connection, according to availability of resources (e.g., processing resources, communication resources, and/or the like), user preferences, and/or the like.

The service agent of an electronic device may provide an indication of whether the service agent accepts the service connection to the service agent of a peer electronic device through the applicable network protocol and/or session layer.

If the service agent 2503 determines to accept the service connection, then the service agent 2503 may send a service connection acceptance 2515 to the network protocol and/or session layer 2507.

If the second electronic device accepts the service connection (e.g., if the service agent 2503 accepts the service connection), then the network protocol and/or session layer 2507 may communicate with the first electronic device (e.g., the network protocol and/or session layer 2505) to establish the service connection. For example, the network protocol and/or session layer 2507 may send to the network protocol and/or session layer 2505 a service connection creation response 2517 (e.g., in response to the service connection creation request 2511).

The network protocol and/or session layer 2505 and the network protocol and/or session layer 2507 may establish the service connection 2521. The service connection 2521 may include one or more sessions between the network protocol and/or session layer 2505 and the network protocol and/or session layer 2507. For example, the service connection 2512 may include SL-session 1, SL-session 2, SL-session 3, and SL-session n.

If the network protocol and/or session layer 2505 and the network protocol and/or session layer 2507 establish the service connection 2521, then the network protocol and/or session layer 2505 may send to the service agent 2501 an indication 2519 that the service connection is established.

According to various embodiments of the present disclosure, if a service connection is established between a service agent 2501 and a service agent 2503 (e.g., between a service provider and a service consumer), the service agent 2501 and the service agent 2503 communicate using the sessions reserved for the established service connection.

According to various embodiments of the present disclosure, after the service consumer has used the accessory service provided by the service provider (e.g., after the accessory service has fulfilled the purpose/desire thereof), the service connection between the service consumer and the service provider may be terminated. According to various embodiments of the present disclosure, any combination of the service consumer and the service provider may terminate the service connection. According to various embodiments of the present disclosure any combination of the service consumer and the service provider may terminate the service connection at any time.

According to various embodiments of the present disclosure, a service agent (e.g., a service provider) may serve one or more service consumers. The service provider may serve multiple service consumers on one or more peer electronic devices. The service provider may serve multiple service consumers on one or more peer electronic devices over separate individual established service connections. According to various embodiments of the present disclosure, a service consumer may consume an accessory service (e.g., receive information relating to a service) provided by one or more service providers. The service consumer may consume an accessory service (e.g., receive information relating to a service) provided by one or more service providers on one or more peer electronic devices. The service consumer may consume an accessory service (e.g., receive information relating to a service) provided by one or more service providers on one or more peer electronic devices over separate individual established service connections.

According to various embodiments of the present disclosure, either a service provider or a service consumer may initiate a service connection according to the corresponding accessory service profile. For example, either the service provider or the service consumer may initiate the service connection according to the corresponding accessory service profile.

Figure 26:
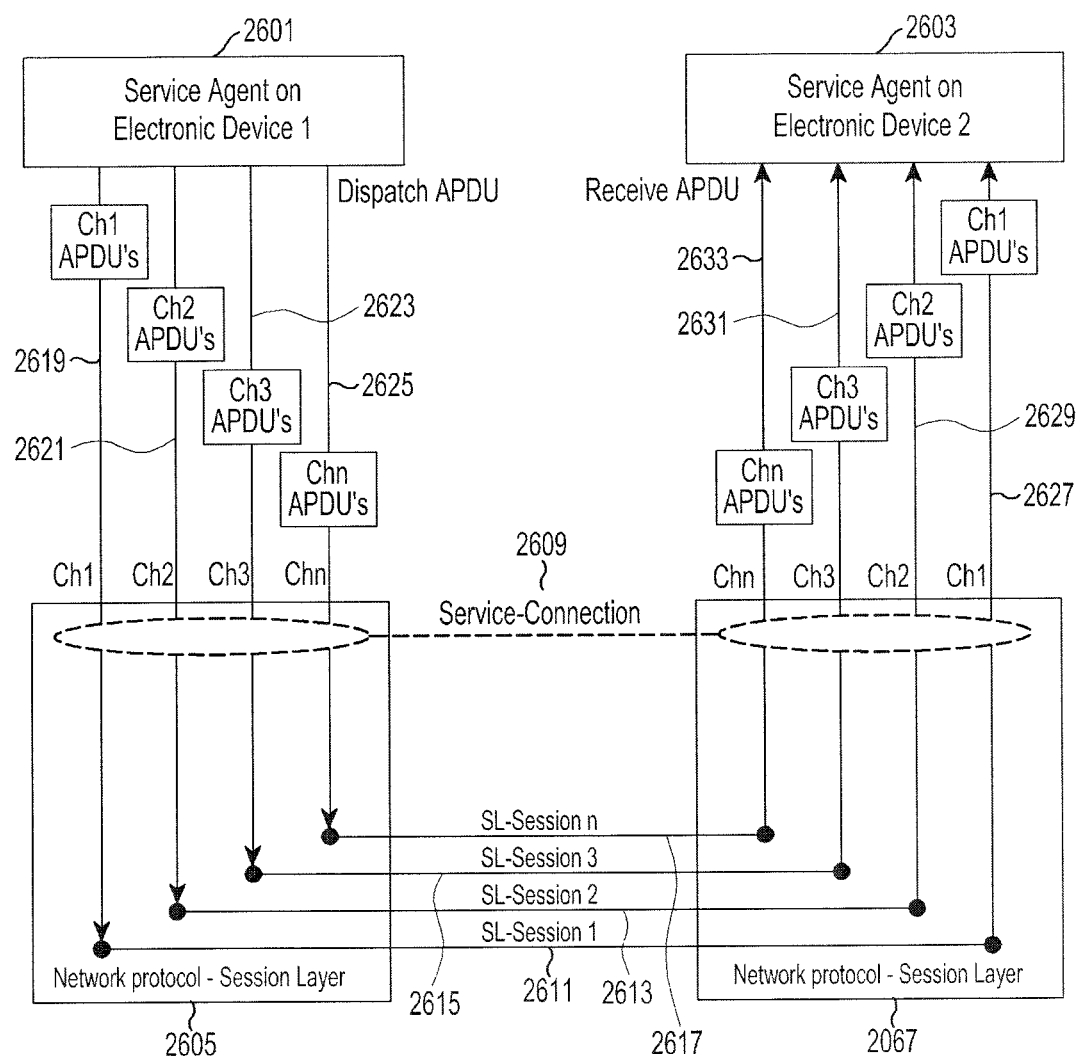
FIG. 26 illustrates a communication between service agents according to an embodiment of the present disclosure.

FIG. 26 illustrates a communication between service agents according to an embodiment of the present disclosure.

Referring to FIG. 26, a service agent 2601 of a first electronic device may communicate with a service agent 2603 of a second electronic device over a service connection 2609. The service agent 2601 and the service agent 2603 may communicate over the service connection 2609 established using a network protocol and/or session layer 2605 of the first electronic device and a network protocol and/or session layer 2607 of the second electronic device.

According to various embodiments of the present disclosure, the service connection 2609 established between the network protocol and/or session layer 2605 and the network protocol and/or session layer 2607 may include at least one session over which the service agent 2601 and the service agent 2603 communicate. For example, as illustrated in FIG. 26, the service connection 2609 may include session 2611 (e.g., SL-Session 1), session 2613 (e.g., SL-Session 2), session 2615 (e.g., SL-Session 3), session 2617 (e.g., SL-Session n), and/or the like.

According to various embodiments of the present disclosure, the service connection may include a plurality of channels over which messages between the service agent 2601 and the service agent 2603 are exchanged. A session included in the service connection may be associated with a channel. For example, session 2611 may be associated with Channel 1 2619 formed between the service agent 2601 and the network protocol and/or session layer 2605 and Channel 1 2627 formed between the service agent 2603 and the network protocol and/or session layer 2607; session 2613 may be associated with Channel 2 2621 formed between the service agent 2601 and the network protocol and/or session layer 2605 and Channel 2 2629 formed between the service agent 2603 and the network protocol and/or session layer 2607; session 2615 may be associated with Channel 3 2623 formed between the service agent 2601 and the network protocol and/or session layer 2605 and Channel 1 2631 formed between the service agent 2603 and the network protocol and/or session layer 2607; and session 2617 may be associated with Channel n 2625 formed between the service agent 2601 and the network protocol and/or session layer 2605 and Channel n 2633 formed between the service agent 2603 and the network protocol and/or session layer 2607.

According to various embodiments of the present disclosure, additional channels may be established and/or configured with the service connection according to the applicable accessory service profile and the corresponding application protocol. According to various embodiments of the present disclosure, existing channels of a service connection may be terminated according to the applicable accessory service profile and the corresponding application protocol.

According to various embodiments of the present disclosure, each channel may communicate at least one application protocol data unit associated with the accessory service.

According to various embodiments of the present disclosure, the session layer is unaware of interactions between the service agents at an application level. For example, the session layer leverages the addressing of the service agents and service connections established between service agents to enable communication between the service agents. The session layer may use the ASP ID and the service agent identifier to identify, locate, and/or service an applicable service agent. The session layer may use the application layer entity identifier, the peer electronic device identifier, and/or the like to identify, locate, and/or service an applicable service agent. The session layer may use a combination of the peer device identifier, application layer entity, ASP ID, and service agent identifier to identify, locate, and/or service an applicable service agent.

Figure 27:
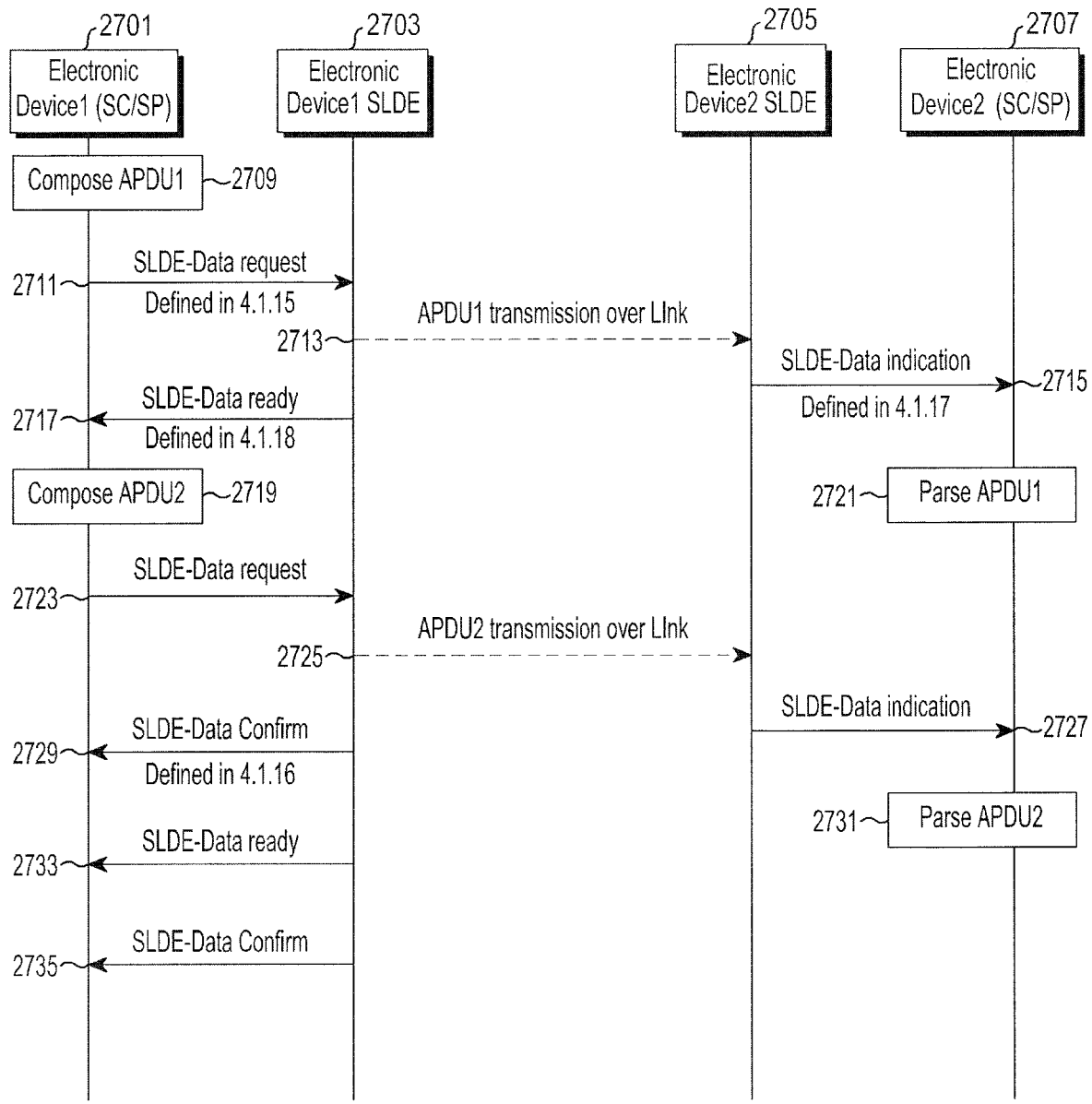
FIG. 27 illustrates communication of a message according to an embodiment of the present disclosure.

FIG. 27 illustrates communication of a message according to an embodiment of the present disclosure.

Referring to FIG. 27, a service agent 2701 of a first electronic device may communicate messages with a service agent 2707 of a second electronic device. The first electronic device may include a session layer data entity 2703, and the second electronic device may include a session layer data entity 2705.

The service agent 2701 may generate a message 2709 to be communicated to the service agent 2707. The service agent 2701 may generate the message 2709 in accordance with the corresponding application service profile.

Thereafter, the service agent 2701 may invoke a data request. For example, the service agent 2701 may send a message (e.g., SLDE-Data.request) 2711 to the session layer data entity 2703. The message 2711 may correspond to an application protocol data unit. After the service agent 2701 invokes the data request and sends the message 2711, the service agent 2701 prepares to receive a message (e.g., SLDE-Data.Confirm) identifying the delivery status of the message 2711. If the message identifying the delivery status of the message 2711 indicates that the delivery status is a failure, then a message including the message 2711 or information relating thereto may be retransmitted in accordance with the applicable application protocol. For example, if the application protocol supports retransmission of a message if a confirmation message is received that indicates that the transmission of a message failed, then retransmission of the message may be invoked.

The session layer of the first electronic device may send a message 2713 comprising data relating to the message 2711 to the session layer of the second electronic device. For example, the session layer data entity 2703 may perform transmission of data relating to the message 2711 (e.g., transmission of the application protocol data unit) to the session layer data entity 2705 over a connection (e.g., a service connection) between the first electronic device and the second electronic device.

Upon receipt of data from the session layer of the first electronic device, the session layer of the second electronic device may inform the applicable service agent of the data reception. For example, upon receipt of data from the session layer entity 2703, the session layer entity 2705 may send to the service agent 2707 an indication (e.g., SLDE-Data.indication) 2715 that the session layer entity 2705 received the message 2713 comprising data relating to the message 2711. The session layer entity 2705 may send to the service agent 2707 the received data. For example, the indication 2715 may include the data relating to the message 2711.

Thereafter, the service agent 2707 may parse the received data. For example, as illustrated at reference numeral 2721 of FIG. 27, the service agent 2707 may parse the received data. The service agent 2707 may process the received data.

In the meantime, the service agent 2701 may await an indication from the session layer (e.g., the session layer management entity) indicating that the service agent 2701 may initiate another data request on the respective channel corresponding to the channel for which the indication is received. For example, the service agent 2701 may receive the indication (e.g., SLDE-Data.ready) 2717 from the session layer data entity 2703.

If the service agent 2701 receives the indication 2717 that the service agent 2701 may initiate another data request on the respective channel, then the service agent 2701 may generate a message 2719 to be communicated to the service agent 2707. The service agent 2701 may generate the message 2719 in accordance with the corresponding application service profile.

Thereafter, the service agent 2701 may invoke a data request. For example, the service agent 2701 may send a message (e.g., SLDE-Data.request) 2723 to the session layer data entity 2703. The message 2723 may correspond to an application protocol data unit. After the service agent 2701 invokes the data request and sends the message 2723, the service agent 2701 prepares to receive a message (e.g., SLDE-Data.confirm) indicating the delivery status of the message 2723.

The session layer of the first electronic device may send a message 2725 comprising data relating to the message 2723 to the session layer of the second electronic device. For example, the session layer data entity 2703 may perform transmission of data relating to the message 2723 (e.g., transmission of the application data protocol unit) to the session layer entity 2705 over a connection (e.g., a service connection) between the first electronic device and the second electronic device.

Upon receipt of data from the session layer of the first electronic device, the session layer of the second electronic device may inform the applicable service agent of the data reception. For example, upon receipt of data from the session layer entity 2703, the session layer entity 2705 may send to the service agent 2707, an indication (e.g., SLDE-Data.indication) 2727 that the session layer entity 2705 received the message 2725 comprising data relating to the message 2723. The session layer entity 2705 may send to the service agent 2707 the received data. For example, the indication 2727 may include the data relating to the message 2723.

Thereafter, the service agent 2707 may parse the received data. For example, as illustrated at reference numeral 2731 of FIG. 27, the service agent 2707 may parse the received data. The service agent 2707 may process the received data.

Meanwhile, the service agent 2701 may receive a message (e.g., SLDE-Data.confirm) 2729 that indicates whether the message 2711 and/or the data associated with message 2709 was successfully delivered.

After transmitting the message 2723, the service agent 2701 may await an indication from the session layer (e.g., the session layer management entity) indicating that the service agent 2701 may initiate another data request on the respective channel corresponding to the channel for which the indication is received. For example, the service agent 2701 may receive the indication (e.g., SLDE-Data.ready) 2733 from the session layer data entity 2703.

Further, after transmitting the message 2723, the service agent 2701 may receive a message (e.g., SLDE-Data.confirm) 2735 that indicates whether the message 2723 and/or the data associated with message 2719 was successfully delivered.

Figure 28:
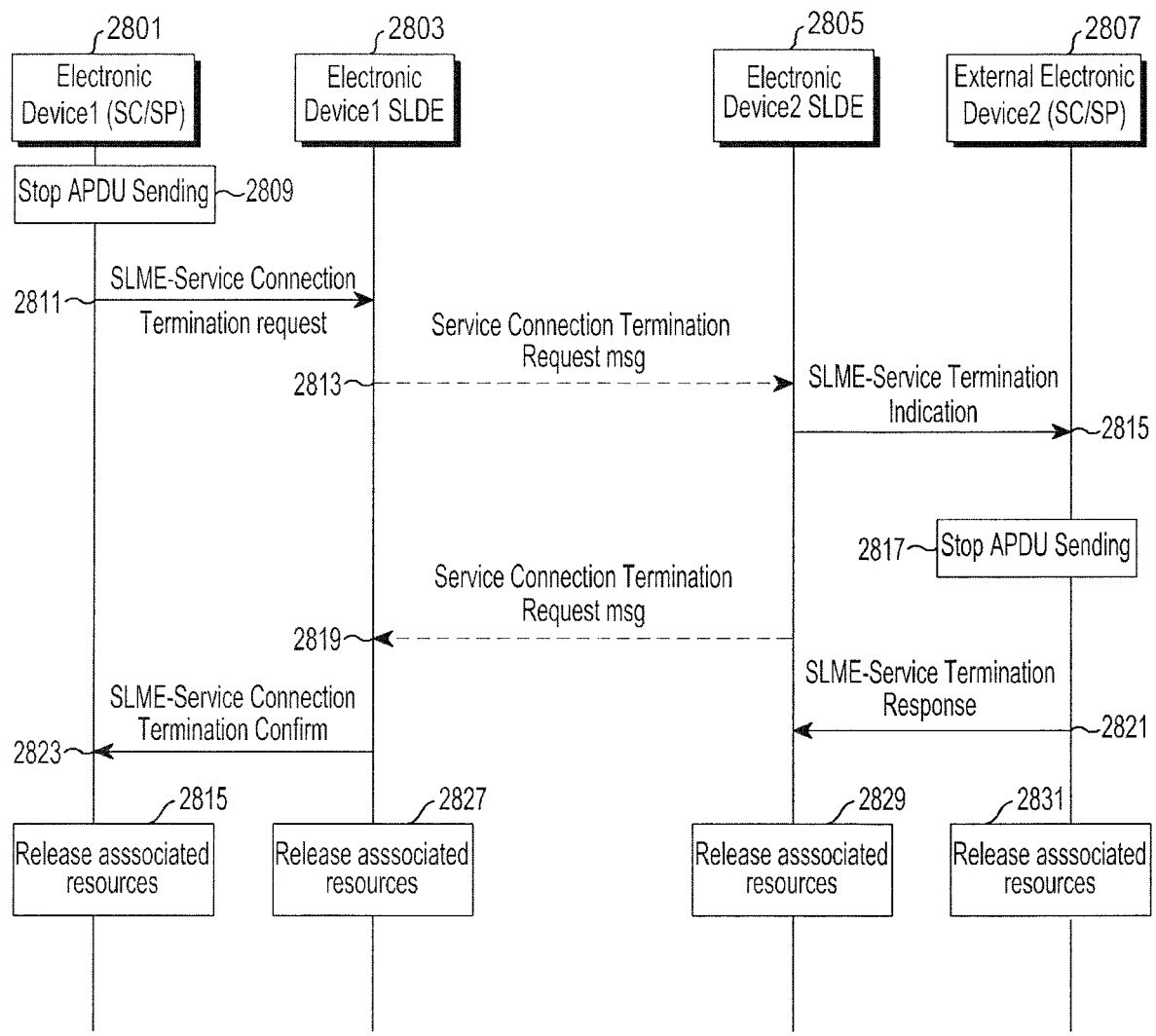
FIG. 28 illustrates a termination of communication between service agents according to an embodiment of the present disclosure.

FIG. 28 illustrates a termination of communication between service agents according to an embodiment of the present disclosure.

Referring to FIG. 28, if a service agent of a first electronic device and a service agent of a second electronic device are communicating over established service connections, then either of the service agents may invoke termination of the service connections between the service agents. The service agent invoking termination of the service connection may be a service provider or a service consumer in relation to the service connection to be terminated. A service agent may invoke termination of the service connection between the service agent and another service agent if the accessory service for which the service connection was established has been fulfilled. The service agent may invoke termination of the service connection if the purpose/desire associated with the communication between service agents over the service connection is fulfilled.

As illustrated in FIG. 28, a service agent 2801 of the first electronic device may communicate with a service agent 2807 of a second electronic device. According to various embodiments of the present disclosure, the service agent 2801 or the service agent 2807 may invoke termination of an existing service connection. According to various embodiments of the present disclosure, termination of the existing service connection may be initiated by the service agent that initiated establishing the service connection.

If the service agent 2801 wants to terminate an existing service connection, then the service agent 2801 may stop sending messages (e.g., data) 2809 over the channels associated with the service connection to be terminated.

The service agent 2801 may invoke termination of an existing service connection by sending a service connection termination request (e.g., SLME-ServiceConnectionTermination.request) 2811 to a session layer of the first electronic device. For example, the service agent 2801 may invoke termination of an existing service connection by sending the service connection termination request 2811 to a session layer management entity 2803 of the first electronic device. The service connection termination request 2811 may include a peer device identifier, a local service agent identifier, a remote service agent identifier, an ASP ID, and/or the like. According to various embodiments of the present disclosure, the service connection termination request 2811 may include the same information transmitted during the service connection creation (e.g., the same information as information included in message 2219 and/or message 2213). The peer device identifier may include an identifier of the device with which the service connection is to be terminated. For example, according to FIG. 28, the peer device identifier may correspond to the second electronic device on which the service agent 1807 resides.

If the session layer management entity 2803 receives a request to terminate a service connection, then the session layer management entity 2803 may communicate with a session layer management entity of the second electronic device on which the desired service agent resides. As an example, the session layer management entity 2803 may communicate with the session layer management entity of the peer electronic device identified in the service connection termination request 2811. According to various embodiments of the present disclosure, if the session layer management entity 2803 receives a service connection termination request 2811, then the session layer management entity 2803 may send a service connection termination request message (e.g., ServiceConnectionTerminationRequest) 2813 to a session layer management entity 2805 of the second electronic device. The service connection termination request message 2813 may include a service agent identifier such as an originating service agent identifier that identifies the service agent from which the request to terminate the service connection originated, a terminating service agent identifier that identifies the service agent with which termination of the service connection is desired, an ASP ID, and/or the like.

If the session layer management entity 2805 of the second electronic device receives the service connection termination request message 2813, then the session layer of the management entity may send to a service agent 2807 of the second electronic device an indication that a service agent on the first electronic device wants to terminate a service connection therewith. For example, the session layer management entity 2805 may send a service connection termination indication (e.g., SLME-ServiceConnectionTermination.indication) 2815 to the service agent 2807. The service connection creation indication 2815 may include a peer device identifier, a service agent identifier such as an originating service agent identifier that identifies the service agent from which the request to termination the service connection originated, a terminating service agent identifier that identifies the service agent with which termination of a service connection is desired, an ASP ID, and/or the like. The peer device identifier may identify the electronic device from which the request to terminate the service connection originated.

In response to receiving a service connection termination indication, a logical entity on the second electronic device may stop sending and/or receiving messages (e.g., data) 2817 over the channels associated with the service connection to be terminated. For example, in response to receiving a service connection termination indication, the service agent 2807 of the second electronic device may determine to terminate the service connection.

In response to receiving a service connection termination indication, a logical entity on the second electronic device, may remove the terminated service connection from a list of service connections relating to the logical entity. For example, in response to receiving a service connection termination indication, the service agent 2807 may remove the service connection (e.g., the one or more channels associated with the termination request) from a list of service connections for the service agent 2807.

Further, in response to receiving the service connection termination request message 2813 and/or to transmitting the service connection termination indication 2815, the session layer of the second electronic device may send a service connection termination request message (e.g., ServiceConnectionTerminationRequest.msg) 2819 to a session layer of the first electronic device. For example, the session layer management entity 2805 may send to the session layer management entity 2803 the service connection termination request message 2819.

In response to receiving the service termination indication 2815, the service agent 2807 may send to the session layer management entity 2805 a service termination response (e.g., SLME-ServiceTermination.response) 2821. After sending the service termination response 2821 and/or upon receiving the service termination indication 2815, the service agent 2807 may release the resources associated with the termination of the service connection (e.g., the channels associated with the termination request).

In response to receiving the service termination response 2821 and/or sending the service connection termination request message 2819, the session layer management entity 2805 may release the resources associated with the termination of the service connection (e.g., the channels associated with the termination request).

In response to receiving the service connection termination request message 2819, the session layer management entity 2803 may send to the service agent 2801 a service connection termination confirmation (e.g., SLME-ServiceConnectionTermination.Confirm) 2823.

In response to receiving the service connection termination request message 2819 and/or sending the service connection termination confirmation 2823, the session layer management entity 2803 may release the resources associated with the termination of the service connection (e.g., the channels associated with the termination request).

In response to receiving the service connection termination confirmation 2823, the service agent 2801 may release the resources associated with the termination of the service connection (e.g., the channels associated with the termination request).

According to various embodiments of the present disclosure, an accessory service profile defines an accessory service to enable an electronic device (e.g., an accessory) to provide and/or consume services relating to the accessory service. According to various embodiments of the present disclosure, an accessory service profile may be a template according to which an application may be developed to enable an electronic device and a peer electronic device to communicate. According to various embodiments of the present disclosure, the accessory service profile creates a standard according to which data communication for a service may be carried out. Accordingly, various electronic devices may communicate data for similar services that are defined to communicate according to characteristics in the applicable accessory service profile.

According to various embodiments of the present disclosure, every accessory service can be mapped to an accessory service profile.

According to various embodiments of the present disclosure, an accessory service profile includes a specification for communication of information relating to a service. According to various embodiments of the present disclosure, the accessory service profile provides a structure in relation to application attributes and network attributes. The accessory service profile may include an identifier (e.g., an ASP ID), an indication of a number of channels used in the service connection, a desired QoS (e.g., a QoS of the corresponding accessory service, a QoS of the service connection for the service, and/or the like), a message format (e.g., structure) for the various messages used in carrying out the service, an indication of channels over which a particular message may be communicated, an indication of which electronic device initiates the service connection therebetween, an indication of which electronic device initiates termination of the service connection therebetween, and/or the like.

In relation to the application attributes, the application service profile may define the applicable service, a structure of messages using an application protocol associated with the application service profile, message identifiers, and/or the like. In relation to the network attributes, the application service profile may define an ASP ID, a list of channels in the service connection, a list of channels to employ lazy setup, a description of a desired QoS for each channel, a message to channel mapping, a message format supported by each channel, a minimum bandwidth capability desired of the connectivity type, and/or the like.

The ASP ID identifies the accessory service profile. The ASP ID is a unique identification across all the varying accessory service profiles. The ASP ID may be 128 bits in size. The ASP ID may be a string.

The list of channels in the service connection may identify the channels that are to be setup and provided by the service connection. The list of channels corresponds to the channels over which messages related to the service are to be communicated. The service may communicate messages relating to the service over a subset of the list of channels.

The list of channels to employ lazy setup may identify the channels (e.g., by channel number) that may be setup at a later time (e.g., to add the channels to an already established service connection). According to various embodiments of the present disclosure, channels may be setup when the service connection is established, and/or channels may be setup when the channels are desired and thus added to an already established service connection.

The description of the desired QoS for each channel may identify a desired QoS for each channel. For example, each channel may be identified by a channel number. A QoS for each channel may be mapped to the corresponding channel. The description of the desired QoS may include a type value, a priority value, and a data rate value. Each of the type value, a priority value, and a data rate value may have a respective default value according to which the session layer selects a corresponding default value.

The message to channel mapping may identify the types of message that may be transported on each channel. For example, the message to channel mapping may provide a mapping of message identifiers to channel numbers.

The message format supported by each channel may provide an indication of the encoding formats of a message that is allowed on a channel. According to various embodiments of the present disclosure, a message may be encoded in binary format, JSON format, XML format, and/or the like. According to various embodiments of the present disclosure, a service agent using an accessory service profile may specify a message format from among a list of allowed formats that may be communicated over a given channel. According to various embodiments of the present disclosure, upon a service connection being established, the messages exchanged on a particular channel may be the same message format. For example, upon the service connection being established, all messages exchanged on the particular channel should be of the same message format (e.g., which was defined in the accessory service profile or selected by the service agent from among a list of allowable message formats).

The minimum bandwidth capability desired of the connectivity type may identify an expectation of a particular connectivity type over which communication for a service is carried out. The minimum bandwidth capability desired of the connectivity type may provide guidance to application developers as to which connectivity types may be ideal for running a desired service, which connectivity types may be unable to run the desired service, and/or the like.

According to various embodiments of the present disclosure, an accessory service profile may include a version identifier (e.g., a version value). The version identifier may track evolution of a specification for the accessory service profile. The use of versioning enables tracking of changes and/or enhancements to features of the accessory service profile. The use of versioning and, specifically, the version identifier may serve as a point of reference for certifying an implementation for compliance with an accessory service profile. The use of versioning, and specifically, the version identifier, may serve as a point of reference for determining compatibility and non-compatibility between implementations of a given accessory service profile. The version identifier may include two fields—a major version value and a minor version value. The major version value may have a size of 8 bits. The minor version value may have a size of 8 bits.

According to various embodiments of the present disclosure, an increment in the minor version value may be backwards compatible. For example, if the major version value is identical across two different versions of an accessory service profile, then the accessory service profile having a larger minor version value is backwards compatible with the accessory service profile having the smaller minor version value. The accessory service profile having the larger minor version value may be backwards compatible with the accessory service profile having the smaller minor version value by allowing the accessory service profile having the larger minor version value to function under the specification according to the accessory service profile having the smaller minor version value.

According to various embodiments of the present disclosure, an increment in the major version value may indicate that a major change and/or enhancement to the specification for the accessory service profile occurred in relation to an accessory service profile having a smaller major version value. For example, if the major version value is different across two different versions of an accessory service profile, then the two different versions of the accessory service profile may not be compatible. In other words, the version of the accessory service profile having the larger major version value may not be backwards compatible with the version of the accessory service profile having the smaller major version value.

According to various embodiments of the present disclosure, every implementation of a given accessory service profile may correspond to a distinct version of the given accessory service profile. For example, every service agent of a given accessory service profile may correspond to a distinct version of the accessory service profile.

According to various embodiments of the present disclosure, the accessory service profile to which an implementation corresponds may be made available to a capability discovery layer when the implementation registers therewith. For example, the specific accessory service profile (e.g., the specific version of the accessory service profile) to which a service agent corresponds may be made available to a capability discovery layer if the service agent registers with the capability discovery layer. The capability discovery layer may communicate the versioning information (e.g., the version identifier) of the applicable accessory service profile with other information relating to the service agent to interested service agents (e.g., on a peer electronic device). For example, during a capability exchange procedure between capability discovery layer on an electronic device and capability discovery layer on a peer electronic device, the capability discovery layer on the electronic device may communicate versioning information (e.g., the version identifier) of the applicable accessory service profile with other information relating to the service agent of the electronic device to the capability discovery layer on the peer electronic device.

According to various embodiments of the present disclosure, if two service agents are communicating to provide an accessory service, the service agents may configure communication to ensure compatibility. For example, the service agent compliant with an accessory service profile having a larger major version value or a higher minor version value may determine whether the service agent is compatible with the service agent compliant with an accessory service profile having a smaller major version value or a smaller minor version value. If the service agent with an accessory service profile having a larger major version value or a higher minor version value is compatible with the service agent is compatible with the service agent compliant with an accessory service profile having a smaller major version value or a smaller minor version value, then the service agent may configure communications thereof to be compatibly (e.g., configure for backwards compatibility if beneficial).

According to various embodiments of the present disclosure, an accessory service mapped to an accessory service profile may include an alarm service, a calendar service, a call service, a context service, a file transfer service, a music service, a notification service, and/or the like. As an example, a context service may include a service relating to contextual data of the user, the electronic device (e.g., providing the accessory service), and/or the like. The contextual service may correspond to a location-based data service, a fitness data service, and/or the like.

According to various embodiments of the present disclosure, an accessory service corresponding to a call service may enable a service provider implementing the call service to initiate a call (e.g., a telephone call), to communicate an alert relating to an incoming call or a status of a call (e.g., to a service consumer), to handle incoming calls (e.g., as requested by a service consumer), to provide a call log (e.g., to a service consumer either automatically or as requested by the service consumer), to delete a call log (e.g., either automatically or as requested by a service consumer), and/or the like.

According to various embodiments of the present disclosure, an accessory service corresponding to a call service may enable a service consumer implementing the call service to request to initiate a call (e.g., a telephone call), to receive an incoming call alert, to process an incoming call alert, to request to answer an incoming call, to reject an incoming call, to silence an incoming call, to request a call log, to request that a specific call log be deleted, and/or the like.

According to various embodiments of the present disclosure, an accessory service corresponding to an alarm service may enable a service provider implementing the alarm service to provide a list of alarms (e.g., to a service consumer either automatically or as requested by a service consumer), to provide data relating to an alarm (e.g., to a service consumer), to edit an alarm (e.g., according to a request from a service consumer), to provide an alert relating to an alarm (e.g., including data relating to an alarm ring, a snooze function, a time, and/or the like), to provide a status of an alarm (e.g., to a service consumer), to set an activation status of an alarm (e.g., according to a request from a service consumer), and/or the like.

According to various embodiments of the present disclosure, an accessory service corresponding to an alarm service may enable a service consumer implementing the alarm service to request a list of alarms (e.g., from a service provider), to request data relating to an alarm (e.g., from a service provider), to request an alarm action (e.g., from a service provider), to provide data relating to an editing of an alarm (e.g., to a service provider), to receive an alert relating to an alarm (e.g., including data relating to an alarm ring, a snooze function, a time, and/or the like), to receive a status of an alarm (e.g., from a service provider), to set an activation status of an alarm, and/or the like.

According to various embodiments of the present disclosure, an accessory service corresponding to a calendar service may enable a service provider implementing the calendar service to provide a list of calendar information (e.g., a number of event, a list of events, a status of events, and/or the like), to provide an alert (e.g., a notification) of a calendar event, to provide an alert of a calendar action, to dismiss an alert of a calendar event (e.g., in response to a request from a service consumer), to snooze an alert of a calendar event (e.g., in response to a request from a service consumer), to set a notification setting (e.g., in response to a request from a service consumer), to change (e.g., edit) a calendar event (e.g., in response to a request from a service consumer), to provide an indication of an upcoming calendar event (e.g., in response to a request from a service consumer), and/or the like.

According to various embodiments of the present disclosure, an accessory service corresponding to a calendar service may enable a service consumer implementing the calendar service to request calendar information, to receive a list of calendar information (e.g., a number of event, a list of events, a status of events, and/or the like), to receive an alert (e.g., a notification) of a calendar event, to receive an alert of a calendar action, to request to dismiss an alert of a calendar event, to request to snooze an alert of a calendar event, to request to set a notification setting, to request a change (e.g., edit) to a calendar event, to request an indication of an upcoming calendar event, and/or the like.

According to various embodiments of the present disclosure, an accessory service corresponding to a context service may enable a service provider implementing the context service to launch an application (e.g., in response to a request from a service consumer), to register an event (e.g., in response to a request from a service consumer), to unregister an event (e.g., in response to a request from a service consumer), to provide an indication of an event (e.g., to a service consumer), to register a motion (e.g., in response to a request from a service consumer), to unregister a motion (e.g., in response to a request from a service consumer), to provide an indication of a motion event (e.g., to a service consumer), and/or the like.

According to various embodiments of the present disclosure, an accessory service corresponding to a context service may enable a service consumer implementing the context service to request to launch an application, to request to register an event, to request to unregister an event, to receive an indication of an event, to request to register a motion, to request to unregister a motion, to receive an indication of a motion event, and/or the like.

According to various embodiments of the present disclosure, an accessory service corresponding to a file transfer service may enable a service provider implementing the file transfer service to setup a file transfer (e.g., in response to a request from a service consumer), to cancel a file transfer (e.g., in response to a request from a service consumer), to receive a file transfer progress, to provide an indication of whether a file transfer is complete, and/or the like.

According to various embodiments of the present disclosure, an accessory service corresponding to a file transfer service may enable a service consumer implementing the file transfer service to request to setup a file transfer, to request to cancel a file transfer, to provide an indication of a file transfer progress, to receive an indication of whether a file transfer is complete, and/or the like.

According to various embodiments of the present disclosure, an accessory service corresponding to a music service may enable a service provider implementing the music service to receive a request relating to a remote control function (e.g., from a service consumer), to provide information relating to a music attribute (e.g., in response to a service consumer), to set a music attribute (e.g., in response to a service consumer), to provide information relating to a sound path (e.g., in response to a service consumer), to set a sound path (e.g., in response to a service consumer), to change a media (e.g., in response to a service consumer), to provide an indication of a change to the media, to control a music function, and/or the like.

According to various embodiments of the present disclosure, an accessory service corresponding to a music service may enable a service consumer implementing the music service to send a request relating to a remote control function, to receive information relating to a music attribute, to request to set a music attribute, to receive information relating to a sound path, to request to set a sound path, to request to change a media, to receive an indication of a change to the media, to request to control a music function, and/or the like.

According to various embodiments of the present disclosure, an accessory service corresponding to a notification service may enable a service provider implementing the notification service to provide an indication relating to a received notification, to configure a notification setting (e.g., in response to a request from a service consumer), to launch a notification (e.g., in response to a request from a service consumer), to receive an indication of an update to a notification, to provide an indication that a notification was checked, to receive an indication of whether a notification is synchronized, to provide an indication relating to synchronization of a notification, and/or the like.

According to various embodiments of the present disclosure, an accessory service corresponding to a notification service may enable a service consumer implementing the notification service to receive an indication relating to a received notification, to request to configure a notification setting, to request to launch a notification, to provide an indication of an update to a notification, to receive an indication that a notification was checked, to provide an indication of whether a notification is synchronized, to receive an indication relating to synchronization of a notification, and/or the like.

Figure 29:
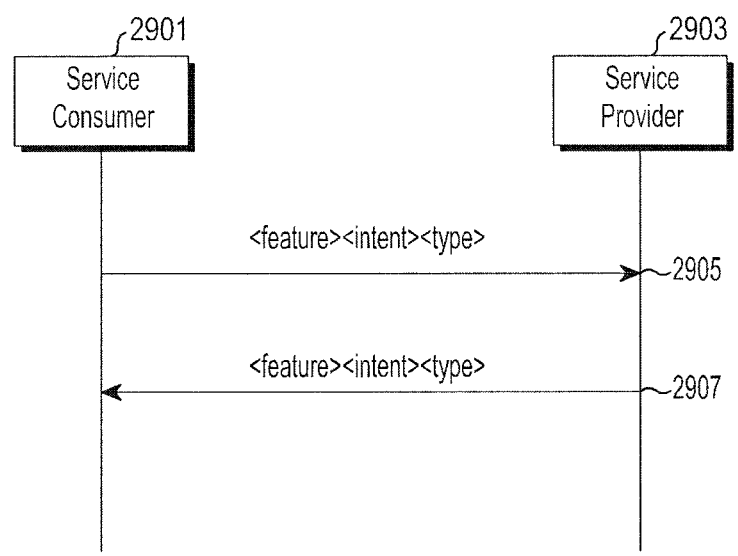
FIG. 29 illustrates a message exchange between service agents according to an embodiment of the present disclosure.

FIG. 29 illustrates a message exchange between service agents according to an embodiment of the present disclosure.

Referring to FIG. 29, a service consumer 2901 communicates with a service provider 2903. The service consumer 2901 and the service provider 2903 may communicate regarding an accessory service in accordance with a corresponding accessory service profile. The corresponding accessory service profile may define a format for messages exchanged between the service consumer 2901 and the service provider 2903 relating to the accessory service.

As illustrated in FIG. 29, the service consumer 2901 may send a message 2905 to the service provider 2903. Similarly, the service provider 2903 may send a message 2907 to the service consumer 2901. Message identifiers for the message 2905 and the message 2907 may be configured in accordance with the accessory service profile to which the accessory service is mapped. According to various embodiments of the present disclosure, the accessory service profile may define a structure of a message identifier that includes an indication of a feature, an intent, a type, and/or the like.

Figure 30:
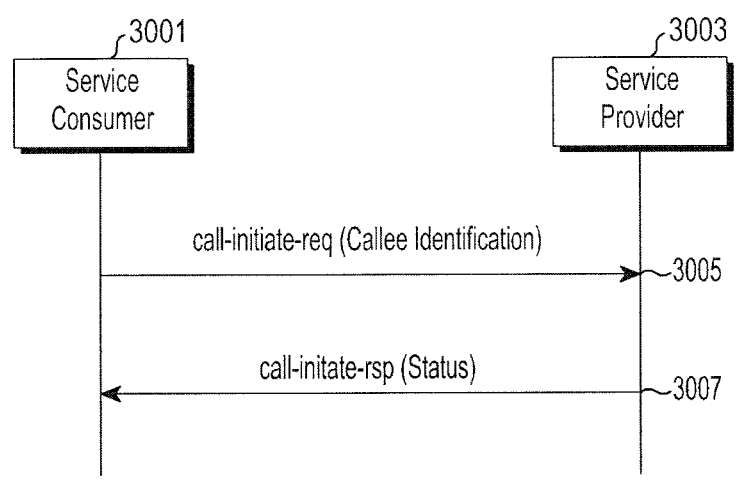
FIG. 30 illustrates a message exchange between service agents according to an embodiment of the present disclosure.

FIG. 30 illustrates a message exchange between service agents according to an embodiment of the present disclosure.

Referring to FIG. 30, a service consumer 3001 communicates with a service provider 3003. The service consumer 3001 and the service provider 3003 may communicate regarding an accessory service in accordance with a corresponding accessory service profile. As illustrated in FIG. 30, the accessory service relates to a call service.

The service consumer 3001 may send a message (e.g., call-initiate-req) 3005 to the service provider 3003. The message 3005 may be configured according to a format defined by the applicable accessory service profile. The message 3005 may correspond to a request to initiate a call according to the call service. As a result, the message identifier may correspond to call-initiate-req such that the service provider 3003 may determine how to process the message 3005 and what actions to take upon receipt of the message 3005. The message identifier may indicate that the accessory service relates to a call service, that the purpose of the message is to initiate a call, and that the type of message is a request (e.g., that a response to the message is expected). The message 3005 may include the callee identification identifying the contact or address thereof of an intended recipient of the desired call.

In response to the message 3005, the service provider 3003 may send a response message (call-initiate-rsp) 3007 to the service consumer 3001. The response message 3007 may be configured according to a format defined by the applicable accessory service profile. The response message 3007 may include a status of the requested call, and/or the like.

Figure 31:
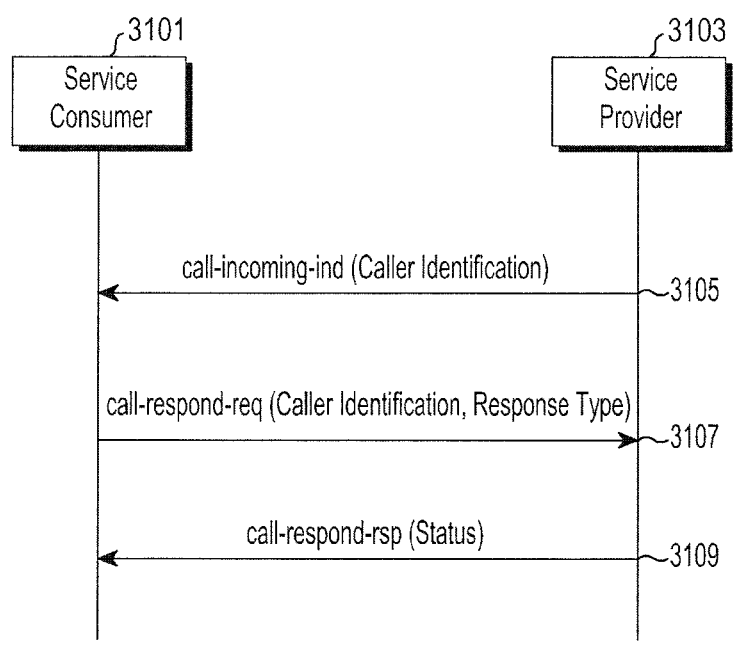
FIG. 31 illustrates a message exchange between service agents according to an embodiment of the present disclosure.

FIG. 31 illustrates a message exchange between service agents according to an embodiment of the present disclosure.

Referring to FIG. 31, a service consumer 3101 communicates with a service provider 3103. The service consumer 3101 and the service provider 3103 may communicate regarding an accessory service in accordance with a corresponding accessory service profile. As illustrated in FIG. 31, the accessory service relates to a call service.

The service provider 3103 may send an indication of an incoming call (e.g., call-incoming-ind) 3105 to the service consumer 3101. The indication of the incoming call 3105 may be configured according to a format defined by the applicable accessory service profile. The indication of the incoming call 3105 may include an indication of a caller identification.

The service consumer 3101 may send a call response request (e.g., call-respond-req) 3107 to the service provider 3003. The call response request 3107 may be configured according to a format defined by the applicable accessory service profile. The call response request 3107 may correspond to a request for responding to an incoming call. For example, the call response request 3107 may correspond to a request to answer the incoming call, reject the incoming call, silence the incoming call, and/or the like. As a result, the call response request 3107 may include an indication of the response type that the service consumer 3101 requests the service provider 3103 to take. Using the message identifier, the service provider 3103 may determine how to process the call response request 3107 and using the information relating to the response type, the service provider 3103 may determine the actions to take upon receipt of the call response request 3107.

In response to the call response request 3107, the service provider 3103 may send a response message (call-respond-rsp) 3109 to the service consumer 3101. The response message 3109 may be configured a format defined by the applicable accessory service profile. The response message 3109 may include a status of the response to the incoming call.

Figure 32:
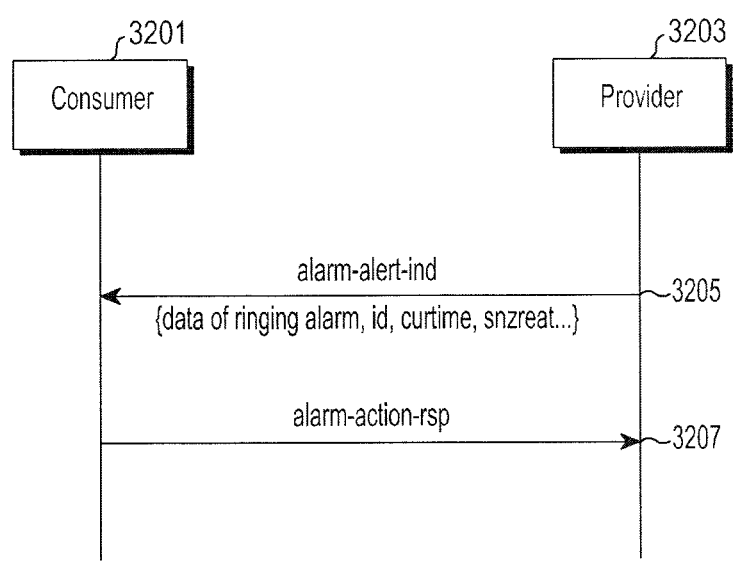
FIG. 32 illustrates a message exchange between service agents according to an embodiment of the present disclosure.

FIG. 32 illustrates a message exchange between service agents according to an embodiment of the present disclosure.

Referring to FIG. 32, a service consumer 3201 communicates with a service provider 3203. The service consumer 3201 and the service provider 3203 may communicate regarding an accessory service in accordance with a corresponding accessory service profile. As illustrated in FIG. 32, the accessory service relates to an alarm service.

The service provider 3203 may send an indication of an alarm alert (e.g., alarm-alert-ind) 3205 to the service consumer 3201. The indication of the alarm alert 3205 may be configured according to a format defined by the applicable accessory service profile. The indication of the alarm alert 3205 may include an indication of an alarm that is ringing, data relating to the alarm, information relating to a snooze of the alarm, and/or the like.

In response to the indication of the alarm alert 3205, the service consumer 3201 may send a response message (alarm-action-rsp) 3207 to the service provider 3203. The response message 3207 may be configured according to a format defined by the applicable accessory service profile.

The response message 3207 may indicate a desired action, and/or the like. For example, the response message 3207 may include an action which the service consumer 3201 wants to the service provider 3203 to perform in relation to the alarm that is ringing.

Figure 33:
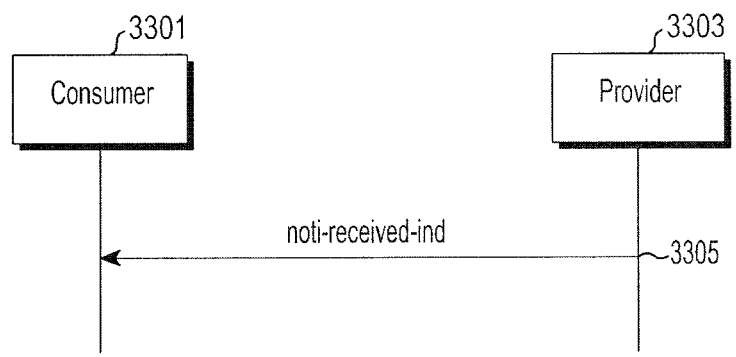
FIG. 33 illustrates a message exchange between service agents according to an embodiment of the present disclosure.

FIG. 33 illustrates a message exchange between service agents according to an embodiment of the present disclosure.

Referring to FIG. 33, a service consumer 3301 communicates with a service provider 3303. The service consumer 3301 and the service provider 3303 may communicate regarding an accessory service in accordance with a corresponding accessory service profile. As illustrated in FIG. 33, the accessory service relates to a notification service.

The service provider 3303 may send an indication of a received notification (e.g., noti-received-ind) 3305 to the service consumer 3301. The indication of the received notification 3305 may be configured according to a format defined by the applicable accessory service profile. The indication of the received notification 3305 may include an information relating to the received notification, and/or the like. For example, the information relating to the received notification that may be included with the indication of the received notification 3305 may include sufficient information to enable the service consumer 3301 to determine whether to take action in relation to the notification (e.g., to request the service provider 3303 to send a response, and/or the like).

Figure 34:
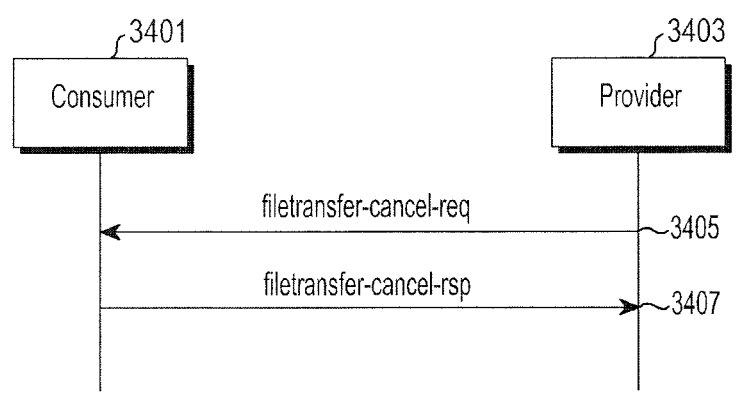
FIG. 34 illustrates a message exchange between service agents according to an embodiment of the present disclosure.

FIG. 34 illustrates a message exchange between service agents according to an embodiment of the present disclosure.

Referring to FIG. 34, a service consumer 3401 communicates with a service provider 3403. The service consumer 3401 and the service provider 3403 may communicate regarding an accessory service in accordance with a corresponding accessory service profile. As illustrated in FIG. 34, the accessory service relates to a file transfer service.

The service provider 3403 may send a request (e.g., filetransfer-cancel-req) 3405 to the service consumer 3401. The request 3405 may be configured according to a format defined by the applicable accessory service profile. The request 3405 may correspond to a request to cancel a file transfer. As a result, the message identifier may correspond to filetransfer-cancel-req such that the service consumer 3401 may determine how to process the request 3405 and what action to take upon receipt of the request 3405. The message identifier may indicate that the accessory service relates to a file transfer service, that the purpose of the message is to cancel a file transfer, and that the type of message is a request (e.g., that a response to the message is expected).

In response to the request 3405, the service consumer 3401 may send a response message (filetransfer-cancel-req) 3407 to the service provider 3403. The response message 3407 may be configured according to a format defined by the applicable accessory service profile. The response message 3407 may include a status of the file transfer (e.g., a status of the cancellation of the file transfer), and/or the like.

F. SERVICE DISCOVERY/CAPABILITY EXCHANGE

According to various embodiments of the present disclosure, an electronic device and a peer electronic device can exchange respective capabilities. For example, the capability exchange between an electronic device and a peer electronic device may relate to the exchange of capabilities of application programs on connected electronic devices. Capability exchange between electronic devices enables peer electronic devices (e.g., the applications on the peer electronic devices) to discover or identify the capabilities of other peer electronic devices.

According to various embodiments of the present disclosure, capability exchange may include the protocol and/or procedure according to which application programs (e.g., application layer entities and corresponding supported service capabilities such as service agents) are communicated across peer electronic devices. For example, the capability exchange may include the protocol and/or procedure according to which application programs of an electronic device and the capabilities thereof are advertised to and/or discovered by a peer electronic device.

Capability exchange across peer electronic devices enables electronic devices having different configurations to communicate and provide services. For example, capability exchange enables peer electronic devices having a different feature set (e.g., supporting different subsets of features and/or having different applications respectively loaded thereon) to communicate and provide services. Accordingly, capability exchange across peer electronic devices enables a peer electronic device to leverage functions and/or capabilities of an electronic device to which the peer electronic device is connected. An electronic device may provide access to functions and/or capabilities thereof to a peer electronic device to which the electronic device is connected. In addition, the electronic device may provide access to functions and/or capabilities that are newly added thereto to a peer electronic device (e.g., when a new application or capability is installed on the electronic device).

As discussed above regarding FIG. 10, a first electronic device 1001 may communicate with the second electronic device 1003. The first electronic device 1001 and the second electronic device 1003 may use the capability exchange protocol 1041 to communicate therebetween capabilities of at least one of the first electronic device 1001 or the second electronic device 1003. In particular, the first electronic device 1001 and the second electronic device 1003 may communicate the capabilities between the capability exchange 1039 of the first electronic device 1001 and the capability exchange 1043 of the second electronic device 1003.

As another illustration, referring to FIG. 19, the first electronic device 1901 and the second electronic device 1903 may communicate capabilities between the capability discovery layer 1916 of the first electronic device 1901 and the capability discovery layer 1925 of the second electronic device 1903. The capability discovery layer 191 and the capability discovery layer 1925 may communicate capabilities that are respectively registered therewith. For example, the capability exchange protocol may be encapsulated in the capability discovery layer.

According to various embodiments of the present disclosure, an application layer entity on an electronic device may use the functionality (e.g., services) of a capability discovery layer to advertise itself and/or capabilities thereof to an application layer entity on a peer electronic device. Conversely, an application layer entity on an electronic device may use the functionality (e.g., services) of the capability discovery layer to discover application layer entities of interest (e.g., or capabilities or services of interest) on a peer electronic device.

The capability discovery layer may leverage a session layer to achieve the functionality of the capability discovery layer. For example, the capability discovery layer may communicate with the session layer to create a service connection with a capability discovery layer of another capability discovery layer (e.g., a capability discovery layer of a peer electronic device). If a service connection is established for capability exchange between an electronic device and a peer electronic device, then the capability discovery layer of the electronic device and the capability exchange of the peer electronic device may perform capability exchange over the service connection.

The capability discovery layer may register with the session layer in order to facilitate capability exchange. For example, the capability discovery layer may register with the session layer to be able to accept (e.g., receive) incoming service connection creation requests from new peer electronic devices. As another example, the capability discovery layer may register with the session layer to be able to receive notifications about new peer electronic devices.

As illustrated in FIG. 9, the capability exchange entity 915 (e.g., the capability discovery layer) may use the session layer service access point 911 to leverage the session layer to establish a service connection with a peer electronic device for capability exchange. The capability discovery layer may use the session layer service access point to communicate messages over a channel provided by the service connection. The messages communicated between an electronic device and a peer electronic device in relation to capability exchange may be configured in accordance with a capability exchange protocol.

According to various embodiments of the present disclosure, the capability discovery layer may initiate establishment of a service connection whenever the capability discovery layer queries a peer electronic device. The capability discovery layer may initiate establishment of a service connection whenever the capability discovery layer is to notify a peer electronic device of a change in registered application layer entities and/or service capabilities thereof.

According to various embodiments of the present disclosure, the service connection established for capability exchange may be maintained and used for capability exchange until the peer electronic device is no longer connected to the electronic device.

The capability exchange entity 915 may receive notifications of newly added and/or authenticated peer electronic devices through the session layer service access point 911. For example, if a peer electronic device is newly connected to the electronic device 901 and/or if a peer electronic device is newly authenticated by the electronic device 901, then the capability exchange entity 915 may use the session layer service access point 911 to receive notifications of such connection and/or authentication.

According to various embodiments of the present disclosure, the capability discovery layer may receive registration from application layer entities. For example, the capability discovery layer may allow an application layer entity to register an identity and/or service capabilities thereof with the capability discovery layer. Conversely, the capability discovery layer may allow an application layer entity to de-register the identity and/or service capabilities (or subset of service capabilities) with the capability discovery layer.

As illustrated in FIG. 14, an application layer entity 1402 may communicate with the capability discovery layer 1409 using the capability discovery service access point 1411. The capability discovery service access point 1411 may enable the application layer entity 1402 to register with the capability discovery layer 1409. For example, the capability discovery service access point 1411 may enable the application layer entity 1402 to register service capabilities thereof (e.g., using the application layer entity identifier associated with the application layer entity 1402) with the capability discovery layer 1409. The application layer entity 1402 may use the capability discovery service access point 1411 to communicate with the capability discovery layer 1409 to obtain a list of application layer entity identifiers identifying application layer entities of peer electronic devices that provide a desired service. The application layer entity 1402 may use the capability discovery service access point 1411 to instruct or request the capability discovery layer 1409 to receive incremental updates of capabilities of a peer electronic device. The application layer entity 1402 may use the capability discovery service access point 1411 to instruct or request the capability discovery layer 1409 to automatically perform a persistent capability query to a new peer electronic device (e.g., such that the capability discovery layer may continually identify application layer entities on peer electronic devices that perform the desired service).

As discussed above, the capability discovery layer of an electronic device may communicate and/or advertise capabilities of the electronic device. In particular, the capability discovery layer may communicate and/or advertise capabilities of the electronic device that are registered with the capability discovery layer. For example, the capability discovery layer may communicate and/or advertise application layer entities and/or service capabilities thereof that are registered with the capability discovery layer. According to various embodiments of the present disclosure, the capability discovery layer may maintain a list of registered application layer entities and/or service capabilities thereof. The capability discovery layer may maintain a list of local registered application layer entities. As an example, the capability discovery layer may maintain an application layer entity registration database. The application layer registration database may correspond to a repository that includes an identity and capability information of an application layer entity that has registered with the corresponding capability discovery layer. For example, the application layer registration database may include identity and capability information of application layer entities that are currently registered with the corresponding capability discovery layer.

The capability discovery layer of an electronic device may receive queries from peer electronic devices. The queries may include requests for information relating to capabilities of the electronic device. The capability discovery layer may respond to a query from a peer electronic device with information relating to locally registered application layer entities.

The capability discovery layer of an electronic device may notify a peer electronic device of a change in registrations of application layer entities or service capabilities thereof. For example, the capability discovery layer may notify a peer electronic device of a change in the list of registered application layer entities. A change in registrations of application layer entities may be a result of a new registration of an application layer entity or a de-registration of a previously registered application layer entity. A change in registrations of application layer entities or service capabilities thereof may be a result of the electronic device installing a new application, upgrading an existing application, and/or the like. If a change in registrations of application layer entities or service capabilities thereof occurs, then the capability discovery layer may communicate an entire list of currently registered application layer entities and/or service capabilities thereof, or the capability discovery layer may communicate to the peer electronic device a difference between a currently list of registered application layer entities and/or service capabilities thereof and a previous list of registered application layer entities and/or service capabilities thereof that was communicated to the peer electronic device (e.g., the capability discovery layer may communicate the "delta" between registered application layer entities or service capabilities thereof over a period of time).

According to various embodiments of the present disclosure, a capability discovery layer of an electronic device may receive a query with a filter for application layer entities and/or service capabilities thereof. The query with a filter may correspond to a request from a peer electronic device for a specific set of application layer entities and/or service capabilities thereof, a specific set of a type of application layer entities and/or service capabilities thereof, and/or the like. If the capability discovery layer receives a query with a filter, then the capability discovery layer may respond to such a query with a list of application layer entities or service capabilities thereof that satisfy the filter. The capability discovery layer may communicate and/or advertise a filtered set of application layer entities and/or service capabilities thereof that satisfy a particular query. For example, if the capability discovery layer receives a query for a list of application layer entities and/or service capabilities thereof that may provide a messaging service, then the capability discovery layer may identify and/or filter the currently registered application layer entities and/or service capabilities thereof that may provide a messaging service, and communicate such application layer entities and/or service capabilities thereof to the peer electronic device.

According to various embodiments of the present disclosure, an electronic device may leverage a capability discovery layer thereof to discover application layer entities and/or service capabilities thereof on peer electronic devices. The capability discovery layer may query a peer electronic device for a list of application layer entities and/or service capabilities thereof. The query may be a filtered request for a specific set of application layer entities and/or service capabilities thereof, a specific set of a type of application layer entities and/or service capabilities thereof, and/or the like.

According to various embodiments of the present disclosure, a capability discovery layer of an electronic device may maintain a list of application layer entities and/or service capabilities thereof of peer electronic devices to which the electronic device is connected, peer electronic devices to which the electronic device was previously connected, and/or the like. As an example, the capability discovery layer may maintain a peer electronic device application layer entity database. The peer electronic device application layer entity database may correspond to a repository that includes an identity and capability information of application layer entities on a peer electronic device. The capability discovery layer may populate the peer electronic device application layer entity database with information received during capability exchange between the electronic device and a peer electronic device.

According to various embodiments of the present disclosure, the capability discovery layer may keep the list of application layer entities and/or service capabilities thereof of a peer electronic device by querying the peer electronic device when the capability discovery layer receives a request from an application layer entity on the electronic device. According to various embodiments of the present disclosure, the capability discovery layer may keep the list of application layer entities and/or service capabilities thereof of a peer electronic device by receiving capability updates from peer electronic devices.

According to various embodiments of the present disclosure, capability exchange may include a capability exchange protocol which defines a protocol by which an electronic device and a peer electronic device may communicate with each other in order to exchange capabilities. For example, the capability exchange protocol may define a protocol by which a capability discovery layer of an electronic device communicates with a capability discovery layer of a peer electronic device in order to exchange information about application layer entities respectively registered therewith and/or service capabilities of such application layer entities.

According to various embodiments of the present disclosure, capability exchange between a capability discovery layer of an electronic device and a capability discovery layer of a peer electronic device may include a query requesting a list of application layer entities and/or service capabilities thereof. For example, the capability discovery layer of the electronic device may query the capability discovery layer of the peer electronic device for a list of application layer entities registered therewith and/or service capabilities thereof.

According to various embodiments of the present disclosure, the capability exchange protocol may define the queries relating to capability exchange between an electronic device and a peer electronic device. The capability exchange protocol may define behavior of an electronic device and/or peer electronic device during capability exchange. For example, the capability exchange protocol may define a normal query behavior. As another example, the capability exchange protocol may define a persistent query behavior. According to various embodiments of the present disclosure, capability exchange behavior (e.g., normal query behavior, persistent query behavior, and/or the like) may be set according to a request from an application layer entity for service capabilities of a peer electronic device. For example, the capability exchange behavior may be set according to a request received by a capability discovery layer of an electronic device from an application layer entity thereof for service capabilities of application layer entities on a peer electronic device.

According to various embodiments of the present disclosure, the normal query behavior may relate to a capability exchange according to which a capability discovery layer of an electronic device queries (e.g., via a message exchange) a peer electronic device to discover (e.g., learn) application layer entities registered therewith and/or service capabilities thereof. According to various embodiments of the present disclosure, according to the normal query behavior, if an electronic device wants an update on the application layer entities registered with the peer electronic device and/or service capabilities thereof, then the electronic device may repeat a query with the peer electronic device for application layer entities registered therewith and/or service capabilities thereof. As an example, in order for an electronic device to discover application layer entities subsequently registered with the peer electronic device, the electronic device may repeat a query for application layer entities registered with the peer electronic device and/or service capabilities thereof. According to normal query behavior, updates to the peer electronic device may not be communicated to the electronic device using a push scheme. Rather, the electronic device may repeat capability exchange queries to receive updated information relating to capabilities of the peer electronic device. According to various embodiments of the present disclosure, the normal query behavior may include a 1:1 query to query response message ratio (e.g., which may be distinguished from a persistent query behavior which may have multiple response messages for each query message).

According to various embodiments of the present disclosure, the persistent query behavior may relate to a capability exchange according to which a capability discovery layer of an electronic device queries (e.g., via message exchange), a peer electronic device to discover (e.g., learn) application layer entities registered therewith and/or service capabilities thereof. The peer electronic device queried by the capability exchange layer of the electronic device may perform incremental capability update (e.g., via another message exchange). For example, the peer electronic device queried by the electronic device may communicate incremental capability update if application layer entities registered therewith and/or service capabilities thereof is changed (e.g., since the most recent capability exchange or capability update). According to various embodiments of the present disclosure, if an electronic device and peer electronic device perform capability exchange according to a persistent query behavior, then the peer electronic device may continue to update the electronic device with a change in capabilities of the peer electronic device. The peer electronic device may update the electronic device with a capability update at predefined time intervals, as the capabilities of the peer electronic device (e.g., capabilities of the registered application layer entities) are updated, and/or the like.

According to various embodiments of the present disclosure, an electronic device may automatically query a newly connected peer electronic device. For example, if a new peer electronic device is connected to the electronic device, then the electronic device may automatically query the new peer electronic device for service capabilities (e.g., a list of application layer entities registered therewith and/or service capabilities thereof). As another example, if a peer electronic device is reconnected to the electronic device (e.g., after having been disconnected for a period of time), then the electronic device may automatically query the peer electronic device for an update of service capabilities. According to various embodiments of the present disclosure, the electronic device may automatically query a newly connected peer electronic device or a reconnected electronic device without being prompted by an application layer entity on the electronic device. For example, the capability discovery layer of the electronic device may automatically query a newly connected peer electronic device or a reconnected electronic device based on receipt of a notification from the session layer of the electronic device that a new peer electronic device is connected and/or that a peer electronic device is reconnected.

According to various embodiments of the present disclosure, an electronic device may dynamically update and/or sync capabilities of the electronic device with a peer electronic device (e.g., a peer electronic device connected to the electronic device). For example, when a new application is installed to a peer electronic device connected to the electronic device, then the peer electronic device may send a message that updates the electronic device with the new set of service capabilities (or simply the delta new or incremental update of service capabilities) of the peer electronic device. The new set of service capabilities (or the delta new or incremental update of service capabilities) may be pushed to the electronic device.

According to various embodiments of the present disclosure, the capability discovery layer may include an entity for enabling application layer entity registration. The entity for enabling application layer entity registration may include or otherwise use a service access point with which services thereof may be accessed. For example, if an application layer entity wants to register with the capability discovery layer, then the application layer entity may register with the entity for enabling application layer entity registration using the corresponding service access point.

According to various embodiments of the present disclosure, the capability discovery layer may include an entity for enabling application layer entity capability querying. The entity for enabling application layer entity capability querying may include or otherwise use a service access point with which services thereof may be accessed. For example, if an application layer entity wants to discover an application layer entity on a peer electronic device that performs a desired service, then the application layer entity may query application layer entity capability using the corresponding service access point.

According to various embodiments of the present disclosure, if an application layer entity wants to advertise capabilities thereof, then the application layer entity may register with the capability discovery layer. For example, if an application layer entity wants to inform peer electronic devices of service capabilities of the application layer entity that may be leveraged (e.g., of accessory services that the application layer entity may provide and/or consume), then the application layer entity may register with the capability discovery layer of the electronic device.

Figure 35:
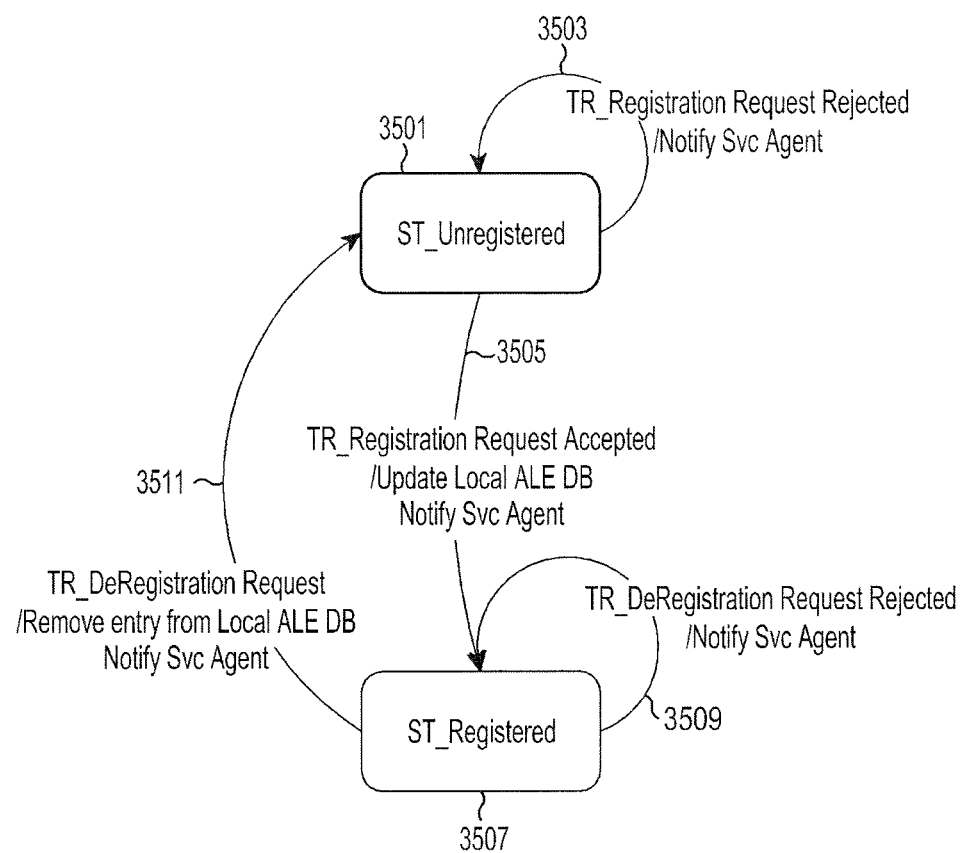
FIG. 35 illustrates a state diagram of registration of an application layer entity according to an embodiment of the present disclosure.

FIG. 35 illustrates a state diagram of registration of an application layer entity according to an embodiment of the present disclosure.

Referring to FIG. 35, an application layer entity of an electronic device may be in an unregistered state 3501 according to which the application layer entity is not registered with a capability discovery layer of the electronic device. The unregistered state 3501 may be the default state of an application layer entity. For example, a newly installed application layer entity may initialize in the unregistered state 3501.

If the application layer entity (or service agent thereof) wants to register with the capability discovery layer, then the application layer entity may communicate a request to register with the capability discovery layer.

If the request to register with the capability discovery layer is rejected, then the application layer entity may receive a message indicating that the request to register with the capability discovery layer is rejected. For example, if the capability discovery layer rejects the request for the application layer entity to register with the capability discovery layer, then the capability discovery layer may communicate a message (or otherwise inform) the application layer entity that the request to register with the capability discovery layer is rejected. The application layer entity may remain in the unregistered state 3501 as illustrated by the state transition arrow 3503. If the request to register with the capability discovery layer is rejected, then the corresponding service agent may be notified of the rejection of the request to register with the capability discovery layer.

If the request to register with the capability discovery layer is accepted, then the application layer entity may receive a message indicating that the request to register with the capability discovery layer is accepted. For example, if the capability discovery layer accepts the request for the application layer entity to register with the capability discovery layer, then the capability discovery layer may communicate a message to (or otherwise inform) the application layer entity that the request to register with the capability discovery layer is accepted. If the request to register with the capability discovery layer is accepted, then the corresponding service agent may be notified of the acceptance of the request to register with the capability discovery layer. If the request to register with the capability discovery layer is accepted, then the application layer registration database may be updated. For example, the capability discovery layer may update the application layer registration database if the request to register with the capability discovery layer is accepted. The capability discovery layer may update the application layer registration database with information relating to the application layer entity for which the request to register with the capability discovery layer is accepted. For example, the capability discovery layer may update or otherwise include in a list of registered application layer entities and/or service capabilities thereof the application layer entity for which the request to register with the capability discovery layer is accepted.

If the request to register with the capability discovery layer is accepted, then the application layer entity may transition to a registered state 3507. If the application layer entity is in the registered state 3507, the application layer entity (or applicable service agent thereof) is registered with the capability discovery layer. As illustrated in FIG. 35, if the request to register with the capability discovery layer is accepted, then the application layer entity may transition to the registered state 3507 as illustrated by the state transition arrow 3505.

If the application layer entity is in the registered state 3507 and the application layer wants to de-register from the capability discovery layer, then the application layer entity may communicate a request to de-register from the capability discovery layer.

If the request to de-register from the capability discovery layer is rejected, then the application layer entity may receive a message indicating that the request to de-register from the capability discovery layer is rejected. For example, if the capability discovery layer rejects the request for the application layer entity to de-register from the capability discovery layer, then the capability discovery layer may communicate a message to (or otherwise inform) the application layer entity that the request to de-register from the capability discovery layer is rejected. The application layer entity may remain in the registered state 3507 as illustrated by the state transition arrow 3509. If the request to de-register from the capability discovery layer is rejected, then the corresponding service agent may be notified of the rejection of the request to de-register from the capability discovery layer.

If the request to de-register from the capability discovery layer is accepted, then the application layer entity may receive a message indicating that the request to de-register from the capability discovery layer is accepted. For example, if the capability discovery layer accepts the request for the application layer entity to de-register from the capability discovery layer, then the capability discovery layer may communicate a message to (or otherwise inform) the application layer entity that the request to de-register from the capability discovery layer is accepted. If the request to de-register from the capability discovery layer is accepted, then the corresponding service agent may be notified of the acceptance of the request to de-register from the capability discovery layer. If the request to de-register from the capability discovery layer is accepted, then the application layer registration database may be updated. For example, the capability discovery layer may update the application layer registration database if the request to de-register from the capability discovery layer is accepted. The capability discovery layer may update the application layer registration database to remove (or otherwise modify) information relating to the application layer entity for which the request to de-register from the capability discovery layer is accepted. For example, the capability discovery layer may update or otherwise remove from a list of registered application layer entities and/or service capabilities thereof the application layer entity for which the request to de-register from the capability discovery layer is accepted.

If the request to de-register from the capability discovery layer is accepted, then the application layer entity may transition to the unregistered state 3501. As illustrated in FIG. 35, if the request to de-register from the capability discovery layer is accepted, then the application layer entity may transition to the unregistered state 3501 as illustrated by the state transition arrow 3511.

Figure 36:
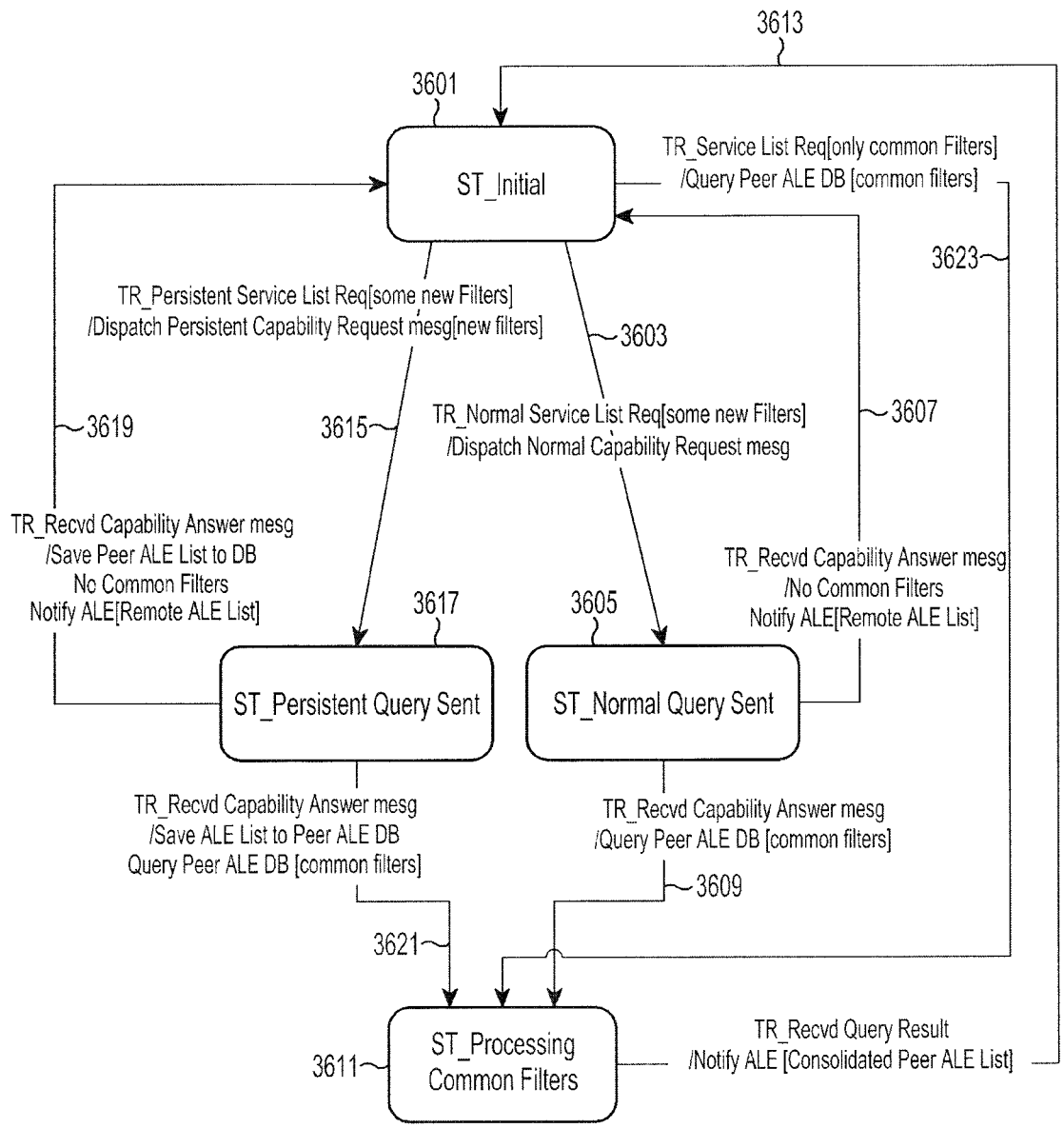
FIG. 36 illustrates a state diagram of a capability query according to an embodiment of the present disclosure.

FIG. 36 illustrates a state diagram of a capability query according to an embodiment of the present disclosure.

Referring to FIG. 36, the query state of a capability discovery layer in relation to a specific query may be in an initial state 3601 according to the specific query is not awaiting a response.

As illustrated by state transition arrow 3603, the capability discovery layer of an electronic device may receive a service list request according to a normal query. The service list may include an indication that the request corresponds to a normal query according to normal query behavior defined by the applicable capability exchange protocol. For example, the capability discovery layer may receive a service list request according to a normal query from an application layer entity. The service list request according to a normal query may include a service list that may identify the desired services that the application layer entity desires. For example, the service list request according to a normal query may include a new filter of desired services. If the capability discovery layer receives the service list request according to a normal query, then the capability discovery layer may communicate a capability request (e.g., a normal capability request message) to a peer electronic device. For example, the capability discovery layer may communicate the capability request to a capability discovery layer of the peer electronic device. The capability discovery layer may communicate the capability request to the peer electronic device upon receipt of the service list request. The capability discovery layer may communicate that the capability request corresponds to a normal query. For example, the capability request may include an indication that the capability request is a normal query such that the peer electronic device processes the capability request according to normal query behavior in accordance with the capability exchange protocol.

If the capability discovery layer of the electronic device receives a service list request according to a normal query, then the capability discovery layer may transition to a normal query sent state 3605 in relation to the service list request according to a normal query.

If the capability discovery layer receives a response to the capability request (e.g., a capability answer message) communicated to the peer electronic device, the capability discovery layer may determine whether the response to the capability request indicates whether the peer electronic device may provide and/or consume any of the desired services (e.g., the services included in the service list request). For example, the capability discovery layer may determine whether any of the available services of the peer electronic device (e.g., the application layer entities registered with the peer electronic device and/or the service capabilities thereof) correspond to the applicable filter associated with the capability request (e.g., corresponding to the service list request). According to various embodiments of the present disclosure, a capability discovery layer may determine whether any common filters exist between the capability request and the capability answer according to capability exchange. A capability discovery layer may determine whether any common services exist between the desired services of the electronic device and the list of available services of the peer electronic device (e.g., based on results from querying the peer electronic device application layer entity database). According to various embodiments of the present disclosure, the response to the capability request (e.g., the capability answer message) may include a list of available services of the peer electronic device and/or a response to the capability request indicating that no common services exist between the desired services of the electronic device and the list of available services of the peer electronic device.

If the capability discovery layer determines that service capabilities of the peer electronic device do not satisfy any of the desired services of the electronic device, then the capability discovery layer may communicate such a result to the application layer entity associated with the service list request. As illustrated by state transition arrow 3607, the capability discovery layer may transition to the initial state 3601 in relation to the query of the service list request according to a normal query.

As illustrated by state transition arrow 3609, if the capability discovery layer determines that service capabilities of the peer electronic device do satisfy at least one of the desired services of the electronic device (e.g., based on results from querying the peer electronic device application layer entity database), then the capability discovery layer may transition to a processing common filters state 3611 in relation to the service list request according to a normal query. The capability discovery layer may query the peer electronic device application layer entity database for common filters.

In the processing common filters state 3611, the capability discovery layer may identify service capabilities of the peer electronic device that satisfy at least one of the desired services of the electronic device (e.g., based on results from querying the peer electronic device application layer entity database). If the capability discovery layer identifies service capabilities of the peer electronic device that satisfy at least one of the desired services of the electronic device, then the capability discovery layer may communicate a query result to the application layer entity associated with the service list request according to a normal query. According to various embodiments of the present disclosure, the capability discovery layer may receive from the peer electronic device a query result that identifies service capabilities of the peer electronic device that satisfy at least one of the desired services of the electronic device. The capability discovery layer may notify the applicable application layer entity of the normal query result.

As illustrated by state transition arrow 3613, if the capability discovery layer identifies service capabilities of the peer electronic device that satisfy at least one of the desired services of the electronic device, the capability discovery layer may transition to the initial state 3601 in relation to the service list request according to a normal query. According to various embodiments of the present disclosure, if the capability discovery layer communicates a query result to the application layer entity associated with the service list request according to a normal query, the capability discovery layer may transition to the initial state 3601 in relation to the service list request according to a normal query. According to various embodiments of the present disclosure, the capability discovery layer may communicate a list of application layer entities on a peer electronic device and/or service capabilities thereof that satisfy the service list request according to a normal query.

As illustrated by state transition arrow 3615, the capability discovery layer of an electronic device may receive a service list request according to a persistent query. The service list may include an indication that the request corresponds to a persistent query according to persistent query behavior defined by the applicable capability exchange protocol. For example, the capability discovery layer may receive a service list request according to a persistent query from an application layer entity. The service list request according to a persistent query may include a service list that may identify the desired services that the application layer entity desires. For example, the service list request according to a persistent query may include a new filter of desired services. If the capability discovery layer receives the service list request according to a persistent query, then the capability discovery layer may communicate a capability request (e.g., a persistent capability request message) to a peer electronic device. For example, the capability discovery layer may communicate the capability request to a capability discovery layer of the peer electronic device. The capability discovery layer may communicate the capability request to the peer electronic device upon receipt of the service list request. The capability discovery layer may communicate that the capability request corresponds to a persistent query. For example, the capability request may include an indication that the capability request is a persistent query such that the peer electronic device processes the capability request according to persistent query behavior in accordance with the capability exchange protocol.

If the capability discovery layer of the electronic device receives a service list request according to a persistent query, then the capability discovery layer may transition to a persistent query sent state 3617 in relation to the service list request according to a persistent query.

If the capability discovery layer receives a response to the capability request (e.g., a capability answer message) communicated to the peer electronic device, the capability discovery layer may determine whether the response to the capability request indicates whether the peer electronic device may provide and/or consume any of the desired services (e.g., the services included in the service list request). For example, the capability discovery layer may determine whether any of the available services of the peer electronic device (e.g., the application layer entities registered with the peer electronic device and/or the service capabilities thereof) correspond to the applicable filter associated with the capability request (e.g., corresponding to the service list request). According to various embodiments of the present disclosure, a capability discovery layer may determine whether any common filters exist between the capability request and the capability answer according to capability exchange. A capability discovery layer may determine whether any common services exist between the desired services of the electronic device and the list of available services of the peer electronic device. The response to the capability request (e.g., the capability answer message) may include a list of available services of the peer electronic device and/or a response to the capability request indicating that no common services exist between the desired services of the electronic device and the list of available services of the peer electronic device.

According to various embodiments of the present disclosure, the capability discovery layer may store a list of the available services of the peer electronic device (e.g., the application layer entities registered with the peer electronic device and/or the service capabilities thereof). According to various embodiments of the present disclosure, the capability exchange protocol may define the persistent query behavior such that the peer electronic device updates the capability discovery layer with incremental changes to the available services of the peer electronic device. The capability discovery layer may store such incremental changes. For example, the capability discovery layer may store such incremental changes so as to update the list of available services of the peer electronic device (e.g., the application layer entities registered with the peer electronic device and/or the service capabilities thereof).

If the capability discovery layer determines that service capabilities of the peer electronic device do not satisfy any of the desired services of the electronic device, then the capability discovery layer may communicate such a result to the application layer entity associated with the service list request. The capability discovery layer may save the peer electronic device application layer entity list (e.g., received with the capability answer message) to the peer electronic device application layer entity database. As illustrated by state transition arrow 3619, the capability discovery layer may transition to the initial state 3601 in relation to the query of the service list request according to a persistent query.

As illustrated by state transition arrow 3621, if the capability discovery layer determines that service capabilities of the peer electronic device do satisfy at least one of the desired services of the electronic device, then the capability discovery layer may save the application layer entity list (e.g., received with the capability answer message). For example, the capability discovery layer may update the peer electronic device application layer entity database to include information included in the application layer entity list. The capability discovery layer may query the peer electronic device application layer entity database for common filters. The capability discovery layer may transition to the processing common filters state 3611 in relation to the service list request according to a persistent query.

In the processing common filters state 3611, the capability discovery layer may identify service capabilities of the peer electronic device that satisfy at least one of the desired services of the electronic device. If the capability discovery layer identifies service capabilities of the peer electronic device that satisfy at least one of the desired services of the electronic device (e.g., based on results from querying the peer electronic device application layer entity database), then the capability discovery layer may communicate a query result to the application layer entity associated with the service list request according to a persistent query. According to various embodiments of the present disclosure, the capability discovery layer may receive from the peer electronic device a query result that identifies service capabilities of the peer electronic device that satisfy at least one of the desired services of the electronic device. The capability discovery layer may notify the applicable application layer entity of the query result.

If the capability discovery layer receives a service list request (e.g., from an application layer entity), then the capability discovery layer may determine whether the service list request includes any new filters. For example, the capability discovery layer may determine whether a service list request includes only common filters. If the capability discovery layer determines that the service list request does not include a new filter, then the capability discovery layer may query the peer electronic device application layer entity database. The capability discovery layer may query the peer electronic device application layer entity database in order to determine whether the service capabilities of peer electronic devices satisfy the desired services (e.g., the list of services included in the service list request).

As illustrated by state transition arrow 3623, if the service list request does not include any new filters (e.g., if only common filters are included in the service list request), then the capability discovery layer may query the peer electronic device application layer entity database (e.g., for common filters) and transition to the processing common filters state 3611.

In the processing common filters state 3611, the capability discovery layer may identify service capabilities of the peer electronic device that satisfy at least one of the desired services of the electronic device. If the capability discovery layer identifies service capabilities of the peer electronic device that satisfy at least one of the desired services of the electronic device (e.g., based on results from querying the peer electronic device application layer entity database), then the capability discovery layer may communicate a query result to the application layer entity associated with the service list request. According to various embodiments of the present disclosure, the capability discovery layer may receive from the peer electronic device a query result that identifies service capabilities of the peer electronic device that satisfy at least one of the desired services of the electronic device. The capability discovery layer may notify the applicable application layer entity of the query result.

As illustrated by state transition arrow 3613, if the capability discovery layer identifies service capabilities of the peer electronic device that satisfy at least one of the desired services of the electronic device, the capability discovery layer may transition to the initial state 3601 in relation to the service list request according to a persistent query. According to various embodiments of the present disclosure, if the capability discovery layer communicates a query result to the application layer entity associated with the service list request according to a persistent query, the capability discovery layer may transition to the initial state 3601 in relation to the service list request according to a persistent query. According to various embodiments of the present disclosure, the capability discovery layer may communicate a list of application layer entities on a peer electronic device and/or service capabilities thereof that satisfy the service list request according to a persistent query.

Figure 37:
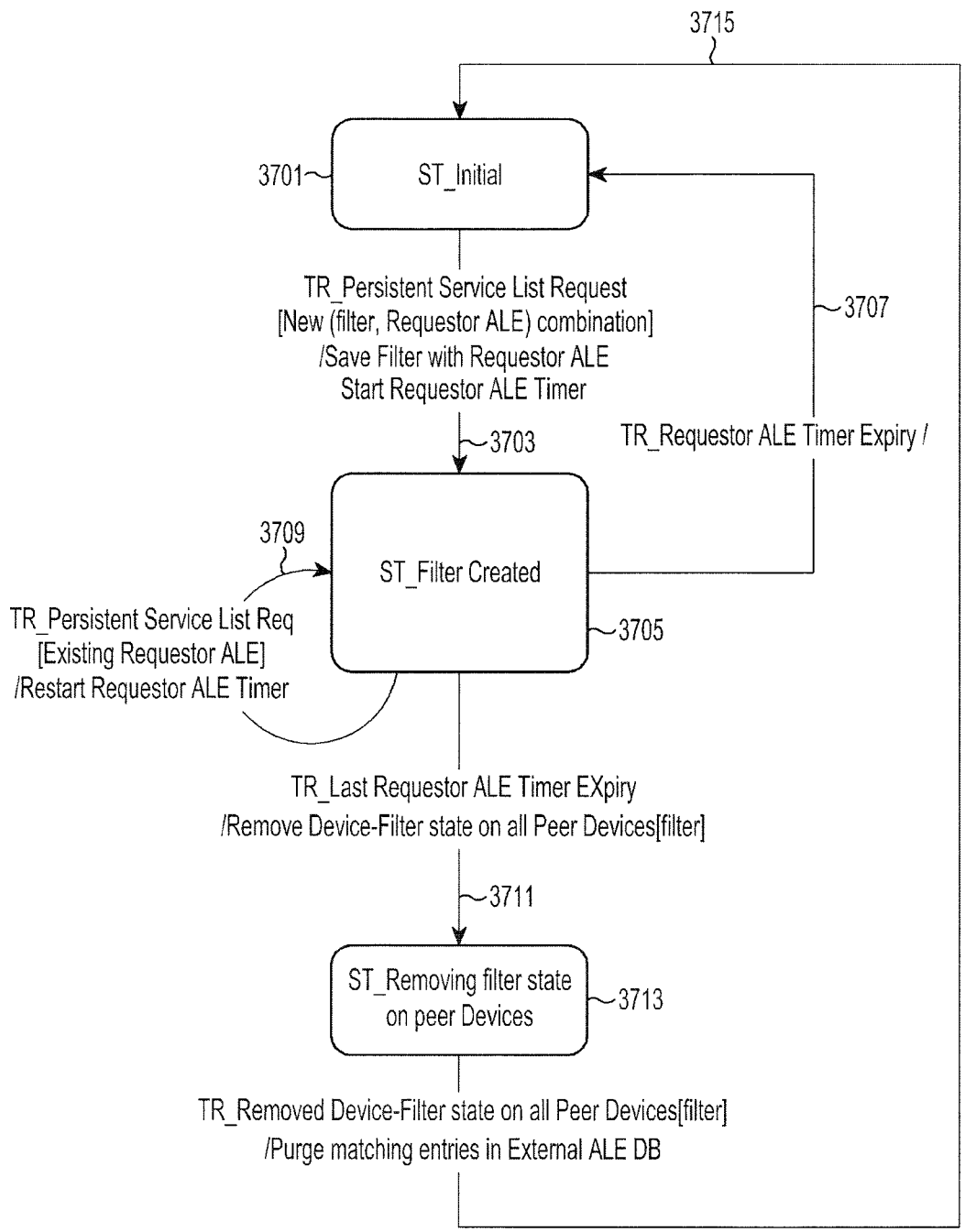
FIG. 37 illustrates a state diagram of an application layer entity according to an embodiment of the present disclosure.

FIG. 37 illustrates a state diagram of an application layer entity according to an embodiment of the present disclosure.

Referring to FIG. 37, an application layer entity of an electronic device may issue a persistent query to a capability discovery layer. For example, the application layer entity may leverage the capability discovery layer to perform discovery of service capabilities of peer electronic devices. In accordance with a capability exchange protocol, the application layer entity may leverage the capability discovery to perform discovery using a persistent query, the behavior of which may be defined by the applicable capability exchange protocol. In particular, a lifecycle of a persistent query filter/requesting application layer entity pair is shown in FIG. 37.

As illustrated in FIG. 37, the application layer entity may be in an initial state 3701. If the application layer entity is in the initial state 3701 there are no current persistent query requests from the requesting application layer entity. This can be either because the requesting application layer entity has not yet submitted a persistent query request, or because the persistence duration of the request has timed out.

As illustrated by state transition arrow 3703, a first time request is made that corresponds to a new persistent query filter/requesting application layer entity pair. Here, the persistent query filter/requesting application layer entity pair is saved and a timer corresponding to the persistence duration requested by the application layer entity is started. Also, the application layer entity may request service capabilities of a peer electronic device according to a persistent query behavior. For example, the application layer entity may communicate a persistent service list request to the capability discovery layer. The persistent service list request may include an indication that the request corresponds to a persistent query. The persistent service list request may include an identifier of the application layer entity of the electronic device (e.g., the application layer entity initiating the request or otherwise requesting the service capabilities), a filter, and/or the like. The filter may identify or otherwise provide an indication of the service capabilities that the application layer entity desires. For example, the filter may identify or otherwise provide an indication of the desired services. According to various embodiments of the present disclosure, the persistent service list request may include a new combination of a filter and application layer entity identifier (e.g., the parameters of the persistent query are new and not subject to a current persistent query). According to various embodiments of the present disclosure, if the application layer entity initiates a persistent query (e.g., communicates the persistent service list request), then the application layer entity may save the filter. The filter may be saved to a local persistent query state (e.g., a new persistent query state for the requesting application layer entity) if the filter is new. According to various embodiments of the present disclosure, if the application layer entity initiates a persistent query (e.g., communicates the persistent service list request), then the application layer entity may start a requestor application layer entity timer.

According to various embodiments of the present disclosure, the persistent query may include a persistence duration. The persistence duration may correspond to a duration for which the requesting application layer entity wishes the query to persist. The persistence duration may be specified according to a unit of minutes. According to various embodiments of the present disclosure, the persistence query may include a field in which a value corresponding to the persistence duration may be entered. As an example, the persistence duration may be within a range of 1 to 1440 minutes. According to various embodiments of the present disclosure, the capability exchange protocol may define a default persistence duration. For example, the default persistence duration may be 720 minutes.

If the application layer entity initiates a persistent query (e.g., communicates the persistent service list request), then the application layer entity may transition to a filter created state 3705 that means that there is a live persistent query request corresponding to the persistent query filter/requesting application layer entity pair.

If the requestor application layer entity timer expires (e.g., when the application layer entity is in the filter created state 3705), then as illustrated by state transition arrow 3707, the application layer entity may transition to the initial state 3701. Here, there is a timeout of the persistence duration timer in the specific case that there is at least one other application layer entity for which the lifecycle of that persistent query filter/requesting application layer entity pair is in the filter created state 3705, i.e., the other application layer entity has a live request for the same filter.

As illustrated by state transition arrow 3709, the application layer entity may remain in the filter created state 3705 if the application layer entity reinitiates a persistent query or initiates a new persistent query. Here, there is a duplicate request from the application layer entity for the filter while the persistence duration of the previous request has still not timed out. If the application layer entity reinitiates a persistent query or initiates a new persistent query, then the application layer entity and/or the capability discovery layer may restart the requestor application layer entity timer.

If the last requestor application layer entity timer expires, then the application layer entity may transition to the removing filter state on peer electronic devices state 3713, which is a cleaning up state where the electronic device is attempting to remove persistent query subscriptions from peer electronic devices for the filter.

As illustrated by state transition arrow 3711, the application layer entity may remove the device filter state on all peer electronic devices. Here, there is a timeout of the persistence duration timer (similar to the state transition arrow 3707) but there is no other application layer entity which has a live request for the same filter.

If the application layer entity has removed the device filter state on all peer electronic devices such that the persistence query is terminated, then the application layer entity and/or capability discovery layer may purge entries associated with the persistent query from the peer electronic device application layer entity database. As illustrated by state transition arrow 3715, if the filter state is removed on all peer electronic devices and the associated entries are purged from the peer electronic device application layer entity database, then the application layer entity may transition to the initial state 3701. In other words, all connected electronic devices have removed the filter from their state and would no longer provide any capability updates for the filter. Here, any local capability entries for the filter are cleaned up and the application layer entity may transition to the initial state 3701.

Figure 38:
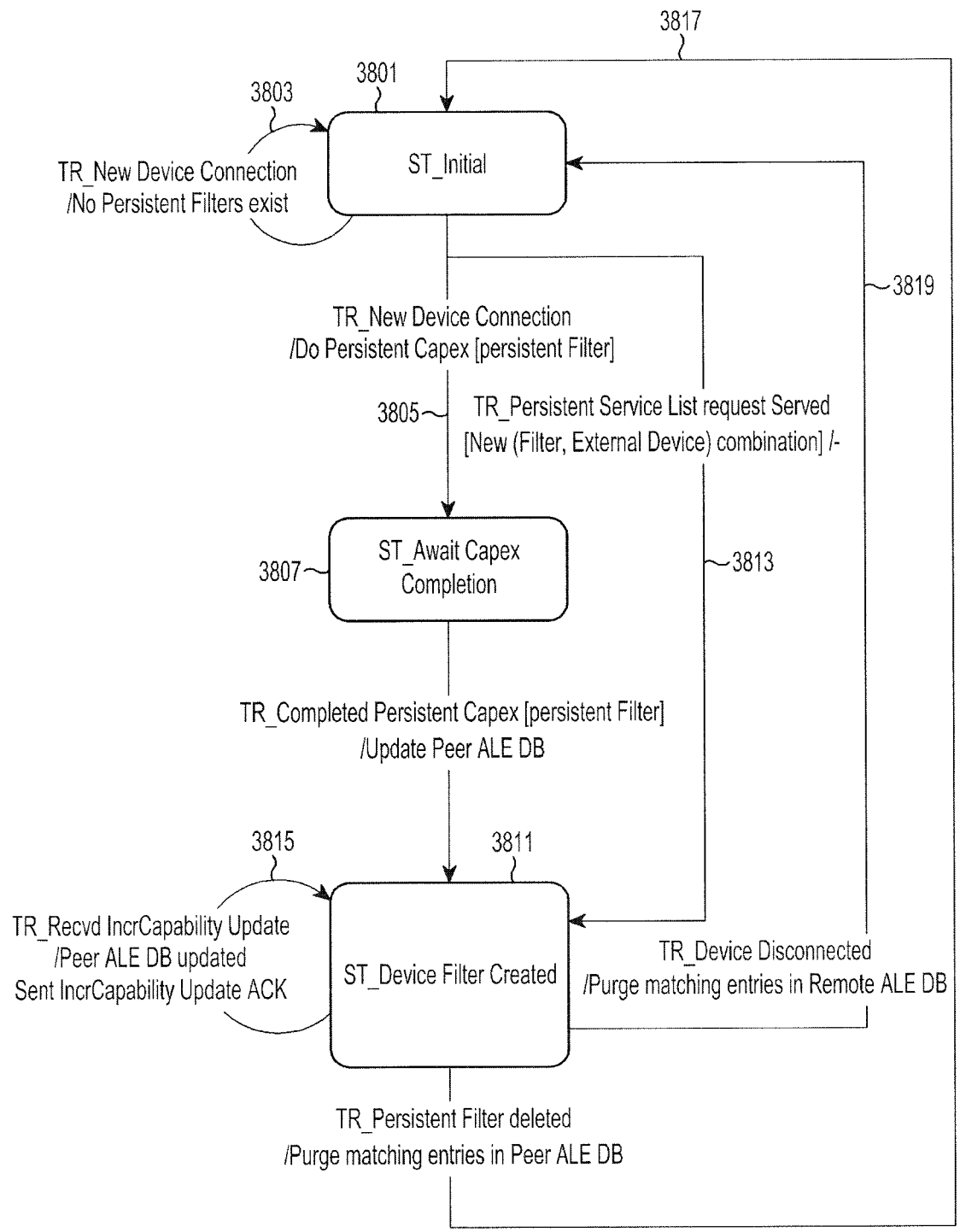
FIG. 38 illustrates a state diagram of a capability discovery layer according to an embodiment of the present disclosure.

FIG. 38 illustrates a state diagram of a capability discovery layer according to an embodiment of the present disclosure.

Referring to FIG. 38, a capability discovery layer of an electronic device may be in an initial state 3801 in relation to a peer electronic device query.

If a new peer electronic device is connected to the electronic device, then the electronic device may determine whether any persistent filters are active (e.g., exist). For example, if the capability discovery layer is notified (e.g., by a session layer) that a new peer electronic device is connected, then the capability discovery layer may determine whether any persistent filters are active (e.g., exist). The capability discovery layer may determine whether any persistent queries have not yet expired.

As illustrated by state transition arrow 3803, if a new peer electronic device is connected and if no persistent filters are determined to be active, then the capability discovery layer may remain in the initial state 3801. For example, if the capability discovery layer determines that no persistent filters are active, the capability discovery layer may remain in the initial state 3801.

In contrast, as illustrated by transition arrow 3805, if a new peer electronic device is connected and if a persistent filter is determined to be active, then the capability discovery layer may transition to an await capability exchange completion state 3807. For example, if the capability discovery layer determines that a persistent query has not yet expired and that a persistent filter exists, the capability discovery layer may transition to the await capability exchange completion state 3807. The capability discovery layer may transition to the await capability exchange completion state 3807 if no new service list request including a new filter and/or peer electronic device is received.

At the await capability exchange completion state 3807, the electronic device performs capability exchange with the newly connected peer electronic device. The electronic device may perform the capability exchange relating to existing persistent queries with the newly connected peer electronic device. For example, the capability discovery layer may perform capability exchange with the peer electronic device (e.g., the capability discovery layer thereof) using the persistent filter. The capability discovery layer may complete the specified capability discovery associated with the active persistent queries.

As illustrated by state transition arrow 3809, if capability exchange relating to existing persistent queries is completed, then the peer electronic device application layer entity database may be updated. For example, the peer electronic device application layer entity database may be updated to reflect current service capabilities of the newly connected peer electronic device. If the capability discovery layer determines that the capability exchange relating to existing queries is completed with the peer electronic device and the peer electronic device application layer entity database is updated to reflect the capability exchange, then the capability discovery layer may transition to a device filter created state 3811.

In contrast to the transitions relating to state transition arrow 3803 and state transition arrow 3805, if a new persistent service list request is received and the persistent service list request includes a new combination of a filter and a set of peer device identifiers, then, as illustrated by state transition arrow 3813, the capability discovery layer may transition to the device filter created state 3811. For example, if the capability discovery layer receives a persistent service list request from an application layer entity, and the persistent service list request includes a new combination of a filter and a peer device identifier relative to existing persistent queries, then the capability discovery layer may proceed to the device filter created state 3811.

If a peer electronic device provides an incremental capability update, then the peer electronic device application layer entity database may be updated. As an example, if the capability discovery layer receives an update indicating a change in the service capabilities of a peer electronic device, then the capability discovery layer may update the peer electronic device application layer entity database to reflect the change in the service capabilities of the peer electronic device.

As illustrated by state transition arrow 3815, if the capability discovery layer is in the device filter created state 3811 and if the capability discovery layer receives an incremental capability update from a peer electronic device, then the capability discovery layer may update the peer electronic device application layer entity database to incorporate the incremental update included in the received incremental capability update, and the capability discovery layer may communicate an incremental capability update acknowledgement to the peer electronic device.

If a peer electronic device is disconnected, then the capability discovery layer may transition to the initial state 3801. According to various embodiments of the present disclosure, if a peer electronic device is disconnected, then the peer electronic device application layer entity database may be updated to purge the entries associated with the newly disconnected peer electronic device. The capability discovery layer may update the peer electronic device application layer entity database if the capability discovery layer receives notification (e.g., from the session layer) that a peer electronic device is disconnected.

As illustrated by state transition arrow 3819, if the capability discovery layer is in the device filter created state 3811, and if a peer electronic device is disconnected, then the capability discovery layer may purge matching entries in the peer electronic device application layer entity database, and transition to the initial state 3801.

Figure 39:
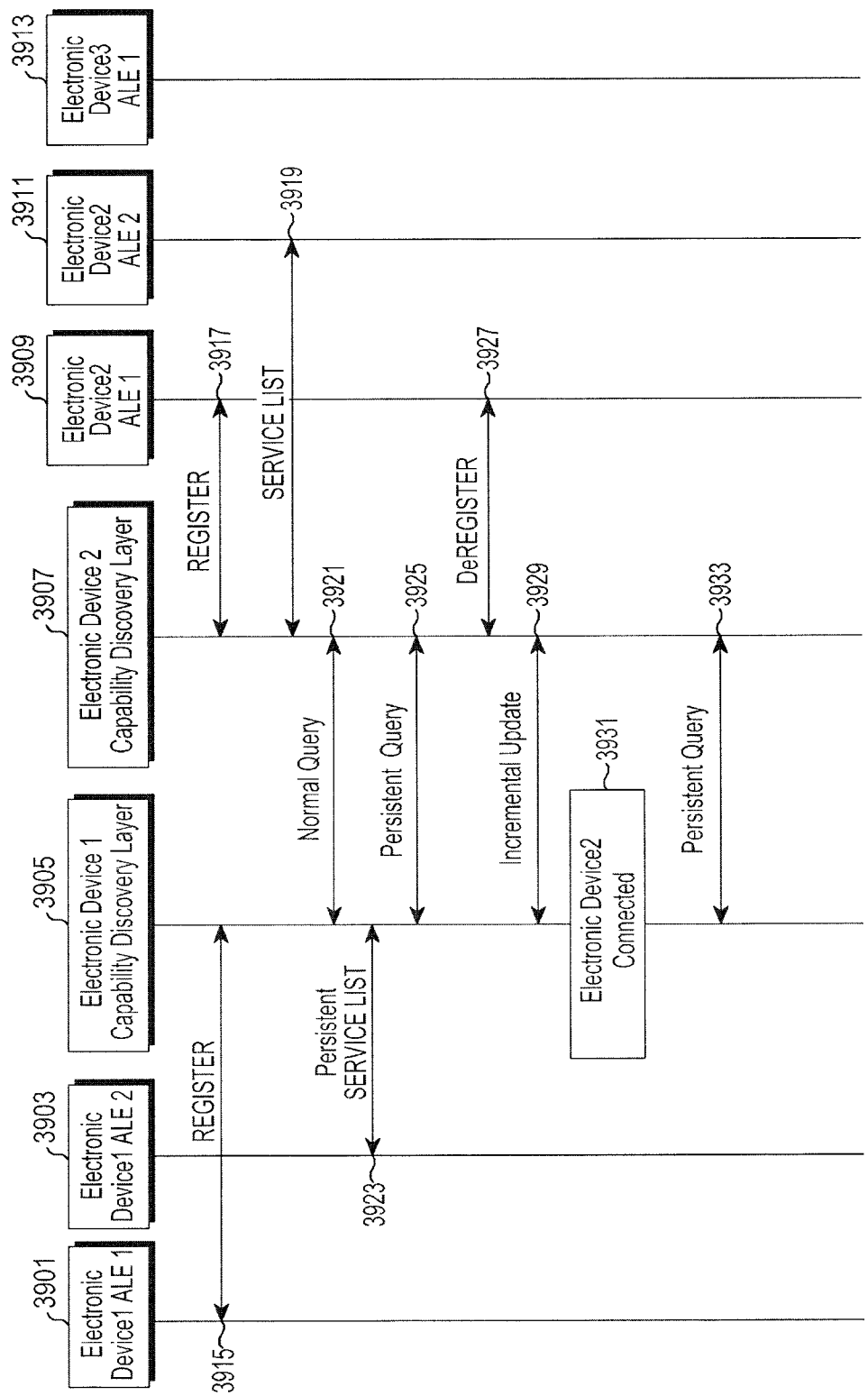
FIG. 39 illustrates a signaling diagram for a service discovery according to an embodiment of the present disclosure.

FIG. 39 illustrates a signaling diagram for service discovery according to various embodiments of the present disclosure.

Referring to FIG. 39, a first electronic device may communicate with at least one other electronic device. The first electronic device may include at least one application layer entity. For example, the first electronic device may include application layer entity 3901 and application layer entity 3903. The first electronic device may also include a capability discovery layer 3905 for performing capability exchange with the at least one other electronic device.

A second electronic device may include at least one application layer entity. For example, the second electronic device may include application layer entity 3909 and application layer entity 3911. The second electronic device may also include a capability discovery layer 3907 for performing capability exchange with the first electronic device.

A third electronic device may include at least one application layer entity. For example, the third electronic device may include application layer entity 3913.

As discussed above, if an application layer entity wants to advertise capabilities thereof, then the application layer entity may register with the capability discovery layer. As illustrated at 3915, the application layer entity 3901 may register with the capability discovery layer 3905.

Similarly, at 3917, the application layer entity 3909 may register with the capability discovery layer 3907.

According to various embodiments of the present disclosure, the capability discovery layer 3905 may register with a session layer of the electronic device. The capability discovery layer 3905 may register with the session layer in order to establish a service connection with a capability discovery layer of a peer electronic device. The capability discovery layer 3905 may perform capability exchange over a channel provided by the service connection. For example, the capability discovery layer 3905 may exchange messages with a capability discovery layer of the second electronic device (e.g., in accordance with an applicable capability exchange protocol) in order to perform capability exchange.

Similarly, the capability discovery layer 3907 may register with the session layer of the second electronic device in order to establish a service connection with a capability discovery layer of the electronic device. The capability discovery layer 3907 may perform capability exchange with the capability discovery layer 3905.

At 3919, the application layer entity 3911 may request service capabilities of the electronic device. The application layer entity 3911 may request (e.g., with filters) the capability discovery layer 3907 for a list application layer entities on peer electronic devices connected to the second electronic device (e.g., the electronic device on which the application layer entity 3911 resides). The application layer entity 3911 may request the capability discovery layer 3907 for the list of application layer entities on electronic devices connected to the second electronic device with an indication (or expectation) that the request will be processed as a normal query with normal query behavior defined by the applicable capability exchange protocol. For example, the application layer entity 3911 may communicate a service list request to the capability discovery layer 3907.

If the peer electronic device application layer entity database is up-to-date (e.g., current), then information relating to the service list may be retrieved from the peer electronic device application layer entity database. Thereafter, the information relating to the service list retrieved from the peer electronic device application layer entity database may be communicated to the application layer entity 3911. As an example, the capability discovery layer 3907 may determine whether the peer electronic device application layer entity database is sufficiently up-to-date to satisfy the filter associated with the service list request received from the application layer entity 3911.

If the peer electronic device application layer entity database is not up-to-date and/or cannot satisfy the filter associated with the service list request received from the application layer entity 3911, then the capability discovery layer 3907 may perform capability exchange with the relevant electronic devices connected thereto. The capability discovery layer 3907 may perform capability exchange according to a normal query behavior in accordance with the service list request received at 3919. For example, at 3921, the capability discovery layer 3907 may communicate a normal capability query (e.g., a query with normal query behavior) to the capability discovery layer 3905. The capability discovery layer 3907 may communicate the results of the normal capability query to the application layer entity 3911. The capability discovery layer 3907 may update the applicable peer electronic device application layer entity database with information received (e.g., service capabilities) from the capability exchange.

At 3921, the capability discovery layer 3907 and the capability discovery layer 3905 may perform capability exchange according to a normal capability query. The capability discovery layer 3907 may query the capability discovery layer 3905 according to the service list request received at 3919 from the application layer entity 3911. Thereafter, the capability discovery layer 3907 may communicate the results of the normal capability query to the application layer entity 3911.

At 3923, the application layer entity 3903 may request service capabilities of at least one electronic device connected to the electronic device. The application layer entity 3903 may request (e.g., with filters) the capability discovery layer 3905 for a list of application layer entities of electronic devices connected to the first electronic device (e.g., the electronic device on which the application layer entity 3903 resides). The application layer entity 3903 may request the capability discovery layer 3905 for the list of application layer entities of electronic devices connected to the electronic device with an indication (or expectation) that the request will be processed as a persistent query with persistent query behavior defined by the applicable capability exchange protocol. For example, the application layer entity 3903 may communicate a persistent service list request to the capability discovery layer 3905.

According to various embodiments of the present disclosure, if the capability discovery layer receives a persistent service list request, then the capability discovery layer may save the filter associated with the persistent service list request. For example, the capability discovery layer may save the filter associated with the persistent service list request to a local persistent query state if the filter is new (e.g., if the filter does not correspond to an existing persistent query).

If the peer electronic device application layer entity database is up-to-date (e.g., current), then information relating to the persistent service list may be retrieved from the peer electronic device application layer entity database. Thereafter, the information relating to the service list retrieved from the peer electronic device application layer entity database may be communicated to the application layer entity 3903. As an example, the capability discovery layer 3905 may determine whether the peer electronic device application layer entity database is sufficiently up-to-date to satisfy the filter associated with the service list request received from the application layer entity 3903.

If the peer electronic device application layer entity database is not up-to-date and/or cannot satisfy the filter associated with the service list request received from the application layer entity 3903, then the capability discovery layer 3905 may perform capability exchange with the relevant peer electronic devices connected thereto. The capability discovery layer 3905 may perform capability exchange according to a persistent query behavior in accordance with the persistent service list request received at 3923. For example, at 3925, the capability discovery layer 3905 may communicate a normal persistent query (e.g., a query with persistent query behavior) to the capability discovery layer 3907. The capability discovery layer 3905 may communicate the results of the normal capability query to the application layer entity 3903. The capability discovery layer 3905 may update the applicable peer electronic device application layer entity database with information received (e.g., service capabilities) from the capability exchange.

At 3925, the capability discovery layer 3905 and the capability discovery layer 3907 may perform capability exchange according to a persistent capability query. The capability discovery layer 3905 may query the capability discovery layer 3907 according to the persistent service list request received at 3923 from the application layer entity 3903. Thereafter, the capability discovery layer 3905 may communicate the results of the persistent capability query to the application layer entity 3903. The capability discovery layer 3905 may communicate to the capability discovery layer 3907 that the capability query at 3925 is of a persistent type. The capability discovery layer 3905 may communicate to the capability discovery layer 3907 parameters associated with the persistent capability query. The capability discovery layer 3907 may process the persistent capability query at 3925 in accordance with the applicable capability exchange protocols.

At 3927, the application layer entity 3909 may deregister from the capability discovery layer 3907. The capability discovery layer 3907 may update the applicable application layer registration database to reflect deregistration of the application layer entity 3909.

At 3929, the capability discovery layer 3907 may perform capability exchange with the capability discovery layer 3905. In particular, the capability discovery layer 3907 may communicate incremental update information. The incremental update information may include changes made to service capabilities (e.g., registered service capabilities) of the first peer electronic device. According to various embodiments of the present disclosure, the capability exchange for incremental updates may be prompted by an update to the service capabilities of an applicable peer electronic device. According to various embodiments of the present disclosure, the capability exchange for incremental updates may be performed at preset time intervals over which an applicable persistent query is valid (e.g., for the persistent duration). The capability discovery layer 3905 may update the applicable peer electronic device application layer entity database to reflect the incremental update. In particular, the capability discovery layer 3905 may update the applicable peer electronic device application layer entity database to reflect the de-registration of the application layer entity 3909. The capability discovery layer 3905 may communicate the change to the service capabilities (e.g., the incremental update) to the application layer entity 3903 from which the persistent service list request originated.

At 3931, a new peer electronic device (e.g., the second electronic device) may be connected to the first electronic device. The capability discovery layer 3905 may be notified of the connection of the second electronic device. For example, the session layer may notify the capability discovery layer 3905 of the connection of the second electronic device.

According to various embodiments of the present disclosure, if a new peer electronic device is connected, then the capability discovery layer of the electronic device may determine whether any valid persistent queries (e.g., persistent queries that have not expired—a persistent query for which the persistence duration has not elapsed) exist. The capability discovery layer may also determine whether any valid persistent queries are relevant (e.g., applicable) to the newly connected peer electronic device. If the capability discovery layer of the electronic device determines that a valid persistent query exists, then the capability discovery layer may perform capability exchange with the newly connected peer electronic device.

At 3933, the capability discovery layer 3905 may perform a capability exchange with a capability discovery layer of the newly connected device. For example, the capability discovery layer 3905 may perform a persistent capability query with the newly connected device. For example, if the application layer entity 3913 is previously registered with the capability discovery layer of the third electronic device, then the capability discovery layer 3905 may discover the application layer entity 3913 (e.g., receive information relating to the application layer entity 3913) through the persistent capability query with the third peer electronic device.

Figure 40:
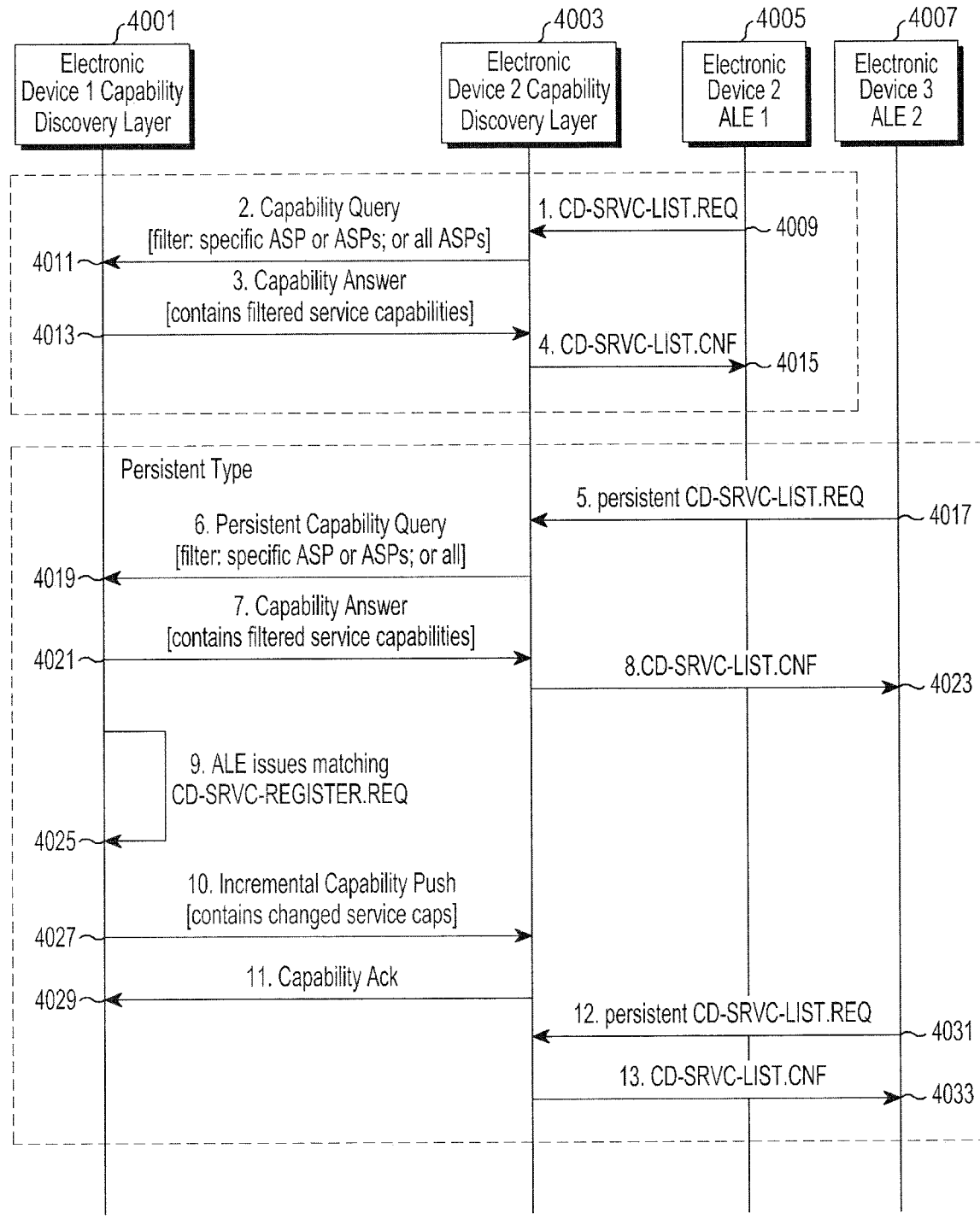
FIG. 40 illustrates a capability exchange procedure according to an embodiment of the present disclosure.

FIG. 40 illustrates a capability exchange procedure according to an embodiment of the present disclosure.

Referring to FIG. 40, a first electronic device having a capability discovery layer 4001 may communicate with a second electronic device having a capability discovery layer 4003, an application layer entity 4005, and an application layer entity 3907.

At 4009, the application layer entity 4005 may communicate a service list request (e.g., CD-SRVC-LIST.REQ) with the capability discovery layer 4003. The service list request may include a transaction identifier, a number of accessory service profile filter, a list of ASP IDs, a number of peer electronic devices filters, a list of peer device identifiers, a query type, a requesting application layer entity identifier, a persistence duration, and/or the like.

The transaction identifier may be an identifier that identifies the service list request. The transaction identifier may be used to correlate the service list request with a service list confirmation message. The transaction identifier may be a value having 8 bits. The transaction identifier may be determined according to a rolling counter that is incremented with each new service list request.

The number of ASP ID filters may specify the number of ASP IDs specified as filters. For example, the number of ASP ID filters may specify the number of ASP IDs to which the service list request relates. The number of ASP ID filters may have a value that corresponds to a filter for all accessory service profiles. For example, a number of ASP ID filters having a value of zero may correspond to an indication that the service list request relates to all application layer entities on the applicable peer electronic devices irrespective of which accessory service profile that each application layer entity implements. For example, a number of ASP ID filters having a value of zero may correspond to an indication that the requesting application layer entity wants information (e.g., service capability information) on all application layer entities on the applicable peer electronic devices irrespective of which accessory service profile that each application layer entity implements.

The list of ASP IDs may correspond to an indication of the application layer entities for which the service list request is valid. The list of ASP IDs may correspond to an indication of the application layer entities for which the requesting application layer entity wants information (e.g., service capability information).

The number of peer electronic devices filter may specify the number of peer electronic devices specified as filters. For example, the number of peer electronic devices filter may specify the number of peer electronic devices to which the service list request relates. The number of peer electronic devices filter may have a value that corresponds to a filter for all peer electronic devices. For example, a number of peer electronic devices filter having a value of zero may correspond to an indication that the service list request relates to all peer electronic devices. For example, a number of peer electronic devices filter having a value of zero may correspond to an indication that the requesting application layer entity wants information (e.g., service capability information) on application layer entities across all peer electronic devices.

The list of peer device identifiers may correspond to an indication of the peer electronic devices for which the service list request is valid. The list of peer device identifiers may correspond to an indication of the peer electronic device for which the requesting application layer entity wants information (e.g., service capability information). For example, the list of peer device identifiers may specify that the requesting application layer entity is interested in application layer entities (e.g., satisfying the applicable accessory service profile filters) on peer electronic devices corresponding to any peer device identifier included in the list of peer device identifiers.

The query type may indicate the type of query. For example, the query type may indicate whether the query corresponds to a normal query. As another example, the query type may indicate whether the query corresponds to a persistent query. The query type may indicate whether the application layer entity expects a normal query behavior or a persistent query behavior of the capability discovery layer in relation to the service list request. The query type may be a 1 bit value (e.g., with 0 value corresponding to a normal query and a value of 1 corresponding to a persistent query type).

The requesting application layer entity identifier may identify the application layer entity that initiated the query (e.g., the application layer entity from which the service list request originated).

The persistence duration may correspond to a time duration for which the application layer entity (e.g., the application layer entity from which the service list request originated) wants the query to persist (e.g., to remain valid).

At 4011, the capability discovery layer 4003 may communicate a capability query (e.g., CapabilityQuery) to the capability discovery layer 4001. The capability query may include a filter for the query. The capability query may correspond to a query for applicable peer electronic devices for a list of service capabilities. For example, the capability query may correspond to a query for applicable peer electronic devices for a list of registered application layer entities in accordance with normal query behavior or persistent query behavior. The capability query may include a message type, a software version, a query type, a persistence duration, a number of accessory service profile filters, and an ASP ID filter.

The software version may correspond to a field that indicates the software version of the protocol implementation that relates to the communication between electronic devices to provide and/or consume services. The software version may be a field having 2 bytes. The software version may have a field indicating a major version of the software and a field indicating a minor version of the software. For example, the software version may be a field having 2 bytes in which the first byte indicates the major version and the second byte indicates the minor version.

The query type may indicate the type of query. For example, the query type may indicate whether the query corresponds to a normal query. As another example, the query type may indicate whether the query corresponds to a persistent query. The query type may indicate whether the query is expected to be processed according to normal query behavior or persistent query behavior. The query type may be a 1 bit value (e.g., with 0 value corresponding to a normal query and a value of 1 corresponding to a persistent query type).

The number of accessory service profile filters may indicate the number of ASP IDs included as filters in the query. For example, the number of ASP ID filter may specify the number of ASP IDs to which the query relates. The number of ASP ID filter may have a value that corresponds to a filter for all accessory service profiles. For example, a number of ASP ID filter having a value of zero may correspond to an indication that the query relates to all application layer entities on the applicable peer electronic devices irrespective of which accessory service profile that each application layer entity implements. For example, a number of ASP ID filter having a value of zero may correspond to an indication that the requesting application layer entity wants information (e.g., service capability information) on all application layer entities on the applicable peer electronic devices irrespective of which accessory service profile that each application layer entity implements.

The list of ASP IDs may correspond to an indication of the application layer entities for which the query is valid. The list of ASP IDs may correspond to an indication of the application layer entities for which requesting application layer entity wants information (e.g., service capability information).

The persistence duration may correspond to a time duration for which the query is to persist (e.g., to remain valid).

At 4013, the capability discovery layer 4001 may communicate a response to the capability query (e.g., CapabilityAnswer). The response to the capability query may include filtered service capabilities (e.g., filtered according to the capability query). The response to the capability query may include an indication of a message type, a software version, a number of application layer entity information, a list of application layer entity information, and/or the like.

The software version may correspond to a field that indicates the software version of the protocol implementation that relates to the communication between electronic devices to provide and/or consume services. The software version may be a field having 2 bytes. The software version may have a field indicating a major version of the software and a field indicating a minor version of the software. For example, the software version may be a field having 2 bytes in which the first byte indicates the major version and the second byte indicates the minor version. For example, a software version "3.4" may be encoded as 0x0304.

The number of application layer entity information may correspond to an indication of the number of application layer entities for which information is provided.

The list of application layer entity information may correspond to information about the application layer entities that match the accessory service profile filters included in the capability query. The application layer entity information may include information relating to an application layer entity identifier, a friendly name of the application layer entity, a service agent identifier, an ASP ID, an accessory service profile version role, and/or the like for each application layer entity for which information is included in the response to the capability query.

In response to the receiving of the response to the capability query, the capability discovery layer 4003 may update the applicable peer electronic device application layer database with information relating to the response to the capability query.

At 4015, the capability discovery layer 4003 may communicate to the application layer entity 4005 a response to the service list request (CD-SRVC-LIST.CNF). The response to the service list request may notify the requesting application layer entity (e.g., the application layer entity 4005) of the list of application layer entities on the applicable peer electronic devices that satisfy the filters specified in the service list request. The response to the service list request may include information that the capability discovery layer 4003 received in response to the capability query. The response to the service list request may include a transaction identifier, a peer device identifier, a service agent identifier, an ASP ID, an accessory service profile version, an application layer entity identifier, an application layer entity name, a role, and/or the like.

The transaction identifier may be an identifier that identifies the service list request. The transaction identifier may be the same as the transaction identifier associated with the corresponding service list request. The transaction identifier may be a value having 8 bits. The transaction identifier may be determined according to a rolling counter that is incremented with each new service list request.

The message exchange in 4009 through 4015 may correspond to a normal query. For example, the service list request communicated at 4009 may include a query type set to normal such that the query is treated according to the normal query behavior defined by the applicable capability exchange protocol.

At 4017, the application layer entity 4007 may communicate a service list request (e.g., persistent CD-SRVC-LIST.REQ) with the capability discovery layer 4003. The service list request may be a persistent service list request. For example, the service list request may include a query type field that indicates that the request corresponds to a persistent type.

At 4019, the capability discovery layer 4003 may communicate a capability query (e.g., PersistentCapabilityQuery) to the capability discovery layer 4001. The capability query may be a persistent capability query. For example, the capability query may include may include a query type field that indicates that the request corresponds to a persistent type. The capability query may correspond to a query for applicable peer electronic devices for a list of service capabilities.

At 4021, the capability discovery layer 4001 may communicate a response to the capability query (e.g., CapabilityAnswer). The response to the capability query may include filtered service capabilities (e.g., filtered according to the capability query). The response to the capability query may include an indication of a message type, a software version, a number of application layer entity information, a list of application layer entity information, and/or the like.

In response to the receiving of the response to the capability query, the capability discovery layer 4021 may update the applicable peer electronic device application layer database with information relating to the response to the capability query.

At 4023, the capability discovery layer 4003 may communicate to the application layer entity 4005 a response to the service list request (CD-SRVC-LIST.CNF). The response to the service list request may notify the requesting application layer entity (e.g., application layer entity 4007) of the list of application layer entities on the applicable peer electronic devices that satisfy the filters specified in the service list request. The response to the service list request may include information that the capability discovery layer 4003 received in response to the capability query. The response to the service list request may include a transaction identifier, a peer device identifier, a service agent identifier, an ASP ID, an accessory service profile version, an application layer entity identifier, an application layer entity name, a role, and/or the like.

At 4025, an application layer entity on the first electronic device may communicate a service registration request (e.g., CD-SRVC-REGISTER.REQ) to the capability discovery layer 4001. In response to receiving the service registration request, the capability discovery layer 4001 may update the applicable application layer entity registration database.

According to various embodiments of the present disclosure, if a new application layer entity and/or service agent thereof registers with the capability discovery layer, the capability discovery layer may determine the service capabilities of the newly registered application layer entity and/or service agent thereof matches a pending/valid persistent query.

At 4027, the capability discovery layer 4001 may communicate an incremental capability update (e.g., IncrementalCapabilityPush) to the capability discovery layer 4003. As an example, the capability discovery layer 4001 may communicate the incremental capability according to a push communication scheme. According to various embodiments of the present disclosure, the capability discovery layer 4001 may communicate an incremental capability update if the first electronic device has a pending/valid persistent query from a second electronic device (e.g., if the capability discovery layer 4001 determines that a persistent duration has not expired on a previously received persistent capability query). According to various embodiments of the present disclosure, the incremental capability update may include changed service capabilities (e.g., a delta of service capabilities over a period of time such as since the last incremental update and/or the initial response to the initial capability query). The incremental capability update may include an application layer entity update information. The application layer entity update information may include information about an application layer entity that has newly registered, unregistered, or modified the registration thereof. The application layer entity update information may include an application layer entity identifier, an update type, a friendly name of an application layer entity, a number of service agents, a list of service agent identifiers, a list of corresponding ASP IDs, accessory service profile version information, and role. For example, application layer entity update information may include a service agent identifier, and corresponding ASP IDs, accessory service profile version information, and role corresponding to the updated application layer entities.

At 4029, the capability discovery layer 4003 may communicate a capability acknowledgement (e.g., CapabilityAck) to the capability discovery layer 4001. The capability acknowledgement may acknowledge receipt of the incremental capability update.

At 4031, the application layer entity 4007 may communicate a service list request (e.g., persistent CD-SRVC-LIST.REQ) with the capability discovery layer 4003. The service list request may be a persistent service list request. For example, the service list request may include a query type field that indicates that the request corresponds to a persistent type.

At 4033, the capability discovery layer 4003 may communicate to the application layer entity 4005 a response to the service list request (CD-SRVC-LIST.CNF). The response to the service list request may notify the requesting application layer entity (e.g., the application layer entity 4007) of the list of application layer entities on the applicable peer electronic devices that satisfy the filters specified in the service list request. The response to the service list request may include information that the capability discovery layer 4003 received in relation to the incremental capability update that the capability discovery layer 4003 received from the capability discovery layer 4001.

Figure 41:
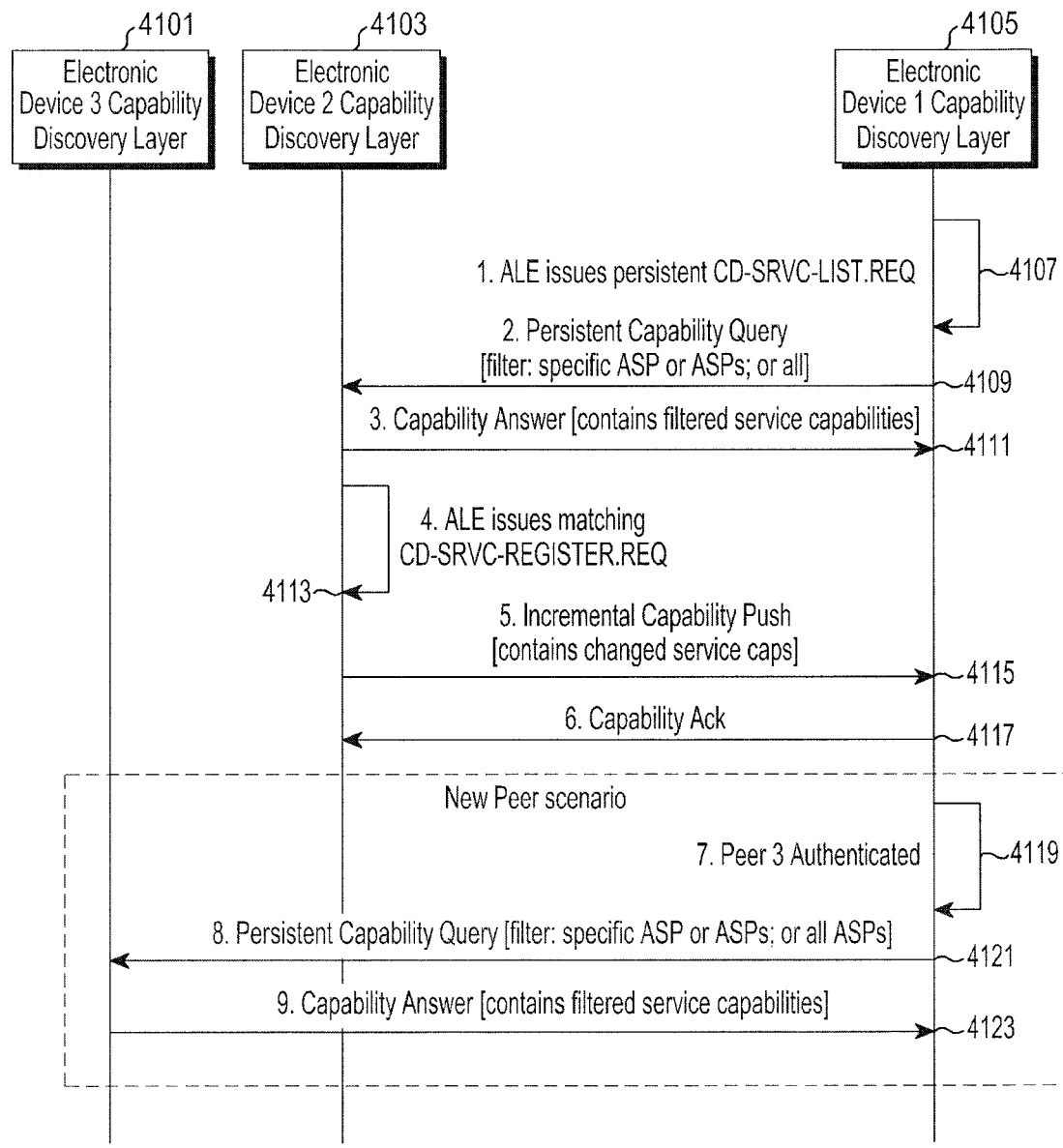
FIG. 41 illustrates a capability exchange procedure according to an embodiment of the present disclosure.

FIG. 41 illustrates a capability exchange procedure according to an embodiment of the present disclosure.

Referring to FIG. 41, a first electronic device having a capability discovery layer 4105 may communicate with a second electronic device having a capability discovery layer 4103. The first electronic device may also communicate with a third electronic device having a capability discovery layer 4101.

At 4107, an application layer entity on the first electronic device may communicate a service list request (e.g., persistent CD-SRVC-LIST.REQ) with the capability discovery layer 4105. The service list request may be a persistent service list request. For example, the service list request may include a query type field that indicates that the request corresponds to a persistent type.

At 4109, the capability discovery layer 4105 may communicate a capability query (e.g., PersistentCapabilityQuery) to the capability discovery layer 4103. The capability query may be a persistent capability query. For example, the capability query may include may include a query type field that indicates that the request corresponds to a persistent type. The capability query may correspond to a query for applicable peer electronic devices for a list of service capabilities (e.g., matching a filter of the service list request).

At 4111, the capability discovery layer 4103 may communicate a response to the capability query (e.g., CapabilityAnswer). The response to the capability query may include filtered service capabilities (e.g., filtered according to the capability query). The response to the capability query may include an indication of a message type, a software version, a number of application layer entity information, a list of application layer entity information, and/or the like.

At 4113, an application layer entity of the second electronic device may communicate a service registration request (e.g., CD-SRVC-REGISTER.REQ) to the capability discovery layer 4103. In response to receiving the service registration request, the capability discovery layer 4103 may update the applicable application layer entity registration database.

At 4115, the capability discovery layer 4103 may communicate an incremental capability update (e.g., IncrementalCapabilityPush) to the capability discovery layer 4105. As an example, the capability discovery layer 4103 may communicate the incremental capability according to a push communication scheme. According to various embodiments of the present disclosure, the capability discovery layer 4103 may communicate an incremental capability update if the first electronic device has a pending/valid persistent query from a second electronic device (e.g., if the capability discovery layer 4103 determines that a persistent duration has not expired on a previously received persistent capability query). According to various embodiments of the present disclosure, the incremental capability update may include changed service capabilities (e.g., a delta of service capabilities over a period of time such as since the last incremental update and/or the initial response to the initial capability query). The incremental capability update may include an application layer entity update information.

At 4117, the capability discovery layer 4105 may communicate a capability acknowledgement (e.g., CapabilityAck) to the capability discovery layer 4103. The capability acknowledgement may acknowledge receipt of the incremental capability update.

According to various embodiments of the present disclosure, a third electronic device may connect to the first electronic device. As an example, if the third peer electronic device connects to the first electronic device, then the third peer electronic device may be authenticated (e.g., the third electronic device may have to undergo an authentication procedure).

At 4119, the third peer electronic device (e.g., the electronic device having the capability discovery layer 4101) may be connected to the first electronic device (e.g., the electronic device having the capability discovery layer 4105). The capability discovery layer 4105 may authenticate the newly connected peer electronic device.

At 4121, the capability discovery layer 4105 may communicate a capability query (e.g., PersistentCapabilityQuery) to the capability discovery layer 4101. The capability query may be a persistent capability query. For example, the capability query may include may include a query type field that indicates that the request corresponds to a persistent type. The capability query may correspond to a query for applicable peer electronic devices for a list of service capabilities (e.g., matching a filter of the service list request). The capability discovery layer 4105 may communicate a capability query corresponding to the persistent query associated with the service list received at 4107.

At 4123, the capability discovery layer 4101 may communicate a response to the capability query (e.g., CapabilityAnswer). The response to the capability query may include filtered service capabilities (e.g., filtered according to the capability query). The response to the capability query may include an indication of a message type, a software version, a number of application layer entity information, a list of application layer entity information, and/or the like.

In response to the receiving the response to the capability query, the capability discovery layer 4105 may update the applicable peer electronic device application layer database with information relating to the response to the capability query.

G. DEVICE DISCOVERY

According to various embodiments of the present disclosure, an electronic device may discover at least one peer electronic device to which the electronic device may connect in order to provide a user with an accessory service. For example, the electronic device may discover at least one peer electronic device with which to establish a connection to enable the electronic device to provide and/or consume services.

According to various embodiments of the present disclosure, an electronic device may want to determine whether any peer electronic devices exist with which the electronic device may connect in order to create a system of electronic devices that communicate using a common accessory protocol. Common accessory protocols may include accessory protocols that are variations of a same accessory protocol.

According to various embodiments of the present disclosure, the discovery of peer electronic devices with which to connect may be defined by a discovery protocol. The discovery protocol may enable an electronic device that implements an accessory protocol to discover other electronic devices that implement an accessory protocol that is common to the accessory protocol implemented by the electronic device. The discovery protocol may enable an electronic device that implements an accessory protocol to authenticate other electronic devices that implement an accessory protocol that is common to the accessory protocol implemented by the electronic device. The discovery protocol may define service access points that may be used by a device management application installed on an electronic device to discover other electronic devices that implement an accessory protocol that is common to the accessory protocol implemented by the electronic device.

According to various embodiments of the present disclosure, the discovery protocol may enable an electronic device to discover other electronic devices across a variety of communication technologies. For example, the discovery protocol may enable the electronic device to discover other electronic devices according to Bluetooth, Bluetooth low energy, Bluetooth Basic Rate/Enhanced Data Rate, Internet Protocol, User Datagram Protocol, Transmission Control Protocol, Radio Frequency Communication, Wi-Fi, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, Universal Serial Bus (USB), High Definition Multimedia Interface (HDMI), Recommended Standard 232 (RS-232), Plain Old Telephone Service (POTS), Ethernet, Proprietary Connectivity technologies, Proprietary software communication frameworks and/or the like. For example, the discovery layer may enable the electronic device to discover other electronic devices according to various communication technologies using the various connection modules 821 through 855. According to various embodiments of the present disclosure, the discovery protocol may enable an electronic device to discover a specific other electronic device across a variety of communication technologies. The electronic device may discover the specific other electronic device across more than one communication technology concurrently, or sequentially. According to various embodiments of the present disclosure, the discovery protocol may enable an electronic device to discover more than one other electronic device, at least two of which are discovered using a communication technology relative to another.

As illustrated in FIG. 9, according to various embodiments of the present disclosure, the application layer may include a device management application 917. The device management application 917 may manage the operations relating to discovery, authentication, attachment of a device to an accessory communication protocol, and/or the like.

The discovery protocol may use a discovery management entity service access point 919, an authentication management entity service access point 925, and/or an attachment service access point 931.

According to various embodiments of the present disclosure, the discovery protocol may specify the protocol for communication between the device management application 917 and the discovery management entity 921. The device management application 917 may use the device management entity service access point 919 to communicate with the discovery management entity 921. The discovery management entity 921 may provide or otherwise communicate to the device management application 917 a list of potential electronic devices that implement an accessory protocol that is common to the accessory protocol implemented by the electronic device 901. The device management application 917 may communicate a request to the discovery management entity to connect to or disconnect from electronic devices that implement an accessory protocol that is common to the accessory protocol implemented by the electronic device 901.

According to various embodiments of the present disclosure, the discovery protocol may specify the protocol for communication between the discovery management entity 921 and a security service 923. The security service 923 may provide authentication functionality to enable the electronic device to authenticate peer electronic devices. The discovery management entity 921 may use the authentication management entity service access point 925 to communicate with the security service 923.

According to various embodiments of the present disclosure, the discovery protocol may specify the protocol for communication between the discovery management entity 921 and a session layer 929. The discovery management entity 921 may use the attachment service access point 931 to communicate with the session layer 929. The discovery management entity 921 may use the attachment service access point 931 to communicate with application protocols and/or application entities. The discovery management entity 921 may use the attachment service access point 931 to notify applicable accessory communication protocols that a peer electronic device that implements an accessory protocol that is common to the accessory protocol implemented by the electronic device 901 is discovered, authenticated, attached, detached and/or the like to the electronic device 901.

According to various embodiments of the present disclosure, the discovery management entity 921 may set roles for performing a discovery procedure for peer electronic devices that implement an accessory protocol that is common to the accessory protocol implemented by the electronic device 901. For example, the discovery management entity 921 may define roles for performing device discovery procedures. The discovery management entity 921 may initiate a discovery procedure. The discovery management entity 921 may respond to incoming messages relating to the discovery procedure. The discovery management entity 921 may provide appropriate indications (e.g., notifications and/or message exchanges) to the device management application 917. The discovery management entity 921 may request the authentication management entity service access point 925 to authenticate a peer electronic device that is connected to the electronic device 901 and that implements an accessory protocol that is common to the accessory protocol implemented by the electronic device 901. The discovery management entity 921 may process and/or handle responses (e.g., message exchange) received from the authentication management entity service access point 925 (e.g., in relation to an authentication of a connected device). The discovery management entity 921 may provide the applicable accessory communication protocols with an indication of peer electronic devices that implement an accessory protocol that are common to the accessory protocol implemented by the electronic device 901 and that are authenticated (e.g., by the security service 923).

According to various embodiments of the present disclosure, the security service 923 may provide various services to the discovery management entity 921 and/or an accessory protocol transport layer. The security service 923 may manage the cryptographic certificate thereof. The security service 923 may verify the cryptographic certificates of a peer electronic device that is connected to the electronic device 901 and that implements an accessory protocol that is common to the accessory protocol implemented by the electronic device 901. The security service 923 may perform random number generation. The security service 923 may provide generation and verification of cryptographic signatures. The security service 923 may provide encryption and/or decryption services.

Referring to FIG. 10, at 1009 and 1015, the second electronic device 1003 and the first electronic device 1001 may find each other and exchange peer descriptions. For example, at 1009 and 1015, peer electronic devices that implement a common accessory protocol may respectively set a visibility setting to be visible to other electronic devices and/or scan for visible peer electronic devices. As illustrated in FIG. 10, the second electronic device 1003 is configured to be visible to the first electronic device 1001 at 1009. At 1015, the first electronic device 1001 scans for a peer electronic device (e.g., that is visible thereto).

At 1019 and 1023, the first electronic device 1001 and the second electronic device 1003 may respectively authenticate each other. For example, at 1019, the discovery management entity 1017 may communicate with the security service 1021 to authenticate the second electronic device 1003. The discovery management entity 1017 may communicate with the security service 1021 to exchange and verify the cryptographic credentials of the second electronic device 1003. Similarly, at 1023, the discovery management entity 1011 may communicate with the security service 1025 to authenticate the first electronic device 1001.

At 1027 and 1031, the first electronic device 1001 and the second electronic device 1003 may respectively perform attachment procedures with respect to the electronic device connected thereto. For example, at 1027 and/or 1031, an electronic device may trigger an accessory protocol communication phase according to which an applicable network protocol, an applicable discovery protocol, and an applicable application protocol are used by application layer entities on the respective electronic device. The electronic device may trigger an accessory protocol communication phase according to which an applicable network protocol, an applicable discovery protocol, and an applicable application protocol are used by application layer entities on the respective electronic device in order to allow the electronic device to communicate with the peer electronic device connected thereto.

According to various embodiments of the present disclosure, an electronic device may perform an accessory description exchange with a peer electronic device in order for the electronic device and the peer electronic device to respectively advertise (e.g., notify) their respective abilities to communicate using an accessory protocol. After the accessory description exchange, the electronic device (e.g., a smart device) and the peer electronic device (e.g., an accessory) may be aware of each other's description, connectivity specific addresses, and other metadata with which the applicable accessory communication protocols may establish a connection and exchange messages in order to provide accessory services.

According to various embodiments of the present disclosure, an accessory device protocol may define generic procedures that are independent of the connectivity technology by which an electronic device and a peer electronic device are connected. Because the accessory device protocol may define generic procedures, development of application layer entities (e.g., application programs) may be extensible. Developers of application layer entities may benefit from reduced complexity for developing application layer entities that may be installed on an electronic device and that may communicate and provide and/or consumer services with an application layer entity installed on a peer electronic device. As a result of the reduced complexity and ease of programming compatible application programs, an eco-system of application programs for use on electronic devices that implement applicable accessory device protocol may flourish.

Generic procedures that may defined by the accessory device protocol and that may be independent of connectivity technology may include sending and/or receiving scan messages, sending and/or receiving response messages, exchange of cryptographic credentials, verification of cryptographic credentials, exchanging communication protocol messages, and/or the like.

Figure 42:
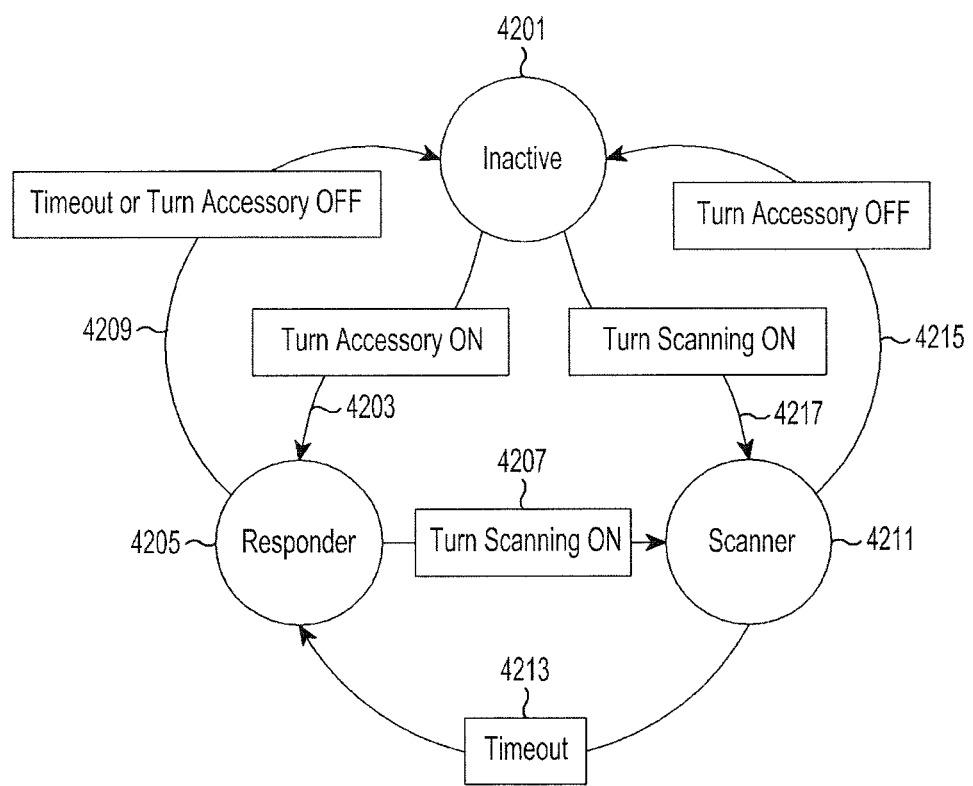
FIG. 42 illustrates a state diagram of a device management entity according to an embodiment of the present disclosure.

FIG. 42 illustrates a state diagram of a device management entity according to various embodiments of the present disclosure.

Referring to FIG. 42, a device management entity may support three roles or states for performing device discovery (e.g., accessory device discovery). For example, the device management entity may support an inactive role, a responder role, and/or a scanner role.

According to various embodiments of the present disclosure, the inactive role may be a role in which the device management entity may not transmit or listen for any messages on any of the connectivity interfaces of the electronic device. The inactive role may be the default role for the electronic device (e.g., the device management entity thereof).

According to various embodiments of the present disclosure, the responder role may be a role in which the device management entity turns on (e.g., activates) a specified connectivity interface (or all connectivity interfaces) and listens for incoming messages that may include peer electronic device descriptions from a peer electronic device (e.g., that may be in the scanner role) that may implement an accessory protocol that is common to the accessory protocol implemented by the electronic device. According to the responder role, the device management entity may respond to incoming messages that may include peer electronic device descriptions from a peer electronic device. According to the responder role, the device management entity may provide a notification of a successful attachment of a peer electronic device that may implement an accessory protocol that is common to the accessory protocol implemented by the electronic device. According to the responder role, the device management entity may activate a timer (e.g., having a value set by variable ACTIVE_TIMEOUT) upon the device management entity entering the responder role. The device management entity may transition back to the inactive role if the timer expires.

According to various embodiments of the present disclosure, the scanner role may be a role in which the device management entity turns on (e.g., activates) the specified connectivity interface (or all connectivity interfaces) and listens for incoming messages that may include peer electronic device descriptions from a peer electronic device (e.g., that may be in the scanner role) that may implement an accessory protocol that is common to the accessory protocol implemented by the electronic device. According to the scanner role, the device management entity may respond to incoming messages that may include peer electronic device descriptions from a peer electronic device. According to the scanner role, the device management entity may transmit a message that may include peer electronic device descriptions of the electronic device. According to the scanner role, the device management entity may trigger an authentication procedure (e.g., for authenticating peer electronic devices that are in the responder role). According to the scanner role, the device management entity may provide a notification of a successful attachment of a peer electronic device that may implement an accessory protocol that is common to the accessory protocol implemented by the electronic device. According to the responder role, the device management entity may activate a timer (e.g., having a value set by variable SCAN_TIMEOUT) upon the device management entity entering the scanner role. The device management entity may transition back to the responder role if the timer expires.

As illustrated in FIG. 42, the device management entity in an inactive role 4201 may be a default role. For example, if an electronic device is initialized (e.g., turned on) when the electronic device is inactive, then the device management entity of the electronic device may start in the inactive role 4201.

If the electronic device (e.g., the accessory) is turned on or otherwise activated, then as illustrated by state transition arrow 4203, the device management entity may transition to a responder role 4205. For example, in response to the electronic device being turned on or otherwise activated, the device management entity may transition to the responder role 4205.

If the device management entity transitions to the responder role 4205, then the device management entity may start a timer. For example, upon the device management entity transitioning to the responder role 4205, the device management entity may start or otherwise initialize a timer.

As illustrated by state transition arrow 4209, if the timer (e.g., ACTIVE_TIMEOUT) expires, then the device management entity may transition to the inactive role 4201. For example, if the timer expires when the timer device management entity is in the responder role 4205, then the device management entity may transition to the inactive role 4201.

Similarly, as illustrated by state transition arrow 4209, if the electronic device (e.g., accessory) is turned off or otherwise deactivated, then the device management entity may transition to the inactive role 4201 (e.g., from the responder role 4205).

As illustrated by state transition arrow 4207, if the electronic device turns on or otherwise activates scanning (e.g., when the device management entity is in the responder role 4205), then the device management entity may transition from the responder role to a scanner role 4211.

If the device management entity transitions to the scanner role 4211, then the device management entity may start a timer. For example, upon the device management entity transitioning to the scanner role 4211, the device management entity may start or otherwise initialize a timer.

As illustrated by state transition arrow 4213, if the timer (e.g., SCAN_TIMEOUT) expires, then the device management entity may transition to the responder role 4205. For example, if the timer expires when the timer device management entity is in the scanner role 4211, then the device management entity may transition to the responder role 4205. According to various embodiments of the present disclosure, the device management entity may transition from the scanner role 4211 to the responder role in response to the scanning role being turned off.

As illustrated by state transition arrow 4215, if the electronic device (e.g., accessory) is turned off or otherwise deactivated, then the device management entity may transition to the inactive role 4201 (e.g., from the scanner role 4211).

As illustrated by state transition arrow 4217, if scanning is turned on (e.g., when the device management entity is in the inactive role 4201), then the device management entity may transition to a scanner role 4211. For example, in response to the scanning being turned on or otherwise activated, the device management entity may transition to the scanner role 4211.

According to various embodiments of the present disclosure, the device management entity may store information relating to peer electronic devices. For example, the device management entity may store information relating to peer electronic devices to keep track of peer electronic devices, for use in performing discovery procedures, and/or for use in performing authentication procedures. The device management entity may store a peer electronic device list. The peer electronic device list may include information about peer electronic devices. For example, the peer electronic device list may include a device identifier (e.g., that corresponds to each peer electronic device discovered by the device management entity), a device action (e.g., an indication whether the device management application has instructed the device management entity to connect with the corresponding peer electronic device), a device state (e.g., an indication whether the corresponding peer electronic device has been discovered, authenticated, connected, and/or the like), a device connection type (e.g., an indication of the connectivity technology associated with the corresponding peer electronic device), accessory description information, and or the like.

According to various embodiments of the present disclosure, each peer electronic device included in the peer electronic device list may correspond to a single connectivity technology. As a result, for peer electronic devices having multiple connectivity technologies with which to connect to the electronic device, the peer electronic device may be included in the peer electronic device list multiple times, with each entry corresponding to a single instance of the peer electronic device and one of the connectivity technologies associated therewith.

According to various embodiments of the present disclosure, the peer electronic device list may include accessory description information. The accessory description information may include a product identifier of the peer electronic device, a manufacturer identifier of the peer electronic device, a friendly name of the peer electronic device, an accessory protocol version supported by the peer electronic device (e.g., a major version, a minor version, and/or the like), an accessory software version (e.g., a version of the accessory protocol implemented by the peer electronic device), an ASP ID of a provided service (e.g., identifying a primary service provided by the peer electronic device), an ASP ID of a consumed service (e.g., identifying a primary service consumed by the peer electronic device), a device connectivity-specific address, a device connectivity-specific metadata, and/or the like.

According to various embodiments of the present disclosure, the device management application may communicate information for discovery procedures to the applicable device management entity in accordance with the discovery protocols. For example, the device management application may communicate a role, a connectivity preference (e.g., an indication of a preferred connectivity technology), a timeout preference (e.g., an indication of whether a timer value other than a default value is preferred for timers to determine a whether the device management entity experiences a timeout in a given role), an active timeout override (e.g., an indication for timers to determine whether the device management entity experiences a timeout in a given role) and/or the like.

According to various embodiments of the present disclosure, if a device management entity discovers a peer electronic device that implements an accessory protocol that is common to the accessory protocol implemented by the electronic device, then the device management entity may store information relating to a device identifier of the peer electronic device, a device state of the peer electronic device (e.g., an indication whether the peer electronic device is authenticated, connected, and/or the like), a device connection type (e.g., identifying the connectivity technology with which the peer electronic device is connected), accessory description detail information, and/or the like.

Figure 43:
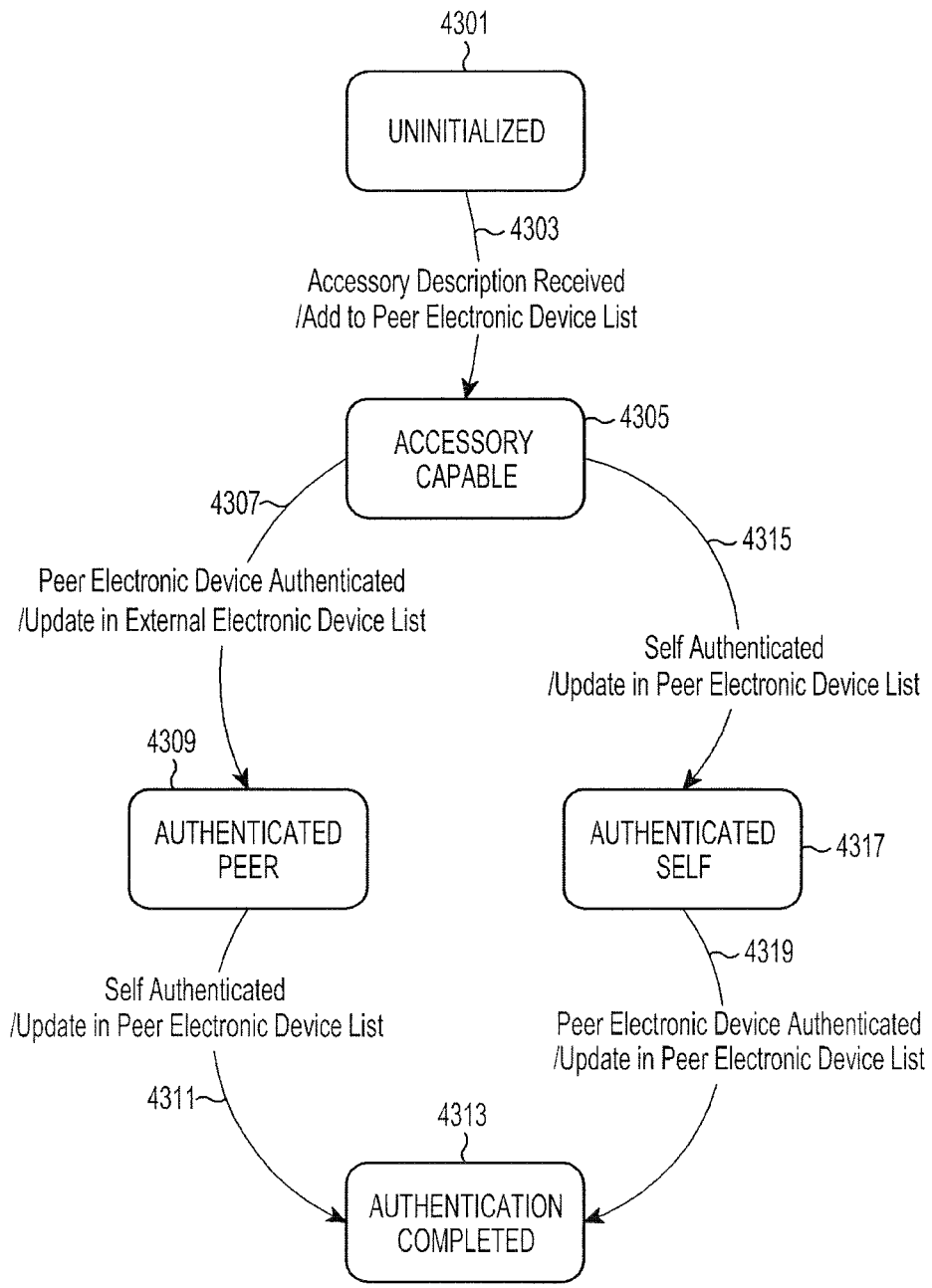
FIG. 43 illustrates a state diagram for connectivity of an electronic device according to an embodiment of the present disclosure.

FIG. 43 illustrates a state diagram for connectivity of an electronic device according to an embodiment of the present disclosure.

Referring to FIG. 43, a state diagram for connectivity of an electronic device according to a given connectivity technology is illustrated. For example, the connectivity technology may correspond to an IP connectivity. As an example, the connectivity technology may correspond to a USB connectivity. According to various embodiments of the present disclosure, various states of the connectivity of an electronic device may be stored in a peer electronic device list.

At 4301, the electronic device is in an uninitialized state in relation to a peer electronic device.

As illustrated by state transition arrow 4303, the electronic device may receive an accessory description from a peer electronic device. For example, the accessory description may include information from which the electronic device may determine whether the peer electronic device implements an accessory protocol that is common to the accessory protocol implemented by the electronic device. The electronic device may store information relating to the peer electronic device. For example, the electronic device may add the peer electronic device to the peer electronic device list.

If the peer electronic device is determined to implement an accessory protocol that is common to the accessory protocol implemented by the electronic device, then the electronic device may transition to the accessory capability state 4305. For example, in the accessory capability state 4305, the electronic device may have discovered a peer electronic device that implements an accessory protocol that is common to the accessory protocol implemented by the electronic device.

As illustrated by state transition arrow 4307, the electronic device and the peer electronic device may perform authentication procedures. For example, the electronic device may authenticate the peer electronic device. The electronic device may update the peer electronic device list. For example, the electronic device may update the peer electronic device list to reflect the results of the authentication procedure.

If the peer electronic device is authenticated, then the electronic device may transition to the authenticated peer state 4309. For example, upon authenticating the peer electronic device, the electronic device may transition to the authenticated peer state 4309.

As illustrated by state transition arrow 4311, the electronic device and/or the peer electronic device may perform authentication procedures. For example, the electronic device may be authenticated in relation to the peer electronic device. A peer electronic device list may be updated to reflect the results of the authentication of the electronic device in relation to the peer electronic device.

If the electronic device is authenticated, then the electronic device may transition to an authentication complete state 4313. In the authenticated complete state 4313, the electronic device and the peer electronic device may be authenticated in relation to one another. As an example, upon authenticating the electronic device, the electronic device (or connectivity state of the electronic device in relation to the peer electronic device) may transition to the authenticated complete state 4313.

Similarly, as illustrated by state transition arrow 4315, the electronic device and/or the peer electronic device may perform authentication procedures. For example, the electronic device may be authenticated in relation to the peer electronic device. A peer electronic device list may be updated to reflect the results of the authentication of the electronic device in relation to the peer electronic device.

If the peer electronic device is authenticated, then the electronic device may transition to the authenticated self state 4317. For example, upon authenticating the peer electronic device, the electronic device may transition to the authenticated self state 4317.

As illustrated by state transition arrow 4319, the electronic device and the peer electronic device may perform authentication procedures. For example, the electronic device may authenticate the peer electronic device. The electronic device may update the peer electronic device list. For example, the electronic device may update the peer electronic device list to reflect the results of the authentication procedure.

If the peer electronic device is authenticated, then the electronic device may transition to the authentication complete state 4313. In the authenticated complete state 4313, the electronic device and the peer electronic device may be authenticated in relation to one another. As an example, upon authenticating the peer electronic device, the electronic device (or connectivity state of the electronic device in relation to the peer electronic device) may transition to the authenticated complete state 4313.

Figure 44:
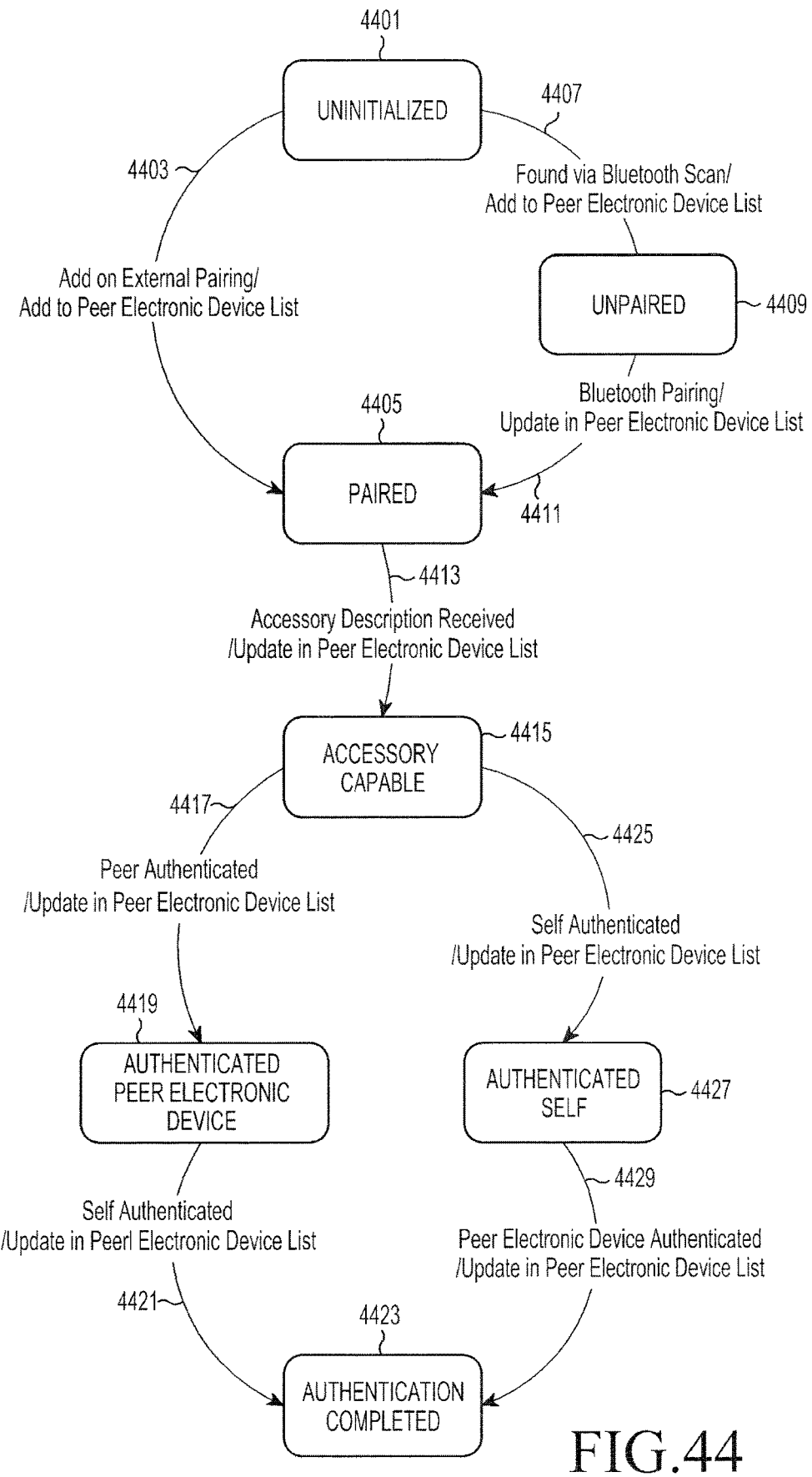
FIG. 44 illustrates a state diagram for connectivity of an electronic device according to an embodiment of the present disclosure.

FIG. 44 illustrates a state diagram for connectivity of an electronic device according to an embodiment of the present disclosure.

Referring to FIG. 44, a state diagram for connectivity of an electronic device according to a given connectivity technology is illustrated. For example, the connectivity technology may correspond to a Bluetooth connectivity. As an example, the connectivity technology may correspond to a Bluetooth low energy connectivity. According to various embodiments of the present disclosure, various states of the connectivity of an electronic device may be stored in a peer electronic device list.

At 4401, the electronic device is in an uninitialized state in relation to a peer electronic device.

As illustrated by state transition arrow 4403, the electronic device may add a peer pairing in relation to a peer electronic device. In response to the addition of the peer pairing, the electronic device may store information relating to the peer electronic device. For example, the electronic device may add the peer electronic device to the peer electronic device list.

If the electronic device is determined to be paired with the peer electronic device (e.g., in response to the addition of the peer pairing), then the electronic device may transition to the paired state 4405.

As illustrated by state transition arrow 4407, the electronic device may perform a scanning for a peer electronic device to which to pair. For example, the electronic device may perform a Bluetooth scan for a peer electronic device. If the electronic device finds a peer electronic device with which to pair, then the electronic device may store information relating to the peer electronic device. As an example, in response to the electronic device finding the peer electronic device with which to pair (e.g., using a scanning process), the electronic device may store information relating to the peer electronic device. For example, the electronic device may add the peer electronic device to the peer electronic device list.

If the electronic device finds a peer electronic device with which to pair, then the electronic device may transition to an unpaired state 4409. For example, the unpaired state 4409 may correspond to the electronic device being unpaired in relation to the peer electronic device.

As illustrated by state transition arrow 4411, the electronic device and the peer electronic device may perform a pairing procedure. For example, the electronic device and the peer electronic device may perform a Bluetooth pairing. The electronic device may update the peer electronic device list. For example, the electronic device may update the peer electronic device list to reflect the results of the pairing procedure.

If the electronic device and the peer electronic device are determined to be paired (e.g., in response to the Bluetooth pairing procedures), then the electronic device may transition to the paired state 4405.

As illustrated by state transition arrow 4413, the electronic device may receive an accessory description from a peer electronic device. For example, the accessory description may include information from which the electronic device may determine whether the peer electronic device implements an accessory protocol that is common to the accessory protocol implemented by the electronic device. The electronic device may store information relating to the peer electronic device. For example, the electronic device may add the peer electronic device to the peer electronic device list.

If the peer electronic device is determined to implement an accessory protocol that is common to the accessory protocol implemented by the electronic device, then the electronic device may transition to the accessory capability state 4415. For example, in the accessory capability state 4415, the electronic device may have paired with a peer electronic device that implements an accessory protocol that is common to the accessory protocol implemented by the electronic device.

As illustrated by state transition arrow 4417, the electronic device and the peer electronic device may perform authentication procedures. For example, the electronic device may authenticate the peer electronic device. The electronic device may update the peer electronic device list. For example, the electronic device may update the peer electronic device list to reflect the results of the authentication procedure.

If the peer electronic device is authenticated, then the electronic device may transition to the authenticated peer state 4419. For example, upon authenticating the peer electronic device, the electronic device may transition to the authenticated peer state 4419.

As illustrated by state transition arrow 4421, the electronic device and/or the peer electronic device may perform authentication procedures. For example, the electronic device may be authenticated in relation to the peer electronic device. A peer electronic device list may be updated to reflect the results of the authentication of the electronic device in relation to the peer electronic device.

If the electronic device is authenticated, then the electronic device may transition to an authentication complete state 4423. In the authenticated complete state 4423, the electronic device and the peer electronic device may be authenticated in relation to one another. As an example, upon authenticating the electronic device, the electronic device (or connectivity state of the electronic device in relation to the peer electronic device) may transition to the authenticated complete state 4423.

Similarly, as illustrated in state transition arrow 4425, the electronic device and/or the peer electronic device may perform authentication procedures. For example, the electronic device may be authenticated in relation to the peer electronic device. A peer electronic device list may be updated to reflect the results of the authentication of the electronic device in relation to the peer electronic device.

If the peer electronic device is authenticated, then the electronic device may transition to the authenticated self state 4427. For example, upon authenticating the peer electronic device, the electronic device may transition to the authenticated self state 4427.

As illustrated by state transition arrow 4429, the electronic device and the peer electronic device may perform authentication procedures. For example, the electronic device may authenticate the peer electronic device. The electronic device may update the peer electronic device list. For example, the electronic device may update the peer electronic device list to reflect the results of the authentication procedure.

If the peer electronic device is authenticated, then the electronic device may transition to the authentication complete state 4423. In the authenticated complete state 4423, the electronic device and the peer electronic device may be authenticated in relation to one another. As an example, upon authenticating the peer electronic device, the electronic device (or connectivity state of the electronic device in relation to the peer electronic device) may transition to the authenticated complete state 4423.

H. NETWORK PROTOCOL

H-1. Introduction

The network protocol provides uniform data services on top of diverse connectivity technologies. The application protocols make use of the services of the network protocol. The network protocol may include the session layer, the transport layer, and the connection layer, which have been introduced above. The session layer includes a Session layer Device Management (SDM) entity, a Service Agent Management (SAM) entity, a Service Connection Management (SCM) entity, and a Session layer Data Communication (SDC) entity. The transport layer includes a Transport layer Device Management (TDM) entity, a Transport layer Session Configuration (TSC) entity, and a Transport layer Data Communication (TDC) entity. The TDM entity provides services to the session layer to configure and remove accessory protocol capable peer electronic devices via the TDM-SAP. The TSC entity provides services to the session layer to configure and remove the QoS and priority attributes of a session via the TSC-SAP. The TDC entity provides data communication services to the session layer via the TDC-SAP.

The application layer uses the services provided by Session layer. In particular, ALEs of the application layer rely on the session layer to setup Service Connections over which Application Protocol data exchange can occur. To be specific, the application layer includes five primary responsibilities. First, the application layer is responsible to define the application protocol between peer ALEs. Second, the application layer is responsible to request the session layer to create a Service Connection to enable application protocol data exchange between peer ALEs. A Service Connection may include a multiplicity of channels to logically separate APDU sequences employing different QoS treatments. Third, the application layer is responsible to request the session layer to terminate Service Connections. Fourth, the application layer is responsible to process APDUs communicated on a channel, as per the application protocol. Fifth, the application layer is responsible for forming APDUs as per the application protocol while adhering to the SDU size restriction of the channel over which those APDUs are to be sent.

There are primarily three services the application layer expects from the below session layer. First, the application layer expects the session layer to provide a registration/unregistration service. This allows credentials of registered ALEs to be reachable by peer ALEs. Second, the application layer expects the session layer to provide service Connection Creation and Termination. Third, the application layer expects the session layer to provide a datagram service.

The session layer enables ALEs to interact with peer ALEs by providing an abstraction referred to as a Service Connection. That is, the session layer allows ALEs to register themselves by providing service capability details such as ASP IDs so that they can be reachable by peer ALEs wishing to establish a Service Connection to them. The Service Connection is a conduit set up between peer ALEs that binds a set of data channels over which they can exchange APDUs. Each channel can be specified with its own desired QoS treatment. However the session layer itself is agnostic of the Application Protocol interactions and data exchanges between the peer ALEs.

The specification of a Service Connection includes Channel Numbers that the initiating ALE populates as per the Accessory Application Protocol that the peer ALEs intend to use to interact with each other. Internally there are Sessions set up between peer session layer entities and the Channel Numbers of a Service Connection map one-to-one with a Session ID. There is a Default Session which uses a reserved Session ID on which exchange session layer control messages are exchanged. The session layer also enables the transmission and reception of session layer Service Data Units (SSDUs).

The session layer includes eight primary responsibilities. First, the session layer receives notifications from the Discovery Management Entity about connected and authenticated peer electronic devices. Second, the session layer configures the transport layer to communicate with an authenticated peer electronic device. Third, the session layer creates and terminates Service Connections as requested from the application layer. Here, the application layer request for Service Connection specifies the channels desired and their respective QoS. Fourth, the session layer configures the transport layer corresponding to the QoS desired for the Channels of a Service Connection. Fifth, the session layer provides a datagram service to the application layer. Sixth, the session layer relays application layer data to the transport layer. Seventh, the session layer routes the data received from the transport layer and passes it to appropriate ALEs. Eighth, the session layer acts upon connection or session events notified by the transport layer. There are primarily two services the session layer expects from the below transport layer. First, the session layer expects the transport layer to provide a datagram service. Second, the session layer expects the transport layer to deliver SPDUs at the requested QoS.

The transport layer provides a data service that enables the transmission and reception of transport layer service data units (TSDUs). The transport layer management service enables QoS parameters and settings to be applied by the session layer at the granularity of individual sessions. To be precise, all the TSDUs carried in a given session receive the same QoS treatment.

The transport layer includes eight primary responsibilities. First, the transport layer configures the Connection layer to communicate with an authenticated peer electronic device. Second, the transport layer provides appropriate QoS on each session; traffic in both directions (outgoing and incoming) is treated in the same way for a given session. Third, the transport layer performs acknowledgement and retry procedures. Fourth, the transport layer performs fragmentation and reassembly procedures to provide an Unrestricted SDU service by abstracting the SDU size limitations of the underlying connectivity technology. Fifth, the transport layer provides a datagram service to the Session layer. Sixth, the transport layer acts upon connection events notified by the connection layer. Seventh, the transport layer provides appropriate priority to PDUs from different sessions, as per a Priority Queuing process. Eighth, if multiple queues with the same priority have packets to be transmitted, then the transport layer brakes the tie should using an implementation-specific technique which is dictated by the platform capability and policies of that device. There are primarily one service the transport layer expects from the below connection layer, namely a datagram service from connection layer.

The connection layer provides a data service that receives data from the transport layer and transmits it over the appropriate connectivity medium. The connection layer also receives data from a connectivity medium and relays it to the transport layer. The connection layer management entity may provide a service such as radio link failure notification, device disassociation notification etc. The connection layer includes four primary responsibilities. First, the connection layer provides common connection layer SAPs to the transport layer. Second, the connection layer supports the transmission of transport layer frames over connectivity technologies including, but not limited to, TCP, Wi-Fi, Bluetooth, Bluetooth low energy, USB and UART. Third, the connection layer provides a datagram service to the transport layer. Fourth, the connection layer provides connectivity technology specific event notifications to the transport layer. Fifth, the connection layer also provides Data Integrity and CRC protection to the Datagram.

Aspects of the session layer, the transport layer, and the connection layer are described below in additional detail.

H-2. Session Layer Protocol

First, aspects of the network protocol that are primarily related to the session layer are referred to as the session layer protocol. The session layer protocol is used to carry out various functions. For example, the functions of the session layer protocol include peer electronic device addition, peer electronic device deletion, service connection creation, service connection termination, the exchange of APDUs, and default session and session identifier generation. Examples of these functions are described below.

H-2-1. Peer Electronic Device Addition

Peer electronic device addition is performed by the AME triggering, upon discovery and authentication of a peer electronic device, the session layer which in turn configures the connection layer and the transport layer for the new peer electronic device. An example of peer electronic device addition is described below with reference to FIG. 45.

Figure 45:
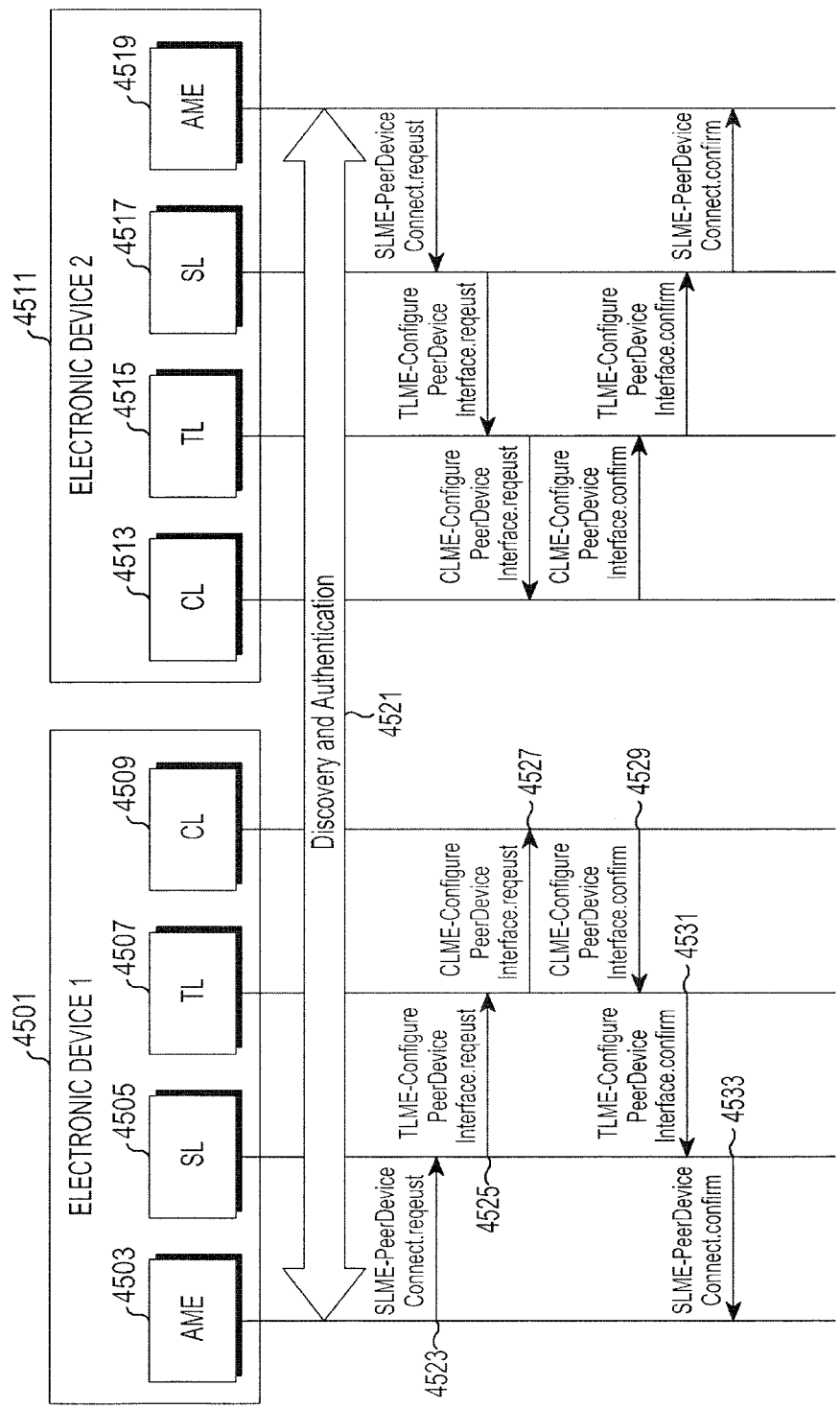
FIG. 45 illustrates a message sequence chart illustrating electronic device addition according to an embodiment of the present disclosure.

FIG. 45 illustrates a message sequence chart illustrating electronic device addition according to an embodiment of the present disclosure.

Referring to FIG. 45, a first electronic device 4501 and a second electronic device 4511 are shown. The first electronic device 4501 includes an AME 4503, a session layer 4505, a transport layer 4507, and a connection layer 4509. The second electronic device 4511 includes an AME 4519, a session layer 4517, a transport layer 4515, and a connection layer 4513.

In operation 4521, AME 4503 of first electronic device 4501 and the AME 4513 of second electronic device 4511 perform discovery and authentication. In operation 4523, AME 4503 generates and communicates a SLME-PeerDeviceConnect.request message to the SLME of the session layer 4505 upon authenticating a peer electronic device with which it wishes to connect for protocol communications. The SLME-PeerDeviceConnect.request message is used by the AME 4503 to request the SLME of the session layer 4505 to add an authenticated accessory protocol capable device to its list of peer electronic devices. The structure of the SLME-PeerDeviceConnect.request message is as follows:

```
SLME-PeerDeviceConnect.request    {
                                  Transaction ID,
                                  Device ID,
                                  Device Connection Type,
                                  Device Connection QoS,
                                  Device Connection MaxSDUSize,
                                  Accessory Description Details
                                  }
```

The parameters of the SLME-PeerDeviceConnect.request message are described below with reference to Table 1.

TABLE 1

| Parameter Name | Size | Valid Range |
|---|---|---|
| Transaction ID | 8 bits | 0x00 to 0xFF |
| Device ID | 32 bits | 0x00000000 to 0xFFFFFFFF |
| Device Connection Type | 16 bits | 0x0001-0xFFFF, As per Table 2 |
| Device Connection QoS | 8 bits | As per Table 3 |
| Device Connection MaxSDUSize | 16 bits | As per Table 4 |
| Accessory Description Details | | As per Table 5 |

The parameters of the SLME-PeerDeviceConnect.request message shown in Table 1 are described below.

Transaction ID of Table 1: The transaction ID is used for correlating the SLME-PeerDeviceConnect.confirm message with the SLME-PeerDeviceConnect.request message. The transaction ID is generated by the AME. It is an 8 bit rolling counter that is incremented monotonically by one for each new SLME-Peer DeviceConnect.request message.

Device ID of Table 1: The device ID is used to identify an accessory protocol capable peer electronic device. The device ID is 32 bits long. The device ID is populated by the AME 4503 by picking an entry from a peer electronic device list with which it wants to establish a connection for accessory protocol communications.

Device Connection Type of Table 1: The device connection type is used to identify the connectivity technology being used to connect the peer electronic device. The device connection type is defined as per Table 2.

TABLE 2

| Value | Connectivity Technology |
|---|---|
| 0x0000 | USB |
| 0x0001 | TCP/IP over Wi-Fi |
| 0x0002 | Bluetooth Low Energy |
| 0x0003 | Bluetooth-RFCOMM |

Device Connection QoS of Table 1: The device connection QoS is used to identify the QoS provided by the connectivity technology being used to connect the peer electronic device. The device connection QoS is defined as per Table 3.

TABLE 3

| Device Connection Type | | Device Connection QoS | |
|---|---|---|---|
| Value | Connectivity Technology | Value | Description |
| 0x0000 | USB | 0x00 | Unrestricted SDU and In-order delivery |
| 0x0001 | TCP/IP over Wi-Fi | 0x00 | Unrestricted SDU and In-order delivery |
| 0x0002 | Bluetooth Low Energy | 0x03 | Restricted SDU and Unordered delivery |
| 0x0003 | Bluetooth-RFCOMM | 0x00 | Unrestricted SDU and In-order delivery |

Device Connection MaxSDUSize of Table 1: The device connection MaxSDUSize is used to identify the maximum size of the SDU that is accepted by the connectivity technology being used to connect the peer electronic device. The device connection MaxSDUSize is defined as per Table 4.

TABLE 4

| Device Connection Type | | Device Connection MaxSDUSize |
|---|---|---|
| Value | Connectivity Technology | Value |
| 0x0000 | USB | 0xFFFF (65535) |
| 0x0001 | TCP/IP over Wi-Fi | 0xFFFF (65535) |
| 0x0002 | Bluetooth Low Energy | 0x0017 (23) |
| 0x0003 | Bluetooth-RFCOMM | 0xFFFF (65535) |

Accessory Description Details of Table 1: The accessory description details may include identification information pertaining to an accessory protocol capable peer electronic device. The accessory description details include multiple fields as defined in Table 5.

TABLE 5

| Name | Size | Valid Range |
|---|---|---|
| Product ID of Device | String | Any string (max length of 8 characters) |
| Manufacturer ID of Device | String | Any string (max length of 8 characters) |
| Device Friendly Name | String | Any string (max length of 8 characters) |
| Accessory Protocol Version | 16 Bits | 0x0000 to 0xFFFF |
| Accessory Software Version | 16 Bits | 0x0000 to 0xFFFF |
| Accessory Service Profile ID of Provided Service | String | Any string (max length of 512 characters) |
| Accessory Service Profile ID of Consumed Service | String | Any string (max length of 512 characters) |
| Device Connectivity-specific Address | | Dependent on Device Connection Type |
| Device Connectivity-specific Meta-data | | Dependent on Device Connection Type |

The parameters of Table 5 are described below.

Product ID of Device of Table 5: The product ID is used to identify the physical product which represents the accessory protocol capable peer electronic device. The product ID is a string 8 characters long.

Manufacturer ID of Device of Table 5: The manufacturer ID is used to identify the manufacturer of an accessory protocol capable peer electronic device. The manufacturer ID is a string 8 characters long.

Device Friendly Name of Table 5: The device friendly name is used to identify the accessory protocol capable peer electronic device using a human-readable name. The device friendly name is a string 8 characters long.

Accessory Protocol Version of Table 5: The accessory protocol version is used to indicate the protocol version that defines the accessory protocol supported by the peer electronic device. The accessory protocol version is 2 bytes long. The first byte is used to indicate the major version, and the second for the minor version.

Accessory Software Version of Table 5: The accessory software version is used to indicate the software version of the accessory protocol implementation. The accessory software version is 2 bytes long. The first byte is used to indicate the major version, and the second for the minor version. For example, the version "3.4" is encoded as 0x0304.

Accessory Service Profile ID of Provided Service of Table 5: The accessory service profile ID which identifies the primary service provided by the peer electronic device. This value should be as defined in the corresponding ASP specification.

Accessory Service Profile ID of Consumed Service of Table 5: The accessory service profile ID identifies the primary service of interest to be consumed by the peer electronic device. This value should be as defined in the corresponding ASP specification.

Device Connectivity-specific Address of Table 5: The device connectivity-specific address is dependent on the device connection type. The structure of the device connectivity-specific address is defined in Table 6.

Device Connectivity-specific Meta-data of Table 5: The device connectivity-specific meta-data is dependent on the device connection type.

Returning to FIG. 45, upon reviving the SLME-PeerDeviceConnect.request message from the AME 4503, the SLME of the session layer 4505 adds the information pertaining to the peer electronic device to a connected peer electronic device list maintained by the SLME of the session layer 4505.

In operation 4525, in response to an SLME-PeerDeviceConnect.request message in operation 4523, the SLME of the session layer 4505 generates and communicates a TLME-ConfigurePeerDeviceInterface.request message to the TLME of the transport layer 4507 to configure the transport layer 4507 for communication with the specified peer electronic device. In particular, the TLME-ConfigurePeerDeviceInterface.request is used by the SLME of the session layer 4505 to request the TLME of the transport layer 4507 to match the device ID to the connectivity parameters in order to send packets to the corresponding peer electronic device. The structure of the TLME-ConfigurePeerDeviceInterface.request message is as follows:

```
TLME-ConfigurePeerDeviceInterface.    {
request                                Transaction ID,
                                       Device ID,
                                       Device Connection Type,
                                       Device Connection QoS,
                                       Device Connection
                                       MaxSDUSize,
                                       Accessory Description Details
                                       }
```

The parameters of the TLME-ConfigurePeerDeviceInterface.request message are described below with reference to Table 6.

TABLE 6

| Parameter Name | Size | Valid Range |
| --- | --- | --- |
| Transaction ID | 8 bits | 0x00 to 0xFF |
| Device ID | 32 bits | 0x00000000 to 0xFFFFFFFF |
| Device Connection Type | 16 bits | 0x0001-0xFFFF, As per Table 2 |
| Device Connection QoS | 8 bits | As per Table 3 |
| Device Connection MaxSDUSize | 16 bits | As per Table 4 |
| Accessory Description Details | | As per Table 5 |

Transaction ID of Table 6: The transaction ID is used for correlating the TLME-ConfigurePeerDeviceInterface.confirm message with the TLME-ConfigurePeerDeviceInterface.request. The transaction ID is generated by the SLME of the session layer 4505. It is an 8 bit rolling counter that is incremented monotonically by one for each new TLME-ConfigurePeerDeviceInterface.request.

Device ID of Table 6: The device ID is used to identify an accessory protocol capable peer electronic device. The device ID is 32 bits long. The device ID is populated by the AME 4503 by picking an entry from a peer electronic device list with which it wants to establish a connection for accessory protocol communications.

Device Connection Type of Table 6: The device connection type is used to identify the connectivity technology being used to connect the peer electronic device. The device connection type is defined as per Table 2.

Device Connection QoS of Table 6: The device connection QoS is used to identify the QoS provided by the connectivity technology being used to connect the peer electronic device. The device connection QoS is defined as per Table 3.

Device Connection MaxSDUSize of Table 6: The device connection MaxSDUSize is used to identify the maximum size of the SDU that is accepted by the connectivity technology being used to connect the peer electronic device. The device connection MaxSDUSize is defined as per Table 4.

Accessory Description Details of Table 6: The accessory description details may include identification information pertaining to an accessory protocol capable peer electronic device. The accessory description details include multiple fields as defined in Table 5.

Upon receiving the TLME-ConfigurePeerDeviceInterface.request message from the SLME of the session layer 4505, the TLME of the transport layer 4507 adds the information pertaining to the new peer electronic device to the connected peer electronic device list maintained by the TLME of the transport layer 4507.

In operation 4527, the TLME of the transport layer 4507 generates and communicates a CLME-ConfigurePeerDeviceInterface.request message to the CLME of the connection layer 4509. The CLME-ConfigurePeerDeviceInterface.request message is used by the TLME of the transport layer 4507 to request the CLME of the connection layer 4509 to configure the device ID to the connectivity parameters in order to send packets to the corresponding peer electronic device. The structure of the CLME-ConfigurePeerDeviceInterface.request message is as follows:

```
CLME-ConfigurePeerDeviceInterface.    {
request                                Transaction ID,
                                       Device ID,
                                       Device Connection Type,
                                       Device Connection QoS,
                                       Device Connection
                                       MaxSDUSize,
                                       Accessory Description Details
                                       }
```

The parameters of the CLME-ConfigurePeerDeviceInterface.request message are described below with reference to Table 7.

TABLE 7

| Parameter Name | Size | Valid Range |
| --- | --- | --- |
| Transaction ID | 8 bits | 0x00 to 0xFF |
| Device ID | 32 bits | 0x00000000 to 0xFFFFFFFF |
| Device Connection Type | 16 bits | 0x0001-0xFFFF, As per Table 2 |
| Device Connection QoS | 8 bits | As per Table 3 |
| Device Connection MaxSDUSize | 16 bits | As per Table 4 |
| Accessory Description Details | | As per Table 5 |

Transaction ID of Table 7: The transaction ID is used for correlating the CLME-ConfigurePeerDeviceInterface.confirm message with the CLME-ConfigurePeerDeviceInterface.request. The transaction ID is generated by the TLME of the transport layer 4507. It is an 8 bit rolling counter that is incremented monotonically by one for each new CLME-ConfigurePeerDeviceInterface.request.

Device ID of Table 7: The device ID is used to identify an accessory protocol capable peer electronic device. The device ID is 32 bits long. The device ID is populated by the AME 4503 by picking an entry from a peer electronic device list with which it wants to establish a connection for accessory protocol communications.

Device Connection Type of Table 7: The device connection type is used to identify the connectivity technology being used to connect the peer electronic device. The device connection type is defined as per Table 2.

Device Connection QoS of Table 7: The device connection QoS is used to identify the QoS provided by the connectivity technology being used to connect the peer electronic device. The device connection QoS is defined as per Table 3.

Device Connection MaxSDUSize of Table 7: The device connection MaxSDUSize is used to identify the maximum size of the SDU that is accepted by the connectivity technology being used to connect the peer electronic device. The device connection MaxSDUSize is defined as per Table 4.

Accessory Description Details of Table 7: The accessory description details may include identification information pertaining to an accessory protocol capable peer electronic device. The accessory description details include multiple fields as defined in Table 5.

Upon receiving the CLME-ConfigurePeerDeviceInterface.request message from the TLME of the of the transport layer 4507, the CLME of the connection layer 4509 adds the information pertaining to the new peer electronic device to the connected peer electronic device list maintained by the CLME of the connection layer 4509, and sets the MaxCSDUSize to the device connection MaxSDUSize and executes connectivity specific procedures, such as, for example, TCP (single socket), TCP (multi-socket), USB (Device Mode using AOAP), USB Device Mode, USB Host Mode, Bluetooth RFCOMM, BLE, UART, etc.

For the TCP (single socket) connectivity procedure, the connection layer 4509, upon receiving a CLME-ConfigurePeerDeviceInterface.request message, creates an entry in a TCP connection list it maintains. The TCP connection list may include one entry for each peer electronic device connected via TCP. Each entry in the TCP connection list has the following parameters: Device Identifier, IP Address, Default Port Number, and Socket ID. The socket ID is used for sending and receiving all CSDUs associated with the matching Device Identifier.

The entry in the TCP connection list is created by processing the connection parameters passed in the CLME-ConfigurePeerDeviceInterface.request message. The connection layer 4509 processes the connection parameters to obtain a smart device default port as well as a peer electronic device connection preference.

If the peer electronic device connection preference is set to server, then the connection layer 4509 establishes a TCP connection to the peer electronic device by connecting to the peer electronic device IP address and peer electronic device default port number. If the connection was successfully established, the connection layer 4509 enters the Socket ID of the connection in the TCP connection list, in the row that includes the matching Device Identifier, IP Address and Default Port Number. The connection layer 4509 then generates a CLME-ConfigurePeerDeviceInterface.confirm message with a status of SUCCESS. If the connection could not be established, the CL deletes the row including the matching Device Identifier, IP Address and Default Port Number, and generates a CLME-ConfigurePeerDeviceInterface.confirm message with a status of FAILURE.

If the peer electronic device connection preference is set to client, then the connection layer 4509 starts a TCP server, if not already running, and starts listening on the smart device default port for incoming TCP connection requests. The connection layer 4509 accepts incoming TCP connections from peer electronic devices that have matching IP address entered in TCP connection list. The connection layer 4509 maintains a timer for each Device Identifier in the client mode. If a timer expires prior to an incoming connection request from the matching Peer Device IP address, then the connection layer 4509 generates a CLME-ConfigureAccessoryInterface.confirm message with a status of TIMEOUT.

For the TCP (multi-socket) connectivity procedure, the connection layer 4509 performs the TCP (single socket) connectivity procedure described above and additionally updates an application session list. The application session list includes entries having the following parameters: Device Identifier, Session ID, Socket ID of the TCP connection being used for the Session ID, and Peer port number to which the Socket ID is bound. The application session list is updated at the time of Session Creation and Session Termination.

For the USB (Device Mode using AOAP) connectivity procedure, the CLME of the connection layer 4509, upon receiving a CLME-ConfigurePeerDeviceInterface.request message, populates an entry into a table that maps the Device Identifier to the matching USB Peer Device Input Stream ID and USB Peer Device Output Stream ID.

For the Bluetooth RFCOMM connectivity procedure, the CLME of the connection layer 4509, upon receiving a CLME-ConfigurePeerDeviceInterface.request message, creates an entry in a RFCOMM connection list it maintains. The RFCOMM connection list may include one entry for each peer electronic device connected via RFCOMM. Each entry in the RFCOMM connection list has the following parameters: Device Identifier, MAC Address, Default RFCOMM Service Record, and Socket ID. The socket ID is used for sending and receiving all CSDUs associated with the matching Device Identifier.

The entry in the RFCOMM connection list is created by processing the connection parameters passed in the CLME-ConfigurePeerDeviceInterface.request message. The connection layer 4509 processes the connection parameters to obtain a local device default RFCOMM service record as well as a peer electronic device connection preference.

If the peer device connection preference is set to server, then the CLME of the connection layer 4509 establishes an RFCOMM connection to the peer electronic device by connecting to the peer Device MAC Address and Peer Device Default RFCOMM Service Record. If the connection was successfully established, the CLME of the connection layer 4509 enters the RFCOMM Socket ID of the connection in the RFCOMM Connection List, in the row that includes the matching Device Identifier, MAC Address and Default RFCOMM Service Record. The CLME of the connection layer 4509 then generates a CLME-ConfigurePeerDeviceInterface.confirm message with a status of SUCCESS. If the connection could not be established, the CLME of the connection layer 4509 deletes the row including the matching Device Identifier, MAC Address and Default RFCOMM Service Record, and generates a CLME-ConfigurePeerDeviceInterface.confirm message with a status of FAILURE.

If the peer Device Connection Preference is set to client, then the CLME of the connection layer 4509 creates a listening RFCOMM socket, if not already running, and starts listening on the Local Device Default RFCOMM Channel for incoming RFCOMM connection requests. The CL accepts incoming RFCOMM connections from peers that have matching MAC addresses entered in the RFCOMM connection list. The CLME of the connection layer 4509 maintains a timer for each Device Identifier in the Client mode. If the timer expires prior to an incoming connection request from the matching Peer Device MAC address, then the CLME of the connection layer 4509 generates a CLME-ConfigureAccessoryInterface.confirm message with a status of TIMEOUT.

For the BLE connectivity procedure, the CLME of the connection layer 4509, upon receiving a CLME-ConfigurePeerDeviceInterface.request message, maintains a map between Device Identifier and the BLE Handles on the BLE Server on the peer electronic device, corresponding to the Client CPDU Characteristic and the Server CPDU Characteristic.

In operation 4529, the connection layer 4509 communicates the CLME-ConfigurePeerDeviceInterface.confirm message to the transport layer 4507. The CLME-ConfigurePeerDeviceInterface.confirm message is used by the CLME of the connection layer 4509 to notify the TLME of the transport layer 4507 whether or not the connection layer 4509 and underlying lower layer were able to add the connected peer electronic device to their list of peer electronic devices. The structure of the CLME-ConfigurePeerDeviceInterface.confirm message is as follows:

| CLME-ConfigurePeerDeviceInterface.confirm | { Transaction ID, Status } |
|---|---|

The parameters of the CLME-ConfigurePeerDeviceInterface.confirm message are described below with reference to Table 8.

TABLE 8

| Name | Size | Valid Range |
|---|---|---|
| Transaction ID | 8 bits | 0x00 to 0xFF |
| Status | 8 bits | 0x00 to 0x01 |

The parameters of the CLME-ConfigurePeerDeviceInterface.confirm message shown in Table 8 are described below.

Transaction ID of Table 8: The transaction ID is populated by echoing the transaction ID in the original CLME-ConfigurePeerDeviceInterface.request message.

Status Code of Table 8: The status parameter is used to indicate whether or not the CLME-ConfigurePeerDeviceInterface.confirm resulted in the successful addition of the connected and authenticated peer electronic device to the list of peer electronic devices maintained by the CLME of the connection layer 4509. The valid values and their meaning are as per Table 9.

TABLE 9

| Value | Meaning |
|---|---|
| 0x00 | SUCCESS |
| 0x01 | FAIL |

In operation 4531, the TLME of the transport layer 4507 generates and communicates a TLME-ConfigurePeerDeviceInterface.confirm message to the SLME of the session layer 4505 that is based on the based on the received CLME-ConfigurePeerDeviceInterface.confirm message. The TLME-ConfigurePeerDeviceInterface.confirm message is used by the TLME of the transport layer 4507 to notify the SLME of the session layer 4505 whether or not the transport layer 4507 and underlying lower layers were able to add the connected peer electronic device to their connected peer electronic device list. The structure of the TLME-ConfigurePeerDeviceInterface.confirm message is as follows:

| TLME-ConfigurePeerDeviceInterface.confirm | { Transaction ID, Status } |
|---|---|

The parameters of the TLME-ConfigurePeerDeviceInterface.confirm message are described below with reference to Table 10.

TABLE 10

| Name | Size | Valid Range |
|---|---|---|
| Transaction ID | 8 bits | 0x00 to 0xFF |
| Status | 8 bits | 0x00 to 0x01 |

The parameters of the TLME-ConfigurePeerDeviceInterface.confirm message shown in Table 9 are described below.

Transaction ID of Table 10: The transaction ID is populated by echoing the transaction ID in the original TLME-ConfigurePeerDeviceInterface.request message.

Status code of Table 10: The status parameter is used to indicate whether or not the TLME-ConfigurePeerDeviceInterface.confirm resulted in the successful addition of the connected and authenticated peer electronic device to the list of peer electronic devices maintained by the TLME of the transport layer 4507. The valid values and their meaning are as per Table 9.

In operation 4533, the SLME of the session layer 4505 generates and communicates a SLME-PeerDeviceConnect.confirm message to the AME 4503 that is based on the based on the received TLME-ConfigurePeerDeviceInterface.confirm message. The SLME-PeerDeviceConnect.confirm message is used by the TSME of the session layer 4505 to notify the AME 4503 whether or not the session layer 4505 and underlying lower layers were able to add the connected peer electronic device to their connected peer electronic device list. The structure of the SLME-PeerDeviceConnect.confirm message is as follows:

| SLME-PeerDeviceConnect.confirm | { Transaction ID, Status } |
|---|---|

The parameters of the SLME-PeerDeviceConnect.confirm message are described below with reference to Table 11.

TABLE 11

| Name | Size | Valid Range |
|---|---|---|
| Transaction ID | 8 bits | 0x00 to 0xFF |
| Status | 16 bits | 0x0000 to 0x0003 |

The parameters of the SLME-PeerDeviceConnect.confirm message shown in Table 11 are described below.

Transaction ID of Table 11: The transaction ID is populated by echoing the transaction ID in the original SLME-PeerDeviceConnect.request message.

Status code of Table 11: The status parameter is used to indicate the status of the original SLME-PeerDeviceConnect.request. The status parameter is 16 bits long. The valid values and their meaning are as per Table 12.

TABLE 12

| Value | Meaning |
| --- | --- |
| 0x0000 | SUCCESSFUL |
| 0x0001 | FAILED |
| 0x0002 | ALREADY_CONNECTED |
| 0x0003 | INVALID_PARAMETER |
| 0x0004-0xFFFF | Reserved |

The AME 4503 receives the SLME-PeerDeviceConnect.confirm message in operation 4533. If the Status is SUCCESSFUL or ALREADY_CONNECTED, then the AME 4503 may not take any further action. If the Status is FAILED or INVALID_PARAMETER, then the AME 4503 may issue another SLME-PeerDeviceConnect.request.

While not described herein, the operations for peer electronic device addition for the second electronic device 4511 are the same as those described above for the first electronic device 4501.

H-2-2. Peer Electronic Device Deletion

Peer electronic device deletion is performed by the AME triggering the session layer which in turn releases corresponding configurations in the connection layer and the transport layer. An example of peer electronic device addition is described below with reference to FIG. 46.

Figure 46:
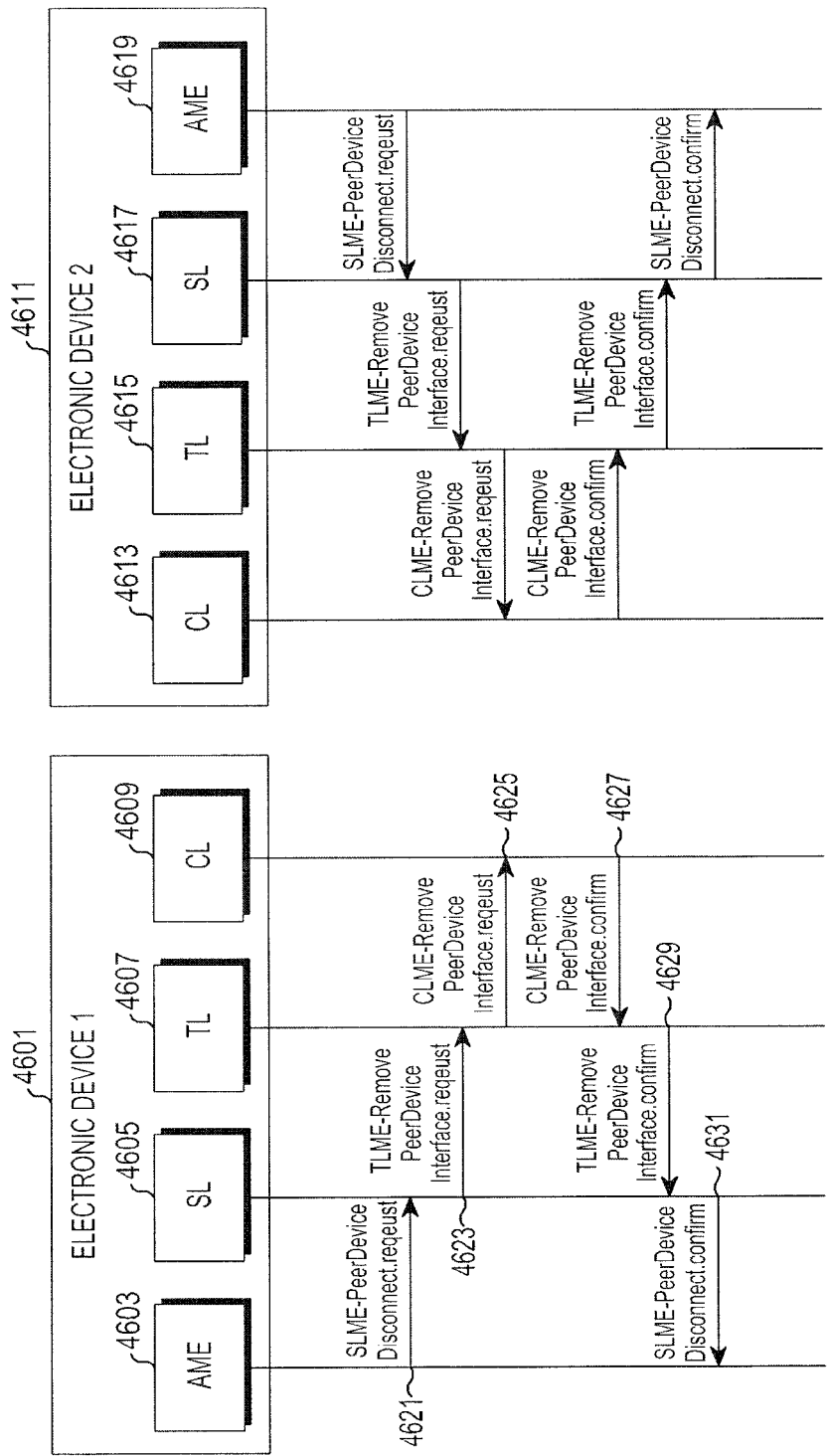
FIG. 46 illustrates a message sequence chart illustrating electronic device deletion according to an embodiment of the present disclosure.

FIG. 46 illustrates a message sequence chart illustrating peer electronic device deletion according to an embodiment of the present disclosure.

Referring to FIG. 46, a first electronic device 4601 and a second electronic device 4611 are shown. The first electronic device 4601 includes an AME 4603, a session layer 4605, a transport layer 4607, and a connection layer 4609. The second electronic device 4611 includes an AME 4619, a session layer 4617, a transport layer 4615, and a connection layer 4613.

In operation 4621, the AME 4603 of the first electronic device 4601 generates and communicates a SLME-PeerDevicedisconnect.request message to the SLME of the session layer 4605 in order to request the SLME of the session layer 4605 to stop accessory protocol communications and to disconnect the device level connection with the specified peer electronic device. The structure of the SLME-PeerDevicedisconnect.request message is as follows:

| SLME-PeerDevicedisconnect.request | { Transaction ID, Device ID } |
| --- | --- |

The parameters of the SLME-PeerDevicedisconnect.request message are described below with reference to Table 13.

TABLE 13

| Name | Size | Valid Range |
| --- | --- | --- |
| Transaction ID | 8 bits | 0x00 to 0xFF |
| Device ID | 32 bits | 0x00000000 to 0xFFFFFFFF |

The parameters of the SLME-PeerDevicedisconnect.request message shown in Table 13 are described below.

Transaction ID of Table 13: The transaction ID is used for correlating a SLME-PeerDeviceDisconnect.confirm to the SLME-PeerDeviceDisconnect.request. It is generated by the AME 4603. It is an 8 bit rolling counter that is incremented monotonically by 1 for each fresh SLME-PeerDeviceDisconnect.request.

Device ID of Table 13: The Device ID is used to identify an accessory protocol capable peer electronic device. It is 32 bits long. It is populated by the AME 4603 by picking an entry from a peer electronic device list with which it wants to terminate the connection being used for accessory protocol communications.

Upon receiving the SLME-PeerDevicedisconnect.request message, the SLME of the session layer 4605 deletes the information pertaining to the peer electronic device from the connected peer electronic device list maintained by the SLME of the session layer 4605.

In operation 4623, the SLME of the session layer 4605 generates and communicates a TLME-RemovePeerDeviceInterface.request to the TLME of the transport layer 4607 to configure the transport layer 4607 to terminate communications with the specified peer electronic device. That is, the SLME of the session layer 4605 requests that the TLME of the transport layer 4607 delete state information which matches the Device ID to the connectivity parameters. The peer electronic device details corresponding to the disconnected peer electronic device passed in the TLME-RemovePeerDeviceInterface.request. The structure of the TLME-RemovePeerDeviceInterface.request message is as follows:

| TLME-RemovePeerDeviceInterface.request | { Transaction ID, Device ID } |
| --- | --- |

The parameters of the TLME-RemovePeerDeviceInterface.request message are described below with reference to Table 14.

TABLE 14

| Name | Size | Valid Range |
| --- | --- | --- |
| Transaction ID | 8 bits | 0x00 to 0xFF |
| Device ID | 32 bits | 0x00000000 to 0xFFFFFFFF |

The parameters of the TLME-RemovePeerDeviceInterface.request message shown in Table 14 are described below.

Transaction ID of Table 14: The transaction ID is used for correlating the TLME-ConfigurePeerDeviceInterface.confirm message to the previously issued TLME-ConfigurePeerDeviceInterface.request message. It is generated by the SLME of the session layer 4605. It is an 8 bit rolling counter that is incremented monotonically by one for each new TLME-ConfigurePeerDeviceInterface.request message.

Device ID of Table 14: The device ID is a local identifier assigned to a connected and authenticated peer electronic device by the AME 4603.

Upon receiving the TLME-ConfigurePeerDeviceInterface.request message, the SLME of the session layer 4605 deletes the information pertaining to the peer electronic device from the connected peer electronic device list maintained by the SLME of the session layer 4605.

In operation 4625, the TLME of the transport layer 4607 generates and communicates a CLME-RemovePeerDeviceInterface.request message to the CLME of the connection layer 4609 to request the CLME of the connection layer 4609 to remove a connected and authenticated peer electronic device from its list of peer electronic devices. The structure of the CLME-RemovePeerDeviceInterface.request message is as follows:

```
CLME-RemovePeerDeviceInterface.request   {
                                          Transaction ID,
                                          Device ID
                                         }
```

The parameters of the TLME-RemovePeerDeviceInterface.request message are described below with reference to Table 15.

TABLE 15

| Name | Size | Valid Range |
| --- | --- | --- |
| Transaction ID | 8 bits | 0x00 to 0xFF |
| Device ID | 32 bits | 0x00000000 to 0xFFFFFFFF |

The parameters of the CLME-RemovePeerDeviceInterface.request message shown in Table 15 are described below.

Transaction ID of Table 15: The transaction ID is used for correlating the CLME-RemovePeerDeviceInterface.confirm message to the previously issued CLME-RemovePeerDeviceInterface.request message. The transaction ID is generated by TLME of the transport layer 4607. It is an 8 bit rolling counter that is incremented monotonically by one for each new CLME-RemovePeerDeviceInterface.request message.

Device ID of Table 15: The device ID is a local identifier assigned to a connected and authenticated peer electronic device by the AME 4603.

Upon receiving the CLME-RemovePeerDeviceInterface.request message, the CLME of the connection layer 4609 deletes the information pertaining to the new peer electronic device from the connected peer electronic device list maintained at the CLME of the connection layer 4609 and follows connectivity specific procedures to disconnect the peer electronic device, such as, for example, TCP (single socket), TCP (multi-socket), USB (Device Mode using AOAP), USB Device Mode, USB Host Mode, Bluetooth RFCOMM, BLE, UART, etc.

For the TCP (single socket) disconnection procedure, the connection layer 4609, upon receiving a CLME-RemovePeerDeviceInterface.request message, looks up the Socket ID matching the Device ID from the TCP connection list. The CLME of the connection layer 4609 then disconnects the socket and deletes the entry from the TCP Connection List. It then generates a CLME-RemovePeerDeviceInterface.confirm with a status of SUCCESS.

For the TCP (multi-socket) disconnection procedure, the connection layer 4609, upon receiving a CLME-RemovePeerDeviceInterface.request message, looks up the Socket ID matching the Device ID from the TCP connection list. The CLME of the connection layer 4609 then disconnects the socket and deletes the entry from the TCP connection list. The CLME of the connection layer 4609 also disconnects all sockets that match the Device Identifier in the application session list. The CLME of the connection layer 4609 then generates a CLME-RemovePeerDeviceInterface.confirm with a status of SUCCESS or FAIL.

For the USB (Device Mode using AOAP) disconnection procedure, the CLME of the connection layer 4609, upon receiving the CLME-RemovePeerDeviceInterface.request message, the map between Device Identifier and the matching USB Peer Device Input Stream ID and USB Peer Device Output Stream ID. The CLME of the connection layer 4609 then generates a CLME-RemovePeerDeviceInterface.confirm with a status of SUCCESS or FAIL.

For the Bluetooth RFCOMM disconnection procedure, the CLME of the connection layer 4609, upon receiving the CLME-RemovePeerDeviceInterface.request message, looks up the Socket ID matching the Device Identifier from the RFCOMM Connection List. The CLME of the connection layer 4609 then disconnects the socket and deletes the entry from the RFCOMM Connection List. The CLME of the connection layer then generates a CLME-RemovePeerDeviceInterface.confirm with a status of SUCCESS or FAIL.

For the BLE disconnection procedure, the CLME of the connection layer 4609, upon receiving the CLME-RemovePeerDeviceInterface.request message, removes the map between Device Identifier and the BLE Handles on the BLE Server on the peer electronic device, corresponding to the Client PDU Characteristic and the Server PDU Characteristic. The CLME of the connection layer then generates a CLME-RemovePeerDeviceInterface.confirm with a status of SUCCESS or FAIL.

In operation 4627, the CLME of the connection layer 4609 communicates the CLME-RemovePeerDeviceInterface.confirm message to the TLME of the transport layer 4607. The CLME-RemovePeerDeviceInterface.confirm message is used by the CLME of the connection layer 4609 to notify the TLME of the transport layer 4607 whether it was able to remove the connected peer electronic device from its list of peer electronic devices. The structure of the CLME-ConfigurePeerDeviceInterface.confirm message is as follows:

```
CLME-ConfigurePeerDeviceInterface.confirm   {
                                             Transaction ID,
                                             Status
                                            }
```

The parameters of the CLME-ConfigurePeerDeviceInterface.confirm message are described below with reference to Table 16.

TABLE 16

| Name | Size | Valid Range |
| --- | --- | --- |
| Transaction ID | 8 bits | 0x00 to 0xFF |
| Status | 8 bits | 0x00 to 0x01 |

The parameters of the CLME-ConfigurePeerDeviceInterface.confirm message shown in Table 16 are described below.

Transaction ID of Table 16: The Transaction ID is populated by echoing the Transaction ID in the original CLME-RemovePeerDeviceInterface.request message.

Status code of Table 16: The Status parameter is used to indicate whether or not the CLME-RemovePeerDeviceInterface.confirm resulted in the successful deletion of the peer electronic device from the list of peer devices maintained by the CLME of the connection layer 4609. The valid values and their meaning are as per Table 9.

Upon receiving the CLME-RemovePeerDeviceInterface.confirm message, the TLME of the transport layer 4607 determines the status code therein. If the status is SUCCESS, then the TLME of the transport layer 4607 generates a TLME-RemovePeerDevice.confirm message with status as SUCCESS. If the status is FAIL, then the TLME of the transport layer 4607 generates a TLME-RemovePeerDeviceInterface.confirm message with status as ERROR.

In operation 4629, the TLME of the transport layer 4607 communicates the TLME-RemovePeerDeviceInterface.confirm message to the SLME of the session layer 4605 to notify the SLME of the session layer 4605 whether or not the TLME of the transport layer 4607 and the CLME of the connection layer 4609 were able to remove the connected peer electronic device from their list of peer electronic devices. The structure of the TLME-RemovePeerDeviceInterface.confirm message is as follows:

```
TLME-RemovePeerDeviceInterface.confirm {
                                         Transaction ID,
                                         Status
                                       }
```

The parameters of the TLME-RemovePeerDeviceInterface.confirm message are described below with reference to Table 17.

TABLE 17

| Name | Size | Valid Range |
| --- | --- | --- |
| Transaction ID | 8 bits | 0x00 to 0xFF |
| Status | 8 bits | 0x00 to 0x01 |

The parameters of the TLME-RemovePeerDeviceInterface.confirm message shown in Table 17 are described below.

Transaction ID of Table 17: The transaction ID is populated by echoing the transaction ID in the original TLME-RemovePeerDeviceInterface.request message.

Status code of Table 17: The Status parameter is used to indicate whether or not the TLME-RemovePeerDeviceInterface.confirm resulted in the successful deletion of the connected and authenticated peer electronic device from the list of peer electronic devices maintained by the TLME of the transport layer 4607. The valid values and their meaning is as per Table 9.

Upon receiving the TLME-RemovePeerDeviceInterface.confirm message, the SLME of the session layer 4605 determines the status code therein. If the status is SUCCESS, then the SLME of the session layer 4605 generates an SLME-PeerDeviceDisconnect.confirm message with status set to SUCCESS. If the status is FAIL, then the SLME of the session layer 4605 generates a SLME-PeerDeviceDisconnect.confirm message with the status set to ERROR.

In operation 4631, the SLME of the session layer 4605 communicates the SLME-PeerDeviceDisconnect.confirm message to the AME 4603 to notify the AME 4603 of the status of a prior SLME-PeerDeviceDisconnect.request. The structure of the SLME-PeerDeviceDisconnect.confirm message is as follows:

```
SLME-PeerDeviceDisconnect.confirm {
                                    Transaction ID,
                                    Status
                                  }
```

The parameters of the SLME-PeerDeviceDisconnect.confirm message are described below with reference to Table 18.

TABLE 18

| Name | Size | Valid Range |
| --- | --- | --- |
| Transaction ID | 8 bits | 0x00 to 0xFF |
| Status | 16 bits | 0x0000 to 0x0003 |

The parameters of the SLME-PeerDeviceDisconnect.confirm message shown in Table 18 are described below.

Transaction ID of Table 18: The transaction ID is populated by echoing the transaction ID in the original SLME-PeerDeviceDisconnect.request message.

Status code of Table 18: The status parameter is used to indicate the status of the original SLME-PeerDeviceDisconnect.request message. The status parameter is 16 bits long. The valid values and their meaning are as per Table 12.

The AME 4603 receives the SLME-PeerDeviceDisconnect.confirm message in operation 4631. If the Status is SUCCESSFUL or ALREADY_CONNECTED, then the AME 4603 may not take any further action. If the Status is FAILED or INVALID_PARAMETER, then the AME 4603 may issue another SLME-PeerDeviceDisconnect.request message.

While not described herein, the operations for peer electronic device addition for the second electronic device 4611 are the same as those described above for the first electronic device 4601.

H-2-3. Service Connection Creation

Service connection creation is performed by the SLME providing the Service-Connection abstraction for a Service Agent to interact with another Service Agent on a peer electronic device and exchange APDUs over the channels that are setup. There are three scenarios related to service connection creation, namely a success scenario, a failure scenario where there is a non-existent remote service agent, and a failure scenario where there is rejection by a remote service agent. Each of the three scenarios related to service connection creation are described below.

H-2-4. Service Connection Creation—Success Scenario

An example of the success scenario related to service connection creation is described below with reference to FIG. 47.

Figure 47:
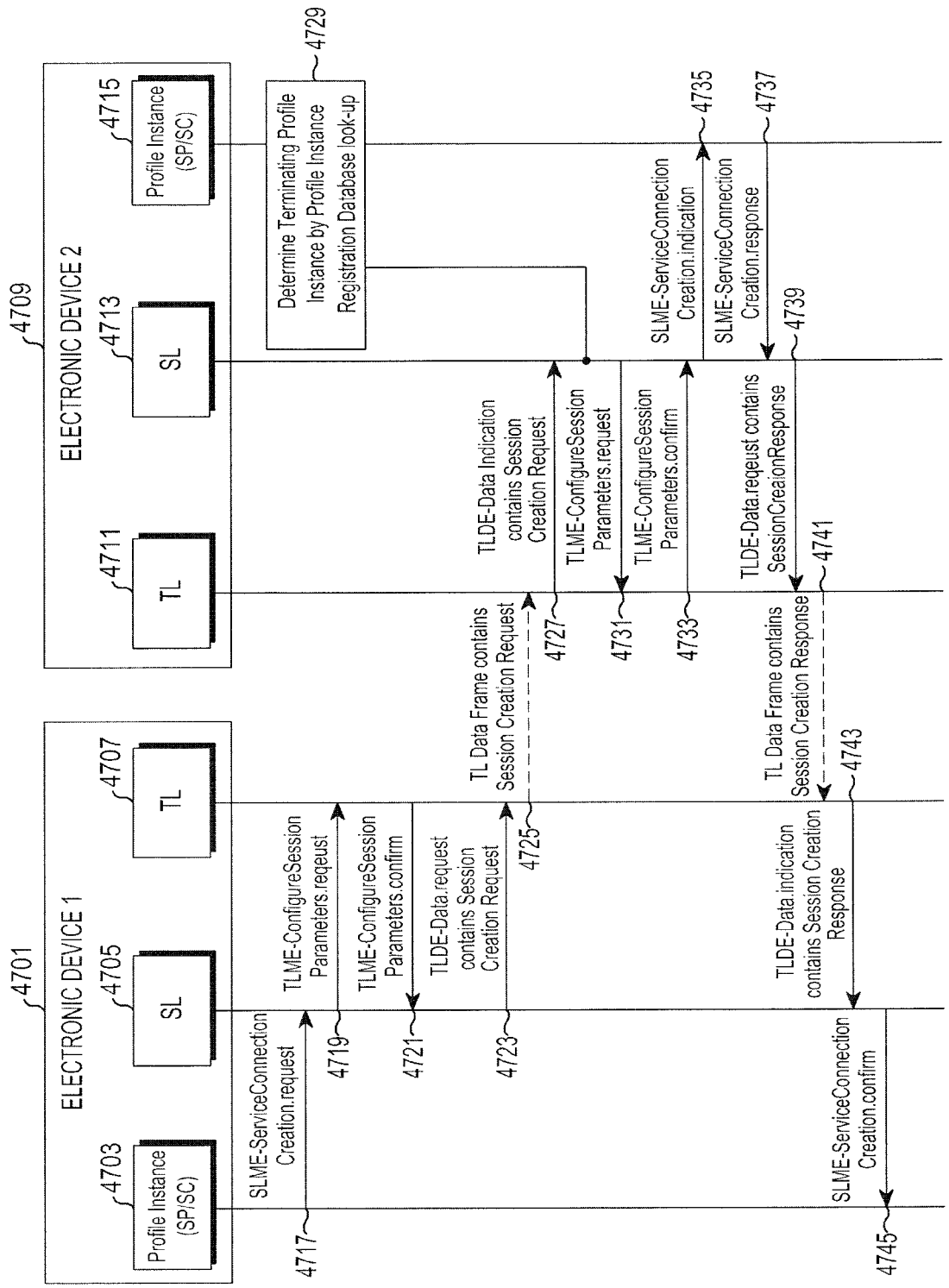
FIG. 47 illustrates a message sequence chart illustrating a success scenario related to service connection according to an embodiment of the present disclosure.

FIG. 47 illustrates a message sequence chart illustrating a success scenario related to service connection according to an embodiment of the present disclosure.

Referring to FIG. 47, a first electronic device 4701 and a second electronic device 4709 are shown. The first electronic device 4701 includes a service agent 4703, a session layer 4705, and a transport layer 4707. The second electronic device 4709 includes a transport layer 4711, a session layer 4713, and a service agent 4715.

In operation 4717, service agent 4703 of the first electronic device 4701 generates and communicates a SLME-ServiceConnectionCreation.request message to a SLME of the session layer 4705 to initiate and create a Service-Connection with peer service agent 4715. The structure of the SLME-ServiceConnectionCreation.request is as follows:

```
SLME-ServiceConnectionCreation.request {
                                         Transaction ID,
                                         Local Service Agent ID,
                                         Remote Service Agent ID,
```

-continued

```
Device ID,
ASP ID,
Number of Channels,
List of {
   Channel Number,
   Payload Type,
   Channel QoS object
   {
      QoS.Type,
      QoS.DataRate,
      QoS.Priority
   },
  }
}
```

The parameters of the SLME-ServiceConnectionCreation.request message are described below with reference to Table 19.

TABLE 19

| Name | Size | Valid Range |
|---|---|---|
| Transaction ID | 8 bits | 0x00 to 0xFF |
| Local Service Agent ID | 16 bits | 0x01 to 0xFFFF. Includes a reserved value range 0xFEFF~0xFFFF |
| Remote Service Agent ID | 16 bits | 0x01 to 0xFFFF. Includes a reserved value range 0xFEFF~0xFFFF |
| Device ID | 32 bits | 0x00000000 to 0xFFFFFFFF |
| ASP ID | 128 bits | A 128 bit character String |
| Number of Channels | 16 bits | 0x0000 to 0x03FF |
| Channel Number | 16 bits | 0x0000 to 0x03FF |
| Payload Type | 8 bit | 0x00 to 0xFF |
| Channel QoS Object | Structure | As per Table 20, Table 21 and Table 22 |

The parameters of the SLME-ServiceConnectionCreation.request message shown in Table 19 are described below.

Transaction ID of Table 19: The transaction ID is used for correlating the SLME-ServiceConnectionCreation.confirm message and the original SLME-ServiceConnectionCreation.request message. The transaction ID is generated by the service agent 4703. The transaction ID is an 8 bit rolling counter that is incremented monotonically by 1 for each new SLME-ServiceConnectionCreation.request message.

Local Service Agent ID of Table 19: The Local Service Agent ID is used to identify the local service agent that is initiating the service-connection. It is populated by echoing the service agent ID passed in a SLME-register.confirm message received by the service agent 4703 that has initiated this message.

Remote Service Agent ID of Table 19: The Remote Service Agent ID is used to identify the remote service agent with which the service-connection is to be setup. The Remote Service Agent ID is populated with a value discovered using services of a Capability Discovery Module.

Device ID of Table 19: The Device ID is used by the Service Agent 4703 to address the peer electronic device that hosts the service agent to which it wants to setup a service-connection. The Device ID is populated with values discovered using services of the Capability Discovery Module.

ASP ID of Table 19: The ASP ID is used to identify the Accessory Service Profile which the local and remote Service Agent's implement and for which the Service-Connection is being setup. The ASP ID is populated by the Service Agent 4703 in accordance with the Accessory Service profile specification.

Number of Channels of Table 19: The Number of Channels specifies the number of logical data pipes that are to be used within the Service-Connection being setup, over which APDU's are to be transported. This is to be in accordance with the Accessory Service Profile corresponding to the ASP ID.

Channel Number of Table 19: The Channel Number identifies a particular Channel in the Service-Connection and also indicates the purpose of the Channel as understood by a Local Service Agent and a Remote Service Agent in accordance with the Accessory Service Profile corresponding to the ASP ID.

Payload Type of Table 19: Indicates the payload type supported for APDUs over a particular Channel (identified by the Channel Number) in the Service-Connection. The valid values are as specified in the corresponding Accessory Profile.

QoS Object of Table 19: The QoS Object specifies how the APDUs transmitted on the specified Channel Number are to be treated in accordance with the QoS definitions. The QoS Object includes the QoS.Type, QoS.DataRate, and QoS.Priority, which are described below.

The QoS.Type is used to indicate the type of application QoS support being requested, the parameters of which are shown below in Table 20.

TABLE 20

| Value | Meaning |
|---|---|
| 0x00 | Unrestricted SDU and In-Order Delivery |
| 0x01 | Unrestricted SDU and Unordered Delivery |
| 0x02 | Restricted SDU and In-Order Delivery |
| 0x03 | Restricted SDU and Unordered Delivery |

The QoS.DataRate is used to indicate the priority of the messages on the new session, the parameters of which are shown below in Table 21.

TABLE 21

| Value | Meaning |
|---|---|
| 0x00 | Low |
| 0x01 | High |

The QoS.Priority is used to indicate the rate at which data originated from the application layer, the parameters of which are shown below in Table 22.

TABLE 22

| Value | Meaning |
|---|---|
| 0x00 | Low Priority |
| 0x01 | Medium Priority |
| 0x02 | High Priority |

In operation 4719, the SLME of the session layer 4705 generates and communicates a TLME-ConfigureSessionParameters.request message to the TLME of the transport layer 4707 to set application QoS criteria for a created session, for a given peer electronic device. The structure of the TLME-ConfigureSessionParameters.request is as follows:

```
TLME-ConfigureSessionParameters.request {
                                           Transaction ID,
                                           Device ID,
```

```
                        Session ID,
                        QoSObject
                        {
                        Type,
                        Priority,
                        DataRate,
                        },
                        }
```

The parameters of the TLME-ConfigureSessionParameters.request message are described below with reference to Table 23.

TABLE 23

| Name | Size | Valid Range |
| --- | --- | --- |
| Transaction ID | 8 bits | 0x00 to 0xFF |
| Device ID | 32 bits | 0x00000000 to 0xFFFFFFFF |
| Session ID | 16 bits | 0x0000 to 0x03FF |
| QoSObject.Type | 1 Byte | 0x00 to 0x03 |
| QoSObject.Priority | 1 Byte | 0x00 to 0x02 |
| QoSObject.DataRate | 1 Byte | 0x00 to 0x01 |

The parameters of the TLME-ConfigureSessionParameters.request message shown in Table 23 are described below.

Transaction ID of Table 23: The Transaction ID is used for correlating the TLME-ConfigureSessionParameters.confirm message to the previously issued TLME-ConfigureSessionParameters.request message. The Transaction ID is generated by the SLME of the session layer 4705. It is an 8 bit rolling counter that is incremented monotonically by one for each new TLME-ConfigureSessionParameters.request message.

Device ID of Table 23: The Device ID is a local identifier assigned to a connected and authenticated peer electronic device by the Discovery Management Entity.

Session ID of Table 23: The Session ID is used to indicate the session on which the TSDU is to be delivered.

QoSObject.Type, QoSObject.Priority, and QoSObject.DataRate of Table 23 is the same as QoS.Type, QoS.Priority, and QoS.DataRate of Table 20, Table 22, and Table 21 described above.

Upon receiving the TLME-ConfigureSessionParameters.request message, the TLME of the transport layer 4707 generates and maintains a (Device ID, Session ID) QoSObjectType mapping table.

In operation 4721, TLME of the transport layer 4707 generates and communicates a TLME-ConfigureSessionParameters.confirm message to the SLME of the session layer 4705 to notify the status of the TLME-ConfigureSessionParameters.request message. Here, if any parameter in the TLME-ConfigureSessionParameters.request message is not supported or is out of range, the STATUS is set to indicate Invalid Parameters. If the TLME of the transport layer 4707 does not support the specified QoS, the STATUS is set to indicate Unsupported QoS. Otherwise, the STATUS is set to indicate a successful update of (Device Identifier, Session ID) to QoSObjectType mapping table at the TLME of the transport layer 4707. The structure of the TLME-ConfigureSessionParameters.confirm is as follows:

```
TLME-ConfigureSessionParameters.confirm    {
                                           Transaction ID,
                                           STATUS
                                           }
```

The parameters of the TLME-ConfigureSessionParameters.confirm message are described below with reference to Table 24.

TABLE 24

| Name | Size | Valid Range |
| --- | --- | --- |
| Transaction ID | 8 bits | 0x00 to 0xFF |
| STATUS | 8 bits | 0x00 to 0x02 |

The parameters of the TLME-ConfigureSessionParameters.request message shown in Table 24 are described below.

Transaction ID of Table 24: The Transaction ID is populated by echoing the Transaction ID in the original TLME-ConfigureSessionParameters.request message.

Status code of Table 24: The Status code is used to indicate the status of the original TLME-ConfigureSessionParameters.request message. It is 8 bits long. The parameters of the Status code are shown in Table 25.

TABLE 25

| Value | Meaning |
| --- | --- |
| 0x00 | Success |
| 0x01 | Unsupported QoS |
| 0x02 | Invalid parameters |

On receipt of the TLME-ConfigureSessionParameters.confirm message, the SLME of the session layer 4705 knows the results of the issuance of the TLME-ConfigureSessionParameters.request message. If the status is Unsupported QoS, then the SLME of the session layer 4705 may terminate the session.

In operation 4723, the SLME of the session layer 4705 generates and communicates a TLDE-data.request message that includes a SessionCreationRequest message to the TLME of the transport layer 4707 to create one or more sessions with the peer SLME on a given Device ID. That is, the SessionCreationRequest message is used for setting up of a Service-Connection. A Service-Connection a bound set of Sessions between a local Service Agent and remote Service Agent. The structure of the TLDE-data.request message is as follows:

```
TLDE-Data.request    {
                     Transaction ID,
                     Device Identifier,
                     Session ID,
                     Payload Length,
                     SPDU (or TSDU)
                     }
```

The parameters of the TLDE-Data.request message are described below with reference to Table 26.

TABLE 26

| Name | Size | Valid Range |
| --- | --- | --- |
| Transaction ID | 8 bits | 0x00 to 0xFF |
| Device ID | 32 bits | 0x00000000 to 0xFFFFFFFF |
| Session ID | 16 bits | 0x0000 to 0x03FF |
| Payload Length | 16 bits | 0x0001 to 0xFFFD |
| SPDU (or TSDU) | Variable | Set of octets |

The parameters of the TLDE-Data.request message shown in Table 26 are described below.

Transaction ID of Table 26: The Transaction ID is used for correlating TLDE-Data.ready and TLDE-Data.confirm messages to a previously issued TLDE-Data.request message. The Transaction ID is generated by SLME of the session layer 4705. The Transaction ID is an 8 bit rolling counter that is incremented monotonically by one for each new TLDE-Data.request to the same Device ID and Session ID.

Device ID of Table 26: The Device ID is used by the TLDE of the transport layer 4707 to address the peer electronic device to which it wants to send an SPDU.

Session ID of Table 26: The Session ID is used to indicate the session on which the SPDU is to be delivered. It is a 10 bit identifier assigned by the SLME at the time of session creation.

Payload Length of Table 26: The Payload Length indicates the number of octets included in the SPDU (or TSDU) to be transmitted by the TLDE. Payload Length is 16 bits long. The TLDE of the transport layer 4707 restricts TSDU size to a maximum of MaxTSDUSize octets, which is a maximum size of TSDU accepted in the TLDE-Data.request, such as 4 bytes.

SPDU (or TSDU): The SPDU (or TSDU) is the set of octet-aligned parameters that constitute the transport layer payload.

The structure of the SessionCreationRequest message is shown below with reference to Table 27.

TABLE 27

| Field Name | Field Type | Valid Range |
| --- | --- | --- |
| Message Type | 8 bits | 0x01 |
| To Service Agent ID | 16 bits | 0x01 to 0xFFFF. Includes a reserved value range 0xFEFF~0xFFFF |
| From Service Agent ID | 16 bits | 0x01 to 0xFFFF. Includes a reserved value range 0xFEFF~0xFFFF |
| ASP ID | 128 bits | A 128 bit character String |
| Number of Sessions | 16 bits | 0x01 to 0x3FF |
| Session ID List | Variable | Each Session ID is 16 bits size. As many as Number of Sessions value. Range is 0x0000 to 0x03FE |
| Channel Number List | Variable | Each Channel Number is 16 bits size. One per Session ID |
| QoSObject List | Variable | QoSObject size is 24 bits. One per Session ID. List of <QoSObject.Type, QoSObject.Priority, QoSObject.DataRate> |
| Payload Type List | Variable | Each Payload type is 8 bits. Range is 0x00 to 0xFF. An item in the list corresponds to a Channel Number in Channel Number List. |

The parameters of the SessionCreationRequest message shown in Table 27 are described below.

Message Type of Table 27: Identifies the type of SLME Message. The value as per Table 46 may be 0x01.

To Service Agent ID of Table 27: The identity of the remote Service Agent with which the Service-Connection is being requested. This is populated by echoing the Remote Service Agent ID field of SLME-ServiceConnection.request message.

From Service Agent ID of Table 27: The identity of the local Service Agent that has initiated the SLME-Service-ConnectionCreation.request. It is populated by echoing the Local Service Agent ID passed in the SLME-register.confirm message received by the Service Agent that has initiated this message.

ASP ID of Table 27: The Accessory Service Profile ID which identifies the service that is sought by the Service-Connection. This value should be as defined in the corresponding ASP specification. This is populated by echoing the ASP ID field of the SLME-ServiceConnectionCreation.request message.

Number of Sessions of Table 27: The count of Sessions to be setup. This is populated by echoing the Number of Channels field of the SLME-ServiceConnectionCreation.request message.

Session ID List of Table 27: List of Session ID's, as many as the value of Number of Sessions. The Session ID is used to identify individual sessions. It is a 16 bit field. The value 0x3FF is a reserved session ID used for the Default Session. The session identifier is generated as the lowest 10 bit value which is not in use with the peer SLME corresponding to the given Device ID.

Channel Number List of Table 27: List of Channel Numbers requested by the Service Agent 4703. The list is populated by echoing the list of Channel Numbers parameter from the SLME-ServiceConnectionCreation.request message that triggered the transmission of this SessionCreationRequest message. A Channel number maps to a corresponding Session ID in the Session ID List.

QoSObject List of Table 27: One QoS Object per ChannelNumber. A QoS Object denotes the QoS criteria of the session to be opened. The QoSObject.Type, QoSObject.Priority and QoSObject.DataRate fields are populated by echoing the QoSObject.Type, QoSObject.Priority and QoSObject.DataRate fields from the SLME-ServiceConnectionCreation.request message that triggered the transmission of this SessionCreationRequest message.

Payload Type List of Table 27: Includes a list of Payload Types supported over the Channels specified in the Channel Number List field. Each Payload Type in the list corresponds to a Channel Number in the Channel Number List field. The valid values are as specified in the corresponding Accessory Profile.

Once again, in operation 4723, the SLME of the session layer 4705 constructs the SessionCreationRequest message as per the above structure and transmits it to the peer SLME by issuing the TLDE-Data.request primitive. For every Session ID in the Session List above, the TLME-ConfigureSessionParameters.request message is invoked (using corresponding QoS object in the QoSObject List) to ensure that TL is configured for each Session ID. The Device ID provided in the parameter of ServiceConnectionCreation.request message is echoed in the TLME-ConfigureSessionParameters.request. A successful TLME-ConfigureSessionParameters.confirm message should have been received for each of them.

The following parameters of the TLDE-Data.request message are filled as described. The other parameters are filled as per the TLDE-Data.request structure definition.

The Device Identifier field in the TLDE-Data.request is filled by echoing the resolved Device ID described above. The Session ID is set to 0x3FF. The TSDU is a set of octet aligned fields of the SessionCreationRequest message.

After issuing the TLDE-Data.request message as described above, the SLME of the session layer 4705 starts a timer with a value of SessionCreationRetryTimeout and waits for the SessionCreationResponse message. In a case where the timer expires, prior to the SessionCreationResponse message being received, the SLME of the session layer 4705 reattempts transmission of the same SessionCreationRequest message for a maximum of SessionCreationRetryLimit times. If a SessionCreationResponse message is not received after retrying the SessionCreationRequest message SessionCreationRetryLimit times, then the SLME issues an SLME-ServiceConnectionCreation.confirm message with a Status of 0x02 (Timeout). For values of SessionCreationRetryLimit (e.g., 3) and SessionCreationRetryTimeout (e.g., 500 ms).

In operation 4725, the TLDE of the transport layer 4707 communicates the SessionCreationRequest message to the peer TLDE of the transport layer 4711 through a transport layer data frame. The transport layer data frame will be described further below.

In operation 4727, the peer transport layer 4711 generates a TLDE-data.indication message having the SessionCreationRequest message included therein and communicates the same to the peer session layer 4713.

In operation 4729, the peer session layer 4713 determines a terminating profile instance by profile instance registration database look up.

In operation 4731, the peer session layer 4713 generates and communicates a TLME-ConfigureSessionParameters.request message to the peer TLME of the transport layer 4707. Here, for every Session ID in the list, the TLME-ConfigureSessionParameters.request message is invoked (using corresponding QoS object in the QoSObject List) to ensure that the peer transport layer 4711 is configured for each Session ID. Operation 4731 is similar to that described above with respect to operation 4719 and thus a description thereof is omitted herein for conciseness in explanation.

In operation 4733, the peer TLME of the transport layer 4711 generates and communicates a TLME-ConfigureSessionParameters.confirm message to the peer session layer 4713. Here, operation 4733 is similar to that described above with respect to operation 4721 and thus a description thereof is omitted herein for conciseness in explanation.

In operation 4735, the peer session layer 4713 generates and communicates the SLME-ServiceConnectionCreation.indication message to the peer service agent 4715 to notify it of the service agent 4703 requesting a service connection. The peer service agent 4715 corresponds to the Service Agent Registration Database entry that matches the To Service Agent ID and ASP ID field in the received SessionCreationRequest message. The structure of the SLME-ServiceConnectionCreation.indication message is as follows:

```
SLME-ServiceConnectionCreation.indication {
                                            Transaction ID,
                                            Identity of Service
                                            Connection
                                            {
                                              Device ID,
                                              Local Service Agent ID,
                                              Remote Service Agent
                                              ID,
                                              ASP ID
                                            },
                                            List of {
                                              Channel Number,
                                              ChannelSSDUSize,
                                              Payload Type
                                            }
                                          }
```

The parameters of the SLME-ServiceConnectionCreation.indication message are described below with reference to Table 28.

TABLE 28

| Name | Size | Valid Range |
|---|---|---|
| Transaction ID | 8 bits | 0x00 to 0xFF |
| Device ID | 32 bits | 0x00000000 to 0xFFFFFFFF |
| Local Service Agent ID | 16 bits | 0x01 to 0xFFFF. Includes a reserved value range 0xFEFF~0xFFFF |
| Remote Service Agent ID | 16 bits | 0x01 to 0xFFFF. Includes a reserved value range 0xFEFF~0xFFFF |
| ASP ID | 128 bits | A 128 bit character String |
| Channel Number | 16 bits | 0x0000 to 0x03FF |
| Channel SSDU Size | 16 bits | MaxSSDUSize or UnrestrictedSDUSize |
| Payload Type | 8 bit | 0x00 to 0xFF |

The parameters of the SLME-ServiceConnectionCreation.indication message shown in Table 28 are described below.

Transaction ID of Table 28: The Transaction ID is used for correlating the SLME-ServiceConnection.response message to the SLME-ServiceConnectionCreation.indication message. It is generated by the SLME. It is an 8 bit rolling counter that is incremented monotonically by 1 for each fresh SLME-ServiceConnectionCreation.indication.

Device ID of Table 28: Identifies the peer electronic device on which the Service Agent identified by Local Service Agent ID from which the Service-Connection request message has been received. It is populated by echoing the value of the Device Identifier field in the TLDE-Data.Indication message received.

Local Service Agent ID of Table 28: Identifies the local Service Agent with which the peer Service Agent has requested for Service-Connection creation. It is populated by echoing the To Service Agent ID field in the SessionCreationRequest message.

Remote Service Agent ID of Table 28: Identifies the peer Service Agent that has requested for the Service-Connection creation. It is populated by echoing the From Service Agent ID from the SessionCreationRequest message that triggered this message.

ASP ID of Table 28: The ASP ID is used to identify the Accessory Service Profile which the local and remote Service Agent's implement and for which the Service-Connection is being setup. It is populated by echoing the ASP ID from the SessionCreationRequest message that triggered this message.

Identity of Service Connection of Table 28: This is the tuple formed by combination of the Device Identifier, Local Service Agent ID, Remote Service Agent ID and ASP ID defined above. It uniquely identifies Service-Connections between peer Service Agent's.

Channel Number of Table 28: The Channel Number identifies a particular Channel in the Service-Connection and also indicates the purpose of the Channel as understood by the Local Service Agent and the Remote Service Agent in accordance with the Accessory Service Profile specification corresponding to the ASP ID.

Channel SSDU Size of Table 28: The Channel SSDU Size indicates the maximum number of octets that an APDU transmitted on the corresponding Channel Number may include. It is set to MaxSSDUSize if the QoS requested for the channel was 0x02 (Restricted SDU and In-Order Delivery) or 0x03 (Restricted SDU and Unordered Delivery). It is set to UnrestrictedSDUSize if the QoS requested for the channel was 0x00 (Unrestricted SDU and In-Order Delivery) or 0x01 (Unrestricted SDU and Unordered Delivery).

Payload Type of Table 28: Indicates the payload type supported for APDUs over a particular Channel (identified by the Channel Number) in the Service-Connection. The valid values are as specified in the corresponding Accessory Profile.

In operation 4737, the peer service agent 4715 generates and communicates a SLME-ServiceConnectionCreation.response message to peer session layer 4713 either accepting or rejecting the Service Connection. The structure of the SLME-ServiceConnectionCreation.response message is as follows:

```
SLME-ServiceConnectionCreation.response    {
                                           Transaction ID,
                                           Status Code
                                           {
```

The parameters of the SLME-ServiceConnectionCreation.response message are described below with reference to Table 29.

TABLE 29

| Name | Size | Valid Range |
| --- | --- | --- |
| Transaction ID | 8 bits | 0x00 to 0xFF |
| Status Code | 8 bits | 0x00 |

The parameters of the SLME-ServiceConnectionCreation.response message shown in Table 29 are described below.

Transaction ID of Table 29: The Transaction ID is used for correlating the SLME-ServiceConnectionCreation.response and the original SLME-ServiceConnectionCreation.indication messages. It is populated by echoing the Transaction ID in the original SLME-ServiceConnectionCreation.indication message.

Status Code of Table 29: The Status Code is used to indicate the status of the original SLME-ServiceConnection-Creation.indication message as set forth in Table 30.

TABLE 30

| Value | Meaning |
| --- | --- |
| 0x00 | Success |
| 0x01 | Rejected |
| 0x02-0xFF | Reserved |

In operation 4739, the peer session layer 4713 generates a SessionCreationResponse message, which is communicated through a TLDE-Data.request message to the transport layer 4711. The structure of the TLDE-Data.request message is as follows:

```
TLDE-Data.request message         {
                                  Transaction ID,
                                  Device ID,
                                  Session ID,
                                  Payload Length,
                                  SPDU (or TSDU)
                                  {
```

The parameters of the TLDE-Data.request message are described below with reference to Table 31.

TABLE 31

| Name | Size | Valid Range |
| --- | --- | --- |
| Transaction ID | 8 bits | 0x00 to 0xFF |
| Device ID | 32 bits | 0x00000000 to 0xFFFFFFFF |
| Session ID | 16 bits | 0x0000 to 0x03FF |
| Payload Length | 16 bits | 0x0001 to 0xFFFD |
| SPDU (or TSDU) | Variable | Set of octets |

The parameters of the TLDE-Data.request message shown in Table 31 are described below.

Transaction ID of Table 31: The Transaction ID is used for correlating the TLDE-Data.ready and TLDE-Data.confirm messages to the previously issued TLDE-Data.request message. It is generated by SLME of the session layer 4713. It is an 8 bit rolling counter that is incremented monotonically by one for each new TLDE-Data.request message to the same Device Identifier and Session ID.

Device ID of Table 31: The Device ID is used by the TLDE of the transport layer 4711 to address the peer electronic device to which it wants to send an SPDU.

Session ID of Table 31: The Session ID is used to indicate the session on which the SPDU is to be delivered. It is a 10 bit identifier assigned by the SLME of the session layer 4713 at the time of session creation.

Payload Length of Table 31: The Payload Length indicates the number of octets included in the SPDU (or TSDU) to be transmitted by the TLDE. It is 16 bits long. The TLDE of the transport layer 4711 restricts the TSDU size to a maximum of MaxTSDUSize octets (e.g., 4 bytes).

SPDU (or TSDU) of Table 31: The SPDU (or TSDU) is the set of octet-aligned parameters that constitute the transport layer payload.

On receipt of the TLDE-Data.request message, the TLDE first checks if any parameter in the TLDE-Data.request message is not supported or is out of range. If so, the TLDE of the transport layer 4711 generates the TLDE-Data.confirm message, with a Status of INVALID_PARAMETER echoing the same Transaction ID.

If the parameters of the TLDE-Data.request message are valid, then the TLDE processes the Device Identifier and Session ID parameters to determine the TL Frame Format Procedure and constructs the TPDU from the SPDU (or TSDU).

For each Device Identifier and Session ID pair, the TLDE maintains separate queues to enqueue TPDUs for transmission to the connection layer. The transport layer enqueues the TPDU formed above, into the packet queue corresponding to the specified Device ID and Session ID pair.

If the CLDE is ready to accept further TPDUs for transmission, the TLDE dequeues the head of the line TPDU from by choosing a Device ID and Session ID queue with the highest priority. It requests the transmission of this TPDU by issuing a CLDE-Data.request message echoing the Device ID.

If the TLDE has queue space to accept further SPDUs (or TSDUs), then the TLDE generates a TLDE-Data.ready message echoing the same Transaction ID.

Regarding the SessionCreationResponse message, the message is used by the SLME of the session layer 4713 to respond to a SessionCreationRequest message from the SLME of the session layer 4705. The parameters of the SessionCreationResponse message are described below with reference to Table 32.

TABLE 32

| Field Name | Field Type | Valid Range |
| --- | --- | --- |
| Message Type | 8 bits | 0x02 |
| To Service Agent ID | 16 bits | 0x01 to 0xFFFF. Includes a reserved value range 0xFEFF~0xFFFF |
| From Service Agent ID | 16 bits | 0x01 to 0xFFFF. Includes a reserved value range 0xFEFF~0xFFFF |
| ASP ID | 128 bits | A 128 bit character String |
| Status Code | 8 Bits | 0x00 to 0x01 |
| Number of Sessions | 16 bits | 0x0001 to 0x03FF |
| Session ID List | Variable | Each Session ID is 16 bits size. As many as Number of Sessions value. Range is 0x0000 to 0x03FF |

The parameters of the SessionCreationRequest message shown in Table 32 are described below.

Message Type of Table 32: The Message Type Identifies the type of SLME Message. Here, the value is 0x02 which indicates that the message is a SessionCreationRequest message.

To Service Agent ID of Table 32: The To Service Agent ID identifies the Service Agent that originated the Service-Connection creation and thus the SessionCreationRequest message. It is populated by echoing the From Service Agent ID field in the corresponding SessionCreationRequest message received.

From Service Agent ID of Table 32: The From Service Agent ID identifies the Service Agent by whom the Service-Connection has been accepted/rejected. It is populated by echoing the To Service Agent ID field in the corresponding SessionCreationRequest message received.

ASP ID of Table 32: The ASP ID identifies the Accessory Service Profile for which the Service-Connection is being accepted/rejected. It is populated by echoing the ASP ID field in the corresponding SessionCreationRequest message received.

Status Code of Table 32: The status code is used to indicate whether the session could be created successfully or not. It is populated based on the Status parameter of the SLME-ServiceConnectionCreation.response message. It is 8 bits long. Table 33 defines the status code.

TABLE 33

| Value | Meaning |
| --- | --- |
| 0x00 | SUCCESS |
| 0x01 | FAILURE |

Number of Sessions of Table 32: The number of Sessions created for this Service-Connection. Populated by echoing the value in from the corresponding SessionCreationRequest message.

Session ID List of Table 32: The Session ID List is a Session ID for this Service-Connection. It is populated by echoing the value from the corresponding SessionCreation-Request message.

In operation 4741, the transport layer 4711 generates a transport layer data frame including the SessionCreationResponse message and communicates it to the transport layer 4707.

In operation 4743, the transport layer 4707 generates a TLDE-Data.indication message including the SessionCreationResponse message and communicates it to the session layer 4705 to provide an SPDU received from a peer session layer entity to a local session layer entity. The structure of the TLDE-Data.request message is as follows:

```
TLDE-Data.indication message  {
                              Device ID,
                              Session ID,
                              Payload Length,
                              SPDU (or TSDU)
                              {
```

The parameters of the TLDE-Data.request message are described below with reference to Table 34.

TABLE 34

| Name | Size | Valid Range |
| --- | --- | --- |
| Transaction ID | 8 bits | 0x00 to 0xFF |
| Device ID | 32 bits | 0x00000000 to 0xFFFFFFFF |
| Session ID | 16 bits | 0x0000 to 0x03FF |
| Payload Length | 16 bits | 0x0001 to 0xFFFD |
| SPDU (or TSDU) | Variable | Set of octets |

The parameters of the TLDE-Data.indication message shown in Table 34 are described below.

Device Identifier of Table 34: The Device ID is used by the TLDE to indicate the peer electronic device from which it has received an SPDU (or TSDU). It is populated by echoing the Device ID parameter in a CLDE-Data.indication message received at the transport layer.

Session ID of Table 34: The Session ID is used to indicate the session on which the TSDU or SPDU was received. It is populated by echoing the Session ID parameter in the CLDE-Data.indication message received at the transport layer.

Payload Length of Table 34: Payload length is used to indicate the number of octets in the SPDU (or TSDU). It is 16 bits long.

SPDU (or TSDU) of Table 34: The SPDU (or TSDU) is the set of octet-aligned parameters that constitute the transport payload.

Upon receiving the SessionCreationResponse included in the TLDE-Data.indication message at the session layer 4705, the SLME of the session layer 4705 makes an entry for the new Service-Connection into the Service-Connection list using the following:

• Identify of the Service Connection passed in the corresponding SLME-ServiceConnectionCreation.indication; and
• List of{
  Channel Number passed in the corresponding SLME-ServiceConnectionCreation.indication message
  ChannelSSDUSize passed in the corresponding SLME-ServiceConnectionCreation.indication message
  Payload Type passed in the corresponding SLME-ServiceConnectionCreation.indication message
  Session ID passed in TLME-ConfigureSessionParameters.confirm message corresponding to the Channel Number
  QoS object provided in the corresponding SessionCreationRequest message
}

Also, the SLME of the session layer 4705 identifies the appropriate Service Agent by matching the set {
To Service Agent ID field in the SessionCreationResponse message
From Service Agent ID field in the SessionCreationResponse message -continued

```
ASP-ID field in the SessionCreationResponse message
Device ID field of TLDE-Data.indication (in which the
SessionCreationResponse message was received)
}
  with the following set of fields respectively, corresponding to each of
the pending SLME-ServiceConnectionCreation.request messages
{
Local Service Agent ID
Remote Service Agent ID
ASP ID
Device ID
}.
```

In operation 4745, the SLME of the session layer 4705 notifies the matched Service Agent 4703 by means of an SLME-ServiceConnectionCreation.confirm message to notify the Service Agent 4703 of the status of its SLME-ServiceConnectionCreation.request. The structure of the SLME-ServiceConnectionCreation.confirm message is as follows:

```
SLME-ServiceConnectionCreation.confirm message {
                                  Transaction ID, Identity of Service
                                  Connection
                                  {
                                    Device ID,
                                    Local Service Agent ID,
                                    Remote Service Agent
                                  ID,
                                    ASP ID
                                  },
                                  Status Code,
                                  List of {
                                    Channel Number,
                                    ChannelSSDUSize,
                                  }
                                }
```

The parameters of the SLME-ServiceConnectionCreation.confirm message are described below with reference to Table 35.

TABLE 35

| Name | Size | Valid Range |
|---|---|---|
| Transaction ID | 8 bits | 0x00 to 0xFF |
| Device Identifier | 32 bits | 0x00000000 to 0xFFFFFFFF |
| Local Service Agent ID | 16 bits | 0x01 to 0xFFFF. Includes a reserved value range 0xFEFF~0xFFFF |
| Remote Service Agent ID | 16 bits | 0x01 to 0xFFFF. Includes a reserved value range 0xFEFF~0xFFFF |
| ASP ID | 128 bits | A 128 bit character String |
| Status Code | 8 bits | 0x00 to 0x01 |
| Channel Number | 16 bits | 0x0000 to 0x03FF |
| Channel SSDU Size | 16 bits | MaxSSDUSize or UnrestrictedSDUSize |

The parameters of the SLME-ServiceConnectionCreation.confirm message shown in Table 35 are described below.

Transaction ID of Table 35: The Transaction ID is used for correlating the SLME-ServiceConnectionCreation.confirm and the original SLME-ServiceConnectionCreation.request messages. It is populated by echoing the Transaction ID from the original SLME-ServiceConnectionCreation.request message.

Device ID of Table 35: The Device ID identifies the peer electronic device which hosts the Service Agent with which the Service-Connection has been created. It is populated by echoing the Device ID parameter in the TLDE.Data.indication message in which the SessionCreationResponse message was received.

Local Service Agent ID of Table 35: Local Service Agent ID identity of the Service Agent which initiated the SLME-ServiceConnectionCreation.request message, by SLME of the session layer 4705. It is populated by echoing the Local Service Agent ID field in the SessionCreationResponse message that has triggered the SLME-ServiceConnectionCreation.confirm message.

Remote Service Agent ID of Table 35: Remote Service Agent ID identifies the Service Agent on the peer electronic device with which the Service-Connection has been created. It is populated by echoing the Remote Service Agent ID field in the SessionCreationResponse message that has triggered the SLME-ServiceConnectionCreation.confirm message.

ASP ID of Table 35: The ASP ID is used to identify the Accessory Service Profile which the local and remote Service Agent's implement and for which the Service-Connection has been created. It is populated by echoing the ASP ID from the SessionCreationResponse message that has triggered the SLME-ServiceConnectionCreation.confirm message.

Status Code of Table 35: The Status Code is used to indicate the status of the original SLME-SessionCreation.request message. It is 1 byte long. Table 36 defines its values. It is populated by echoing the Status field in the SessionCreationResponse message.

TABLE 36

| Value | Meaning |
|---|---|
| 0x00 | Success |
| 0x01 | Rejected |
| 0x02 | Timeout |
| 0x03-0xFF | Reserved |

Channel Number of Table 35: The Channel Number identifies a particular Channel in the Service-Connection and also indicates the purpose of the Channel as understood by the Local Service Agent and the Remote Service Agent in accordance with the Accessory Service Profile specification corresponding to the ASP ID.

Channel SSDU Size of Table 35: The Channel SSDU Size indicates the maximum number of octets that an APDU transmitted on the corresponding Channel Number may include. It is set to MaxSSDUSize if the QoS requested for the channel was 0x02 (Restricted SDU and In-Order Delivery) or 0x03 (Restricted SDU and Unordered Delivery). It is set to UnrestrictedSDUSize if the QoS requested for the channel was 0x00 (Unrestricted SDU and In-Order Delivery) or 0x01 (Unrestricted SDU and Unordered Delivery).

Upon receiving the SLME-ServiceConnectionCreation.confirm message, the Service Agent 4703 determines whether its SLME-ServiceConnectionCreation.request message was successful or a failure. If successful, the Service Agent 4703 is now free to interact with the peer Service Agent 4715 as per the application protocol between the peer Service Agents using SLDE-Data.requests on any of the Channels of the Service Connection returned (identified by {Device ID, Local Service Agent ID, Remote Service Agent ID, ASP ID}).

H-2-5. Service Connection Creation—Failure Scenario Related to Service Connection Creation An example of the failure scenario related to service connection creation is described below with reference to FIG. 48.

Figure 48:
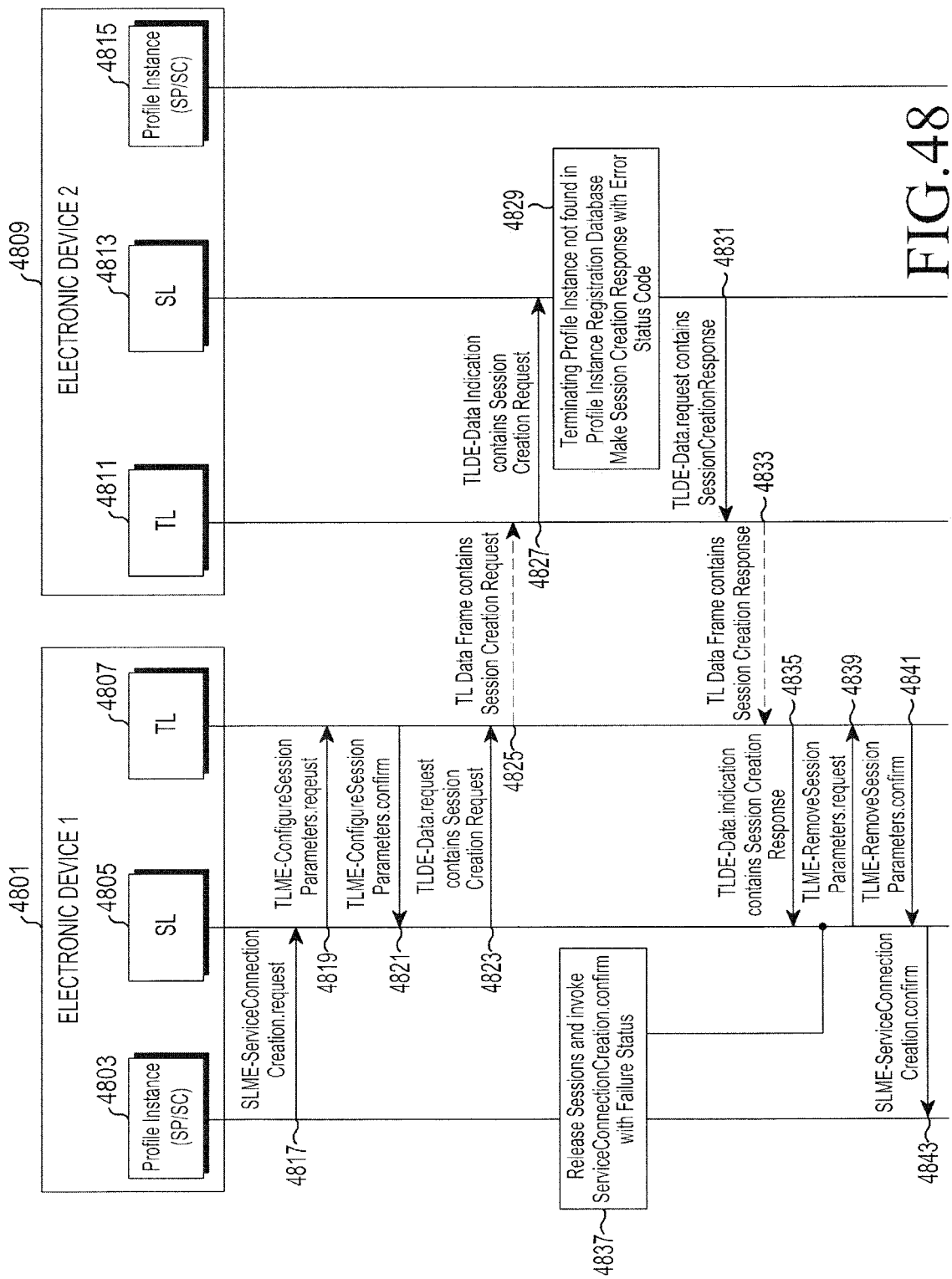
FIG. 48 illustrates a message sequence chart illustrating a failure scenario related to a service connection where there is a non-existent remote service agent according to an embodiment of the present disclosure.

FIG. 48 illustrates a message sequence chart illustrating a failure scenario related to a service connection where there is a non-existent remote service agent according to an embodiment of the present disclosure.

Referring to FIG. 48, a first electronic device 4801 and a second electronic device 4809 are shown. The first electronic device 4801 includes a service agent 4803, a session layer 4805, and a transport layer 4807. The second electronic device 4809 includes a transport layer 4811, a session layer 4813, and a service agent 4815.

Operation 4817 to operation 4827 is the same as operation 4717 to 4727 described above with reference to FIG. 47, and thus descriptions thereof are omitted herein for conciseness in explanation.

In operation 4829, the session layer 4813 terminates a profile instance not found in the profile instance registration database. Further, the session layer 4813 generates a SessionCreationResponse message with an error status code. The SessionCreationResponse message has been described above with respect to operation 4739 of FIG. 47, and thus descriptions thereof are omitted herein for conciseness in explanation Operation 4831 to operation 4835 is the same as operation 4739 to 4743 described above with reference to FIG. 47, and thus descriptions thereof are omitted herein for conciseness in explanation.

In operation 4837, the session layer 4805 releases the sessions and generates an SLME-ServiceConnectionCreation.confirm message with a failure status. The SLME-ServiceConnectionCreation.confirm message has been described above with respect to operation 4745 of FIG. 47, and thus descriptions thereof are omitted herein for conciseness in explanation.

In operation 4839, the session layer 4805 generates and communicates a TLME-RemoveSessionParameters.request message to the transport layer 4807 to remove application QoS criteria settings for a created session, for a given peer electronic device. The structure of the TLME-RemoveSessionParameters.request message is as follows:

| TLME-RemoveSessionParameters.request | { |
| --- | --- |
| | Transaction ID, |
| | Device ID, |
| | Session ID |
| | } |

The parameters of the TLME-RemoveSessionParameters.request message are described below with reference to Table 37.

TABLE 37

| Name | Size | Valid Range |
| --- | --- | --- |
| Transaction ID | 8 bits | 0x00 to 0xFF |
| Device Identifier | 32 bits | 0x00000000 to 0xFFFFFFFF |
| Session ID | 16 bits | 0x0000 to 0x03FF |

The parameters of the TLME-RemoveSessionParameters.request message shown in Table 37 are described below.

Transaction ID of Table 37: The Transaction ID is used for correlating the TLME-RemoveSessionParameters.confirm message to the previously issued TLME-RemoveSessionParameters.request message. It is generated by the session layer 4805. It is an 8 bit rolling counter that is incremented monotonically by one for each new TLME-RemoveSessionParameters.request message.

Device ID of Table 37: The Device ID is a local identifier assigned to a connected and authenticated peer electronic device by the Discovery Management Entity.

Session ID of Table 37: The Session ID is used to indicate the session on which the TSDU is to be delivered.

Upon receiving the TLME-RemoveSessionParameters.request message, the local transport layer updates the (Device ID, Session ID) to QoSObjectType mapping table.

In operation 4841, the transport layer 4807 generates and communicates a TLME-RemoveSessionParameters.confirm message to the session layer 4805. The structure of the TLME-RemoveSessionParameters.confirm message is as follows:

| TLME-RemoveSessionParameters.confirm | { |
| --- | --- |
| | Transaction ID, |
| | STATUS |
| | } |

The parameters of the TLME-RemoveSessionParameters.confirm message are described below with reference to Table 38.

TABLE 38

| Name | Size | Valid Range |
| --- | --- | --- |
| Transaction ID | 8 bits | 0x00 to 0xFF |
| STATUS | 8 bits | 0x00 to 0x01 |

The parameters of the TLME-RemoveSessionParameters.confirm message shown in Table 38 are described below.

Transaction ID of Table 38: The Transaction ID is populated by echoing the Transaction ID in the original TLME-ConfigureSessionParameters.request message.

Status Code of Table 38: The Status Code is used to indicate the status of the original TLME-ConfigureSessionParameters.request message. It is 8 bits long. The definitions of the status code is provided in Table 39.

TABLE 39

| Value | Meaning |
| --- | --- |
| 0x00 | Success |
| 0x01 | Invalid parameters |

In generating the TLME-RemoveSessionParameters.confirm message, if any parameter in the TLME-RemoveSessionParameters.request message is not supported, the STA- TUS is set to 0x01, INVALID PARAMETER. Otherwise, STATUS is set to 0x00, SUCCESS, representing successful update of (Device ID, Session ID) to QoSObjectType mapping table at the transport layer 4807.

In operation 4843, the session layer 4805 communicates the SLME-ServiceConnectionCreation.confirm message to the service agent 4803. Operation 4843 is similar to operation 4845 of FIG. 47, and thus a description thereof is omitted herein for conciseness in explanation.

H-2-6. Service Connection Creation—Failure Scenario Related to Rejection of Service Connection FIG. 49 illustrates a message sequence chart illustrating a failure scenario related to rejection of a service connection by a remote service agent according to an embodiment of the present disclosure.

Figure 49:
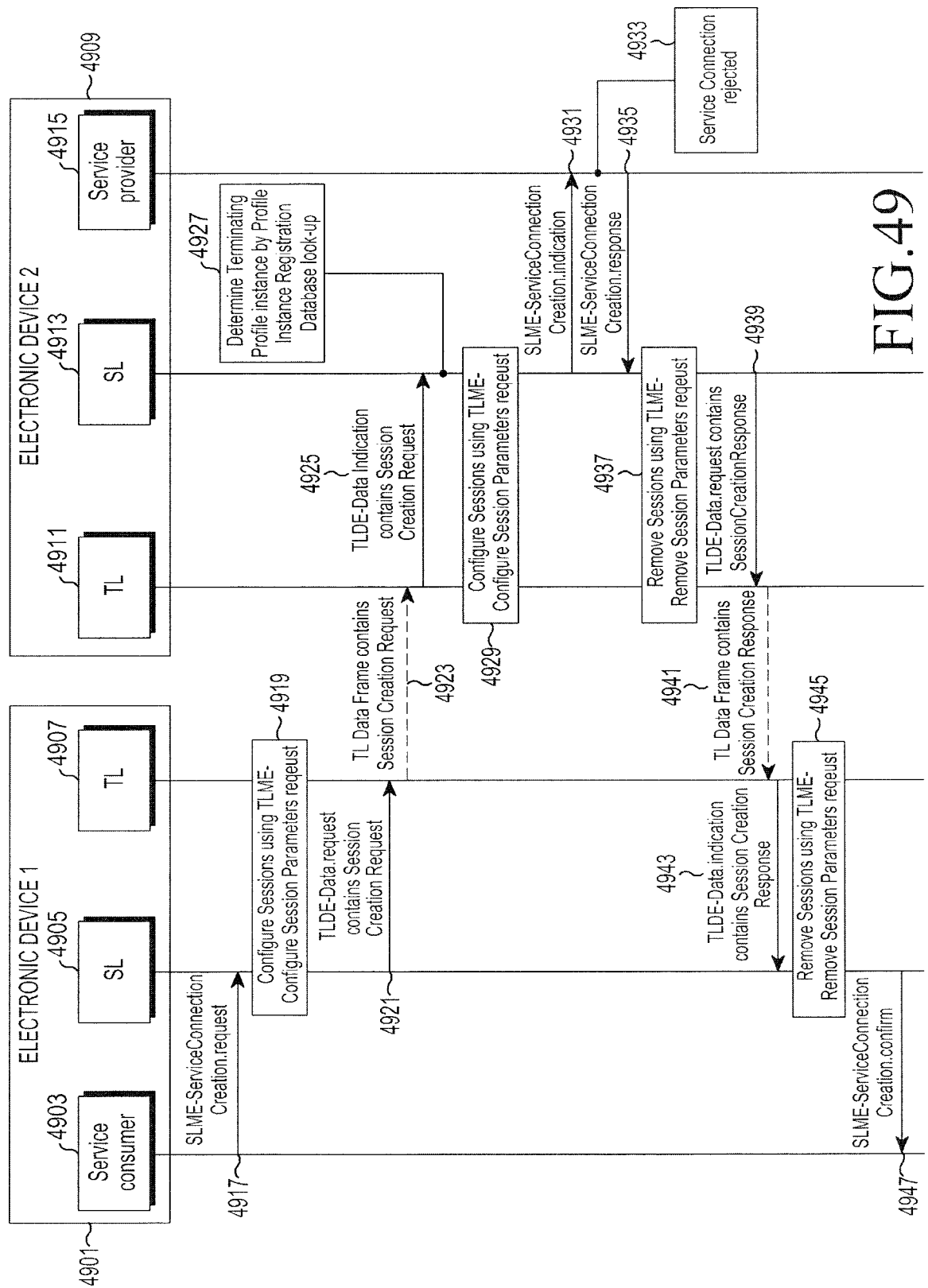
FIG. 49 illustrates a message sequence chart illustrating a failure scenario related to rejection of a service connection by a remote service agent according to an embodiment of the present disclosure.

Referring to FIG. 49, a first electronic device 4901 and a second electronic device 4909 are shown. The first electronic device 4901 includes a service agent 4903, a session layer 4905, and a transport layer 4907. The second electronic device 4909 includes a transport layer 4911, a session layer 4913, and a service agent 4915.

Operation 4917 is the same as operation 4717 of FIG. 47, and thus a description thereof is omitted herein for conciseness in explanation.

In operation 4919, the session layer 4905 and the transport layer 4907 configure sessions using a TLME-ConfigureSessionParameters.request message and a TLME-ConfigureSessionParameters.confirm message. Operation 4919 is the same as both operation 4719 and operation 4721 of FIG. 47, and thus descriptions thereof are omitted herein for conciseness in explanation.

Operation 4921 to operation 4927 is the same as operation 4713 to 4729 described above with reference to FIG. 47, and thus descriptions thereof are omitted herein for conciseness in explanation.

In operation 4929, the session layer 4913 and the transport layer 4911 configure sessions using a TLME-ConfigureSessionParameters.request message and a TLME-ConfigureSessionParameters.confirm message. Operation 4929 is the same as both operation 4731 and operation 4733 of FIG. 47, and thus descriptions thereof are omitted herein for conciseness in explanation.

Operation 4931 is the same as operation 4735 of FIG. 47, and thus a description thereof is omitted herein for conciseness in explanation. In operation 4933, the service agent 4915 rejects the service connection. Operation 4935 is the same as operation 4737 of FIG. 47, and thus a description thereof is omitted herein for conciseness in explanation.

In operation 4937, the session layer 4913 and the transport layer 4911 remove sessions using a TLME-RemoveSessionParameters.request message and a TLME-RemoveSessionParameters.confirm message. Operation 4937 is similar to both operation 4839 and operation 4841 of FIG. 48, and thus descriptions thereof are omitted herein for conciseness in explanation.

Operation 4939 to operation 4943 is the same as operation 4831 to 4735 described above with reference to FIG. 48, and thus descriptions thereof are omitted herein for conciseness in explanation.

In operation 4945, the session layer 4905 and the transport layer 4907 remove sessions using a TLME-RemoveSessionParameters.request message and a TLME-RemoveSessionParameters.confirm message. Operation 4945 is similar to both operation 4839 and operation 4841 of FIG. 48, and thus descriptions thereof are omitted herein for conciseness in explanation.

Operation 4947 is the same as operation 4843 of FIG. 48, and thus a description thereof is omitted herein for conciseness in explanation.

H-2-7. Service Connection Termination

On request from either the service provider or the service consumer engaged in a Service-Connection, the session layer terminates the Service-Connection thus releasing the associated channel, as described below with reference to FIG. 50.

Figure 50:
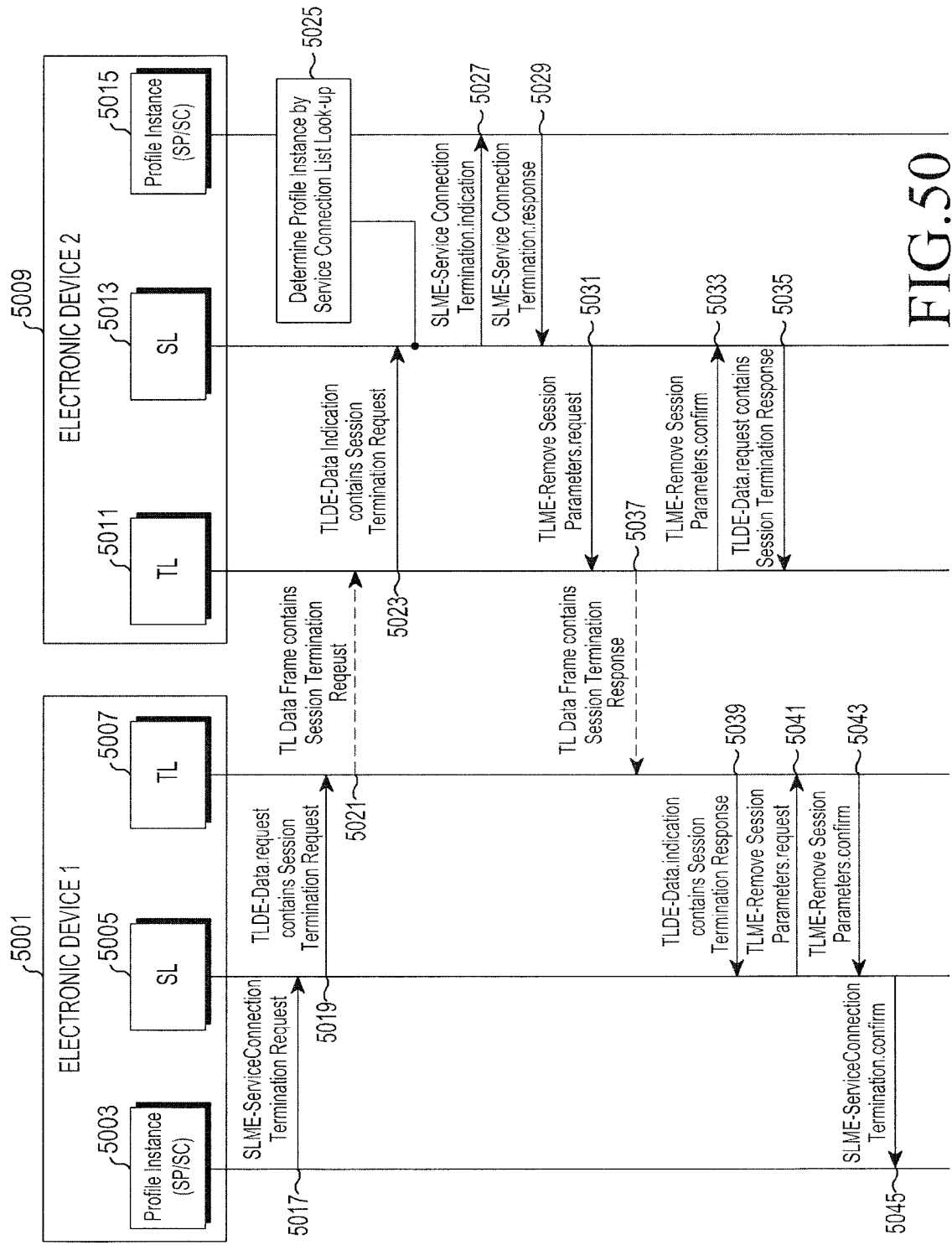
FIG. 50 illustrates a message sequence chart illustrating service connection termination according to an embodiment of the present disclosure.

FIG. 50 illustrates a message sequence chart illustrating service connection termination according to an embodiment of the present disclosure.

Referring to FIG. 50, a first electronic device 5001 and a second electronic device 5009 are shown. The first electronic device 5001 includes a profile instance 5003 for a service provider or the service consumer, a session layer 5005, and transport layer 5007. The second electronic device 5009 includes a transport layer 5011, a session layer 5013, and a profile instance 5015.

In operation 5017, the profile instance 5003 communicates a SLME-ServiceConnectionTermination.request message to the session layer 5005 to terminate a Service Connection. The structure of the SLME-ServiceConnectionTermination.request message is as follows:

```
SLME-ServiceConnectionTermination.request {
                                Transaction ID,
                                Identity of Service
                                Connection
{
                                Device ID,
                                Local Service
                                Agent ID,
                                Remote Service Agent
                                ID,
                                ASP ID
                                },
}
```

The parameters of the SLME-ServiceConnectionTermination.request message are described below with reference to Table 40.

TABLE 40

| Name | Size | Valid Range |
| --- | --- | --- |
| Transaction ID | 8 bits | 0x00 to 0xFF |
| Device ID | 32 bits | 0x00000000 to 0xFFFFFFFF |
| Local Service Agent ID | 16 bits | 0x01 to 0xFFFF. Includes a reserved value range 0xFEFF~0xFFFF |
| Remote Service Agent ID | 16 bits | 0x01 to 0xFFFF. Includes a reserved value range 0xFEFF~0xFFFF |
| ASP ID | 128 bits | A 128 bit character String |

The parameters of the SLME-ServiceConnectionTermination.request message shown in Table 40 are described below.

Transaction ID of Table 40: The Transaction ID is used for correlating the SLME-ServiceConnectionTermination.confirm and the original SLME-ServiceConnectionTermination.request messages. It is generated by the Service Agent. It is an 8 bit rolling counter that is incremented monotonically by one for each new SLME-ServiceConnectionTermination.request.

Identity of Service Connection of Table 40: The tuple {Device ID, Local Service Agent ID, Remote Service Agent ID, or ASP ID} identifies the Service-Connection to be terminated and is an echo of values provided in the SLME-ServiceConnectionCreation.confirm message.

Upon receiving the SLME-ServiceConnectionTermination.request message, the session layer 5005 validates the existence of Service-Connection in the Service-Connection list.

In operation 5019, the session layer 5005 generates and communicates a TLDE-data.request message that includes a SessionTerminationRequest message to the transport layer 5007. The TLDE-data.request message has been described above. The SessionTerminationRequest message is used to terminate one or more sessions with the peer session layer 5013 on a given Device ID. The structure of the SessionTerminationRequest message is set forth in Table 41.

TABLE 41

| Field Name | Field Type | Valid Range |
|---|---|---|
| Message Type | 8 bits | 0x03 |
| To Service Agent ID | 16 bits | 0x01 to 0xFFFF. Includes a reserved value range 0xFEFF~0xFFFF |
| From Service Agent ID | 16 bits | 0x01 to 0xFFFF. Includes a reserved value range 0xFEFF~0xFFFF |
| ASP ID | 128 bits | A 128 bit character String |

Message Type of Table 41: The Message Type identifies the type of Message, e.g., a SessionTerminationRequest message.

To Service Agent ID of Table 41: To Service Agent ID identifies the remote Service Agent participating in the Service-Connection that is being terminated now. This is populated by echoing Remote Service Agent ID passed in the SLME-ServiceConnectionTermination.request message that has triggered the SessionTerminationRequest message.

From Service Agent ID of Table 41: The From Service Agent ID identifies the local Service Agent participating in the Service-Connection that is being terminated now. This is populated by echoing Local Service Agent ID passed in the SLME-ServiceConnectionTermination.request message that has triggered the SessionTerminationRequest message.

ASP ID of Table 41: The Accessory Service Profile ID which identifies the service that is being consumed over the Service-Connection. This is populated by echoing ASP ID passed in the SLME-ServiceConnectionTermination.request message that has triggered the SessionTerminationRequest message.

After communicating the TLDE-Data.request as described above, the session layer 5005 starts a timer with a value of SessionTerminationRetryTimeout and waits for the SessionTerminationResponse message. In the case where the timer expires prior to the SessionTerminationResponse message being received, the session layer 5005 reattempts transmission of the same SessionTerminationRequest message as per the procedure described above for a maximum of SessionTerminationRetryLimit times. If a SessionTerminationResponse message is not received after retrying the SessionTerminationRequest message SessionTerminationRetryLimit times, then the SLME issues an SLME-ServiceConnectionTermination.confirm message with a Status of 0x02 (Timeout).

In operation 5021, the transport layer 5007 communicates the SessionTerminationRequest message to the transport layer 5011 through a transport layer data frame. The transport layer data frame will be described further below.

In operation 5023, the transport layer 5011 generates a TLDE-data.indication message having the SessionTerminationRequest message included therein and communicates the same to the session layer 5013.

In operation 5023, the session layer 5013 determines a profile instance by service-connection list look-up and terminates the corresponding service connection. In particular, the following fields {
To Service Agent ID field of the SessionTerminationRequest message
From Service Agent ID field of the SessionTerminationRequest message
ASP ID field of the SessionTerminationRequest message
Device ID field of TLDE-Data.indication (in which the SessionTerminationRequest message was received)
}
are matched with the following fields respectively of each entry in the Service-Connection list
{
Local Service Agent ID field of the SessionTerminationRequest message
Remote Service Agent ID field of the SessionTerminationRequest message
ASP ID field of the SessionTerminationRequest message
peer Device I D
}.

In operation 5027, the session layer 5013 generates and transmits a SLME-ServiceConnectionTermination.indication message to the profile instance 5015 to inform of the termination of the service connection. The profile instance 5015 releases its resources associated with the service-connection being terminated and concludes that use of the channel numbers associated with service-connection is to be discontinued.

In operation 5029, the profile instance 5015 generates and communicates a SLME-ServiceConnectionTermination.response message to the session layer 5013. The structure of the SLME-ServiceConnectionTermination.response message is as follows:

SLME-ServiceConnectionTermination.response {
Transaction ID,
Status Code
}

The parameters of the SLME-ServiceConnectionTermination.response message are described below with reference to Table 42.

TABLE 42

| Name | Size | Valid Range |
|---|---|---|
| Transaction ID | 8 bits | 0x00 to 0xFF |
| Status Code | 8 bits | 0x00 |

The parameters of the SLME-ServiceConnectionTermination.response message shown in Table 42 are described below.

Transaction ID of Table 42: The Transaction ID is used for correlating the SLME-ServiceConnectionTermination.response message and the original SLME-ServiceConnectionTermination.indication message. It is populated by echoing the Transaction ID in the original SLME-ServiceConnectionTermination.indication message.

Status Code of Table 42: The Status Code is used to indicate the status of the original SLME-ServiceConnectionTermination.indication message. The status code may be, e.g., Success.

In operation 5031, the session layer 5013 generates a TLME-RemoveSessionParameters.request message to request the transport layer 5013 to remove session parameters configured with a created session. The structure of the TLME-RemoveSessionParameters.request message is as follows:

| TLME-RemoveSessionParameters.request | { Transaction ID, Device ID, Session ID } |
|---|---|

The parameters of the TLME-RemoveSessionParameters.request message are described below with reference to Table 43.

TABLE 43

| Name | Size | Valid Range |
|---|---|---|
| Transaction ID | 8 bits | 0x00 to 0xFF |
| Device ID | 32 bits | 0x00000000 to 0xFFFFFFFF |
| Session ID | 16 bits | 0x0000 to 0x03FF |

The parameters of the TLME-RemoveSessionParameters.request message shown in Table 43 are described below.

Transaction ID of Table 43: The Transaction ID is used for correlating the TLME-RemoveSessionParameters.confirm message to the previously issued TLME-RemoveSessionParameters.request message. It is an 8 bit rolling counter that is incremented monotonically by one for each new TLME-RemoveSessionParameters.request message.

Device ID of Table 43: The Device ID is a local identifier assigned to a connected and authenticated peer electronic device by the Discovery Management Entity.

Session ID of Table 43: The Session ID is used to indicate the session on which the TSDU is to be delivered.

Upon receipt of the TLME-RemoveSessionParameters.request message, the transport layer 5011 updates the (Device ID, Session ID) to QoSObjectType mapping table.

In operation 5033, the transport layer 5011 generates and communicates a TLME-RemoveSessionParameters.confirm message to the session layer 5013. The structure of the TLME-RemoveSessionParameters.confirm message is as follows:

| TLME-RemoveSessionParameters.confirm | { Transaction ID, STATUS } |
|---|---|

The parameters of the TLME-RemoveSessionParameters.confirm message are described below with reference to Table 44.

TABLE 44

| Name | Size | Valid Range |
|---|---|---|
| Transaction ID | 8 bits | 0x00 to 0xFF |
| STATUS | 8 bits | 0x00 to 0x01 |

The parameters of the TLME-RemoveSessionParameters.confirm message shown in Table 44 are described below.

Transaction ID of Table 44: The Transaction ID is populated by echoing the Transaction ID in the original TLME-ConfigureSessionParameters.request message.

Status Code of Table 44: The Status Code is used to indicate the status of the original TLME-ConfigureSessionParameters.request message. It is 8 bits long. The definitions to interpret the status code are set forth below in Table 45.

TABLE 45

| Value | Meaning |
|---|---|
| 0x00 | Success |
| 0x01 | Invalid parameters |

In operation 5035, the session layer 5013 generates and communicates a SessionTerminationResponse message, which is communicated through a TLDE-Data.request message to the transport layer 5011. The TLDE-Data.request message has been described above.

Regarding the SessionTerminationResponse message, the message is used by the session layer 5013 to respond to a SessionTerminationRequest message from the session layer 5005. It is used to confirm the termination of the Service-Connection requested in the SessionTerminationRequest message from the session layer 5005. The parameters of the SessionTerminationRequest message are described below with reference to Table 46.

TABLE 46

| Field Name | Field Type | Valid Range |
|---|---|---|
| Message Type | 8 bits | 0x04 |
| To Service Agent ID | 16 bits | 0x01 to 0xFFFF. Includes a reserved value range 0xFEFF~0xFFFF |
| From Service Agent ID | 16 bits | 0x01 to 0xFFFF Includes a reserved value range 0xFEFF~0xFFFF |
| ASP ID | 128 bits | A 128 bit character String |
| Status Code | 8 Bits | 0x00 to 0x01 |

The parameters of the SessionTerminationRequest message shown in Table 46 are described below.

Message Type of Table 46: The Message Type identifies the type of session layer message. Value is SessionTerminationRequest, i.e., value of 0x04.

To Service Agent ID of Table 46: The To Service Agent ID identifies the remote Service Agent participating in the Service-Connection that is being terminated now. This is populated by echoing From Service Agent ID passed in the corresponding SessionTerminationRequest message.

From Service Agent ID of Table 46: The From Service Agent ID identifies the local Service Agent participating in the Service-Connection that is being terminated now. This is populated by echoing To Service Agent ID passed in the corresponding SessionTerminationRequest message.

ASP ID of Table of Table 46: The Accessory Service Profile ID which identifies the service that is being consumed over the Service-Connection. This is populated by echoing ASP ID in the corresponding the SessionTerminationRequest message.

Status Code of Table 46: The Status Code always denotes Success i.e., a value of 0x00.

In operation 5037, the transport layer 5011 generates a transport layer data frame including the SessionTerminationResponse message and communicates it to the transport layer 5007.

In operation 5039, the transport layer 5007 generates a TLDE-Data.indication message including the SessionTerminationResponse message and communicates it to the session layer 5005.

Upon receipt of the SessionTerminationResponse message, the session layer 5005 identifies the appropriate Service-Connection in the Service-Connection list by matching the set

```
{
To Service Agent ID field in the SessionTerminationResponse
message
From Service Agent ID field in the SessionTerminationResponse
message
ASP-ID field in the SessionTerminationResponse message
Device ID field of TLDE-Data.indication (in which the
SessionTerminationResponse message was received)
}
with the following set of fields respectively, corresponding to each of
the pending SLME-ServiceConnectionTermination.request messages
{
Local Service Agent ID
Remote Service Agent Id
ASP ID
Device Identifier
}.
```

The session layer 5005 retrieves the list of Session ID associated with Service-Connection that is being terminated (identified above) and removes the entry corresponding to the termination Service-Connection from the Service-Connection list. For every Session ID it initiates a TLME-RemoveSessionParameters.request message. After receiving TLME-RemoveSessionParameters.response message for all the requests, it notifies the corresponding Service Agent that requested the original SLME-SessionTermination.request message by means of an SLME-ServiceConnectionTermination.confirm message in operation 5045. The structure of the SLME-ServiceConnectionTermination.confirm message is as follows:

```
SLME-ServiceConnectionTermination.confirm  {
                                           Transaction ID,
                                           STATUS
                                           }
```

The parameters of the SLME-ServiceConnectionTermination.confirm message are described below with reference to Table 47.

TABLE 47

| Name | Size | Valid Range |
| --- | --- | --- |
| Status Code | 1 Byte | 0x00 to 0x03 |
| Transaction ID | 8 bits | 0x00 to 0xFF |

The parameters of the SLME-ServiceConnectionTermination.confirm message shown in Table 47 are described below.

Status Code of Table 47: The Status Code is used to indicate the status of the original SLME-SessionTermination.request message. It is 1 byte long. The following values are defined in Table 48. It is populated based on the Status Code field of the SessionTerminationResponse message received.

TABLE 48

| Value | Meaning |
| --- | --- |
| 0x00 | SUCCESS |
| 0x01 | REJECTED |
| 0x02 | TIMEOUT |
| 0x03 | INVALID PARAMETER |

Transaction ID of Table 47: The Transaction ID is used for correlating the SLME-SessionTermination.confirm message and the original SLME-SessionTermination.request message. It is populated by echoing the Transaction ID from the original SLME-SessionTermination.request message.

H-2-8. Exchange of APDUs

Once the Service-Connection is created, the Service Provider/Consumer can send and receive over the associated channels created, as described below with reference to FIG. 51.

Figure 51:
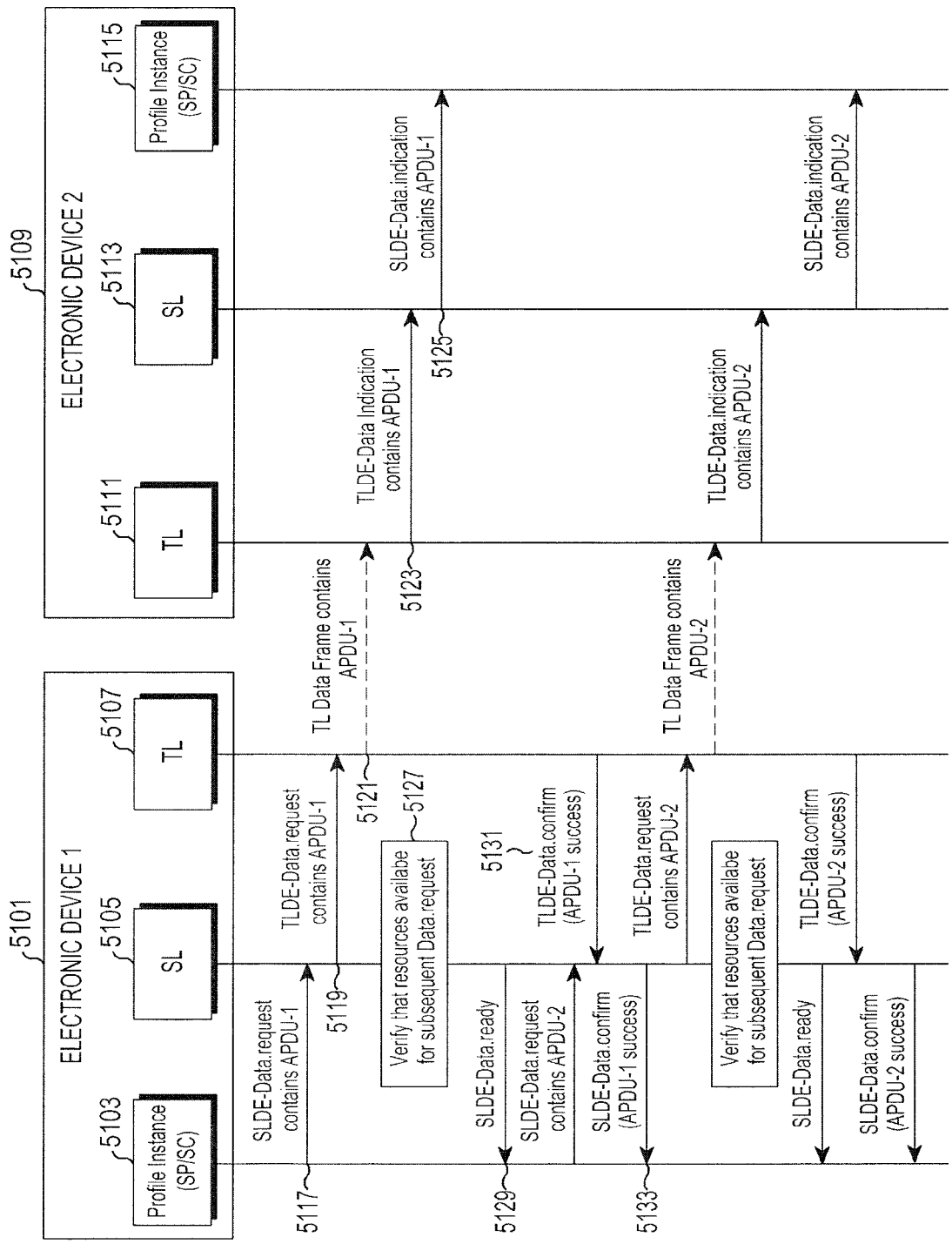
FIG. 51 illustrates a message sequence chart illustrating service connection termination according to an embodiment of the present disclosure.

FIG. 51 illustrates a message sequence chart illustrating service connection termination according to an embodiment of the present disclosure.

Referring to FIG. 51, a first electronic device 5101 and a second electronic device 5109 are shown. The first electronic device 5101 includes a profile instance 5103 for a service provider or the service consumer, a session layer 5105, and transport layer 5107. The second electronic device 5109 includes a transport layer 5111, a session layer 5113, and a profile instance 5115.

In operation 5117, the profile instance 5103 generates and communicates a SLDE-Data.request message including an APDU or SSDU (i.e. APDU-1) for transfer of the APDU to the profile instance 5115. The structure of the SLDE-Data.request message is as follows:

```
SLDE-Data.request    {
                     Transaction ID,
                     Identity of Service Connection {
                                                     Device ID,
                                                     Local Service
                                                     Agent ID,
                                                     Remote Service
                                                     Agent
                                                 ID,
                                                     ASP ID
                                                     },
                     Channel Number,
                     Payload Length,
                     APDU (or SSDU)
                     }
```

The parameters of the SLDE-Data.request message are described below with reference to Table 49.

TABLE 49

| Name | Size | Valid Range |
| --- | --- | --- |
| Transaction ID | 8 bits | 0x00 to 0xFF |
| Device ID | 32 bits | 0x00000000 to 0xFFFFFFFF |
| Local Service Agent ID | 16 bits | 0x01 to 0xFFFF. Includes a reserved value range 0xFEFF~0xFFFF |
| Remote Service Agent ID | 16 bits | 0x01 to 0xFFFF. Includes a reserved value range 0xFEFF~0xFFFF |
| ASP ID | 128 bits | A 128 bit character String |
| Channel Number | 16 bits | 0x0000 to 0x03FF |
| Payload Length | 16 bits | 0x0001 to 0xFFFF |
| APDU (or SSDU) | Variable | Set of octets |

The parameters of the SLDE-Data.request message shown in Table 49 are described below.

Transaction ID of Table 49: The Transaction ID is used for correlating the SLDE-Data.ready and SLDE-Data.confirm messages to the original SLDE-Data.request message. It is generated by the ALE. It is an 8 bit rolling counter that is incremented monotonically by one for each new SLDE-Data.request to the same Service-Connection identity and Channel Number.

Identity of Service Connection of Table 49: The tuple {Device ID, Local Service Agent ID, Remote Service Agent ID, or ASP ID} identifies the Service-Connection and is an echo of values provided in the SLME-ServiceConnection-Creation.confirm message.

Channel Number of Table 49: The Channel Number is used to indicate the channel on which the APDU is to be delivered. Its value is one of the Channel Numbers as per the Accessory Service Profile corresponding to the ASP ID which the Service Connection is for.

Payload Length of Table 49: The Payload length is used to indicate the number of octets in the following APDU (i.e., SSDU). It is 16 bits long. The session layer 5105 restricts SSDU size to a maximum of MaxSSDUSize octets.

APDU of Table 49: The APDU (or SSDU) is the set of octet-aligned parameters that constitute the application payload.

Upon receiving the SLDE-Data.request message, the session layer 5105 first checks if any parameter in the SLDE-Data.request message is not supported or is out of range. If so, the session layer 5105 generates the SLDE-Data.confirm message (described further below) with a Status of INVALID_PARAMETER echoing the same Transaction ID. The session layer 5105 then checks whether it has a registered Application for the specified Session ID parameter and if the session is open. If not, the session layer 5105 generates the SLDE-Data.confirm message with a Status of SESSION_NOT_CREATED echoing the same Transaction ID. If the above checks are passed, the session layer 5105 begins the transmission of the supplied APDU (or SSDU) as follows. The session layer 5105 uses the supplied APDU (or SSDU) directly as the SPDU without adding any fields. The session layer 5105 generates a TLDE-Data.request message to request transmission of the SPDU by identifying the Session ID from the Identity of Service Connection {Device Identifier, Local Service Agent ID, Remote Service Agent ID} and the Channel Number.

In operation 5119, the session layer 5105 communicates the TLDE-Data.request message including the APDU or SSDU (i.e., APDU-1) to the transport layer 5107 to request the transfer of an SPDU (i.e., TSDU) from session layer 5105 to session layer 5113. The structure of the TLDE-Data.request message is as follows:

| TLDE-Data.request | { |
| --- | --- |
| | Transaction ID, |
| | Device ID, |
| | Session ID, |
| | Payload Length, |
| | SPDU (or TSDU) |
| | } |

The parameters of the TLDE-Data.request message are described below with reference to Table 50.

TABLE 50

| Name | Size | Valid Range |
| --- | --- | --- |
| Transaction ID | 8 bits | 0x00 to 0xFF |
| Device Identifier | 32 bits | 0x00000000 to 0xFFFFFFFF |
| Session ID | 16 bits | 0x0000 to 0x03FF |
| Payload Length | 16 bits | 0x0001 to 0xFFFD |
| SPDU (or TSDU) | Variable | Set of octets |

The parameters of the TLDE-Data.request message shown in Table 50 are described below.

Transaction ID of Table 50: The Transaction ID is used for correlating the TLDE-Data.ready and TLDE-Data.confirm messages to the previously issued TLDE-Data.request message. It is an 8 bit rolling counter that is incremented monotonically by one for each new TLDE-Data.request to the same Device ID and Session ID.

Device ID of Table 50: The Device ID is used by the TLDE to address the peer electronic device to which it wants to send an SPDU.

Session ID of Table 50: The Session ID is used to indicate the session on which the SPDU is to be delivered. It is a 10 bit identifier assigned by the session layer at the time of session creation.

Payload Length of Table 50: The Payload Length indicates the number of octets included in the SPDU (or TSDU) to be transmitted by the TLDE. It is 16 bits long. TLDE restricts TSDU size to a maximum of MaxTSDUSize octets.

SPDU (or TSDU) of Table 50: The SPDU (or TSDU) is the set of octet-aligned parameters that constitute the transport layer payload.

On receipt of the TLDE-Data.request message, the transport layer 5107 first checks if any parameter in the TLDE-Data.request message is not supported or is out of range. If so, the transport layer 5107 generates the TLDE-Data.confirm message (described further below), with a Status of INVALID_PARAMETER echoing the same Transaction ID. If the parameters of the TLDE-Data.request message are valid, then the transport layer 5107 processes the Device ID and Session ID parameters to determine the transport layer Frame Format Procedure as described further below and constructs the TPDU from the SPDU (or TSDU). For each Device ID and Session ID pair, the transport layer 5107 maintains separate queues to enqueue TPDUs for transmission to the connection layer. The transport layer enqueues the TPDU formed above, into the packet queue corresponding to the specified Device ID and Session ID pair. If the connection layer is ready to accept further TPDUs for transmission, the transport layer dequeues the head of the line TPDU from by choosing a Device ID and Session ID queue with the highest priority. The transport layer 5107 requests the transmission of this TPDU by issuing a CLDE-Data.request echoing the Device ID. If the transport layer 5107 has queue space to accept further SPDUs (or TSDUs), then the TLDE generates a TLDE-Data.ready message echoing the same Transaction.

In operation 5121, the transport layer 5107 communicates a transport layer frame including APDU-1 to the transport layer 5111.

In operation 5123, the transport layer 5111 generates and communicates a TLDE-DATA.indication message including APDU-1 to the session layer 5113. The structure of the TLDE-DATA.indication message is as follows:

| TLDE-Data.indication | { |
| --- | --- |
| | Device ID, |
| | Session ID, |
| | Payload Length, |

-continued

```
                             SPDU (or TSDU)
                         }
```

The parameters of the TLDE-Data.indication message are described below with reference to Table 51.

TABLE 51

| Name | Size | Valid Range |
|---|---|---|
| Transaction ID | 8 bits | 0x00 to 0xFF |
| Device Identifier | 32 bits | 0x00000000 to 0xFFFFFFFF |
| Session ID | 16 bits | 0x0000 to 0x03FF |
| Payload Length | 16 bits | 0x0001 to 0xFFFD |
| SPDU (or TSDU) | Variable | Set of octets |

The parameters of the TLDE-Data.indication message shown in Table 51 are described below.

Device ID of Table 51: The Device ID is used by the transport layer to indicate the peer electronic device from which it has received an SPDU (or TSDU). It is populated by echoing the Device ID parameter in the CLDE-Data.indication message received at the transport layer.

Session ID of Table 51: The Session ID is used to indicate the session on which the TSDU or SPDU was received. It is populated by echoing the Session ID parameter in the CLDE-Data.indication primitive received at the transport layer.

Payload Length of Table 51: The Payload Length is used to indicate the number of octets in the SPDU (or TSDU). It is 16 bits long.

SPDU (or TSDU) Table 51: The SPDU (or TSDU) is the set of octet-aligned parameters that constitute the transport payload In operation 5125, the session layer 5113 generates and communicates a SLDE-DATA.indication message including APDU-1 to profile instance 5115. The structure of the SLDE-Data.indication primitive is as follows:

```
SLDE-Data.indication    {
                        Identity of Service Connection {
                                                       Device ID,
                                                       Local Service
                                                       Agent ID,
                                                       Remote Service
                                                       Agent
                                                   ID,
                                                       ASP ID
                                                       },
                        Channel Number,
                        Payload Length,
                        APDU (or SSDU)
                        }
```

The parameters of the SLDE-Data.indication message are described below with reference to Table 52.

TABLE 52

| Name | Size | Valid Range |
|---|---|---|
| Device ID | 32 bits | 0x00000000 to 0xFFFFFFFF |
| Local Service Agent ID | 16 bits | 0x01 to 0xFFFF. Includes a reserved value range 0xFEFF~0xFFFF |
| Remote Service Agent ID | 16 bits | 0x01 to 0xFFFF. Includes a reserved value range 0xFEFF~0xFFFF |

TABLE 52-continued

| Name | Size | Valid Range |
|---|---|---|
| ASP ID | 128 bits | A 128 bit character String |
| Channel Number | 16 bits | 0x0000 to 0x03FF |
| Payload length | 16 bits | 0x0001 to 0xFFFF |
| APDU (or SSDU) | Variable | Set of octets |

The parameters of the SLDE-Data.indication message shown in Table 52 are described below.

Device ID of Table 52: The Device ID is used to indicate the peer electronic device from which it has received an SPDU (or TSDU). It is populated by echoing the Device ID parameter in the CLDE-Data.indication message received at the transport layer.

Identity of Service Connection of Table 52: The tuple {Device ID, Local Service Agent ID, Remote Service Agent ID, ASP ID} identifies the Service-Connection to be terminated and is an echo of values provided in the SLME-ServiceConnectionCreation.confirm or SLME-ServiceConnectionCreation.indication message.

Channel Number of Table 52: The Channel Number is used to indicate the channel on which the APDU is to be delivered. Its value is one of the Channel Numbers as per the Accessory Service Profile corresponding to the ASP ID which the Service Connection is for.

Payload Length of Table 52: The Payload Length is used to indicate the number of octets in the following APDU (i.e., SSDU). It is 16 bits long.

APDU (or SSDU) of Table 52: The APDU (or SSDU) is the set of octet-aligned parameters that constitute the application payload.

In operation 5127, the session layer 5105 verifies the resources that are available for a sequent data request.

In operation 5129, the session layer 5105 generates and communicates a SLDE-Data.ready message to notify the profile instance 5103 that the session layer 5105 is ready to accept the next APDU (e.g., APDU-2) for transmission by means of a fresh SLDE-Data.request message.

Meanwhile, in operation 5131, the transport layer 5107 generates and transmits a TLDE-Data.confirm message indicating success for APDU-1. The structure of the TLDE-Data.confirm message is as follows:

```
TLDE-Data.confirm       {
                        Transaction ID,
                        Device ID,
                        Session ID,
                        Status Code
                        }
```

The parameters of the TLDE-Data.confirm message are described below with reference to Table 53.

TABLE 53

| Name | Size | Valid Range |
|---|---|---|
| Device ID | 32 bits | 0x00000000 to 0xFFFFFFFF |
| Local Service Agent ID | 16 bits | 0x01 to 0xFFFF. Includes a reserved value range 0xFEFF~0xFFFF |
| Remote Service Agent ID | 16 bits | 0x01 to 0xFFFF. Includes a reserved value range 0xFEFF~0xFFFF |
| ASP ID | 128 bits | A 128 bit character String |
| Channel Number | 16 bits | 0x0000 to 0x03FF |
| Payload length | 16 bits | 0x0001 to 0xFFFF |
| APDU (or SSDU) | Variable | Set of octets |

The parameters of the SLDE-Data.indication message shown in Table 53 are described below.

Transaction ID of Table 53: The Transaction ID is populated by echoing the Transaction ID in the original TLDE-Data.request message.

Device ID of Table 53: The Device ID is populated by echoing the Device Identifier in the original TLDE-Data.request message.

Session ID of Table 53: The Session ID is populated by echoing the Session ID in the original TLDE-Data.request message.

Status Code of Table 53: The Status Code is used to indicate the status of the original TLDE-Data.request message. It is 8 bits long. The definitions to interpret the status code are provided in Table 54.

TABLE 54

| Value | Meaning |
| --- | --- |
| 0x00 | SPDU delivered to peer SLE |
| 0x01 | SPDU not delivered to peer SLE |
| 0x02 | Invalid parameters |
| 0x03 | Cannot be determined |
| 0x04-0xFF | Reserved |

In operation 5133, the session layer 5105 generates and communicates a SLDE-Data.confirm message indicating success for APDU-1. The SLDE-Data.confirm message is used to notify the profile instance 513 if the SLDE-Data.request was not accepted, or the delivery status of the APDU, if available, depending on the QoS parameters associated with the specified Session ID. The structure of the SLDE-Data.confirm message is as follows:

```
SLDE-Data.confirm   {
                    Transaction ID,
                    Identity of Service Connection {
                                                    Device Identifier,
                                                    Local Service
                                                    Agent ID,
                                                    Remote Service
                                                    Agent
                                                ID,
                                                    ASP ID
                                                    },
                                                    Channel Number,
                                                    Status Code,
                                                    }
```

The parameters of the SLDE-Data.confirm message are described below with reference to Table 55.

TABLE 55

| Name | Size | Valid Range |
| --- | --- | --- |
| Transaction ID | 8 bits | 0x00 to 0xFF |
| Device ID | 32 bits | 0x00000000 to 0xFFFFFFFF |
| Local Service Agent ID | 16 bits | 0x01 to 0xFFFF. Includes a reserved value range 0xFEFF~0xFFFF |
| Remote Service Agent ID | 16 bits | 0x01 to 0xFFFF. Includes a reserved value range 0xFEFF~0xFFFF |
| ASP ID | 128 bits | A 128 bit character String |
| Channel Number | 16 bits | 0x0000 to 0x03FF |
| Status Code | 8 bits | 0x00 to 0x03 |

The parameters of the SLDE-Data.confirm message shown in Table 55 are described below.

Transaction ID of Table 55: The Transaction ID is populated by echoing the Transaction ID in the original SLDE-Data.request message.

Identity of Service Connection of Table 55: The tuple {Device ID, Local Service Agent ID, Remote Service Agent ID, or ASP ID} identifies the Service-Connection and is an echo of values provided in the corresponding SLDE-Data.request message.

Channel Number of Table 55: The Channel Number denotes the Channel Number over which a SLDE-Data.request was issued previously thus causing this SLDE-Data.confirm. It is populated by echoing the value passed in the previous SLDE-Data.request.

Status Code of Table 55: The Status Code is used to indicate the status of the original SLDE-Data.request message. It is 8 bits long. The definitions to interpret the status code are provided in Table 56.

TABLE 56

| Value | Meaning |
| --- | --- |
| 0x00 | APDU delivered to peer ALE |
| 0x01 | APDU not delivered to peer ALE |
| 0x02 | Invalid parameters |
| 0x03 | Session not created |
| 0x04 | Cannot be determined |
| 0x05 to 0xFF | Reserved |

While the operations for APDU-1 have been described above, the operations for APDU-2 are the same as the operations for APDU-1 described above.

H-2-9. Default Session and Session ID Generation

The functions of the session layer protocol with respect to the default session and session ID generation are described hereafter. The session ID is a 10-bit value which can take on, for example, a maximum of 1024 values. Of the 1024 values, the session layer reserves a specific session identifier code (e.g., 0x03FF) for a default session. The default session is assumed to be created and available by default. It is a control session. The default session is used for sending session layer originated messages. Peer electronic devices handle messages transmitted in the default session. Peer electronic devices also ignore session creation or session termination messages attempting to create or terminate the default session. Messages transmitted on the default session are not passed on to any ALEs, while messages transmitted on any other session are intended for specific ALEs. For the other sessions, the session layer generates session IDs as a rolling counter spanning 1023 values starting from 0x0000 to 0x03FE. The maximum number of simultaneously open application sessions may thereby be restricted to 1023, since one session ID is reserved for the default session. Also note that sessions are used to multiplex and demultiplex message streams between peer electronic devices. So, the session IDs are re-used across different peer electronic devices that are simultaneously connected to the electronic device. In particular, to each peer electronic device connected to a given electronic device, there is a default session with an ID, e.g., 0x03FF, that is assumed to be available. The session layer distinguishes between the same session ID from a plurality of different peer electronic devices, by using the Device ID representing the respective plurality of peer electronic devices.

H-3. Transport Layer Protocol

Once again, the transport layer provides a data service that enables the transmission and reception of TSDUs. The transport layer management service enables QoS parameters and settings to be applied by the session layer at the granularity of individual sessions. That is, all the TSDUs carried in a given session receive the same QoS treatment. The transport layer is more easily understood when considered in the context of the greater network protocol.

Figure 52:
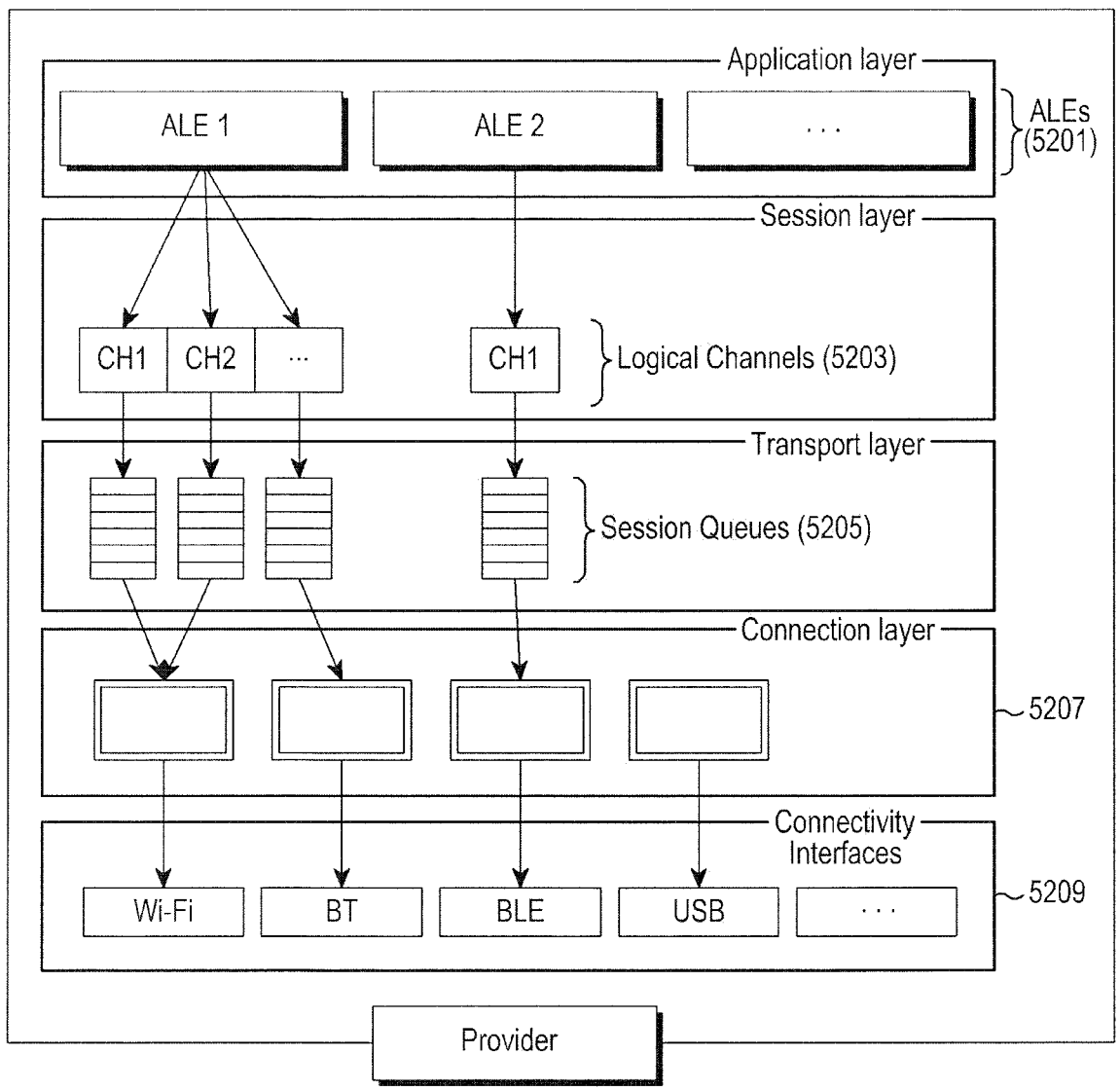
FIG. 52 illustrates a data flow through network protocol layers according to an embodiment of the present disclosure.

FIG. 52 illustrates a data flow through network protocol layers according to an embodiment of the present disclosure.

Referring to FIG. 52, data from the ALEs 5201 is assigned to one or more logical channels 5203 and by the session layer, where each logical channel is associated with a session. The data from each session is queued by the transport layer. The transport layer priority queue schedules the data in one or more session queues 5205 for communication to the relevant connectivity interface 5209 through the connection layer 5207. Here, the data in one or more session queues 5205 may be communicated to one connectivity interface 5209 through the connection layer 5207.

H-3-1. Packet Loading and Priority Queuing

Figure 53:
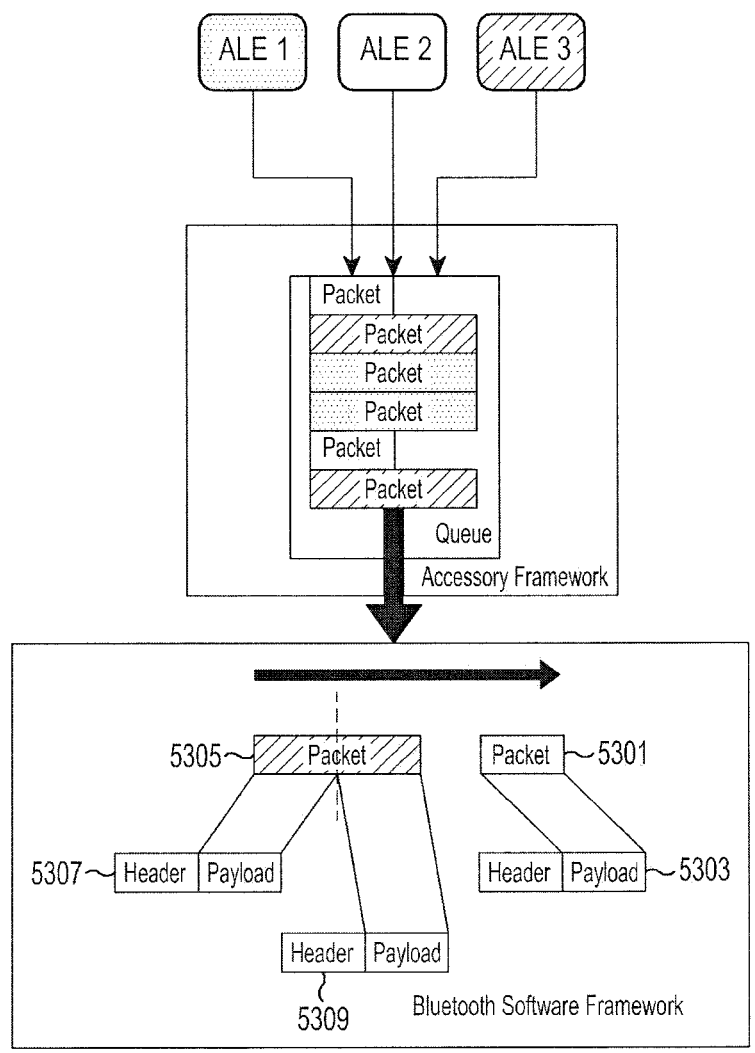
FIG. 53 illustrates packet loading according to an embodiment of the present disclosure.

FIG. 53 illustrates packet loading according to an embodiment of the present disclosure.

Referring to FIG. 53, packets from one or more ALEs are communicated through the session, transport and connection layers to the appropriate connectivity interface. The connectivity interface may employ its own communication protocol. As shown in FIG. 53, a single packet 5301 from the accessory framework may be communicated by the connectivity interface, e.g., the Bluetooth connectivity interface, in one packet 5303 of the Bluetooth protocol. Alternatively, a packet 5305 from the accessory framework may be communicated by the connectivity interface, e.g., the Bluetooth connectivity interface, using two packets 5307 and 5309 of the Bluetooth protocol. Although not shown, more than one packet from the accessory framework may be communicated by the connectivity interface, e.g., the Bluetooth connectivity interface, using one packet of the Bluetooth protocol.

Figure 54:
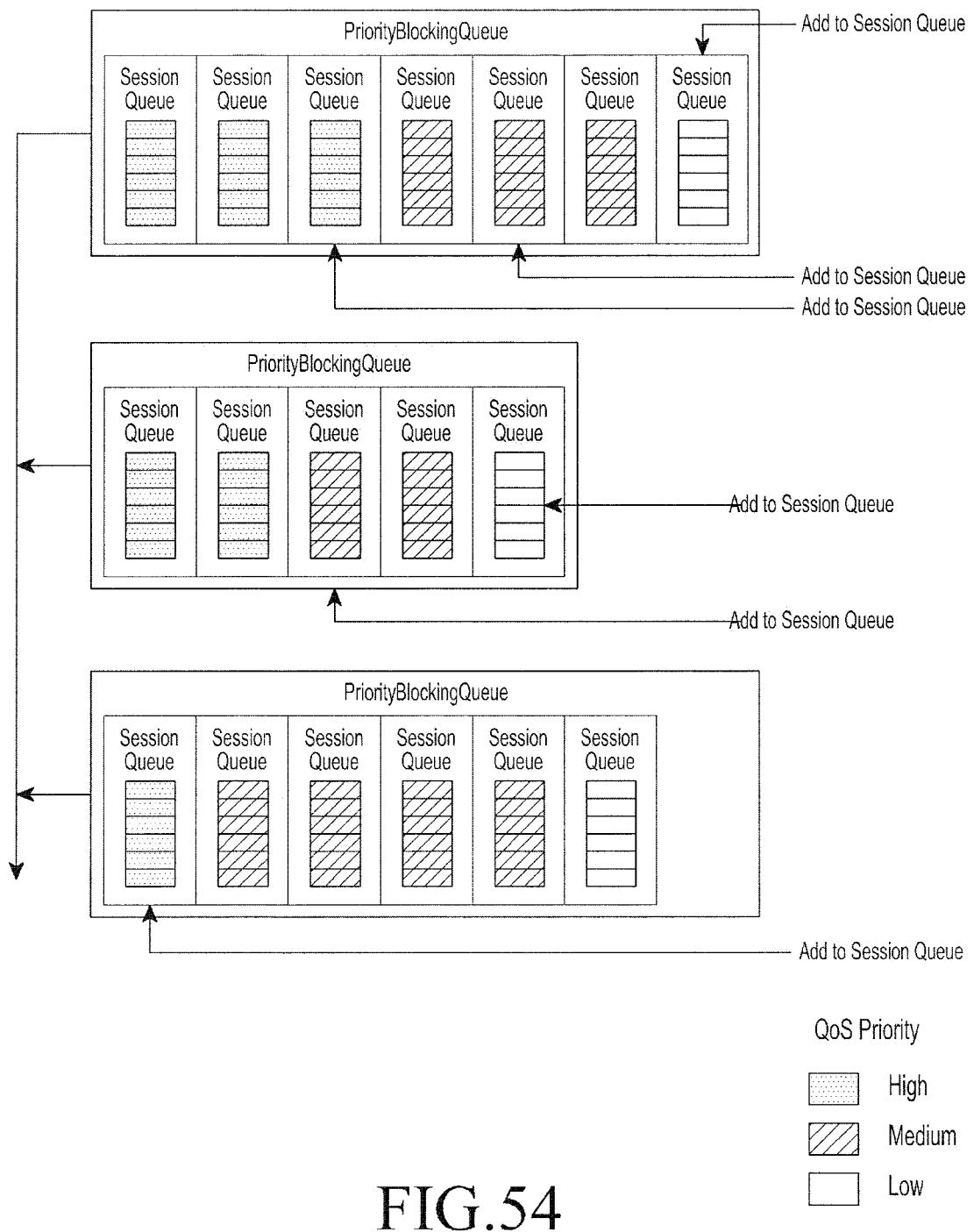
FIG. 54 illustrates a priority queuing scheduler of the transport layer according to an embodiment of the present disclosure.
Figure 55:
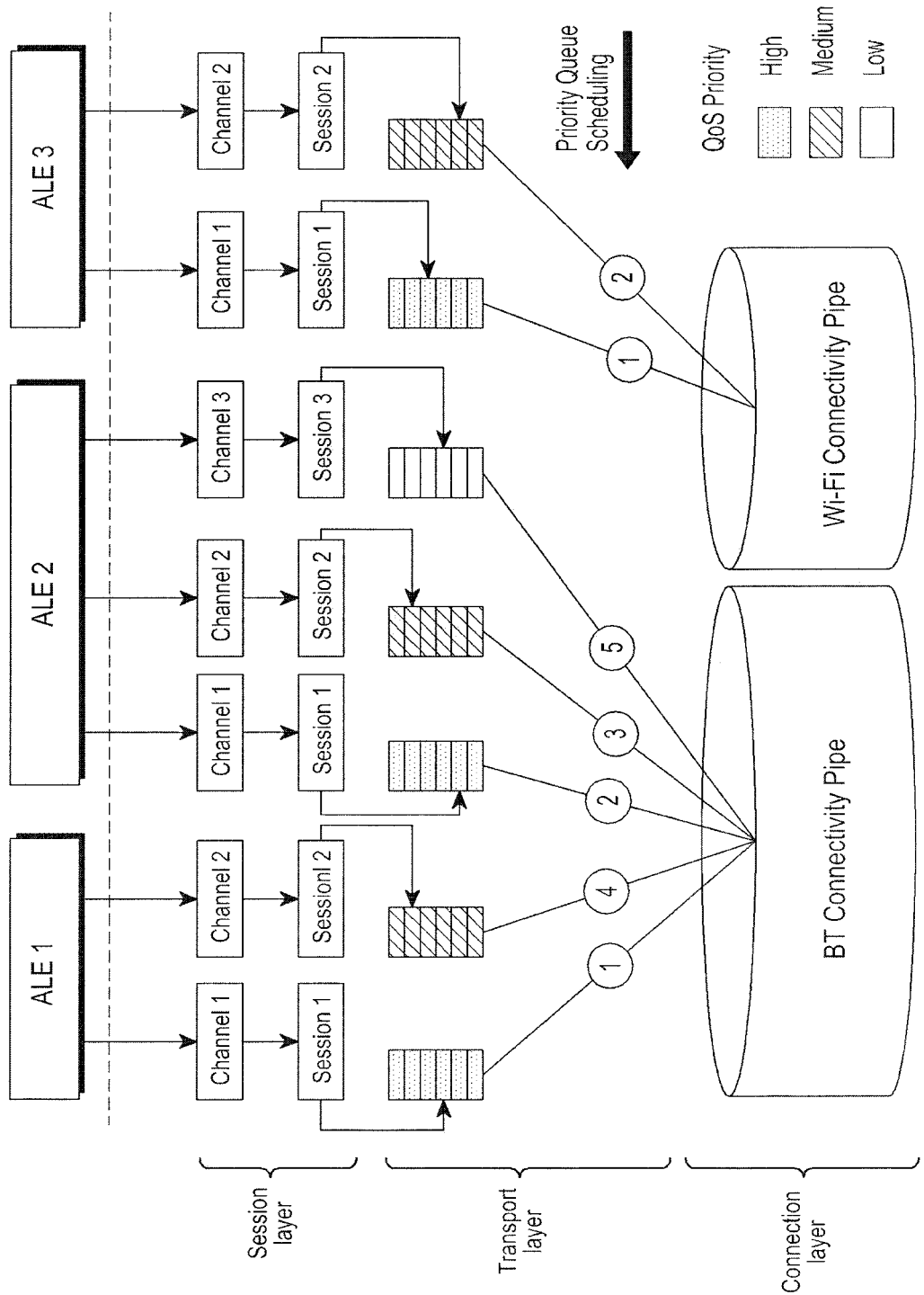
FIG. 55 illustrates buffer management by the transport layer according to an embodiment of the present disclosure.

FIG. 54 illustrates a priority queuing scheduler of the transport layer according to an embodiment of the present disclosure. FIG. 55 illustrates buffer management by the transport layer according to an embodiment of the present disclosure.

Referring to FIGS. 54 and 55, packets from the session layer are added to their respective session queues. A number of session queues are grouped together in a priority blocking queue. The priority blocking queue is a block of session queues for a given connectivity interface. Here, the session queues each include packets of one of a number of QoS priorities, e.g., high, medium, and low. In other words, one session queue may include packets all having one QoS priority and another queue may include packets all having another QoS priority session. In a given priority block, the first packet from the session queue in the head of the priority block is sent, and this process is repeated thereafter. For example, for a given connectivity interface, any packets from a non-empty session queue for which priority is set to high are transmitted first. If there are multiple such queues, the tie is broken using an implementation-specific technique which is dictated by the platform capability and policies of that electronic device. Next, any packets from a non-empty session queue for which priority is set to medium are transmitted next. If there are multiple such queues, the tie is broken using an implementation-specific technique which is dictated by the platform capability and policies of that electronic device. Thereafter, any packets from a non-empty session queue for which priority is set to low are transmitted next. If there are multiple such queues, the tie is broken using an implementation-specific technique which is dictated by the platform capability and policies of that electronic device.

H-3-2. Transport Layer Frame Format

Data is communicated between a transport layer in an electronic device and a peer transport layer in a peer electronic device in transport layer frames. The structure of the transport layer frame is described below with reference to FIG. 56.

Figure 56:
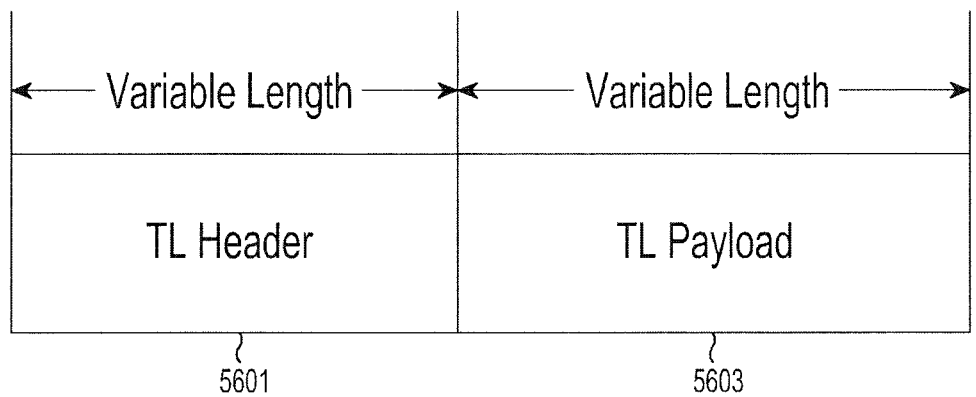
FIG. 56 illustrates a structure of a transport layer frame according to an embodiment of the present disclosure.

FIG. 56 illustrates a structure of a transport layer frame according to an embodiment of the present disclosure.

Referring to FIG. 56, the transport layer frame includes a transport layer header 5601 of a variable length, and a transport layer payload 5603 of a variable length.

The structure of the transport layer header of the transport layer frame is described below with reference to FIG. 57.

Figure 57:
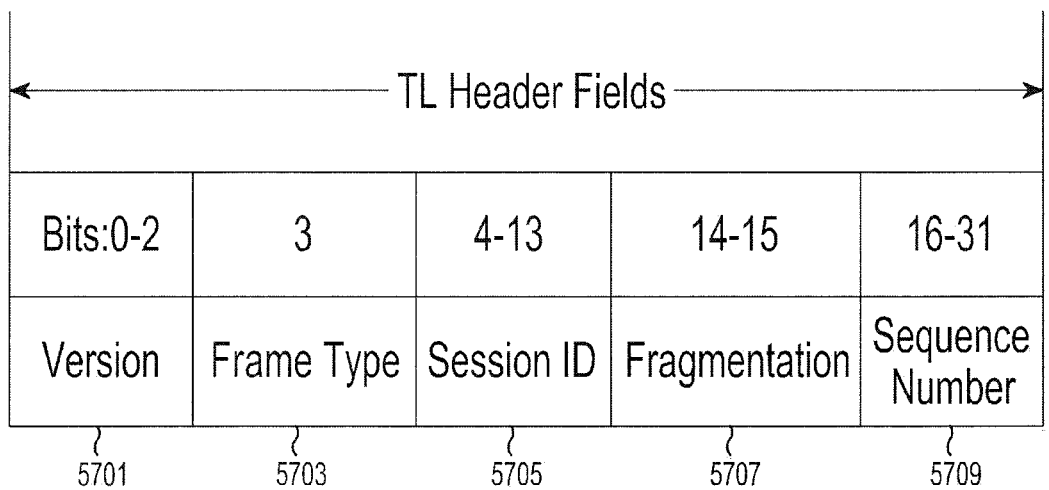
FIG. 57 illustrates a structure of a header of a transport layer frame according to an embodiment of the present disclosure.

FIG. 57 illustrates a structure of a header of a transport layer frame according to an embodiment of the present disclosure.

Referring to FIG. 57, the header of the transport layer frame includes a version field 5701, a frame type field 5703, a session ID field 5705, a fragmentation field 5707, and a sequence number field 5709.

The version field 5701 is 3 bits in size and specifies the version number corresponding to transport layer. This field shall be set to 0b000 to indicate a frame compatible with the transport layer specified in, e.g., Accessory Network Protocol v2.0. All other field values are reserved. The values of the version field are shown in Table 57.

TABLE 57

| Version Field | Description |
| --- | --- |
| 0b000 | Compatible to protocol v2.0 |
| 0b001 to 0b111 | Reserved |

The frame type field 5703 is 1 bit in size and specifies the type of Transport layer frame, i.e., transport layer Data Frame or transport layer Control Frame, as described in Table 58.

TABLE 58

| Frame Type | Description |
| --- | --- |
| 0b0 | Transport Layer Data Frame |
| 0b1 | Transport Layer Control Frame |

The session ID field 5705 is 10 bits in length and specifies the session identifier for which the payload of the data frame belongs to.

The fragmentation field 5707 is 2 bits in size and specifies whether the data frame is unfragmented or fragmented. In the case of a fragmented data frame, the fragmentation field specifies the fragment position of the data frame in a list of fragments, as shown in Table 59.

TABLE 59

| Fragmentation | Description |
| --- | --- |
| 0b00 | Unfragmented frame |
| 0b01 | First Fragment |
| 0b10 | Middle Fragment |
| 0b11 | Last Fragment |

The sequence number field 5709 is 16 bits in length and specifies the sequence identifier for the frame. For a data frame, the sequence number field 5709 shall specify the data sequence number of the data frame and it is incremented by one, modulo $2^{16}$, for every new data frame sent in a session.

Figure 58:
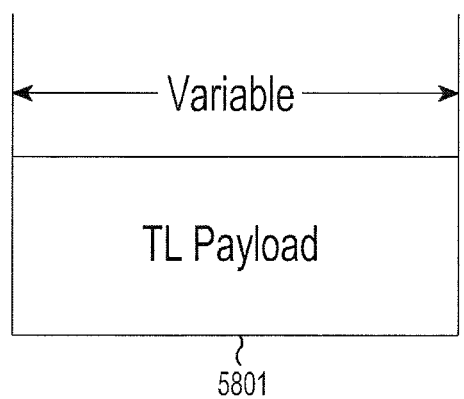
FIG. 58 illustrates a structure of a payload of a transport layer frame according to an embodiment of the present disclosure.

FIG. 58 illustrates a structure of a payload of a transport layer frame according to an embodiment of the present disclosure.

Referring to FIG. 58, the header of the transport layer frame includes a transport layer Payload field 5801. The TL Payload field 5801 is variable in length, octet aligned and the maximum value of the TL Payload field 5801 is bounded by MaxTSDUSize bytes, e.g., 4 bytes.

There are two types of frames used at a transport layer, namely Data Frames and Control Frames. Data Frames are used to carry TSDUs (i.e., SPDUs) which are accepted from a local session layer and are meant to be delivered by the peer transport layer to a peer session layer. Control Frames are used for information exchange between the local transport layer and peer transport layer for the purposes of Acknowledgment. The Frame Type field in the TL Header is used to distinguish between Data Frames and Control Frames, with Frame Type of 0b0 denoting Data Frames and Frame Type of 0b1 denoting Control Frames.

There are two types of data frame formats supported by transport layer as shown in FIG. 59 and FIG. 60 respectively.

FIG. 59 illustrates a structure of a first data frame format supported by a transport layer according to an embodiment of the present disclosure.

FIG. 60 illustrates a structure of a second data frame format supported by a transport layer according to an embodiment of the present disclosure.

Referring to FIGS. 59 and 60, in both of these frames 5901 and 6001, the Frame Type field is set to 0b0 to indicate that the frames are transport layer data frames and the Payload may include a TSDU or a TSDU fragment.

A control frame is described below with reference to FIG. 61.

Figure 61:
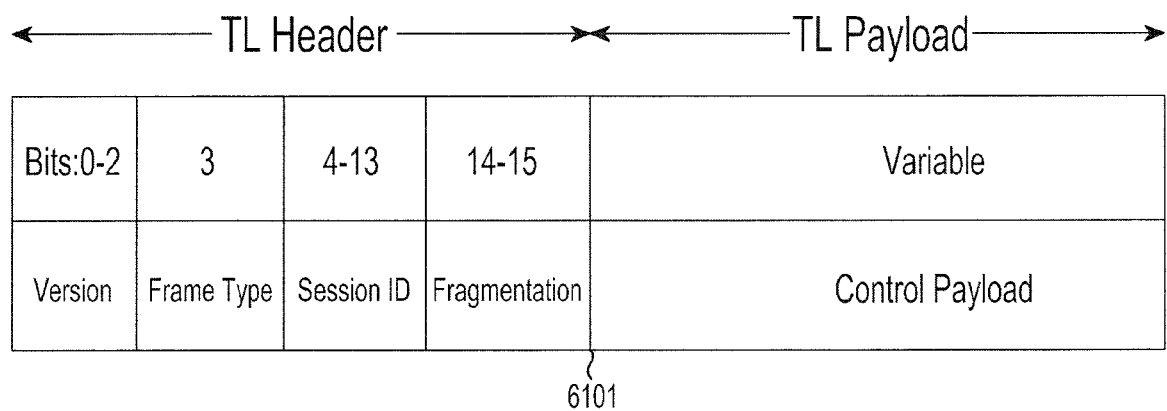
FIG. 61 illustrates a structure of a control frame format supported by a transport layer according to an embodiment of the present disclosure.

FIG. 61 illustrates a structure of a control frame format supported by a transport layer according to an embodiment of the present disclosure.

Referring to FIG. 61, a control frame 6101 is shown. In the control frame, the Frame Type is always set to 0b1 to indicate that the frame is transport layer Control Frame and the Fragmentation field is always set to 0b00 to indicate that the frame is an unfragmented frame.

The payload of the control field is described below with reference to FIG. 62.

Figure 62:
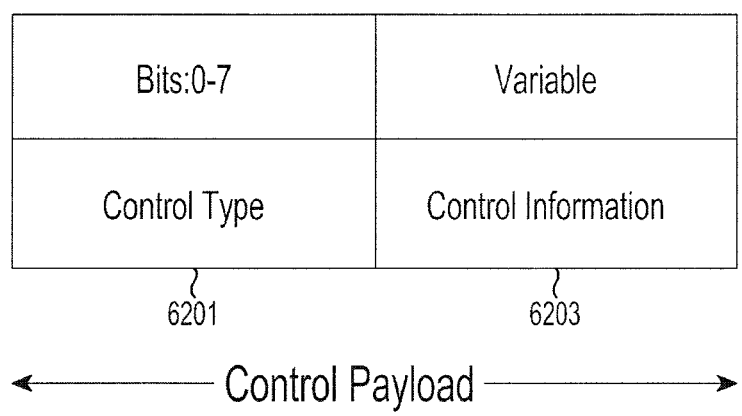
FIG. 62 illustrates a structure of a control payload supported by a transport layer according to an embodiment of the present disclosure.

FIG. 62 illustrates a structure of a control payload supported by a transport layer according to an embodiment of the present disclosure.

Referring to FIG. 62, the control payload field may include a Control Type field 6201 and a Control Information field 6203. The Control Type field 6201 is 8-bits in size and the size of the Control Information field 6203 depends on the value of Control Type field 6201.

The Control Type field 6201 identifies the type of acknowledgement message. The values of the Control Type field 6201 and the respective Control Information size and Control Information value are defined in Table 60.

TABLE 60

| Control Type | Acknowledgement Message Type | Control Information Size | Control Information Value |
|---|---|---|---|
| 0x00 | Immediate-ACK | 16-bit | Sequence number of a successfully received data frame for which acknowledgement is sent. |
| 0x01 | Block-ACK | 16-bit | Sequence number of the last successfully data frame in a block of data frame for which acknowledgment is sent. |
| 0x02 | Selective NAK | Variable | Represents the number of holes and sequence number of each hole. |

The Control Information field 6203 provides the Control Information Value. Its format is specified below for each Control Type in Table 61, Table 62, and Table 63.

TABLE 61

| Bits: 0-7 Control Type | 8-23 Control Information |
|---|---|
| 0x00 | Sequence Number (Immediate ACK) |

TABLE 62

| Bits: 0-7 Control Type | 8-23 Control Information |
|---|---|
| 0x01 | Sequence Number (Block ACK) |

TABLE 63

| Bits: 0-7 Control Type | Variable Control Information | | | | |
|---|---|---|---|---|---|
| 0x02 | Number of holes = N | Hole 1 Sequence Number | Hole 2 Sequence Number | — | Hole N Sequence Number |

H-3-3. Transport Layer Frame Format Procedures

There are four types of frame format procedures (FFPs) supported at the transport layer. The transport layer may use any one of the four FFPs for transmission of a data frame to the peer transport layer. The FFP for a data frame is decided using the Device ID and Session ID pair corresponding to which the TSDU may be transmitted. Using the QoS criteria corresponding to the Session ID (refer to the QoSObject-.Type parameter set using the TLME-ConfigureSessionParameters.request) and the connectivity QoS support corresponding to the Device ID, the FFP is chosen by the TL as set forth in Table 64.

TABLE 64

| | Application QoS Criteria (QoSObjectType) | | | |
|---|---|---|---|---|
| Connectivity QoS support (ConnectivityQoS) | Unrestricted SDU and In-order delivery ($Q_0$) | Unrestricted SDU and Unordered delivery ($Q_1$) | Restricted SDU and In-order delivery ($Q_2$) | Restricted SDU and Unordered delivery ($Q_3$) |
| Unrestricted SDU and In-order delivery ($C_0$) | FFP 1 | FFP 1 | FFP 1 | FFP 1 |
| Unrestricted SDU and Unordered delivery ($C_1$) | FFP 2 | FFP 1 | FFP 2 | FFP 1 |
| Restricted SDU and In-order delivery ($C_2$) | FFP 3 | FFP 3 | FFP 1 | FFP 1 |

TABLE 64-continued

| | Application QoS Criteria (QoSObjectType) | | | |
|---|---|---|---|---|
| Connectivity QoS support (ConnectivityQoS) | Unrestricted SDU and In-order delivery ($Q_0$) | Unrestricted SDU and Unordered delivery ($Q_1$) | Restricted SDU and In-order delivery ($Q_2$) | Restricted SDU and Unordered delivery ($Q_3$) |
| Restricted SDU and Unordered delivery ($C_3$) | FFP 4 | FFP 3 | FFP 2 | FFP 1 |

Under Frame Format Procedure 1 (FFP1), the transport layer Data Frame uses Frame Format 2 shown in FIG. 60 to transmit TSDUs. The transport layer does not perform any Acknowledgment Procedures or Fragmentation and Reassembly procedures. In particular, given a TSDU and Session ID, the transport layer constructs the TPDU as per Frame Format 2, by setting the Version to 0b001, Frame Type to 0b0, Session ID as given, Fragmentation Bits to 0b00 and Payload to the given TSDU. All the transport layer Data Frames are transmitted with the Fragmentation Bits set to 0b00. No transport layer Control Frames are transmitted as part of FFP1. Upon receiving a TPDU, the transport layer constructs the TSDU from the TPDU by parsing as per Frame Format 2. The transport layer extracts bits number 4 to 13 to form the Session ID, and Payload to form the TSDU (or SPDU).

Under Frame Format Procedure 2 (FFP2), the transport layer Data Frame uses Frame Format 1 shown in FIG. 59 to transmit TSDUs. The transport layer does not perform any Fragmentation and Reassembly procedures. In particular, given a TSDU and Session ID, the transport layer constructs the TPDU as per Frame Format 1, by setting the Version to 0b001, Frame Type to 0b0, Session ID as given, Fragmentation Bits to 0b00 and Payload to the given TSDU. All the TL Data Frames are transmitted with the Fragmentation Bits set to 0b00. Acknowledgment Procedures are followed under FFP2 and transport layer Control Frames including the appropriate Acknowledgment messages may be transmitted. The transport layer Data Frames may include Sequence Numbers. The choice of the Acknowledgment procedure between Immediate Acknowledgment and Smart Acknowledgment is determined based on the QoSObject.DataRate parameter set using the TLME-ConfigureSessionParameters.request for the given Session ID. If the QoSObject.DataRate is 0x00 or "Low", then an Immediate Acknowledgment mechanism is used, while if QoSObject.DataRate is 0x01 or "High", then the Smart Acknowledgment mechanism is used. Both mechanisms are specified further below. Upon receiving a TPDU, the transport layer first parses bit number 3 to determine the Frame Type. If the Frame Type is 0b1, then the frame is a transport layer Control Frame. If the Frame Type is 0b0, then the frame is a transport layer Data Frame. In the case of a Data Frame, the transport layer constructs the TSDU from the TPDU by parsing as per Frame Format 1. The transport layer extracts bits number 4 to 13 to form the Session ID, and Payload to form the TSDU (or SPDU).

Under Frame Format Procedure 3 (FFP3), the transport layer Data Frame uses Frame Format 1 shown in FIG. 59 to transmit TSDUs. The transport layer does not perform any Acknowledgment Procedures. In particular, given a TSDU and Session ID, the transport layer constructs the TPDU as per Frame Format 1 by following the Fragmentation Procedure described further below. No transport layer Control Frames are transmitted as part of FFP3. Upon receiving a TPDU, the transport layer constructs the TSDU from the TPDU by parsing as per Frame Format 1 by following the Fragmentation Procedure described further below. No transport layer Control Frames are transmitted as part of FFP1.

Under FFP4, the transport layer Data Frame uses Frame Format 1 to transmit TSDUs. In particular, given a TSDU and Session ID, the transport layer constructs the TPDU as per Frame Format 1 shown in FIG. 60 by following the Fragmentation Procedure described further below. Acknowledgment Procedures are followed under FFP4 and transport layer Control Frames including the appropriate Acknowledgment messages may be transmitted. The choice of the Acknowledgment procedure between Immediate Acknowledgment and Smart Acknowledgment is determined based on the QoSObject.DataRate parameter set using the TLME-ConfigureSessionParameters.request for the given Session ID. If the QoSObject.DataRate is 0x00 or "Low", then Immediate Acknowledgment mechanism is used, while if QoSObject.DataRate is 0x01 or "High", then the Smart Acknowledgment mechanism is used. Upon receiving a TPDU, the transport layer first parses bit number 3 to determine the Frame Type. If Frame Type is 0b1, then it is a transport layer Control Frame. If Frame Type is 0b0, then it is a transport layer Data Frame. In the case of a Data Frame, the transport layer constructs the TSDU from the TPDU by parsing as per Frame Format 1. The transport layer extracts bits number 4 to 13 to form the Session ID, and Payload to form the TSDU (or SPDU).

H-3-4. Transport Layer Frame Examples

Examples of the transport layer frames are described below.

Figure 63:
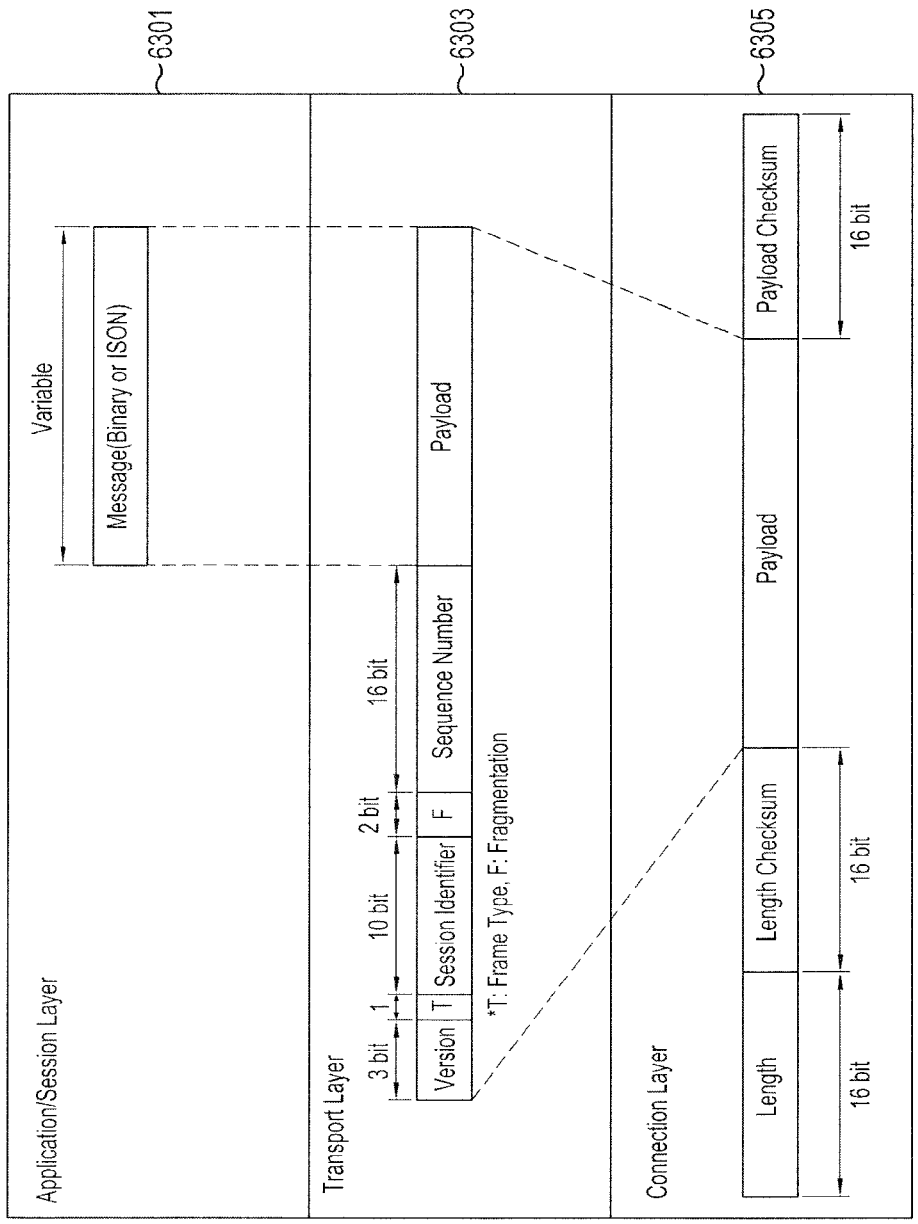
FIG. 63 illustrates a frame structure of a message in an application, session, transport, and connection layers according to an embodiment of the present disclosure.

FIG. 63 illustrates a frame structure of a message in the application, session, transport, and connection layers according to an embodiment of the present disclosure.

Referring to FIG. 63, a message of the application and session layers 6301 may be of a, for example, a binary or JSON type. The message of the application and session layers 6301 is variable in length. The message of the application and session layers 6301 corresponds to the payload of the transport layer frame of the transport layer 6303. The transport layer frame of the transport layer 6303 has been described above with respect to FIGS. 56 to 62. The transport layer frame of the transport layer 6303 corresponds to the payload of the connection layer 6305.

FIG. 64 illustrates an overview of a generic frame structure for a transport frame according to an embodiment of the present disclosure. Referring to FIG. 64, the full format of the generic frame structure for a transport frame is shown. Also shown in additional detail are the frame header format and the frame payload format of the generic frame structure for a transport frame.

FIG. 65 illustrates an overall frame structure for a transport frame according to an embodiment of the present disclosure. Referring to FIG. 65, the full format of the overall frame structure for a transport frame is shown. Also shown in additional detail are the frame header format and the frame payload format of the overall frame structure for a transport frame.

Figure 66:
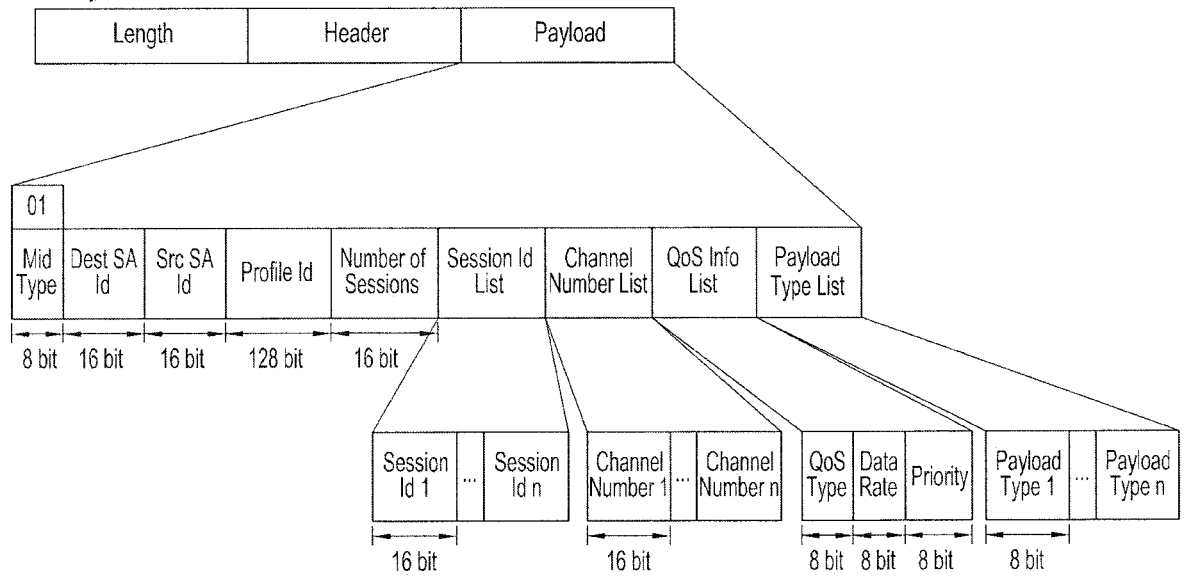
FIG. 66 illustrates a transport layer data frame structure for a create service connection request according to an embodiment of the present disclosure.

FIG. 66 illustrates a transport layer data frame structure for a create service connection request according to an embodiment of the present disclosure. Referring to FIG. 66, the full format of the transport layer data frame structure for a create service connection request is shown. Also shown in additional detail are the frame header format and the frame payload format of the transport layer data frame structure for a create service connection request.

FIG. 67 illustrates a transport layer data frame structure for a create service connection response according to an embodiment of the present disclosure. Referring to FIG. 67, the full format of the transport layer data frame structure for a create service connection response is shown. Also shown in additional detail are the frame header format and the frame payload format of the transport layer data frame structure for a create service connection response.

FIG. 68 illustrates a transport layer data frame structure for a terminate service connection request according to an embodiment of the present disclosure. Referring to FIG. 68, the full format of the transport layer data frame structure for a terminate service connection request is shown. Also shown in additional detail are the frame header format and the frame payload format of the transport layer data frame structure for a terminate service connection request.

FIG. 69 illustrates a transport layer data frame structure for a terminate service connection response according to an embodiment of the present disclosure. Referring to FIG. 69, the full format of the transport layer data frame structure for a terminate service connection response is shown. Also shown in additional detail are the frame header format and the frame payload format of the transport layer data frame structure for a terminate service connection response.

FIG. 70 illustrates a transport layer data frame structure for sending data according to an embodiment of the present disclosure. Referring to FIG. 70, the full format of the transport layer data frame structure for sending data is shown. Also shown in additional detail are the frame header format and the frame payload format of the transport layer data frame structure for sending data.

FIG. 71 illustrates parameters for message type, fragmentation, and sequence number fields of the transport layer data frame structures of FIGS. 66 to 70 according to an embodiment of the present disclosure.

FIG. 72 illustrates a transport layer control frame structure for immediate acknowledgment according to an embodiment of the present disclosure. Referring to FIG. 72, the full format of the transport layer control frame structure for immediate acknowledgment is shown. Also shown in additional detail are the frame header format and the frame payload format of the transport layer control frame structure for immediate acknowledgment.

FIG. 73 illustrates a transport layer control frame structure for block acknowledgment according to an embodiment of the present disclosure. Referring to FIG. 73, the full format of the transport layer control frame structure for block acknowledgment is shown. Also shown in additional detail are the frame header format and the frame payload format of the transport layer control frame structure for block acknowledgment.

FIG. 74 illustrates a transport layer control frame structure for selective negative acknowledgment according to an embodiment of the present disclosure. Referring to FIG. 74, the full format of the transport layer control frame structure for selective negative acknowledgment is shown. Also shown in additional detail are the frame header format and the frame payload format of the transport layer control frame structure for selective negative acknowledgment.

FIG. 75 illustrates parameters for message type, fragmentation, and sequence number fields of the transport layer control frame structures of FIGS. 72 to 74 according to an embodiment of the present disclosure.

H-3-5. Transport Layer Fragmentation and Reassembly Procedure

As and when set forth in the transport layer Data Frame Format and procedures described above, the originator transport layer performs the following steps to fragment a TSDU into one or more TPDUs.

The transport layer determines the maximum CSDU size corresponding to the Device ID to which the TSDU is to be delivered. The transport layer then fragments the TSDU into one or more fragments such that each fragment can be accommodated within the maximum CSDU size. If there is only one fragment, then the transport layer sets the Fragmentation Bits to 0b00, and constructs the TPDU. If there is more than one fragment, then the transport layer sets the Fragmentation Bits to 0b01 in the first fragment, 0b10 in each of the middle fragments, and 0b11 in the last fragment. The transport layer assigns distinct Sequence Numbers to each fragment, sequencing them in increasing order from the first to the last, with the Sequence Number being increased by 1 for each next fragment, wrapping around to start from 1 upon reaching the highest value. The transport layer constructs one TPDU per fragment.

Upon receiving a CLDE-Data.indication, as and when set forth in the transport layer Data Frame Format and procedures described herein, the recipient transport layer performs the following steps to construct a TSDU from one or more TPDUs.

The transport layer checks the Fragmentation Bits in the TPDU. If they are set to 0b00, then the TL determines that there is no fragmentation and extracts the payload to form the TSDU. If they are set to 0b01, then the transport layer determines that there is fragmentation. The transport layer extracts the payload from the TPDU and forms a partial TSDU and notes its Sequence Number. It now expects the Fragmentation Bits set to 0b10 or 0b11 in the TPDUs with subsequent Sequence Numbers included in a further CLDE-Data.indication message from the same Device ID. For each TPDU with Fragmentation Bits set to 0b10, the transport layer keeps appending the payload to the partial TSDU. When a TPDU with Fragmentation Bits set to 0b11 is received, the transport layer forms the complete TSDU by appending the payload to the partial TSDU. If any Sequence Number is missed, the transport layer follows the Acknowledgment procedures. If TPDUs with intermediate Sequence Numbers still continue to be missed, the transport layer drops the partial TSDU and ignores incoming TPDUs until a Fragmentation Bit field of 0b00 or 0b01 is seen. Then the transport layer resumes processing as described above.

H-3-6. Transmission Scenarios and Acknowledgement Mechanisms

As and when set forth in the transport layer Data Frame Format and procedures described above, peer transport layers perform a number of transport layer to transport layer message exchanges to transmit and acknowledge TPDUs, depending on the type of acknowledgement. For example, there are two transmission scenarios for NO ACK, namely upon receipt of a TLDE-Data.request message, and when a source session layer passes a TSDU with an invalid parameter. Further, there are three transmission scenarios for immediate ACK, namely successful data transmission, or when there is a lost data frame or a lost immediate acknowledgement frame. Still further, there are four transmission scenarios for Smart ACK, namely smart Acknowledgment without message loss, or when there is a lost data frame or a lost immediate acknowledgement frame or smart acknowledgment with one hole. The various transmission scenarios are described below with reference to FIG. 76 to FIG. 83.

Figure 76:
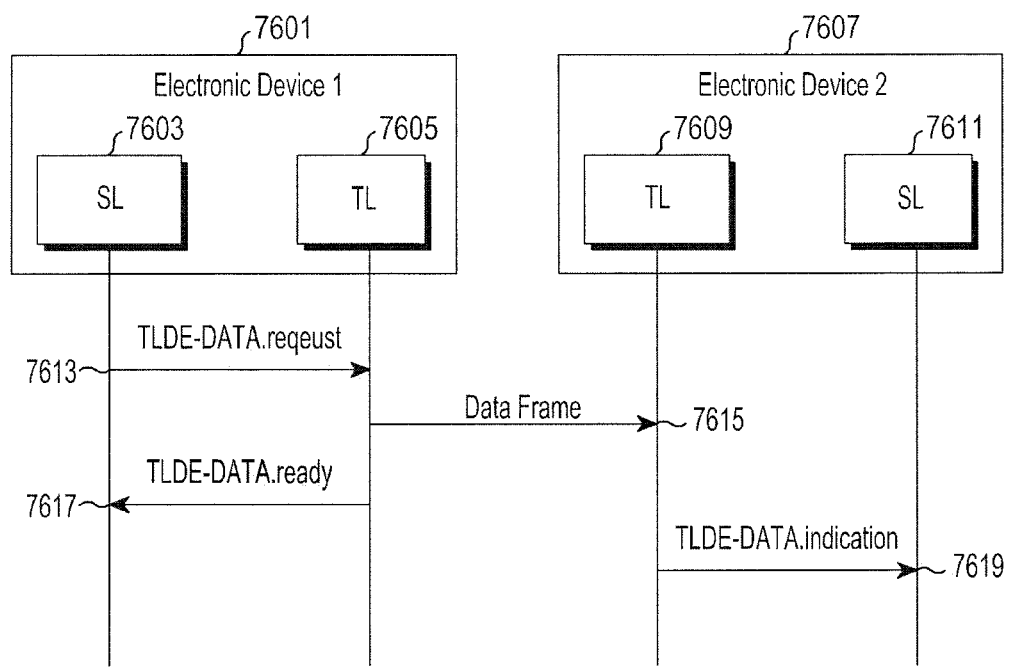
FIG. 76 illustrates a message sequence chart for a scenario of no-ACK with successful data transmission according to an embodiment of the present disclosure.

FIG. 76 illustrates a message sequence chart for a scenario of no-ACK with successful data transmission according to an embodiment of the present disclosure.

Referring to FIG. 76, a first electronic device 7601 includes a session layer 7603 and a transport layer 7605, and a second electronic device 7607 includes a session layer 7611 and a transport layer 7609. In operation 7613, the session layer 7603 sends a TLDE-Data.request message to the transport layer 7605. The TLDE-Data.request message is described above. In operation 7615, upon receipt of TLDE-Data.request message, the transport layer 7605 constructs a TPDU from a received TSDU and transmits the TPDU in a data frame to the transport layer 7609. In this scenario, the electronic device 6701 does not expect any response from the second electronic device 7607, for the transmitted data frame. Hence, the electronic device 6701 may not maintain any timer at the transport layer 7605. In operation 7617, the transport layer 7605 transmits a TLDE-Data.ready message to the session layer 7603. The TLDE-Data.ready message is issued by transport layer 7605 to the session layer 7603 to notify that it is ready to accept further SPDUs from the session layer 7603. The structure of the TLDE-Data.ready message is as follows:

| TLDE-Data.ready | { Transaction ID, Device ID, Session ID } |
|---|---|

The parameters of the TLDE-Data.ready message are described below with reference to Table 65.

TABLE 65

| Name | Size | Valid Range |
|---|---|---|
| Transaction ID | 8 bits | 0x00 to 0xFF |
| Device Identifier | 32 bits | 0x00000000 to 0xFFFFFFFF |
| Session ID | 16 bits | 0x0000 to 0x03FF |

The parameters of the TLDE-Data.ready message shown in Table 65 are described below.

Transaction ID of Table 65: The Transaction ID is populated by echoing the Transaction ID in the original TLDE-Data.request message.

Device ID of Table 65: The Device Identifier is populated by echoing the Device Identifier in the original TLDE-Data.request message.

Session ID of Table 65: The Session ID is populated by echoing the Session ID in the original TLDE-Data.request message.

In operation 7619, the transport layer 7609 transmits the TLDE-Data.indication message to the session layer 7611 to pass the data frame to its next higher layer. The TLDE-Data.indication message is described above.

Figure 77:
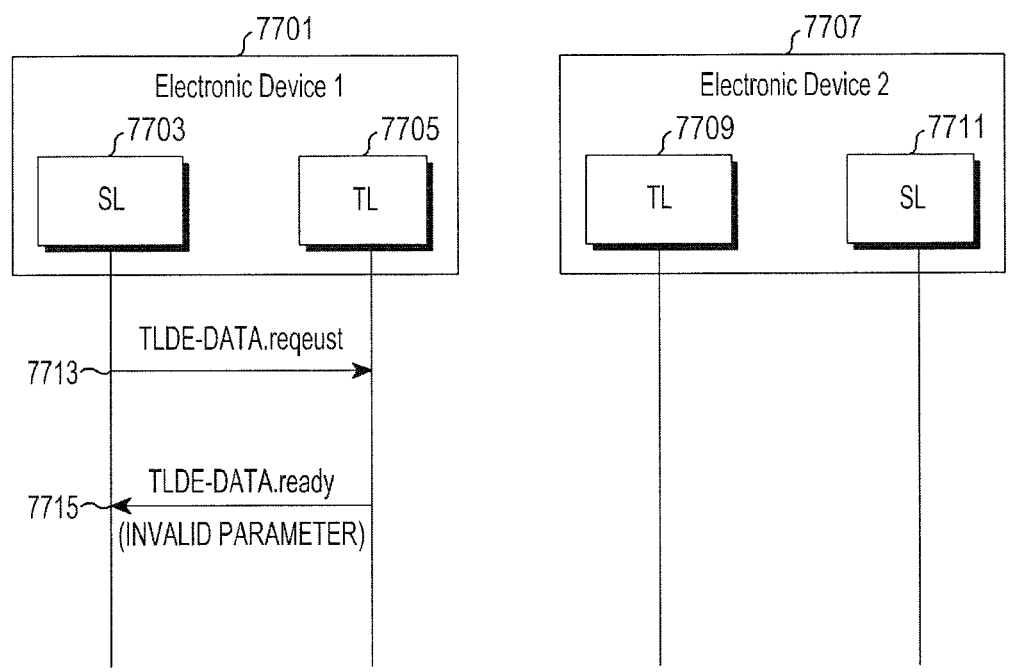
FIG. 77 illustrates a message sequence chart for a scenario where a session layer passes a TSDU with invalid parameters according to an embodiment of the present disclosure.

FIG. 77 illustrates a message sequence chart for a scenario where a session layer passes a TSDU with invalid parameters according to an embodiment of the present disclosure.

Referring to FIG. 77, a first electronic device 7701 includes a session layer 7703 and a transport layer 7705, and a second electronic device 7707 includes a session layer 7711 and a transport layer 7709. In operation 7713, the session layer 7703 sends a TLDE-Data.request message to the transport layer 7705. The TLDE-Data.request message is described above. In operation 7715, if the TLDE-Data.request includes a TSDU with invalid parameters (e.g. a payload larger than MaxTSDUSize), the transport layer 7705 transmits a TLDE-Data.ready message with Invalid Parameter and refrains from transmitting a data frame to transport layer 7709. The TLDE-Data.ready message is described above.

Figure 78:
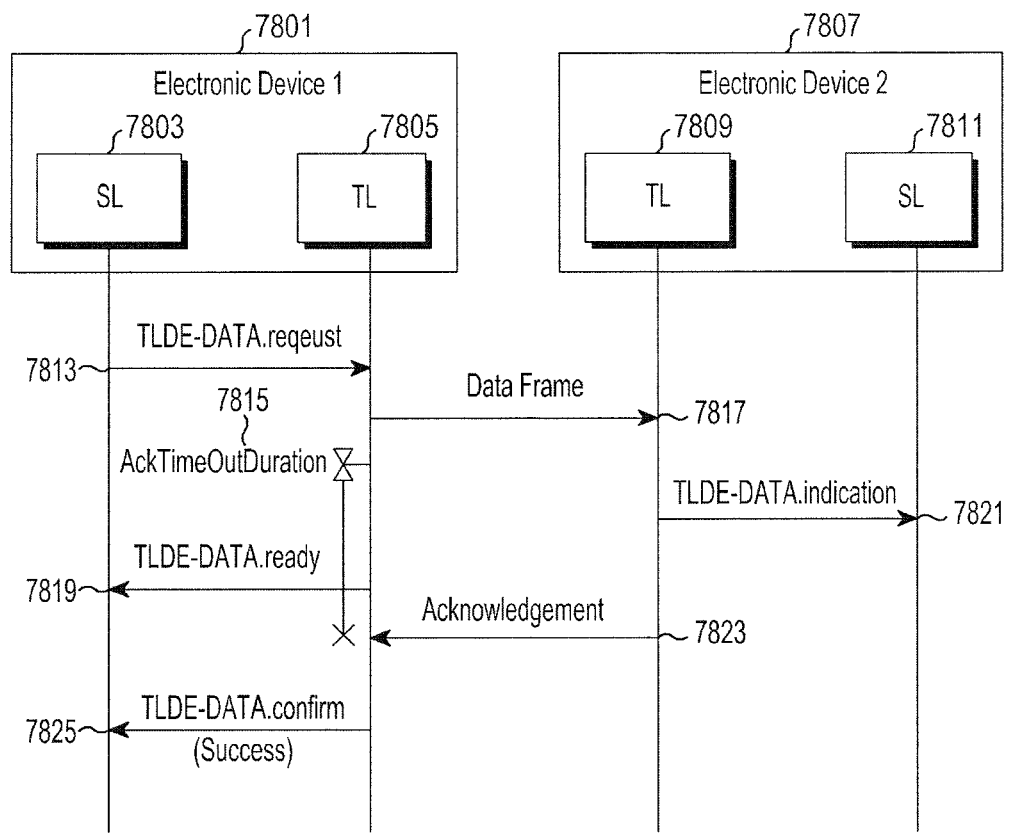
FIG. 78 illustrates a message sequence chart for a scenario for immediate ACK with successful data transmission according to an embodiment of the present disclosure.

FIG. 78 illustrates a message sequence chart for a scenario for immediate ACK with successful data transmission according to an embodiment of the present disclosure.

Referring to FIG. 78, a first electronic device 7801 includes a session layer 7803 and a transport layer 7805, and a second electronic device 7807 includes a session layer 7811 and a transport layer 7809. In operation 7813, the session layer 7803 sends a TLDE-Data.request message to the transport layer 7805. The TLDE-Data.request message is described above. In the Immediate ACK QoS scenario, the transport layer 7805 expects an acknowledgment frame from the transport layer 7809 for every TPDU transmission. Thus, in operation 7815, in waiting for an acknowledgment, the transport layer 7805 starts a timer that will expire after AckTimeoutDuration. In operation 7817, upon receipt of the TLDE-Data.request message, the transport layer 7805 constructs a TPDU from a received TSDU and transmits the TPDU in a data frame to the transport layer 7809. The TLDE-Data.request message is described above. In operation 7619, the transport layer 7605 transmits a TLDE-Data.ready message to the session layer 7603. The TLDE-Data.ready message is described above. In operation 7821, the transport layer 7809 transmits the TLDE-Data.indication message to the session layer 7811 to pass the data frame to its next higher layer. The TLDE-Data.indication message is described above. In operation 7823, the transport layer 7809 sends an acknowledgment back to the transport layer 7805. In operation 7825, the transport layer 7805 receives the acknowledgment from the destination before its timer expires and then disables and resets the timer, and transmits a TLDE-Data.confirm confirm message to the session layer 7803.

Figure 79:
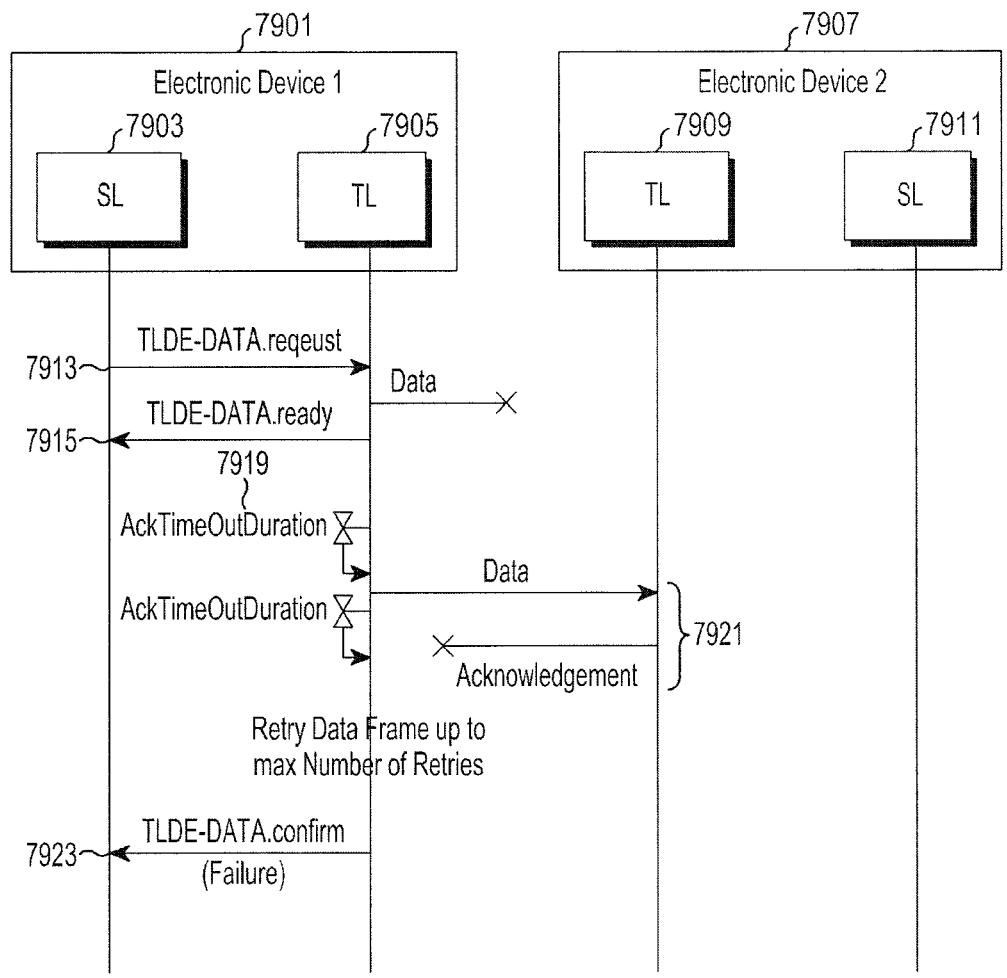
FIG. 79 illustrates a message sequence chart for a scenario where there is a lost data frame and a lost acknowledgment frame according to an embodiment of the present disclosure.

FIG. 79 illustrates a message sequence chart for a scenario where there is a lost data frame and a lost acknowledgment frame according to an embodiment of the present disclosure.

Referring to FIG. 79, a first electronic device 7901 includes a session layer 7903 and a transport layer 7905, and a second electronic device 7907 includes a session layer 7911 and a transport layer 7909. In operation 7913, the session layer 7903 sends a TLDE-Data.request message to the transport layer 7905. The TLDE-Data.request message is described above. In operation 7915, the transport layer 7905 transmits a TLDE-Data.ready message to the session layer 7903. The TLDE-Data.ready message is described above. In operation 7917, the transport layer 7905 constructs a TPDU from a received TSDU and attempts to transmit the TPDU in a data frame to the transport layer 7809. Here, the transport layer 7905 expects an acknowledgment frame from the transport layer 7909 for every TPDU transmission. Thus, in operation 7919, in waiting for an acknowledgment, the transport layer 7905 starts a timer that will expire after AckTimeoutDuration. Here, the timer of the transport layer 7905 expires before an acknowledgment is received. Therefore, the frame transfer has failed either because the data frame did not reach the transport layer 7909 or the acknowledgement from the transport layer 7909 did not reach the transport layer 7905. In operation 7921, the transport layer 7905 retransmits the data, and this entire sequence may be repeated up to a maximum of MaxNumberofRetries times. In operation 7923, if a frame transfer attempt fails a total of (1+MaxNumberofRetries) times, the data transaction information will be discarded, and the transport layer 7905 transmits a TLDE-Data.confirm message with failure status to the session layer 7903.

Data packets employ a smart acknowledgment mechanism. Message losses are detected by the transport layer in order to trigger retransmissions of lost messages. The rationale for using the smart acknowledgment mechanism over the immediate acknowledgment mechanism is the following. Typically, data packets are expected to be transmitted in a continuous stream with a relatively high data-rate. As a result, it may be expensive in terms of bandwidth to individually acknowledge each frame and use that to infer the loss of a frame. Accordingly, the smart acknowledgment mechanism is employed for data packets.

Figure 80:
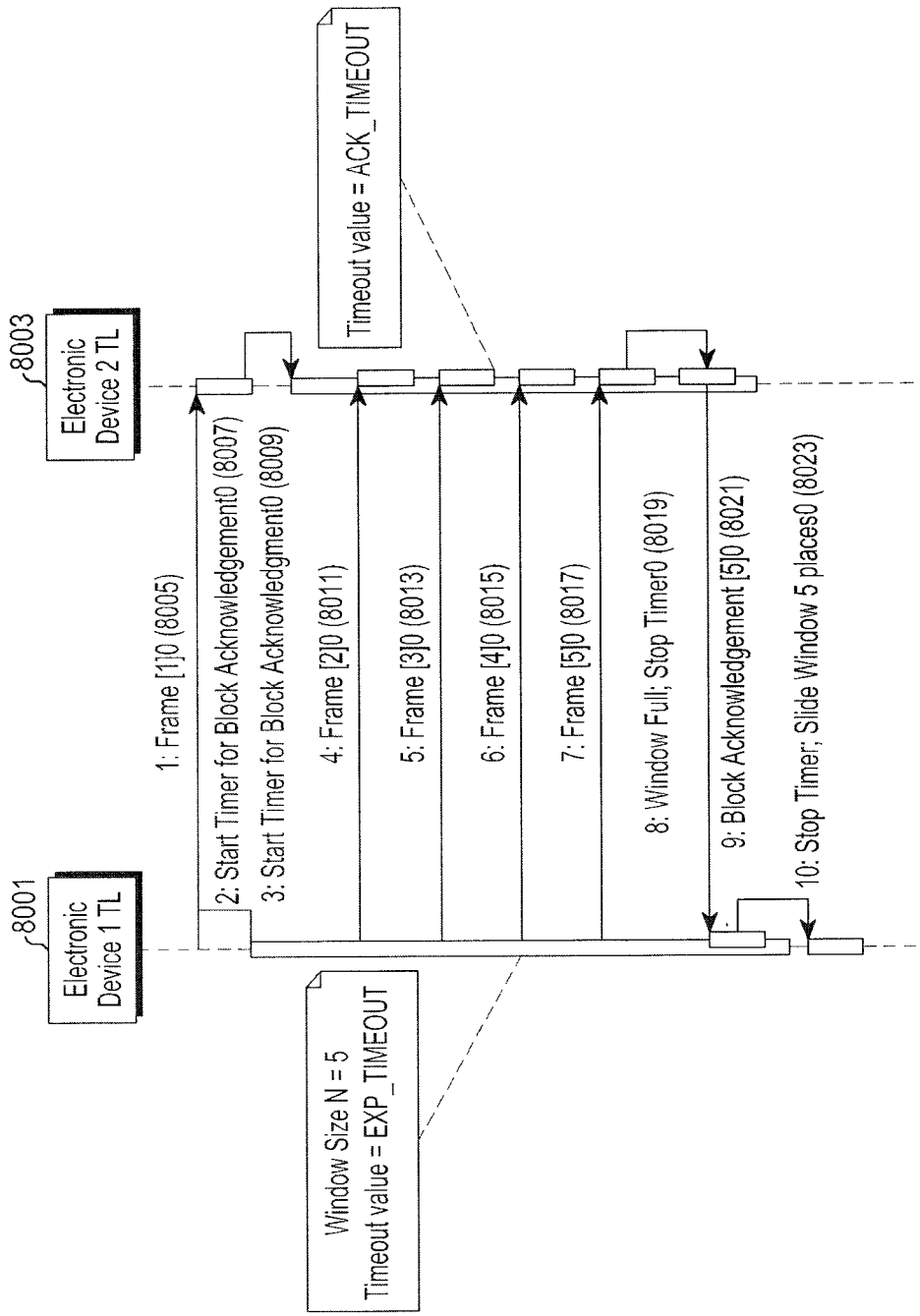
FIG. 80 illustrates a message sequence chart for message transmission with smart acknowledgment for a scenario where a window gets full according to an embodiment of the present disclosure.
Figure 81:
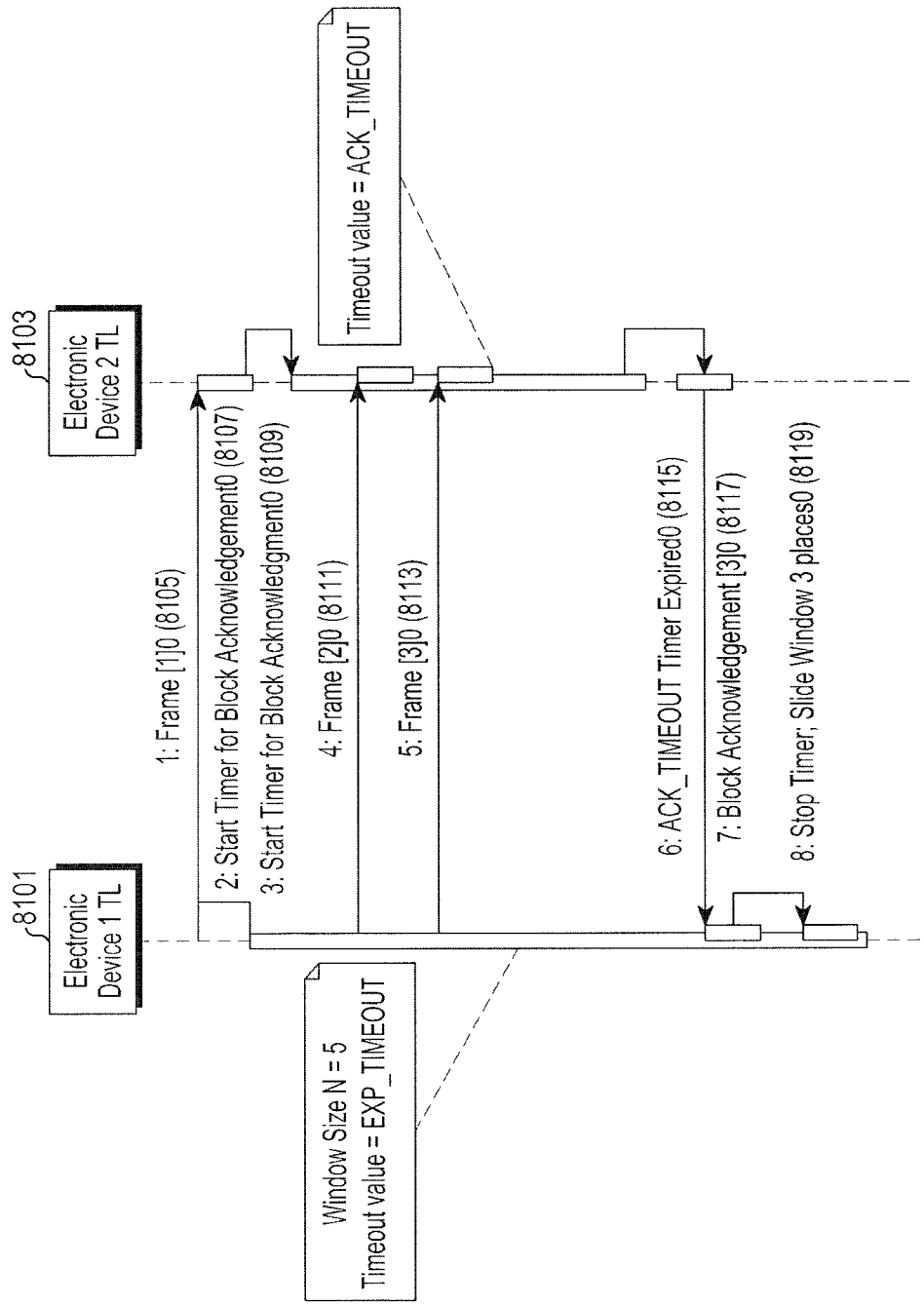
FIG. 81 illustrates a message sequence chart for message transmission with smart acknowledgment for a scenario where a window gets full according to an embodiment of the present disclosure.

FIG. 80 illustrates a message sequence chart for message transmission with smart acknowledgment for a scenario where a window gets full according to an embodiment of the present disclosure. FIG. 81 illustrates a message sequence chart for message transmission with smart acknowledgment for a scenario where a window gets full according to an embodiment of the present disclosure.

Referring to FIG. 80 and FIG. 81, a transport layer 8001 and 8101 of a first electronic device and a transport layer 8003 and 8103 of a second electronic device are shown. Under the smart acknowledgment mechanism, in order not to cause congestion, the transport layer 8001 and 8101 maintains a window of packets that are currently being attempted for transmission. The size of this window is set to a window size parameter, N. This window may include a block of N packets which have contiguous sequence numbers. The value N represents the maximum number of packets whose acknowledgment can be pending. Using the smart acknowledgment mechanism described below, the transport layer 8001 and 8101 infers the successful transmission of a contiguous block of packets in this window. Upon making that inference, the transport layer 8001 slides the window forward to begin at the packet with the lowest sequence number that has not yet been acknowledged. Under the smart acknowledgment mechanism, the transport layer 8003 and 8103 acknowledges a block of frames with a Block Acknowledgement Frame. The acknowledgment frame echoes the sequence number of the last frame in a block of the window size parameter, N, and carries the same number in the acknowledgment number field. The transport layer 8001 and 8101 retransmits the block of frames, until it receives the Block Acknowledgement Frame or runs out of attempts. The retransmission process is controlled by two factors, namely a retransmission timer and a retransmission counter. For a frame block, the initial timeout is set to a block acknowledgment timeout value, EXP_TIMEOUT, and the retransmission counter is set to zero. When the timeout is triggered, if the retransmission counter is less than the maximum limit on retransmission attempts, MAX_RETRANSMIT, the block of frames is retransmitted. For every retransmission attempt, the retransmission counter is incremented, and the timeout is doubled. If the retransmission counter reaches MAX_RETRANSMIT on a timeout, then the attempt to transmit the block of frames is canceled and the transmission is considered a failure. On the other hand, if the transport layer 8001 and 8101 receives a Block Acknowledgment Frame in time, transmission is considered successful.

As shown in FIG. 80, in operation 8005, a first frame is transmitted from transport layer 8001 to transport layer 8003. In operation 8007, the transport layer 8001 starts a timer for block acknowledgment. In operation 8009, the transport layer 8003 starts a timer for block acknowledgment. In operation 8011, a second frame is transmitted from transport layer 8001 to transport layer 8003. In operation 8013, a third frame is transmitted from transport layer 8001 to transport layer 8003. In operation 8015, a fourth frame is transmitted from transport layer 8001 to transport layer 8003. In operation 8017, a fifth frame is transmitted from transport layer 8001 to transport layer 8003. In operation 8019, the transport layer 8003 detects that the window is full and stops its timer for block acknowledgment. In operation 8021, the transport layer 8003 transmits the block acknowledgment with respect to the first through fifth frames to the transport layer 8001. In operation 8023, the transport layer 8001 detects receipt of the block acknowledgment, stops its timer block acknowledgment, and slides the window five places.

As shown in FIG. 81, in operation 8105, a first frame is transmitted from transport layer 8101 to transport layer 8103. In operation 8107, the transport layer 8101 starts a timer for block acknowledgment. In operation 8109, the transport layer 8103 starts a timer for block acknowledgment. In operation 8111, a second frame is transmitted from transport layer 8101 to transport layer 8103. In operation 8113, a third frame is transmitted from transport layer 8101 to transport layer 8103. In operation 8115, the transport layer 8103 detects that the timer expired. In operation 8117, the transport layer 8103 transmits the block acknowledgment with respect to the first through third frames to the transport layer 8101. In operation 8119, the transport layer 8101 detects receipt of the block acknowledgment, stops its timer block acknowledgment, and slides the window three places.

Figure 82:
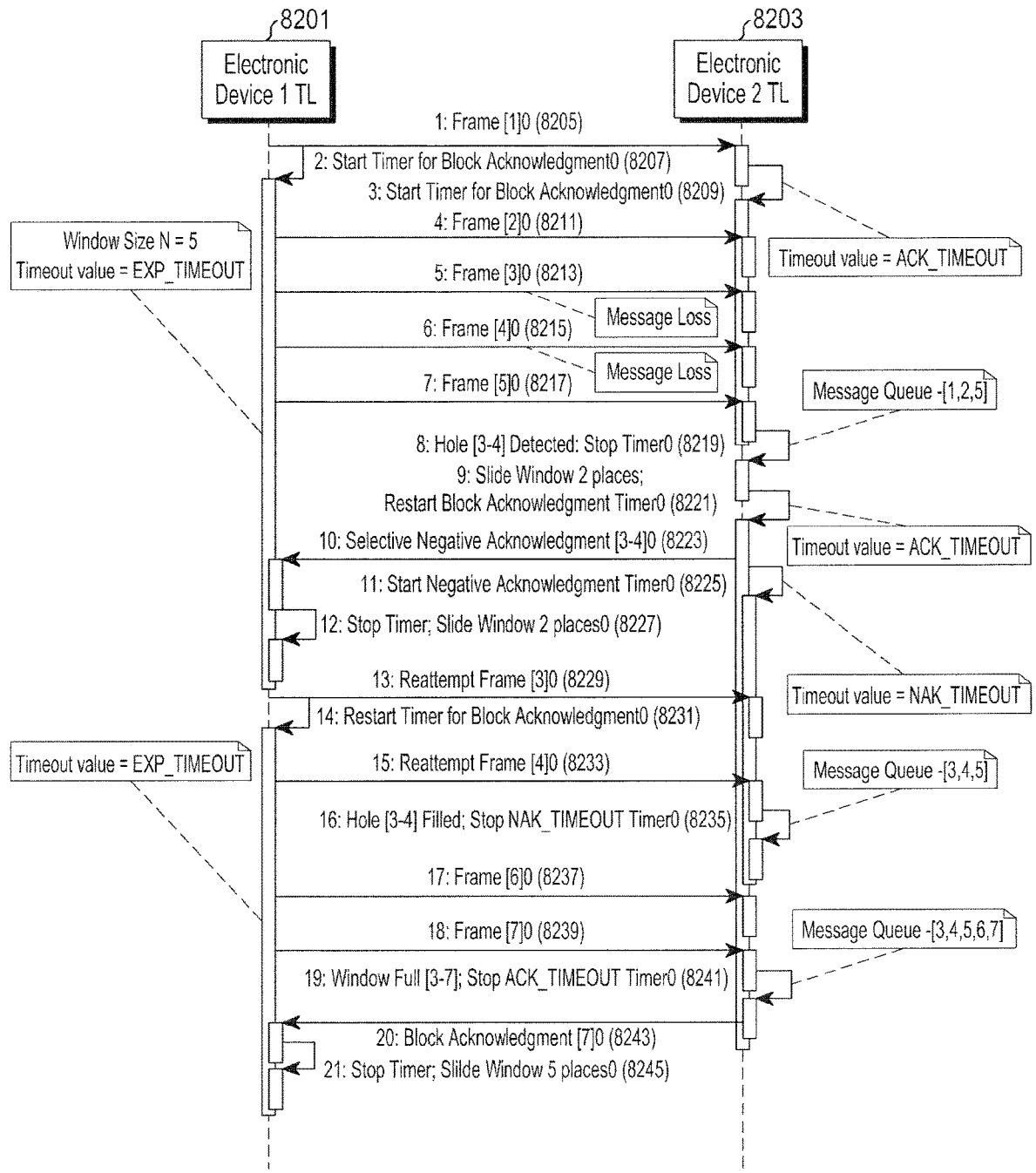
FIG. 82 illustrates a message sequence chart for message transmission with smart acknowledgment for a scenario where one hole has a successful selective negative acknowledgment according to an embodiment of the present disclosure.
Figure 83:
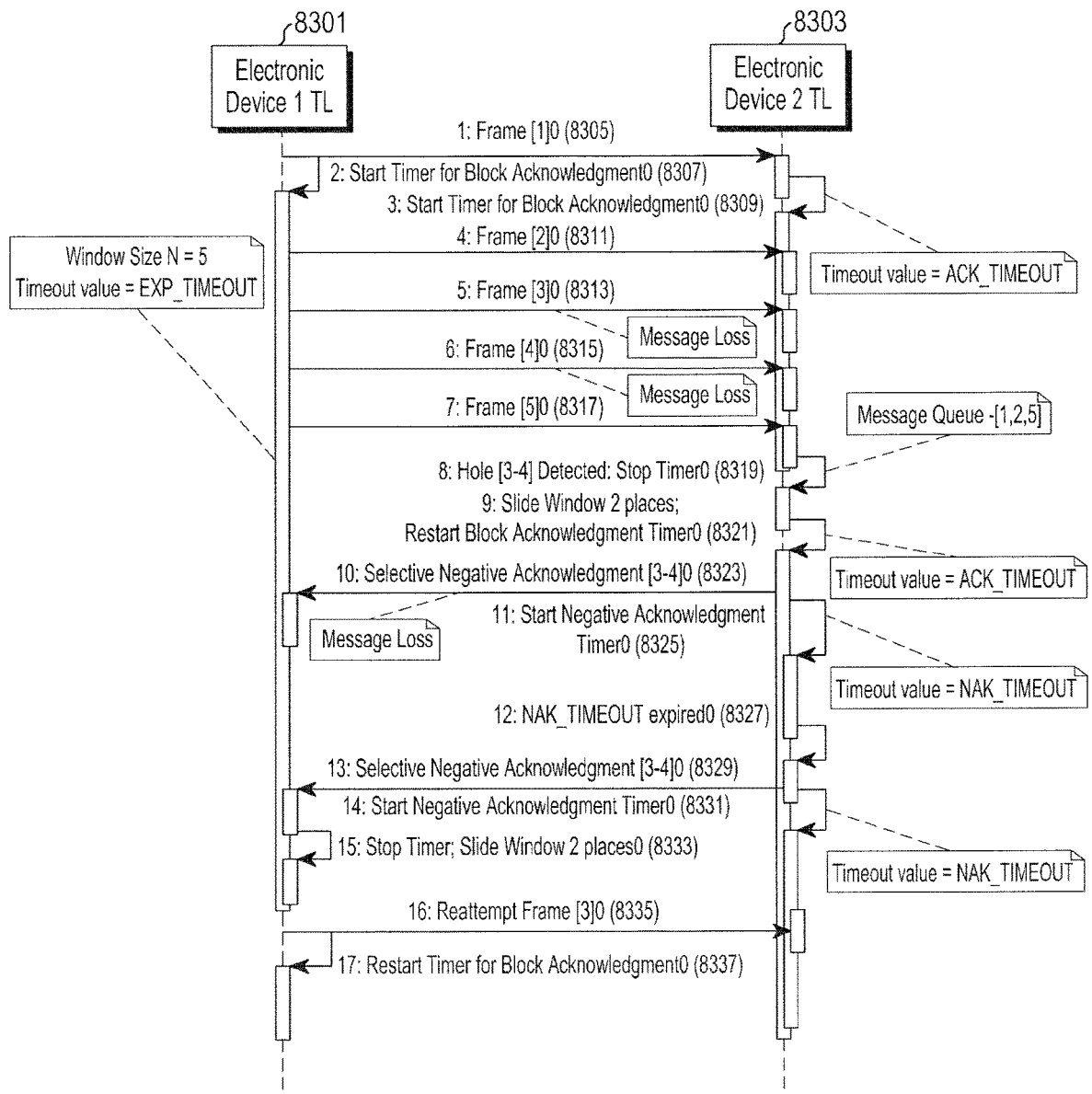
FIG. 83 illustrates a message sequence chart for message transmission with smart acknowledgment for a scenario where one hole has a lost selective negative acknowledgment according to an embodiment of the present disclosure.

FIG. 82 illustrates a message sequence chart for message transmission with smart acknowledgment for a scenario where one hole has a successful selective negative acknowledgment according to an embodiment of the present disclosure. FIG. 83 illustrates a message sequence chart for message transmission with smart acknowledgment for a scenario where one hole has a lost selective negative acknowledgment according to an embodiment of the present disclosure.

Referring to FIG. 82 and FIG. 83, a transport layer 8201 and 8301 of a first electronic device and a transport layer 8203 and 8303 of a second electronic device are shown. Under the smart acknowledgment mechanism, the transport layer 8203 and 8303 also runs a block acknowledgment timer with a value ACK_TIMEOUT to trigger the transmission of a Block Acknowledgment Frame, for the last packet in a contiguous block of successfully received packets. The Block Acknowledgement Frame Type 0x9 can be sent from the transport layer 8203 and 8303 either after completion of the window N (which means after N contiguous packets are received successfully) or the expiry of the block acknowledgment timer, ACK_TIMEOUT. Packet losses are detected at the transport layer 8203 and 8303 upon receipt of a non-contiguous block of packets. The sequence of packets which are missing in the non-contiguous block of packets at the transport layer 8203 and 8303 is referred to as a hole. As soon as a loss is detected, a Selective Negative Acknowledgment Frame is sent and a timer is started with a negative acknowledgment retransmit timeout value. The Selective Negative Acknowledgment Frame may include the entire list of all the holes at the transport layer 8203 and 8303. The negative acknowledgment retransmission timer, NAK_TIMEOUT is used to ensure that even if a Selective Negative Acknowledgment Frame is lost, it can be retransmitted and the transport layer 8201 and 8301 can be accurately informed about the status of packets received. Once the transport layer 8203 and 8303 receives all the lost frames, the negative acknowledgment retransmission timer, NAK_TIMEOUT is stopped. Under the smart acknowledgment mechanism, the transport layer 8201 and 8301 maintains a window representing the block of packets being transmitted. This window is moved in the following manner. If no selective negative acknowledgment is received, then a block acknowledgment is used for the window to slide forward. Otherwise, if a selective negative acknowledgment is received, then the window is slid forward up to the sequence number one less than the beginning of the first hole. This is because a selective negative acknowledgment frame may include the entire list of holes at the transport layer 8203 and 8303 starting from the first hole. So it also serves as a block acknowledgment up to the sequence number prior to the beginning of the first hole. This enables the window to slide forward as described above.

As shown in FIG. 82, in operation 8205, a first frame is transmitted from transport layer 8201 to transport layer 8203. In operation 8207, the transport layer 8201 starts a timer for block acknowledgment. In operation 8209, the transport layer 8203 starts a timer for block acknowledgment. In operation 8211, a second frame is transmitted from transport layer 8201 to transport layer 8203. In operation 8213, a third frame is transmitted from transport layer 8201 to transport layer 8203. In operation 8215, a fourth frame is transmitted from transport layer 8201 to transport layer 8203. In operation 8217, a fifth frame is transmitted from transport layer 8201 to transport layer 8203. In operation 8219, the transport layer 8203 detects a hole for the third and fourth frames and stops its timer for block acknowledgment. In operation 8221, the transport layer 8203 slides the window two places and restarts the timer for block acknowledgment. In operation 8223, the transport layer 8203 transmits the selective negative acknowledgment with respect to the third and fourth frames to the transport layer 8201. In operation 8225, the transport layer 8203 starts the timer for negative acknowledgment. In operation 8227, the transport layer 8201 stops its timer for block acknowledgment and slides the window two places. In operation 8229, a reattempt of the third frame is transmitted from transport layer 8201 to transport layer 8203. In operation 8231, the transport layer 8201 restarts the timer for block acknowledgment. In operation 8233, a reattempt of the fourth frame is transmitted from transport layer 8201 to transport layer 8203. In operation 8235, the transport layer 8203 detects that the hole with respect to the third and fourth frames is filled and stops the timer for negative acknowledgment. In operation 8237, a sixth frame is transmitted from transport layer 8201 to transport layer 8203. In operation 8239, a seventh frame is transmitted from transport layer 8201 to transport layer 8203. In operation 8241, the transport layer 8203 detects that the window with respect to the third through seventh frames is full. In operation 8243, a block acknowledgment for the third through seventh frames is transmitted from the transport layer 8203 to the transport layer 8201. In operation 8245, the transport layer 8201 stops the timer for block acknowledgment and slides the window five places.

As shown in FIG. 83, in operation 8305, a first frame is transmitted from transport layer 8301 to transport layer 8303. In operation 8307, the transport layer 8301 starts a timer for block acknowledgment. In operation 8309, the transport layer 8303 starts a timer for block acknowledgment. In operation 8311, a second frame is transmitted from transport layer 8301 to transport layer 8303. In operation 8313, a third frame is transmitted from transport layer 8301 to transport layer 8303. Here, the third frame is lost. In operation 8315, a fourth frame is transmitted from transport layer 8301 to transport layer 8303. Here, the fourth frame is lost. In operation 8317, a fifth frame is transmitted from transport layer 8301 to transport layer 8303. In operation 8319, the transport layer 8303 detects a hole for the third and fourth frames and stops its timer for block acknowledgment. In operation 8321, the transport layer 8303 slides the window two places and restarts the timer for block acknowledgment. In operation 8323, the transport layer 8303 transmits the selective negative acknowledgment with respect to the third and fourth frames to the transport layer 8301. Here, the selective negative acknowledgment is lost. In operation 8325, the transport layer 8303 starts the timer for negative acknowledgment. In operation 8327, the transport layer 8303 detects that the timer for negative acknowledgment expires. In operation 8329, the transport layer 8303 retransmits the selective negative acknowledgment with respect to the third and fourth frames to the transport layer 8301. In operation 8331, the transport layer 8303 starts the timer for negative acknowledgment. In operation 8333, the transport layer 8301 stops its timer for block acknowledgment and slides the window two places. In operation 8335, a reattempt of the third frame is transmitted from transport layer 8201 to transport layer 8203. In operation 8337, the transport layer 8301 restarts its timer for block acknowledgment.

H-4. Connection Layer Protocol

The connection layer provides a reliable datagram service to the local transport layer with a maximum CSDU size of MaxCSDUSize bytes. As can be seen in FIG. 63, the connection layer makes use of the Payload Length field in order to provide a reliable datagram service, depending on the underlying connectivity technology. Other than the Payload Length field, the connection layer does not have any mechanism to provide a specific QoS. However, the connection layer may provide four kinds of datagram services depending on the service provided by the underlying connectivity technology, namely unrestricted SDU and In-order Delivery, unrestricted SDU and Unordered Delivery, restricted SDU and In-order Delivery, and restricted SDU and Unordered Delivery. A mapping between the connectivity technologies to their Connectivity QoS is shown in Table 66.

TABLE 66

| Connectivity | QoS Provided |
| --- | --- |
| TCP | Unrestricted SDU and In-order delivery ($C_0$) |
| USB (device mode over AOAP) | Unrestricted SDU and In-order delivery ($C_0$) |
| Bluetooth Low Energy | Restricted SDU and Unordered delivery ($C_3$) |
| Bluetooth RFCOMM | Unrestricted SDU and In-order delivery ($C_0$) |

Connectivity specific states for a connected peer electronic device list depend on the connectivity technology employed. For example, the IP connectivity specific states for a connected peer electronic device list for TCP in the case where packets corresponding to multiple sessions are transmitted over a single socket is shown in Table 67.

TABLE 67

| Name | | Size | Valid Range |
| --- | --- | --- | --- |
| Device Connectivity-specific Address | IP Address | 32 bits | Any valid IP address |
| | TCP Port Number | 16 bits | COMM_PORT |
| | MAC Address | 48 bits | Any valid MAC address |
| Device Connectivity-specific Meta-data | TCP Role Preference | 8 bits | 0x00–0x01 |

The parameters shown in Table 67 are described below.

IP Address of Table 67: The IP Address is the IP address which the local device can address an Accessory Protocol capable peer electronic device. It is 32 bits long and may include any valid IP address.

TCP Port Number of Table 67: The TCP Port Number is the TCP port number on the peer electronic device which is meant to be used for Accessory Protocol communications. It is 16 bits long. It is set to COMM_PORT.

MAC Address of Table 67: The MAC address is the MAC address of the peer electronic device. This is used to identify peer electronic devices that may have been previously entered into the Peer Electronic Device List, since their IP addresses may change depending on the network configuration.

TCP Role Preference of Table 67: The TCP role preference is the TCP role preference of the peer electronic device. It is used to indicate whether the peer electronic device prefers to be a TCP client or a TCP server. It is 8 bits long. Its values are defined as per Table 68.

TABLE 68

| Value | Mapping |
| --- | --- |
| 0x00 | Server |
| 0x01 | Client |
| 0x02-0xFF | Reserved |

In another example, the USB connectivity specific details in the Accessory Description Details field in the peer electronic device list are as shown in Table 69.

TABLE 69

| Name | | Size | Valid Range |
| --- | --- | --- | --- |
| Device Connectivity-specific Address | MAC Address | 48 bits | Any valid MAC address |

The parameters shown in Table 69 are described below.

MAC Address of Table 69: The MAC Address is the MAC address of the peer electronic device. This is used to identify peer electronic devices that may have been previously entered into the peer electronic device list.

In yet another example, the Bluetooth BR/EDR connectivity specific details in the Accessory Description Details field in the peer electronic device list are as shown in Table 60.

TABLE 70

| Name | | Size | Valid Range |
| --- | --- | --- | --- |
| Device Connectivity-specific Address | UUID of RFCOMM Channel | 128 bits | UUID of COMM_RFCHAN |
| | MAC Address | 48 bits | Any valid MAC address |
| Device Connectivity-specific Meta-data | RFCOMM Role Preference | 8 bits | 0x00-0x01 |

The parameters shown in Table 70 are described below.

UUID of RFCOMM Channel of Table 70: The UUID of RFCOMM Channel is the UUID that identifies the RFCOMM channel number on the peer electronic device which is meant to be used for Accessory Protocol communications. It is 128 bits long. It is set to COMM_RFCHAN.

MAC Address of Table 70: The MAC Address is the MAC address of the peer electronic device. This is used to identify peer electronic devices that may have been previously entered into the Peer Electronic Device List.

RFCOMM Role Preference of Table 70: The RFCOMM Role Preference is the RFCOMM role preference of the peer electronic device. It is used to indicate whether the peer electronic device prefers to be an RFCOMM client or an RFCOMM server. It is 8 bits long. Its values are defined as set forth in Table 71.

TABLE 71

| Value | Mapping |
| --- | --- |
| 0x00 | Server |
| 0x01 | Client |
| 0x02-0xFF | Reserved |

In still another example, the BLE connectivity specific details in the Accessory Description Details field in the peer electronic device list are as shown in Table 72.

TABLE 72

| Name | | Size | Valid Range |
| --- | --- | --- | --- |
| Device Connectivity-specific Address | Bluetooth LE Profile UUID | 128 bits | UUID of Data Pipe Profile |
| | MAC Address | 48 bits | Any valid MAC address |
| Device Connectivity-specific Meta-data | Data Pipe Profile Role | 8 bits | 0x00-0x01 |

The parameters shown in Table 72 are described below.

Bluetooth LE Profile UUID of Table 72: The Bluetooth LE Profile UUID is the UUID that identifies the Bluetooth LE Profile on the peer electronic device which is meant to be used for Accessory Protocol communications. It is 128 bits long. It is set to Data Pipe Profile UUID.

MAC Address of Table 72: The MAC Address is the MAC address of the peer electronic device. This is used to identify peer electronic devices that may have been previously entered into the peer electronic device list.

Bluetooth LE Profile Role of Table 72: The Bluetooth LE Profile Role is the Bluetooth LE Profile Role of the peer electronic device. It is used to indicate whether the peer electronic device is a Bluetooth LE Client or a Bluetooth LE Server. It is 8 bits long. Its values are defined as set forth in Table 61.

The connection layer may also include a data integrity validation procedure. For example, as shown in FIG. 63, the connection layer packs the transport layer payload by calculating the length checksum and payload checksum before transmitting a message to the connection layer in a peer electronic device. Upon receipt of a message from the connection layer in the peer electronic device, the connection layer first checks the length checksum and then the payload checksum. If the two checks are valid, the connection layer unpacks the transport layer payload and passes it up to the transport layer.

H-5. Application Status Monitoring and Notification

Application status monitoring and notification is explained below with reference to FIG. 84 through FIG. 87.

Figure 84:
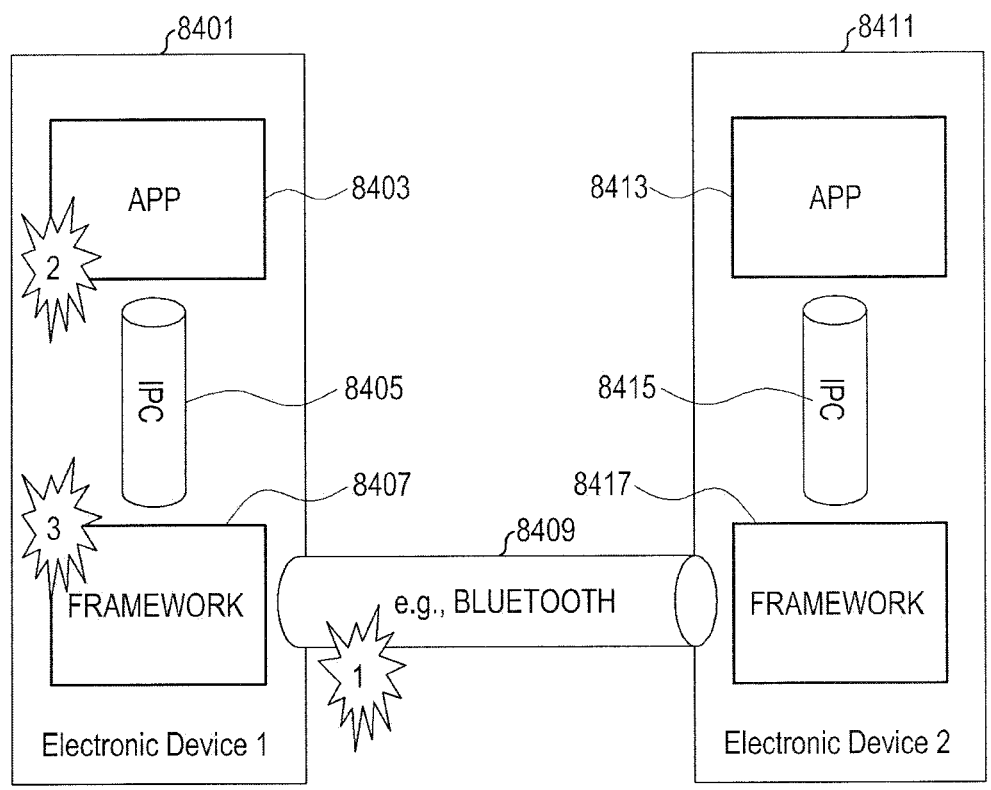
FIG. 84 illustrates an example of locations where a connection between electronic devices may be compromised according to an embodiment of the present disclosure.

FIG. 84 illustrates an example of locations where a connection between peer electronic devices may be compromised according to an embodiment of the present disclosure.

Referring to FIG. 84, a first electronic device 8401 and a second electronic device 8411 are shown that are communicating via a physical link employing a certain connectivity technology 8409, e.g., Bluetooth. The first electronic device 8401 includes an application program 8403, an IPC 8405, and a framework 8407. The second electronic device 8411 includes an application program 8413, an IPC 8415, and a framework 8417. A connection between application program 8403 and application program 8413 may be compromised in one of three scenarios.

The first scenario in which the connection may be compromised is when there is a loss of a physical link. Here, the application program on the other electronic device is notified of a fatal error, attempts to find the peer electronic device, and thereafter initiates a service connection again.

The second scenario in which the connection may be compromised is when an application program crashes.

The third scenario in which the connection may be compromised is when the framework crashes.

Examples of the three scenarios are provided below.

Figure 85:
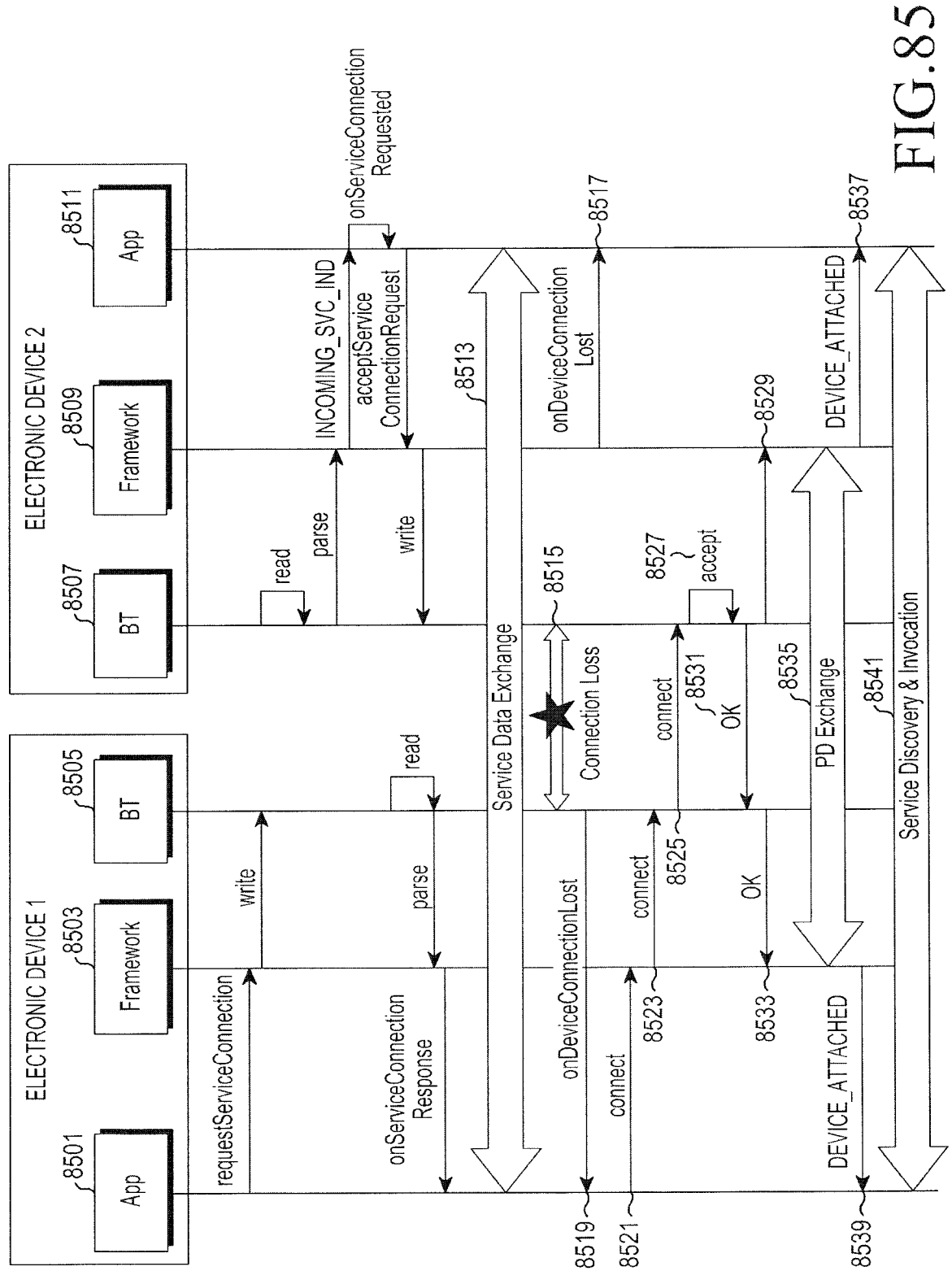
FIG. 85 illustrates an example of a connection between electronic devices being compromised due to a loss of a physical link according to an embodiment of the present disclosure.

FIG. 85 illustrates an example of a connection between peer electronic devices being compromised due to a loss of a physical link according to an embodiment of the present disclosure.

Referring to FIG. 85, it is noted that a description of the operations that occur prior to service data exchange is omitted for conciseness in explanation. In operation 8513, a service data exchange is established. In operation 8515, there is loss of a physical link between Bluetooth device 8505 and Bluetooth device 8507. Herein, the present disclosure is not limited to Bluetooth as a physical connection as any other type of physical connection may be employed.

In operation 8517, framework 8509 communicates an indication to the application program 8511 that the device connection has been lost. In operation 8519, the Bluetooth device 8505 communicates an indication through the framework 8503 to the application program 8501 that the device connection has been lost. In operations 8521 to 8525, the application program 8501 communicates a connection request through the framework 8503 and the Bluetooth device 8505 to Bluetooth device 8507. In operation 8527, Bluetooth device 8507 accepts the request to connect. In operation 8529, the Bluetooth device 8507 communicates an acceptance of the request for connection to the framework 8509. In operations 8531 and 8533, the Bluetooth device 8507 communicates an acceptance of the request for connection through the Bluetooth device 8505 to the framework 8503. In operation 8535, PD exchange is performed between framework 8503 and framework 8509. In operation, 8537, an indication that the device is attached is communicated from the framework 8509 to the application program 8511. In operation 8539, an indication that the device is attached is communicated from the framework 8503 to the application program 8501. In operation 8541, service discovery and invocation is performed between the application program 8501 and the application program 8511.

Figure 86:
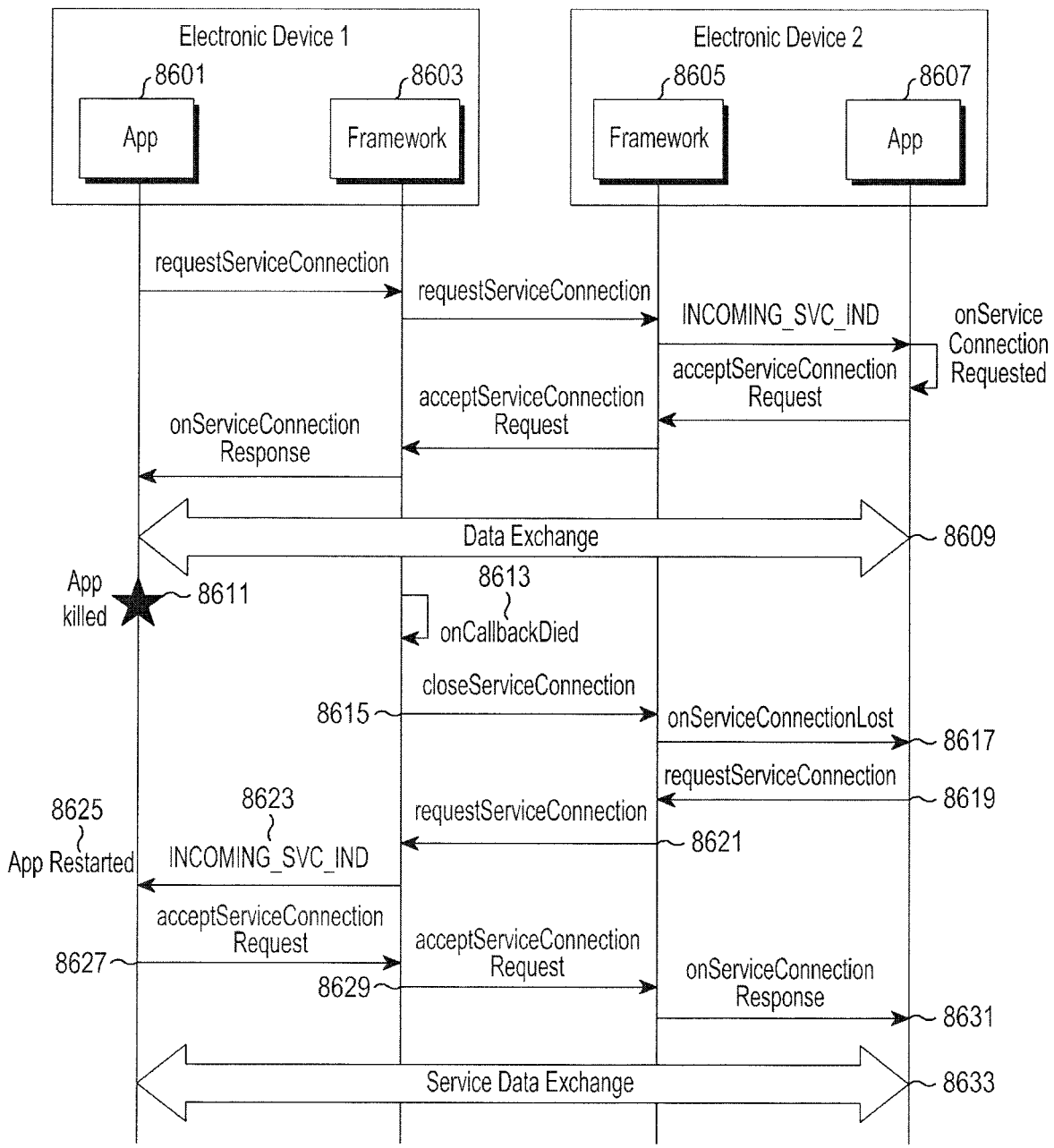
FIG. 86 illustrates an example of a connection between electronic devices being compromised due to an application program crashing according to an embodiment of the present disclosure.

FIG. 86 illustrates an example of a connection between peer electronic devices being compromised due to an application program crashing according to an embodiment of the present disclosure.

Referring to FIG. 86, it is noted that a description of the operations that occur prior to data exchange is omitted for conciseness in explanation. In operation 8609, data exchange is established. In operation 8611, application program 8601 crashes. In operation 8613, framework 8603 determines that callback died. In operation 8615, framework 8603 communicates a close service connection request to framework 8605. In operation 8617, framework 8605 communicates a service connection lost indication to application program 8607. In operation 8619, application program 8607 communicates a request service connection to framework 8605. In operation 8621, framework 8605 forwards the request service connection to framework 8603. In operation 8623, framework 8603 communicates an incoming SVC indication to application program 8601. In operation 8625, the application program 8601 is restarted. In operation 8627, the application program 8601 communicates an accept service connection request to framework 8603. In operation 8629, the framework 8603 communicates the accept service connection request to the framework 8605. In operation 8631, the framework 8605 communicates a service connection response to the application program 8607. In operation 8633, the service data exchange is established.

Figure 87:
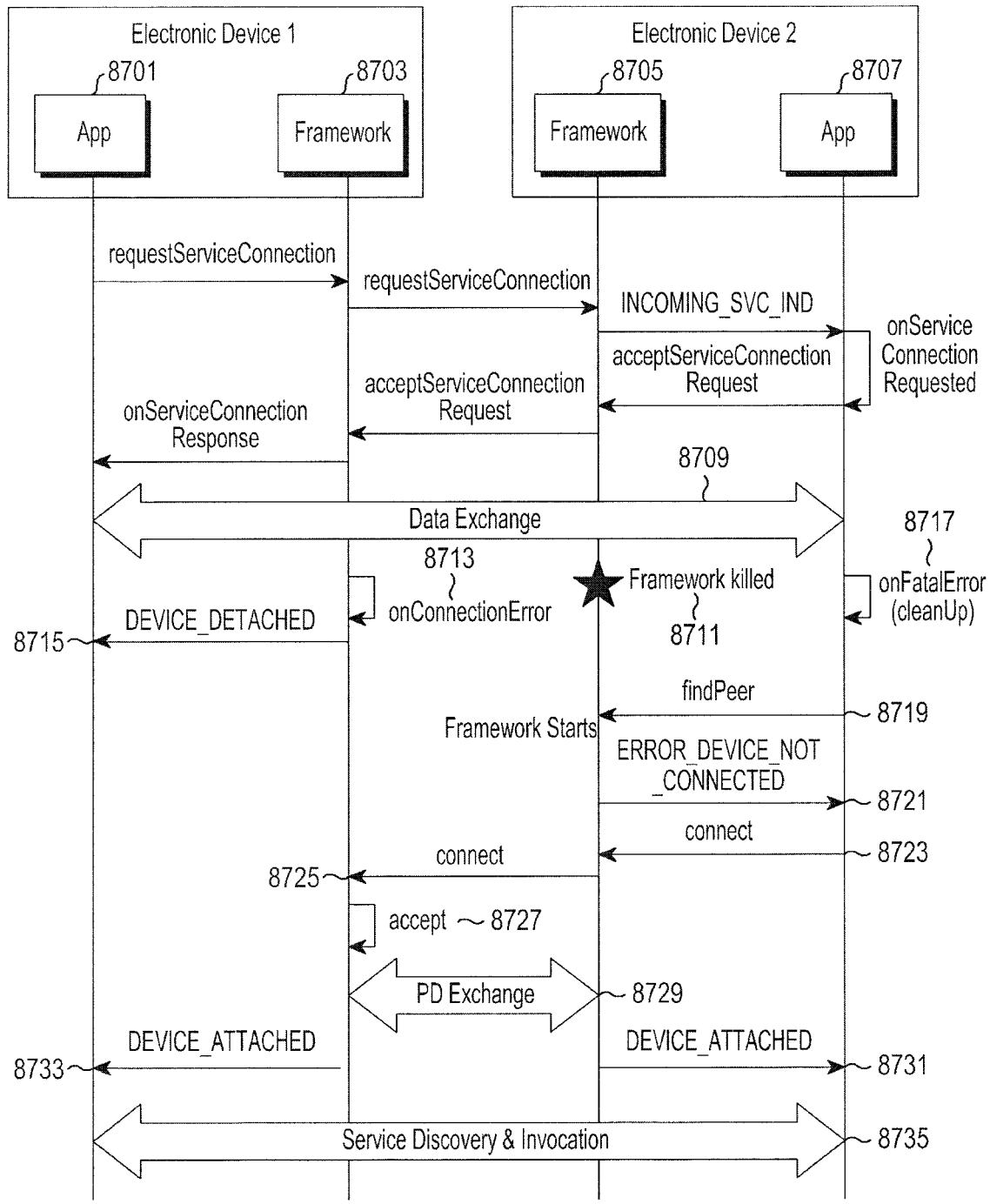
FIG. 87 illustrates an example of a connection between electronic devices being compromised due to a framework crashing according to an embodiment of the present disclosure.

FIG. 87 illustrates an example of a connection between peer electronic devices being compromised due to a framework crashing according to an embodiment of the present disclosure.

Referring to FIG. 87, it is noted that a description of the operations that occur prior to data exchange is omitted for conciseness in explanation. In operation 8709, data exchange is established. In operation 8711, framework 8705 is killed. In operation 8713, framework 8703 detects the connection error. In operation 8715, the framework 8703 indicates to application program 8701 that the device is detached. In operation 8717, application program 8707 detects a fatal error. In operation 8719, the application program 8707 communicates a find peer request to the framework 8705. In operation 8721, the framework 8705 communicates an indication to the application program 8707 that there is an error because the device is not connected. In operation 8723, the application program 8707 communicates a request to connect to the framework 8705. In operation 8725, the framework 8705 communicates a request to connect to the framework 8703. In operation 8727, the framework 8703 accepts the request. In operation 8729, framework 8703 and framework 8705 perform PD exchange. In operation 8731, the framework 8705 communicates an indication of device attachment to the application program 8707. In operation 8733, the framework 8703 communicates an indication of device attachment to the application program 8701. In operation 8735, the application program 8701 and the application program 8707 perform service discovery and invocation.

I. VARIOUS EMBODIMENTS

Figure 88:
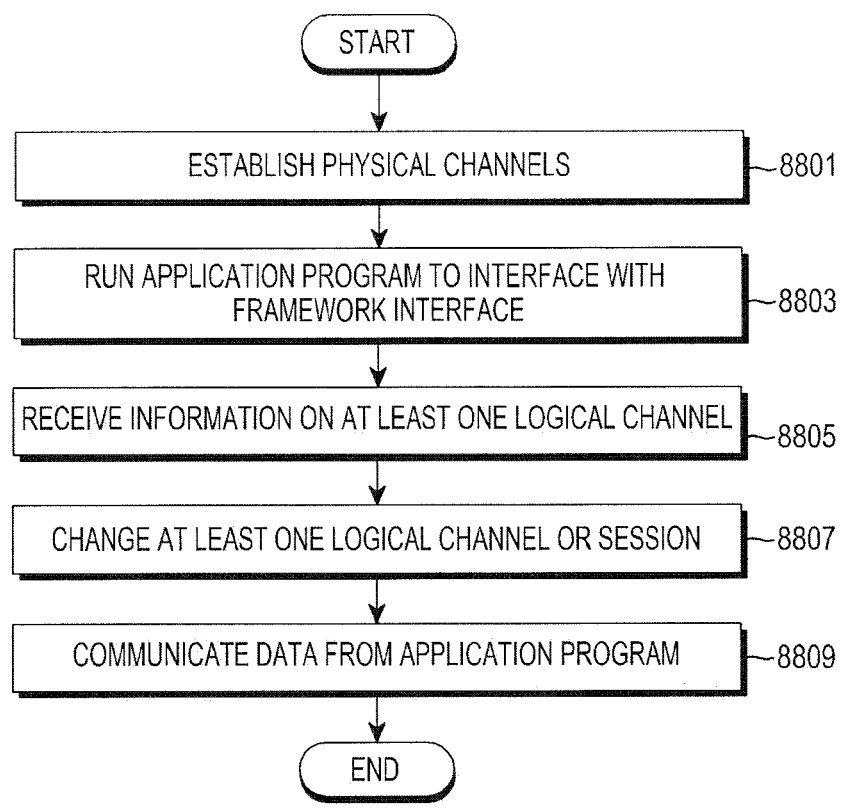
FIG. 88 illustrates a flowchart for operating an electronic device according to an embodiment of the present disclosure.

FIG. 88 illustrates a flowchart for operating an electronic device according to an embodiment of the present disclosure.

Referring to FIG. 88, at operation 8801, an electronic device establishes a physical channel with an electronic device. For example, an electronic device configured to provide a framework interface may establish one or more physical communication channels with a peer electronic device.

At operation 8803, the electronic device may run an application program. The application program may be configured to interface with the framework interface.

At operation 8805, the electronic device may receive information on (e.g., relating to) at least one logical channel. For example, the framework interface of the electronic device may receive information on at least one of one or more logical channels or one or more sessions. The framework interface may receive such information using one or more physical channels established between the electronic device and the peer electronic device.

At operation 8807, the electronic device may change at least one of a logical channel or a session. The framework interface of the electronic device may adapt at least one of a logical channel or a session based at least in part on the received information. For example, the electronic device may change at least one of at least one logical channel or at least one session based at least in part on the information on at least one of one or more logical channels or one or more sessions.

At operation 8809, the electronic device may communicate data from the application program. The electronic device may communicate data from or otherwise relating to the application program using the adapted at least one of at least one logical channel or at least one session. The electronic device may communicate the data from the application program over at least one of the one or more established communication channels.

Figure 89:
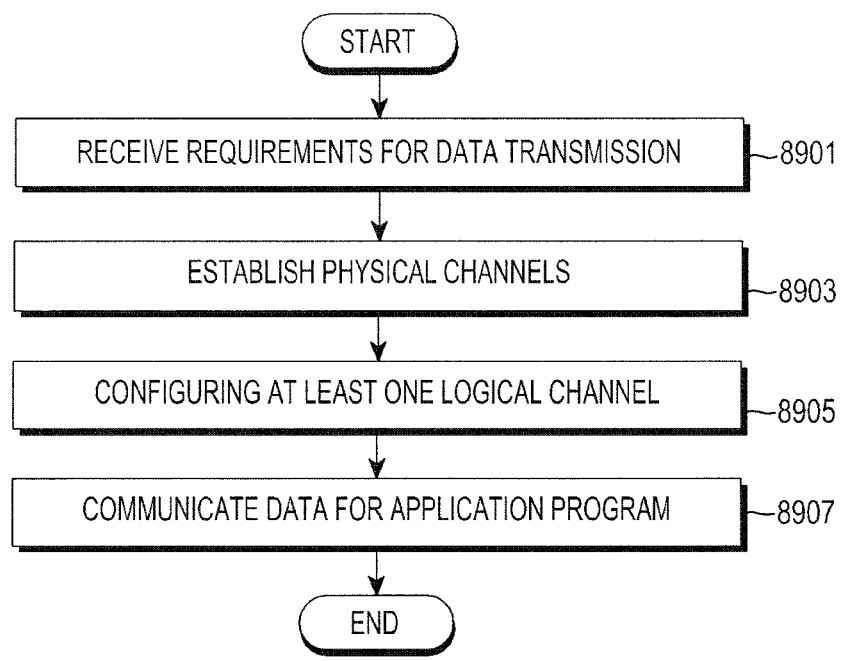
FIG. 89 illustrates a flowchart for communicating data between electronic devices according to an embodiment of the present disclosure.

FIG. 89 illustrates a flowchart for communicating data between electronic devices according to an embodiment of the present disclosure.

Referring to FIG. 89, at operation 8901, an electronic device receives criteria for data transmission. For example, the framework interface of the electronic device may receive an indication for data transmission relating to an application program of the electronic device.

At operation 8903, the electronic device may establish a physical channel between the electronic device and the peer electronic device. For example, the framework interface of the electronic device may establish one or more physical channels between the electronic device and the peer electronic device.

At operation 8905, the electronic device may configure at least one logical channel. For example, the framework interface of the electronic device may configure one or more logical channels over which data for an application program is to be communicated between the electronic device and the peer electronic device. The framework interface of the electronic device may configure the one or more logical channels according to an indication of the criteria for data transmission. The framework interface of the electronic device may configure the one or more logical channels according to the received indication of criteria for data transmission for an application of the electronic device.

At operation 8907, the electronic device may communicate data for an application program. The electronic device may communicate the data for the application program over the one or more logical channels across the one or more physical channels.

Figure 90:
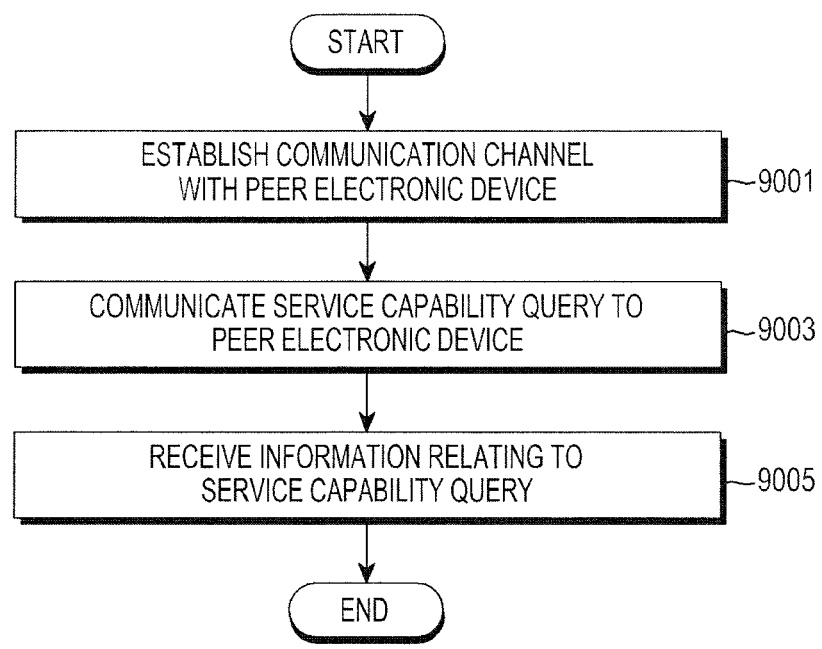
FIG. 90 illustrates a flowchart for operating an electronic device according to an embodiment of the present disclosure.

FIG. 90 illustrates a flowchart for operating an electronic device according to an embodiment of the present disclosure.

Referring to FIG. 90, at operation 9001, the electronic device may establish a communication channel with a peer electronic device. The electronic device may establish one or more communication channels with the peer electronic device.

At operation 9003, the electronic device may communicate a service capability query to the peer electronic device. For example, the electronic device may request the peer electronic device to communicate one or more profile identifiers. The electronic device may communicate the request the one or more profile identifiers using at least one of the one or more established communication channels. The profile identifiers may relate to service capabilities supported by an application program. For example, each of the one or more profile identifiers may be associated with one or more service capabilities supported by a respective application program.

At operation 9005, the electronic device may receive information relating to the service capability query. For example, the electronic device may receive a response to the service capability query. The electronic device may receive one or more profile identifiers associated with service capabilities of the peer electronic device.

Figure 91A:
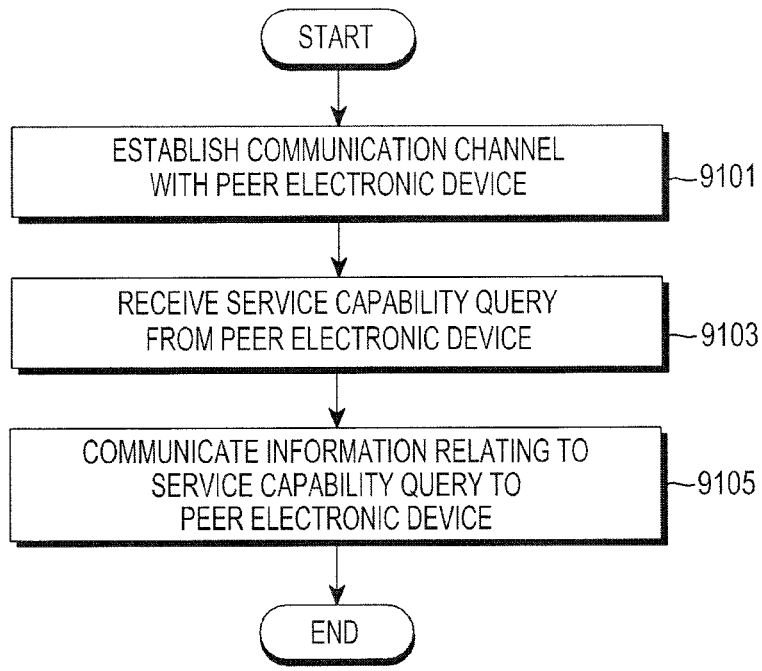
FIG. 91A illustrates a flowchart for operating an electronic device according to an embodiment of the present disclosure.

FIG. 91A illustrates a flowchart for operating an electronic device according to an embodiment of the present disclosure.

Referring to FIG. 91A, at operation 9101, an electronic device establishes a communication channel with a peer electronic device. The electronic device may establish one or more communication channels with the peer electronic device.

At operation 9103, the electronic device may receive a capability query from the peer electronic device. For example, the electronic device may receive a request to communicate one or more profile identifiers. The electronic device may receive the request to communicate the one or more profile identifiers over one or more communication channels. The profile identifiers may relate to service capabilities supported by an application program. For example, each of the one or more profile identifiers may be associated with one or more service capabilities supported by a respective application program.

At operation 9105, the electronic device may communicate information relating to the service capability query to the peer electronic device. For example, the electronic device may communicate a response to the service capability query. The electronic device may communicate one or more profile identifiers associated with service capabilities of the peer electronic device. The electronic device may communicate the information relating to the service capability query over at least one of the one or more established communication channels.

Figure 91B:
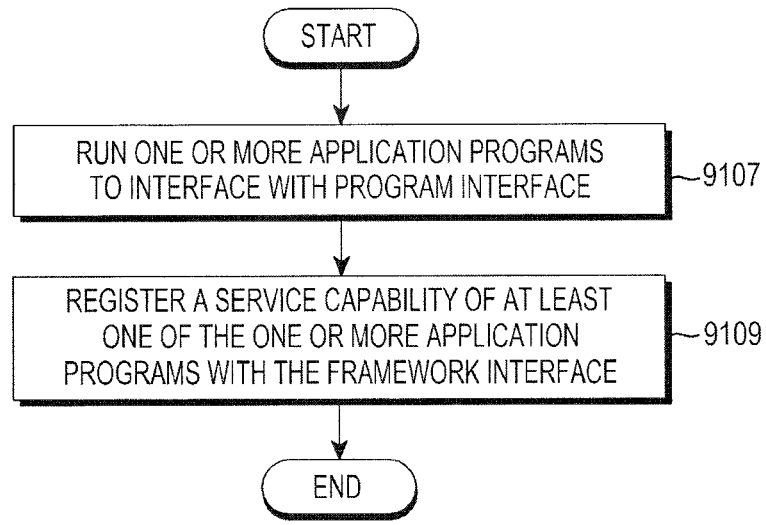
FIG. 91B illustrates a flowchart for operating an electronic device according to an embodiment of the present disclosure.

FIG. 91B illustrates a flowchart for operating an electronic device according to an embodiment of the present disclosure.

Referring to FIG. 91B, at operation 9107, the electronic device may run one or more application programs. The electronic device may be configured to provide a framework interface. For example, the electronic device may be configured to provide a framework interface by executing instructions stored in a memory.

At operation 9109, the electronic device may register a service capability of at least one of the one or more application programs. For example, at least one of the one or more application programs may registered a service capability thereof with the framework interface.

Figure 92:
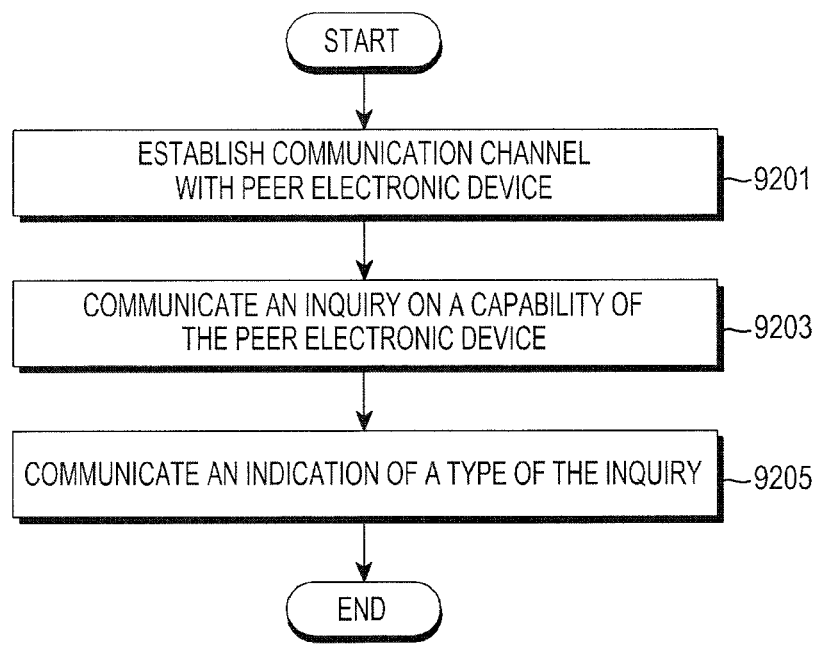
FIG. 92 illustrates a flowchart for operating an electronic device according to an embodiment of the present disclosure.

FIG. 92 illustrates a flowchart for operating an electronic device according to an embodiment of the present disclosure.

Referring to FIG. 92, at operation 9201, an electronic device may establish a communication channel with a peer electronic device. The electronic device may establish one or more communication channels with the peer electronic device.

At operation 9203, the electronic device may communicate an inquiry on a capability of the peer electronic device. For example, the electronic device may communicate an inquiry regarding a capability of the peer electronic device to the peer electronic device. The electronic device may communicate the inquiry regarding the capability of the peer electronic device over at least one of the one or more established communication channels.

At operation 9205, the electronic device may communicate an indication of a type of the inquiry to the peer electronic device. The electronic device may communicate the indication of the type of the inquiry over at least one of the one or more established communication channels.

Figure 93:
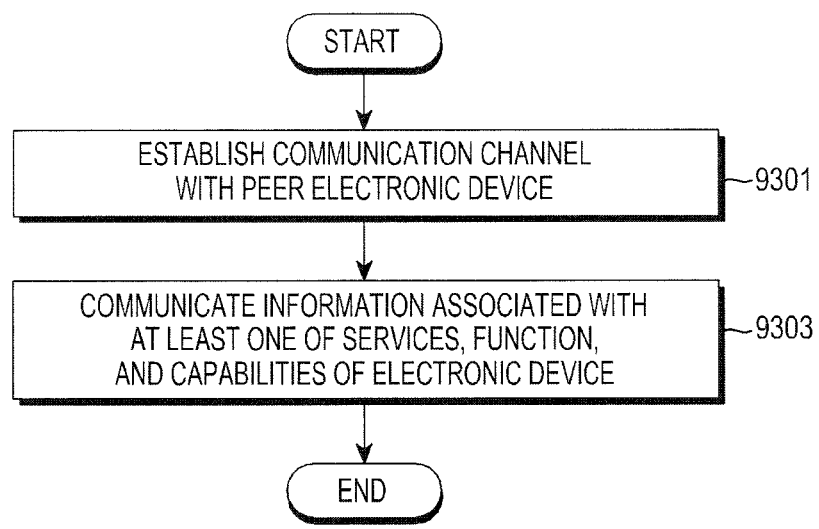
FIG. 93 illustrates a flowchart for exchanging capabilities between electronics device according to an embodiment of present disclosure.

FIG. 93 illustrates a flowchart for exchanging capabilities between electronic devices according to an embodiment of present disclosure.

Referring to FIG. 93, at operation 9301, an electronic device establishes a communication channel with a peer electronic device. The electronic device may establish one or more communication channels with the peer electronic device.

At operation 93003, the electronic device may communicate information associated with at least one of a service, a function, or a capability of the electronic device. For example, the electronic device may communicate service capability information to the peer electronic device. The service capability information may identify a service available from the electronic device, a function available on the electronic device, a capability of the electronic device, and/or the like.

Figure 94:
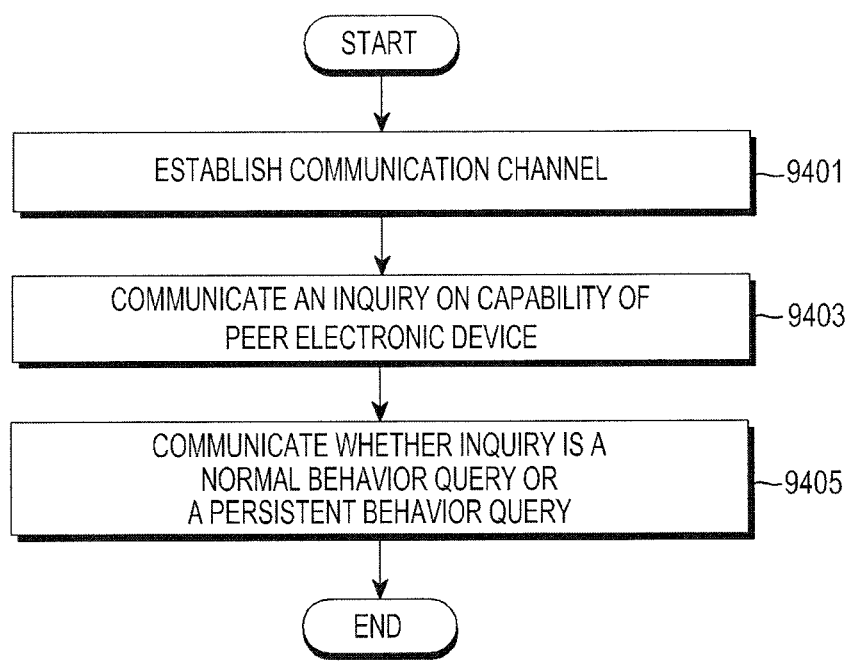
FIG. 94 illustrates a flowchart for exchanging capabilities between electronic devices according to an embodiment of the present disclosure.

FIG. 94 illustrates a flowchart for exchanging capabilities between electronic devices according to an embodiment of the present disclosure.

Referring to FIG. 94, at operation 9401, the electronic device may establish a communication channel with a peer electronic device. The electronic device may establish one or more communication channels with the peer electronic device.

At operation 9403, the electronic device may communicate an inquiry on a capability of the peer electronic device. For example, the electronic device may communicate a service capability query to the electronic device. The electronic device may communicate the inquiry on the capability of the peer electronic device over at least one of the one or more established communication channels.

At operation 9405, the electronic device may communicate whether the inquiry is a normal behavior query or a persistent behavior query to the peer electronic device. For example, the electronic device may communicate whether the inquiry is a query according to which the peer electronic device should (or is expected to) report on a current capability of the peer electronic device, or a query according to which the peer electronic device should (or is expected to) report on a current capability of the peer electronic device and to report on a change to the current capability of the peer electronic device.

Figure 95:
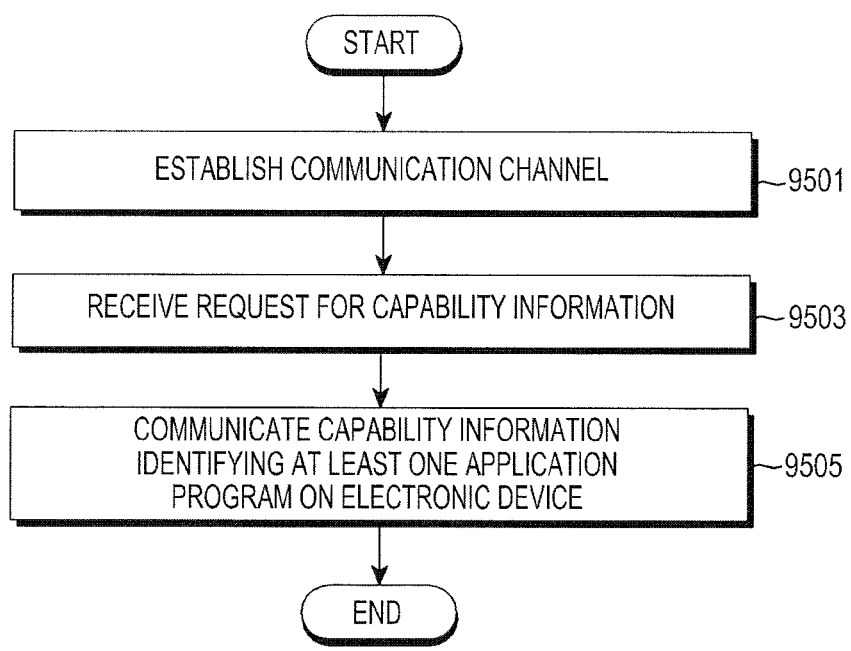
FIG. 95 illustrates a flowchart for exchanging capabilities between electronic devices according to an embodiment of the present disclosure.

FIG. 95 illustrates a flowchart for exchanging capabilities between electronic devices according to an embodiment of the present disclosure.

Referring to FIG. 95, at operation 9501, the electronic device may establish a communication channel with a peer electronic device. The electronic device may establish one or more communication channels with the peer electronic device.

At operation 9503, the electronic device may receive a request for capability information. The electronic device may receive the request for capability information from the peer electronic device over the one or more established communication channels. For example, the electronic device may receive a service capability query from the peer electronic device.

At operation 9505, the electronic device may communicate capability information identifying at least one application program on an electronic device. For example, the electronic device may communicate capability information that is configured to identify one or more application programs residing on (e.g., installed on) the electronic device. The electronic device may communicate the capability information upon receiving a request (e.g., a service capability query) from the peer electronic device. The electronic device may communicate the capability information over at least one of the one or more established communication channels.

Figure 96A:
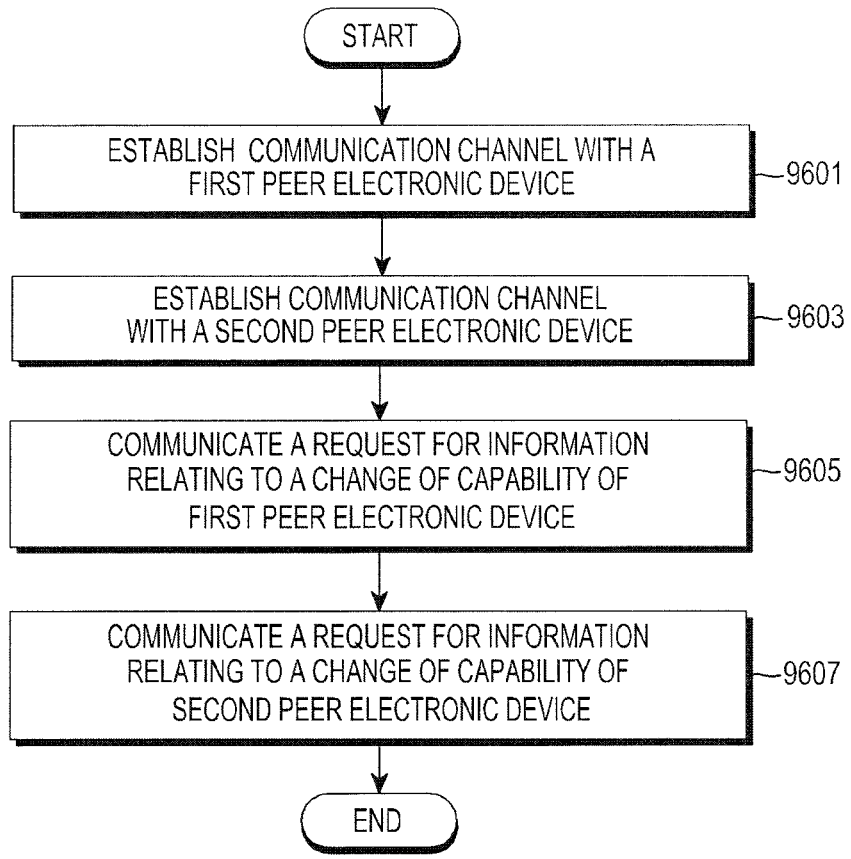
FIG. 96A illustrates a flowchart for exchanging capabilities between electronic device according to an embodiment of the present disclosure.

FIG. 96A illustrates a flowchart for exchanging capabilities between electronic devices according to an embodiment of the present disclosure.

Referring to FIG. 96A, at operation 9601, the electronic device may establish a communication channel with a first peer electronic device. The electronic device may establish one or more communication channels with the first peer electronic device.

At operation 9603, the electronic device may establish a communication channel with a second peer electronic device. The electronic device may establish one or more communication channels with the second peer electronic device.

According to various embodiments of the present disclosure, operations 9601 and 9603 may be performed contemporaneously. For example, the electronic device may establish the one or more communication channels with the first peer electronic device contemporaneously with establishing one or more communication channels with the second peer electronic device.

At operation 9605, the electronic device communicates a request for information relating to a change of capability of the first peer electronic device. For example, the electronic device may communicate a service capability update request to the first peer electronic device.

At operation 9607, the electronic device communicates a request for information relating to a change of capability of the second peer electronic device. For example, the electronic device may communicate a service capability update request to the second peer electronic device.

According to various embodiments of the present disclosure, operations 9605 and 9607 may be performed contemporaneously. For example, the electronic device may communicate a service capability update request to the first electronic device contemporaneously with communicating a service capability update request to the second peer electronic device.

Figure 96B:
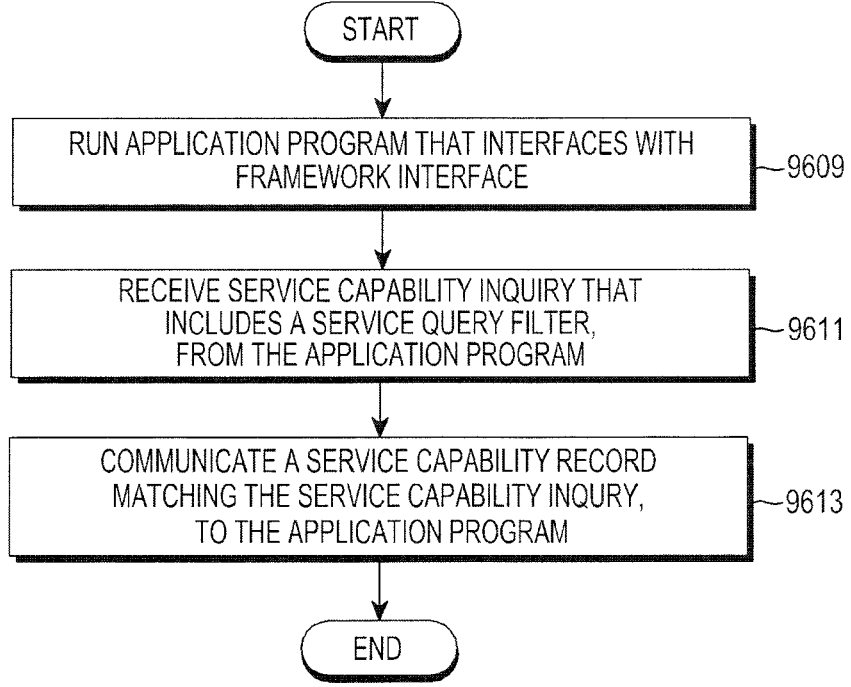
FIG. 96B illustrates a flowchart for capability exchange with an application program according to an embodiment of the present disclosure.

FIG. 96B illustrates a flowchart for capability exchange with an application program according to an embodiment of the present disclosure.

Referring to FIG. 96B, at operation 9609, the electronic device may execute one or more application programs. The electronic device may be configured to provide a framework interface by executing instructions stored in a memory.

At operation 9611, the framework interface may receive a service capability inquiry from at least one of the one or more application programs. The service capability inquiry may include a service query filter.

At operation 9613, the framework interface may communicate a service capability record matching the service capability inquiry to the at least one of the one or more application programs. The framework interface may communicate the service capability record to the at least one of the one or more application programs from which a corresponding service capability inquiry was received. The framework interface may communicate service capability records that match the service capability inquiry according to the service query filter. For example, the framework interface may determine which service capability records (e.g., stored locally) satisfy the service query filter.

Figure 97:
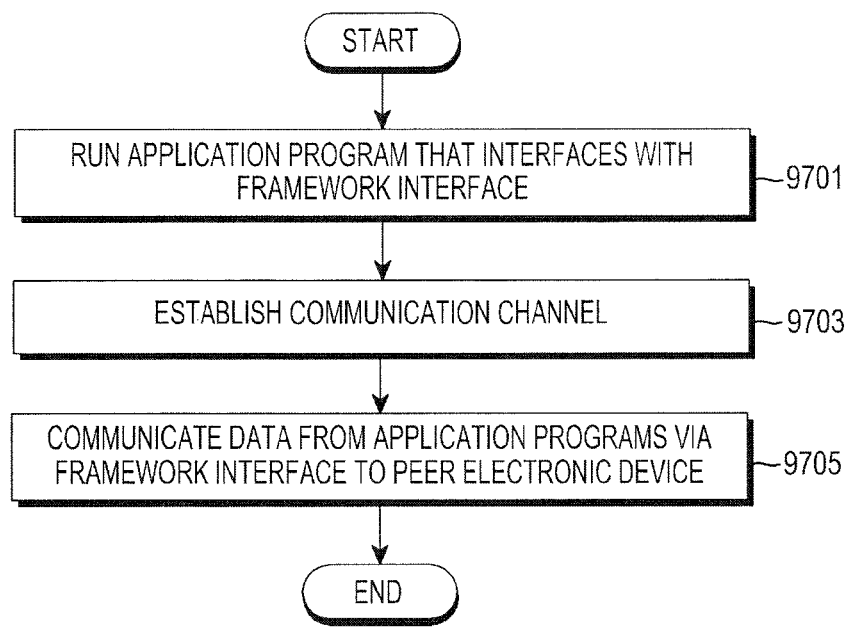
FIG. 97 illustrates a flowchart for operating an electronic device according to an embodiment of the present disclosure.

FIG. 97 illustrates a flowchart for operating an electronic device according to an embodiment of the present disclosure.

Referring to FIG. 97, at operation 9701, the electronic device may run an application program that interfaces with a framework interface. The application program may be configured to interface with the framework interface. The application program may support one or more services. For example, each of the services may include one or more service objectives. The electronic device may perform a service objective by exchanging (e.g., sending and/or receiving) application messages with a peer electronic device.

At operation 9703, the electronic device may establish a communication channel with a peer electronic device. The electronic device may establish one or more communication channels with the peer electronic device.

At operation 9705, the electronic device may communicate data from an application program via the framework interface to the peer electronic device. For example, the electronic device may route data from at least one application program using the framework interface to the peer electronic device. The application program may FIG. 98 illustrates a flowchart for operating an electronic device according to an embodiment of the present disclosure.

Figure 98:
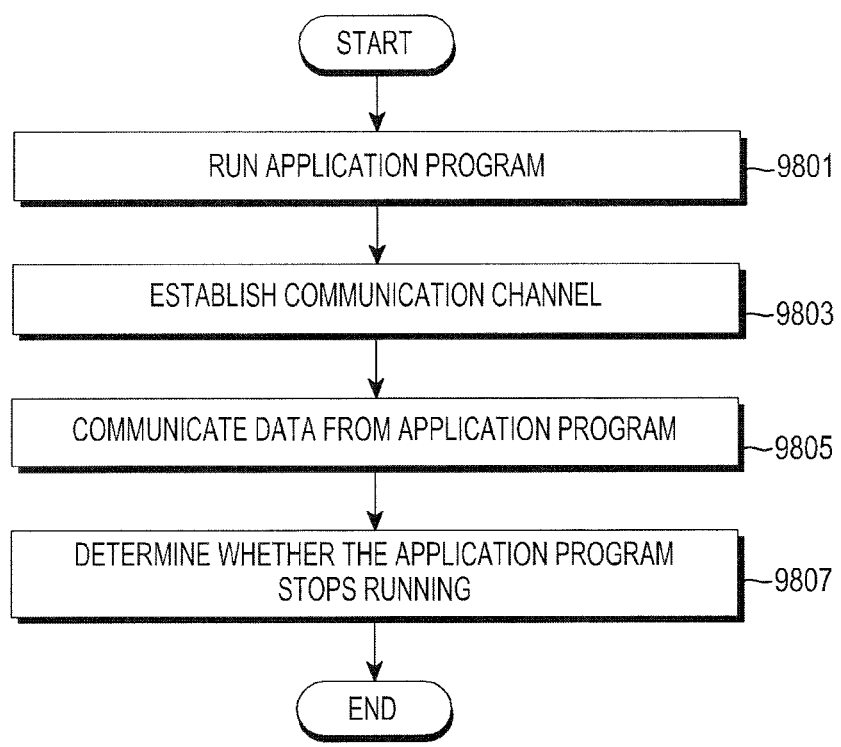
FIG. 98 illustrates a flowchart for operating an electronic device according to an embodiment of the present disclosure.

Referring to FIG. 98, at operation 9801, the electronic device may run an application program. The electronic device may run one or more application programs. The application program may be configured to interface with the framework interface. For example, the electronic device may run one or more application programs on the framework interface that is configured to interface with an operating system of the electronic device.

At operation 9803, the electronic device may establish a communication channel with a peer electronic device. The electronic device may establish one or more communication channels with the peer electronic device.

At operation 9805, the electronic device may communicate data from an application program. For example, the electronic device may communicate data from at least one of the one or more application programs. The electronic device may communicate the data from the application program over at least one of the one or more established communication channels.

At operation 9807, the electronic device may determine whether an application program stops running. For example, the electronic device may determine whether at least one of the one or more application programs stops running. The electronic device may determine whether the application program stops running based at least partly in response to a function of the operating system. As an example, the interface framework of the electronic device may determine whether at least one of the one or more application programs stops running. The interface framework of the electronic device may determine whether the application program stops running based at least partly in response to a function of the operating system.

Figure 99:
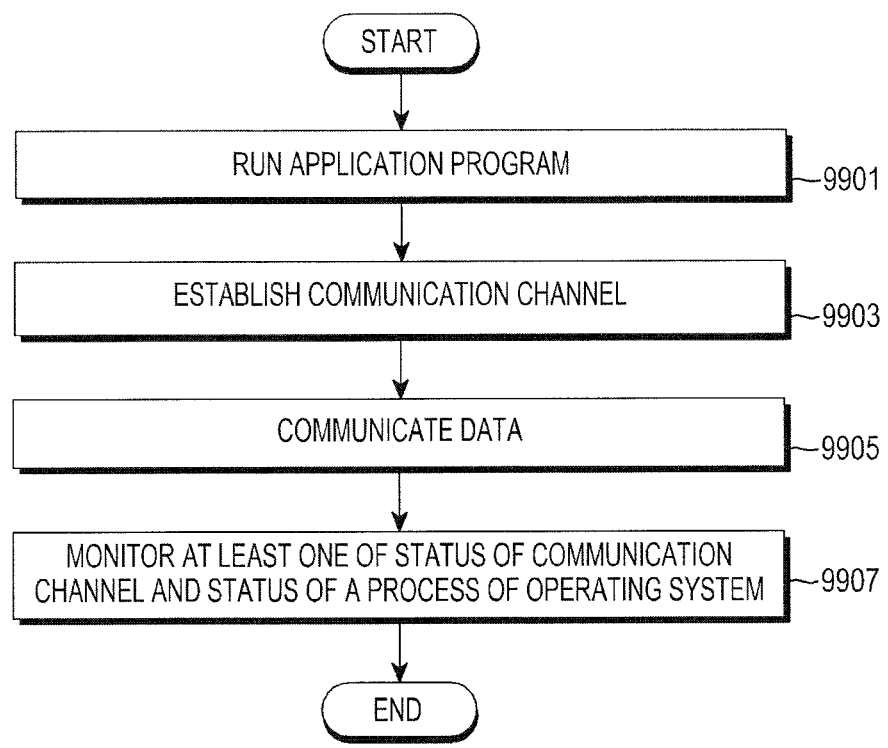
FIG. 99 illustrates a flowchart for monitoring a status of an application program on an electronic device according to an embodiment of the present disclosure.

FIG. 99 illustrates a flowchart for monitoring a status of an application program on an electronic device according to an embodiment of the present disclosure.

Referring to FIG. 99, at operation 9901, the electronic device may run an application program that interfaces with a framework interface. The application program may be configured to interface with the framework interface. The application program may support one or more services. For example, each of the services may include one or more service objectives. The electronic device may perform a service objective by exchanging (e.g., sending and/or receiving) application messages with a peer electronic device.

At operation 9903, the electronic device may establish a communication channel with a peer electronic device. The electronic device may establish one or more communication channels with the peer electronic device.

At operation 9905, the electronic device may communicate data. For example, the electronic device may communicate data with the peer electronic device using at least one of the one or more established communication channels.

At operation 9907, the electronic device may monitor at least of a status of at least one of the one or more communication channels and a status of at least one process of the operating system. For example, the interface framework of the electronic device may monitor at least of a status of at least one of the one or more communication channels and a status of at least one process of the operating system.

Figure 100:
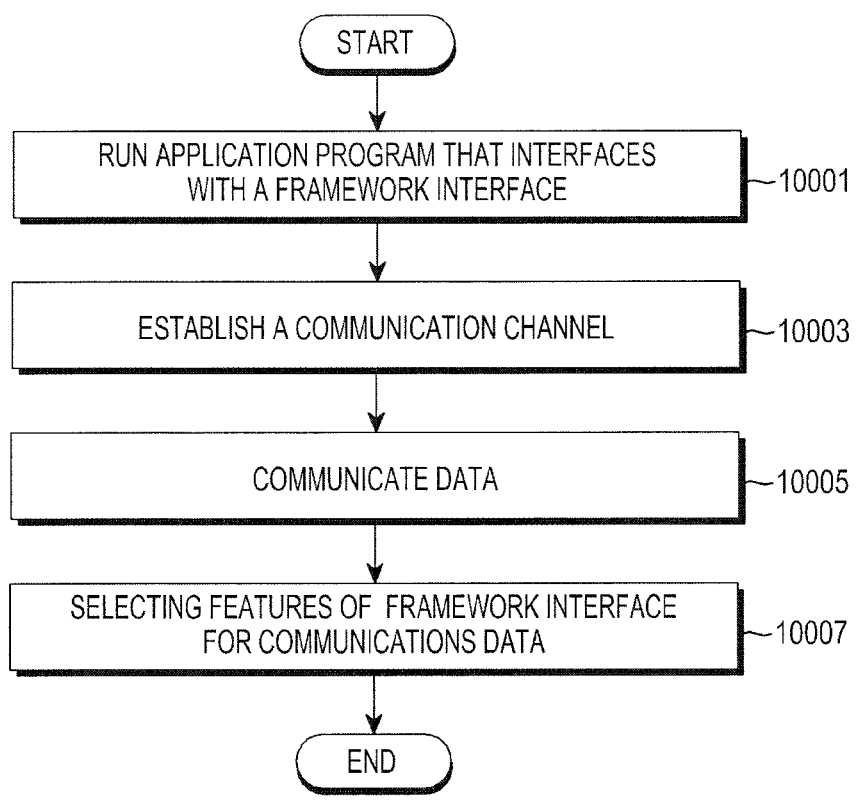
FIG. 100 illustrates a flowchart for operating an electronic device according to an embodiment of the present disclosure.

FIG. 100 illustrates a flowchart for operating an electronic device according to an embodiment of the present disclosure.

Referring to FIG. 100, at operation 10001, the electronic device may run an application program that interfaces with a framework interface. The application program may be configured to interface with the framework interface. The application program may support one or more services. For example, each of the services may include one or more service objectives. The electronic device may perform a service objective by exchanging (e.g., sending and/or receiving) application messages with a peer electronic device.

At operation 10003, the electronic device may establish a communication channel with a peer electronic device. The electronic device may establish one or more communication channels with the peer electronic device.

At operation 10005, the electronic device may communicate data. For example, the electronic device may communicate data with the peer electronic device using at least one of the one or more established communication channels.

At operation 10007, the electronic device may select features of the framework interface for communicating data to the peer electronic device. For example, the electronic device may select a subset of all features available in the framework interface for communicating the data according to at least one of a feature of a capability of the electronic device or a feature of a capability of the peer electronic device.

Figure 101:
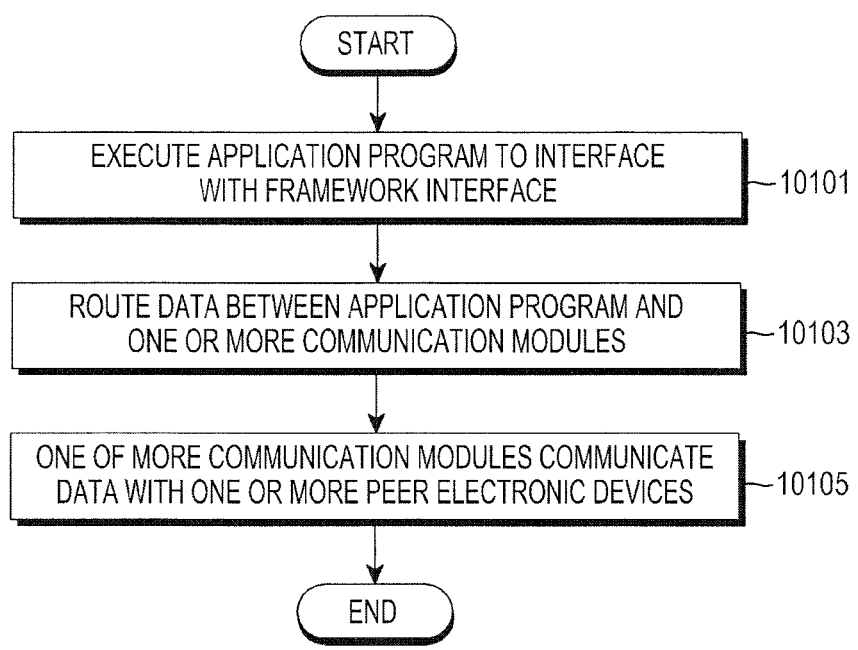
FIG. 101 illustrates a flowchart of a method for operating an electronic device according to an embodiment of the present disclosure.

FIG. 101 illustrates a flowchart of a method for operating an electronic device according to an embodiment of the present disclosure.

Referring to FIG. 101, in operation 10101, at least one processor of an electronic device executes an application program to interface with a framework interface.

In operation 10103, the at least one processor of the electronic device routes data between the application program and one or more communication modules.

Here, each of the one or more communication modules is configured to operate according to a selected one of one or more communication protocols, wherein the framework interface is configured to select at least one of the communication modules for at least part of the data.

In operation 10105, the one or more communication modules communicate the data with one or more peer electronic devices.

Figure 102:
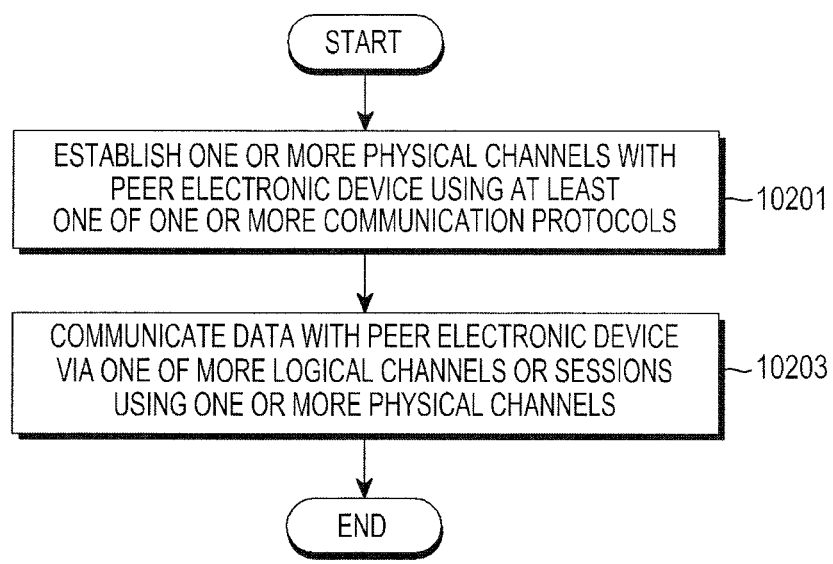
FIG. 102 illustrates a flowchart of a method for operating an electronic device according to an embodiment of the present disclosure.

FIG. 102 illustrates a flowchart of a method for operating an electronic device according to an embodiment of the present disclosure.

Referring to FIG. 102, in operation 10201, the electronic device establishes one or more physical channels with a peer electronic device using at least one of one or more communication protocols.

In operation 10203, the electronic device communicates data with the peer electronic device via one or more logical channels or sessions using the one or more physical channels. Here, the one or more logical channels or sessions are independent of the at least one of the communication protocols.

Figure 103:
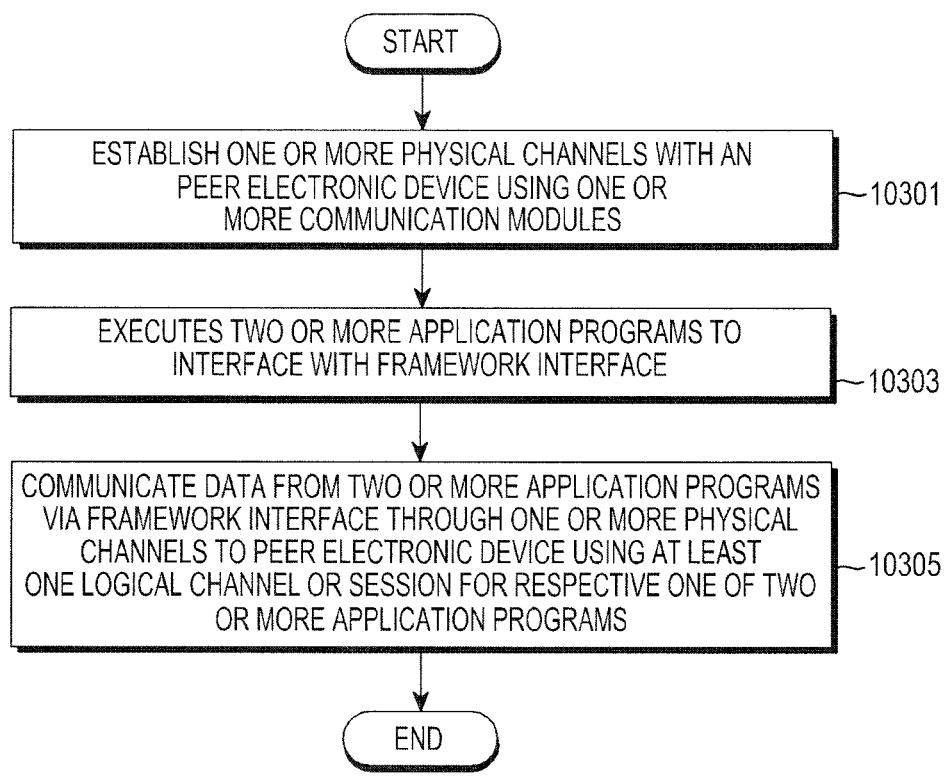
FIG. 103 illustrates a flowchart of a method for operating an electronic device according to an embodiment of the present disclosure.

FIG. 103 illustrates a flowchart of a method for operating an electronic device according to an embodiment of the present disclosure.

Referring to FIG. 103, in operation 10301, an electronic device configured to provide a framework interface establishes one or more physical channels with a peer electronic device using a communication module.

In operation 10303, the electronic device executes two or more application programs to interface with the framework interface.

In operation 10305, data is communicated from the two or more application programs via the framework interface through the one or more physical channels to the peer electronic device using at least one logical channel or session for a respective one of the two or more application programs.

When communicating the data via the framework interface in operation 10305, the framework interface provides data packing including a payload to the communication module. Here, the payload includes first data from one of the two or more application programs, and second data from another of the two or more application programs.

Figure 104:
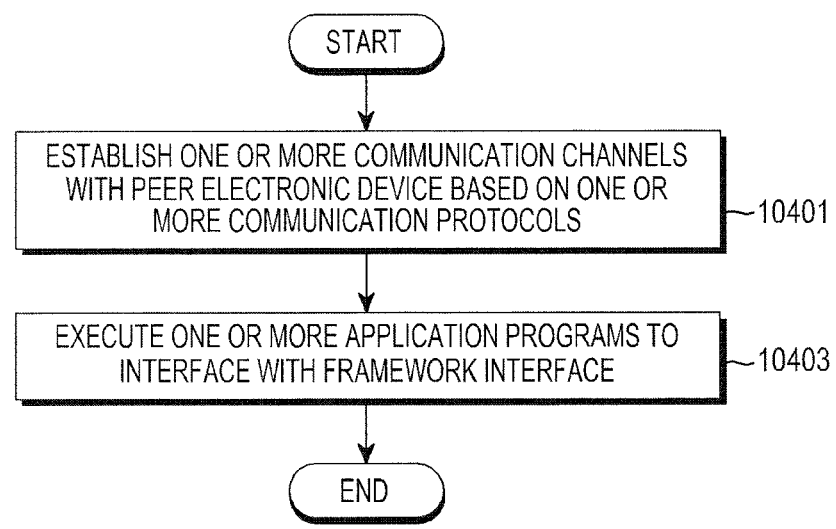
FIG. 104 illustrates a flowchart of a method for operating an electronic device according to an embodiment of the present disclosure.

FIG. 104 illustrates a flowchart of a method for operating an electronic device according to an embodiment of the present disclosure.

Referring to FIG. 104, in operation 10401, an electronic device configured to provide a framework interface establishes one or more communication channels with a peer electronic device, based on one or more communication protocols.

In operation 10403, the electronic device executes one or more application programs to interface with the framework interface.

Here, in one embodiment, the framework interface may be configured to communicate information on a version of the framework interface with the peer electronic device during discovery of the peer electronic device.

In another embodiment, the framework interface is configured to transmit a special message to the peer electronic device for determining compatibility. Here, the special message includes information pertaining to a version.

In yet another embodiment, the framework interface is configured to include a header according to a frame format to each message transmitted to the peer electronic device. Here, the header includes a version that indicates the frame format which the framework interface uses to determine frame format compatibility.

Figure 105:
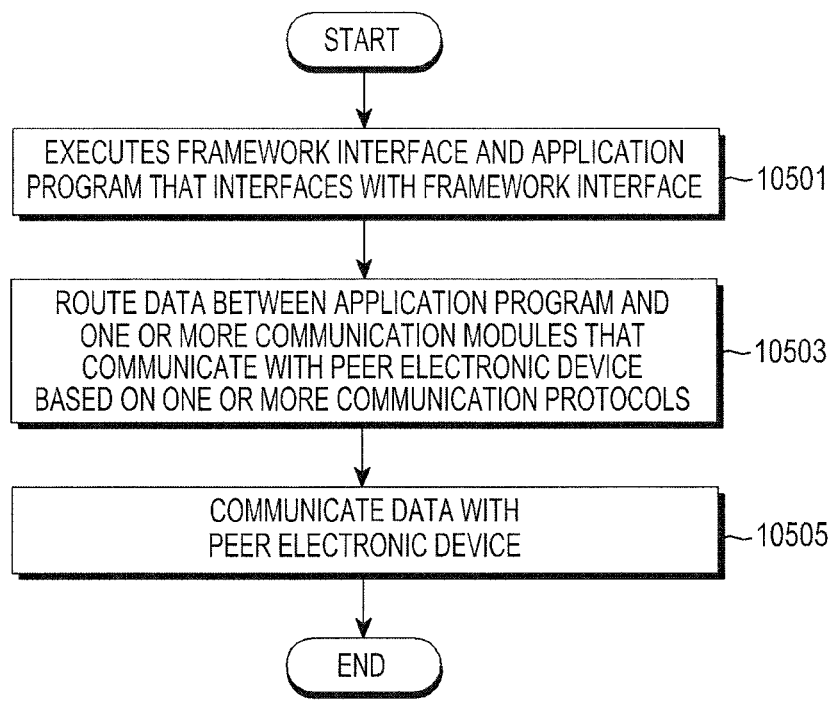
FIG. 105 illustrates a flowchart of a method for an electronic device to communicate with another electronic device according to an embodiment of the present disclosure.

FIG. 105 illustrates a flowchart of a method for an electronic device to communicate with another electronic device according to an embodiment of the present disclosure.

Referring to FIG. 105, in operation 10501, at least one processor executes a framework interface and an application program that interfaces with the framework interface.

In operation 10503, the at least one processor routes data between the application program and one or more communication modules that communicate with the peer electronic device based on one or more communication protocols.

In operation 10505, the one or more communication modules communicate the data with the peer electronic device.

In one embodiment, the framework interface may include a session layer configured to receive information from the application program and to manage one or more logical channels or sessions used for communicating the data with the peer electronic device, based at least partly on the information from the application program.

In another embodiment, the framework interface may include a transport layer configured to receive information from the application program and to match the application program with one or more logical channels or sessions used for communicating the data with the peer electronic device, based at least partly on the information from the application program.

Figure 106:
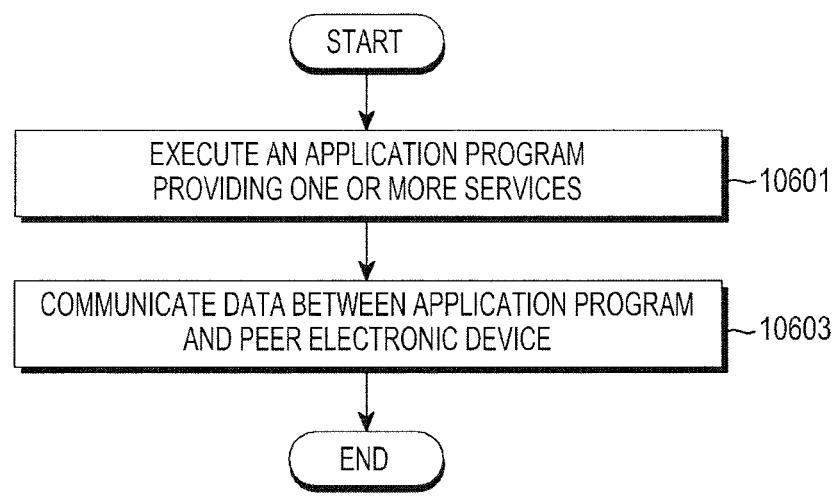
FIG. 106 illustrates a flowchart of a method for an electronic device to communicate with another electronic device according to an embodiment of the present disclosure.

FIG. 106 illustrates a flowchart of a method an electronic device to communicate with another electronic device according to an embodiment of the present disclosure.

Referring to FIG. 106, in operation 10601, at least one processor executes an application program providing one or more services.

In operation 10603, one or more communication modules, configured to communicate with a peer electronic device based on one or more communication protocols, communicate data between the application program and the peer electronic device.

The application program includes one or more service agents, wherein each of the one or more service agents is assigned to handle data for one of the one or more services provided by the application program.

Figure 107:
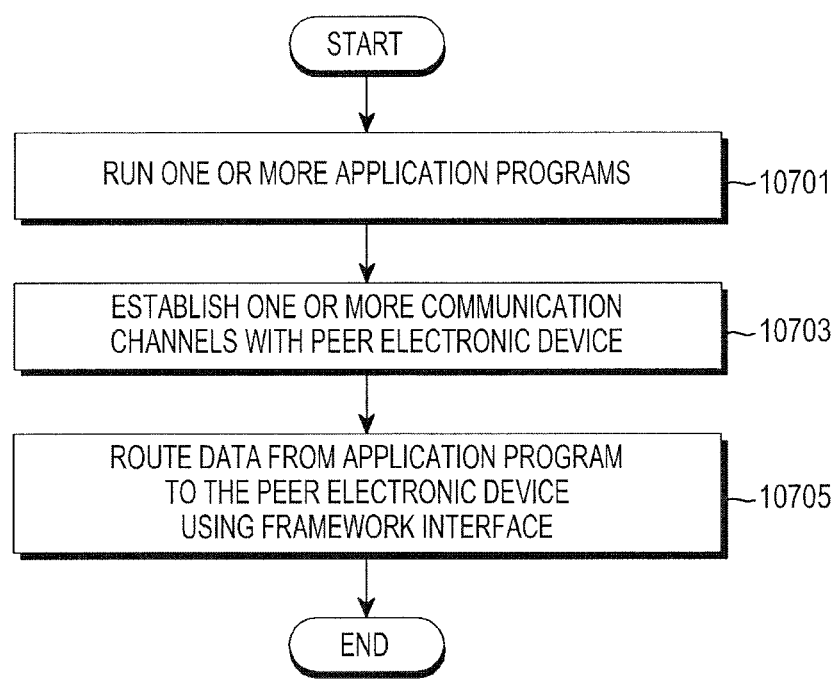
FIG. 107 illustrates a flowchart of a method for operating an electronic device according to an embodiment of the present disclosure.

FIG. 107 illustrates a flowchart of a method for operating an electronic device according to an embodiment of the present disclosure.

Referring to FIG. 107, at operation 10701, the electronic device executes one or more application programs. The electronic device may be configured to provide a framework interface. For example, the electronic device may be configured to provide the framework interface by executing instructions stored in a memory.

At operation 10703, the electronic device establishes one or more communication channels with a peer electronic device.

At operation 10705, the electronic device routes data from an application program to the peer electronic device using the framework interface. For example, the electronic device routes data from at least one of the one or more application programs being executed by the electronic device via the framework interface to the electronic device.

The one or more application programs being executed by the electronic device may support one or more services. For example, each of the one or more application programs may support one or more services.

The one or more services may include one or more service objectives. For example, each of the one or more services of the one or more application programs may include a service objective.

According to various embodiments of the present disclosure, the one or more application programs may provide the one or more service objectives by communicating an application message with the peer electronic device. For example, an application program may provide a service objective to the user of the electronic device using application message exchange with the peer electronic device (e.g., which may be a service provider or a service consumer in relation to a specific service objective)

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for operating an electronic device, the method comprising:
   executing, by at least one processor of the electronic device, an application program to interface with a framework interface;
   routing, by the framework interface, data associated with the application program between the application program and two or more communication modules via a plurality of logical channels,
      wherein the framework interface is configured to assign at least part of the data to a plurality of logical channels based on information received from the application program and select two or more different communication protocols based on the information received from the application program,
      wherein the two or more communication modules operate according to the selected two or more different communication protocols, and
      wherein the framework interface is configured to select at least one of the one or more communication modules for at least part of the data; and
   controlling the two or more communication modules to transmit a message including the at least part of the data that is routed via each of the plurality of logical channels to one or more external electronic devices,
   wherein a communication is performed based on one or more channel identifiers, each of which is indicative of a respective one of one or more logical channels, and
   wherein the one or more channel identifiers are used to indicate the one or more logical channels or sessions on which the data is to be delivered.

2. The method of claim 1, further comprising:
   providing to the framework interface, by the application program, at least one of a preference or a selection of the one or more communication protocols,
   wherein the routing of the data between the application program and the one or more communication modules is based at least partly on the one of the preference or the selection of the one or more communication protocols.

3. The method of claim 2, wherein the at least one of the preference or the selection comprises at least one of an identified number of the communication channels or a Quality of Service (QoS) of the communication channels.

4. The method of claim 1,
   wherein the routing of data comprises routing portions of the data from the application program to the two or more communication modules simultaneously or in sequence.

5. The method of claim 1, wherein the application program includes one of a media controller application, a camera application, a messaging application, a notification application, a calendar application, a contact application, a weather application, a pedometer application, a find device application, an alarm application, a voice memo application, a file transfer application, a call log application, or a context application.

6. The method of claim 1, wherein the communicating of the data with the one or more external devices comprises establishing, by the framework interface, one or more communication channels with the one or more external devices.

7. The method of claim 6, wherein the one or more communication channels include at least one of one or more physical channels or one or more logical channels.

8. The method of claim 1,
   wherein the routing of data comprises routing data from the application program to a single communication module,
   wherein the single communication module operates according to a first communication protocol for at least part of the data, and
   wherein the single communication module operates according to a second communication protocol for at least another part of the data.

9. An electronic device comprising:
   communication modules, wherein the communication modules are configured to communicate with one or more external electronic devices based on one or more communication protocols; and
   at least one processor configured to:
      execute an application program to interface with a framework interface,
      route data associated with the application program between the application program and two or more communication modules via a plurality of logical channels,
         wherein the framework interface is configured to assign at least part of the data to a plurality of logical channels based on information received from the application program and select to or more different communication protocols based on the information received from the application program, and wherein the framework interface is configured to select at least one of the two or more communication modules for at least part of the data, and
control the two or more communication modules to transmit the message including the at least part of the data that is routed via each of the plurality of logical channels to the one or more external electronic devices based on the selected two or more different communication protocols,
wherein a communication is performed based on one or more channel identifiers, each of which is indicative of a respective one of one or more logical channels, and
wherein the one or more channel identifiers are used to indicate the one or more logical channels or sessions on which the data is to be delivered.

10. The electronic device of claim 9,
wherein the application program is configured to provide to the framework interface at least one of a preference or a selection of the one or more communication protocols, and
wherein the data is routed between the application program and the one or more communication modules, based at least partly on the at least one of the preference or the selection of the one or more communication protocols.

11. The electronic device of claim 10, wherein the at least one of the preference or the selection comprises at least one of an identified number of the communication channels and a Quality of Service (QoS) of the communication channels.

12. The electronic device of claim 9,
wherein portions of the data are routed from the application program to the two or more communication modules simultaneously or in sequence.

13. The electronic device of claim 9, wherein the application program includes one of a media controller application, a camera application, a messaging application, a notification application, a calendar application, a contact application, a weather application, a pedometer application, a find device application, an alarm application, a voice memo application, a file transfer application, a call log application, or a context application.

14. The electronic device of claim 9, wherein the framework interfaces are configured to establish one or more communication channels with the one or more external devices for communication of data with the one or more external electronic devices.

15. The electronic device of claim 14, wherein the one or more communication channels include at least one of one or more physical channels or one or more logical channels.

16. The electronic device of claim 9, wherein the application program is configured to provide one or more services with the one or more external electronic devices, through the framework interface.

* * * * *